US007599581B2

(12) United States Patent
Satoh et al.

(10) Patent No.: US 7,599,581 B2
(45) Date of Patent: Oct. 6, 2009

(54) ELECTRONIC IMAGING APPARATUS

(75) Inventors: Yoshiaki Satoh, Tokyo (JP); Yawara Saitoh, Tokyo (JP); Izuru Kiyokawa, Yokohama (JP)

(73) Assignee: Olympus Corporation, Tokyo (JP)

( * ) Notice: Subject to any disclaimer, the term of this patent is extended or adjusted under 35 U.S.C. 154(b) by 425 days.

(21) Appl. No.: 11/647,345

(22) Filed: Dec. 29, 2006

(65) Prior Publication Data

US 2007/0109427 A1    May 17, 2007

Related U.S. Application Data

(60) Division of application No. 10/818,302, filed on Apr. 6, 2004, now abandoned, which is a continuation of application No. 09/574,455, filed on May 19, 2000, now abandoned, which is a continuation of application No. 08/786,222, filed on Jan. 21, 1997, now Pat. No. 6,111,662, which is a continuation of application No. 08/305,776, filed on Sep. 14, 1994, now Pat. No. 5,717,496, which is a division of application No. 08/154,438, filed on Nov. 19, 1993, now abandoned.

(30) Foreign Application Priority Data

| Nov. 19, 1992 | (JP) | ................................. 4-333707 |
| Dec. 17, 1992 | (JP) | ................................. 4-337007 |
| Jan. 21, 1993 | (JP) | ................................. 5-007879 |
| Mar. 1, 1993  | (JP) | ................................. 5-40178 |

(51) Int. Cl.
    *H04N 5/76*   (2006.01)
    *H04N 1/00*   (2006.01)
    *H04N 1/04*   (2006.01)
    *G06K 7/00*   (2006.01)

(52) U.S. Cl. .................... 382/312; 348/231.3; 358/404; 358/474

(58) Field of Classification Search .................... 360/3, 360/131; 358/400, 401, 500, 505, 444, 404, 358/1.16, 1.17, 523, 474; 382/312, 232; 348/231.3, 231.2
See application file for complete search history.

(56) References Cited

U.S. PATENT DOCUMENTS

| 4,180,789 A | 12/1979 | Martucci |
| 4,180,798 A | 12/1979 | Kokori et al. |
| 4,332,015 A | 5/1982 | Rimdzius |
| 4,500,926 A | 2/1985 | Yoshimaru |
| 4,567,515 A | 1/1986 | Schumacher |

(Continued)

FOREIGN PATENT DOCUMENTS

JP    H2-309875 A    12/1990

(Continued)

*Primary Examiner*—Jerome Grant, II
(74) *Attorney, Agent, or Firm*—Pillsbury Winthrop Shaw Pittman, LLP

(57) ABSTRACT

In an electronic imaging apparatus, image information of an image signal photoelectrically converted from an image incident is stored in image information storing means in a format dependent upon a type of the applied storage device. Provided therein are communication means for transmitting and/or receiving image information generated in this apparatus or the other equivalent apparatuses while an operation mode of the apparatus is set for communication and switch means for causing the communication means to start a communication mode operation.

23 Claims, 98 Drawing Sheets

U.S. PATENT DOCUMENTS

| | | |
|---|---|---|
| 5,005,088 A | 4/1991 | Fukushima |
| 5,138,459 A | 8/1992 | Roberts et al. |
| 5,172,246 A | 12/1992 | Yoshida |
| 5,194,968 A | 3/1993 | Nakajima et al. |
| 5,208,681 A | 5/1993 | Yoshida |
| 5,231,501 A | 7/1993 | Sakai et al. |
| 5,291,302 A | 3/1994 | Gordon et al. |
| 5,349,448 A | 9/1994 | Hirai |
| 5,363,204 A | 11/1994 | Millman |
| 5,367,634 A | 11/1994 | Nakamura |
| 5,475,377 A | 12/1995 | Lee |
| 5,640,000 A | 6/1997 | Spriet |
| 5,659,823 A | 8/1997 | Mukai et al. |
| 5,745,101 A | 4/1998 | Yamamoto |
| 5,806,072 A | 9/1998 | Kuba et al. |
| 5,914,787 A | 6/1999 | Satoh et al. |
| 5,959,669 A | 9/1999 | Mizoguchi |
| 5,995,139 A | 11/1999 | Lee |
| 6,044,004 A | 3/2000 | Kramer |
| 6,085,047 A | 7/2000 | Taka |
| 6,111,604 A | 8/2000 | Hashimoto et al. |
| 6,583,893 B1 | 6/2003 | Satoh et al. |
| 6,600,829 B1 | 7/2003 | Affeldt |
| 6,882,440 B1 * | 4/2005 | Nitta .................... 358/1.16 |
| 7,317,477 B2 * | 1/2008 | Shimizu ................ 348/220.1 |
| 7,352,390 B2 * | 4/2008 | Gonzalez ............... 348/208.6 |
| 2001/0043272 A1 | 11/2001 | Sato |
| 2008/0136966 A1 * | 6/2008 | Hashimoto ................ 348/500 |

FOREIGN PATENT DOCUMENTS

| | | |
|---|---|---|
| JP | H2-108468 A | 1/1992 |
| JP | H4-167868 A | 6/1992 |
| JP | H4-183066 A | 6/1992 |
| JP | 63-221498 | 9/1998 |

* cited by examiner

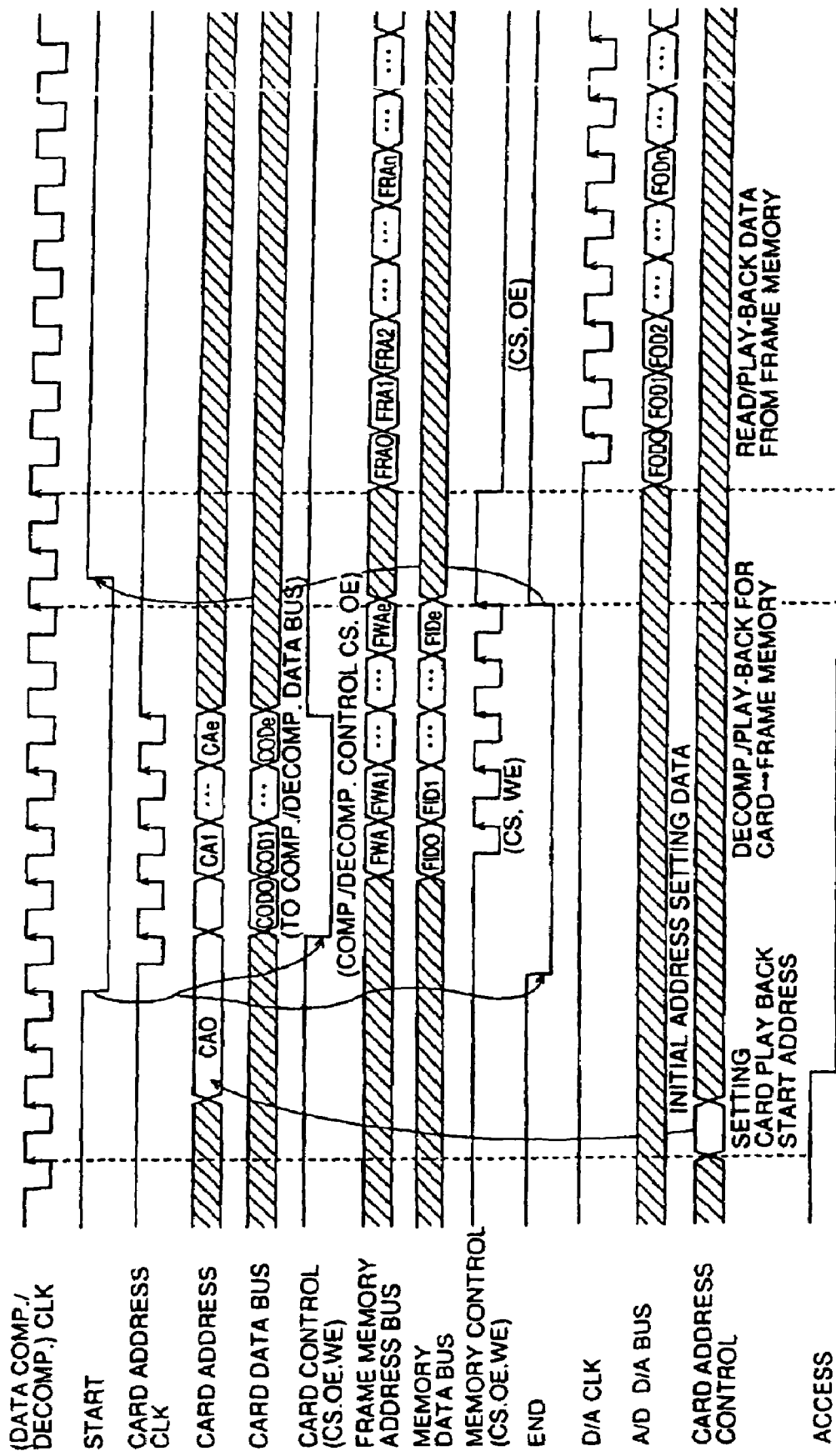

FIG.9

| NO. | CAUSE |
|---|---|
| #1, #1' | ○ RECEPTION SIDE CARD HAS NOT BEEN INSERTED<br>○ 'PROTECT' IS APPLIED TO RECEPTION SIDE CARD<br>○ NO EMPTY CAPACITY EXISTS IN RECEPTION SIDE CARD<br>○ RECEPTION SIDE CARD HAS NOT BEEN FORMATTED |
| #2, #2' | ○ SIDE OF TRANSMISSION IMAGE DATA FILE IS GREATER THAN THAT OF RECEPTION SIDE CARD EMPTY CAPACITY |
| #3, #3' | ○ EMPTY CAPACITY COMES TO NONE AFTER DATA IS RECORDED TO RECEPTION SIDE CARD |

○ TRANSMISSION SIDE TRANSMITS 'COMM.END' AND COMES TO 'END' WHEN 'NG' IS TRANSMITTED.

FIG.10

| MODE | CAMERA IMAGE (REC) | PLAY-BACK (PLAY) | TRANSMISSION (SEND) | TRANSMISSION (RECEIVE) |
|---|---|---|---|---|
| TRIGGER 2 | START | — | TRANSMISSION START | — |
| COMM. MODE | — | — | 'COMM.REQ.' TRANSMIT ↓ 'OK' COMES ↓ 'PLAY' 'TEL'MARK} DISPLAY | — |

|  | REC | PLAY | TRANSMISSION (TRANSMIT) | TRANSMISSION (RECEIVE) |
|---|---|---|---|---|
| TRIGGER 2 | START | — | TRANSMISSION START | 'SEND NEXT IMAGE' (PREVIOUSLY RECEIVED IMAGE OK) |
| COMM. MODE SW. | — | — | 'COMM.REQ.' TRANSMIT | — |
| ▶ PLUS SEND SW. | — | +1 | +1 | 'SEND NEXT IMAGE' (ERASE PREVIOUSLY RECEIVED IMAGE) |
| ◀ MINUS SEND SW. | — | −1 | −1 | 'SEND IMMEADIATELY PREVIOUS IMAGE' |

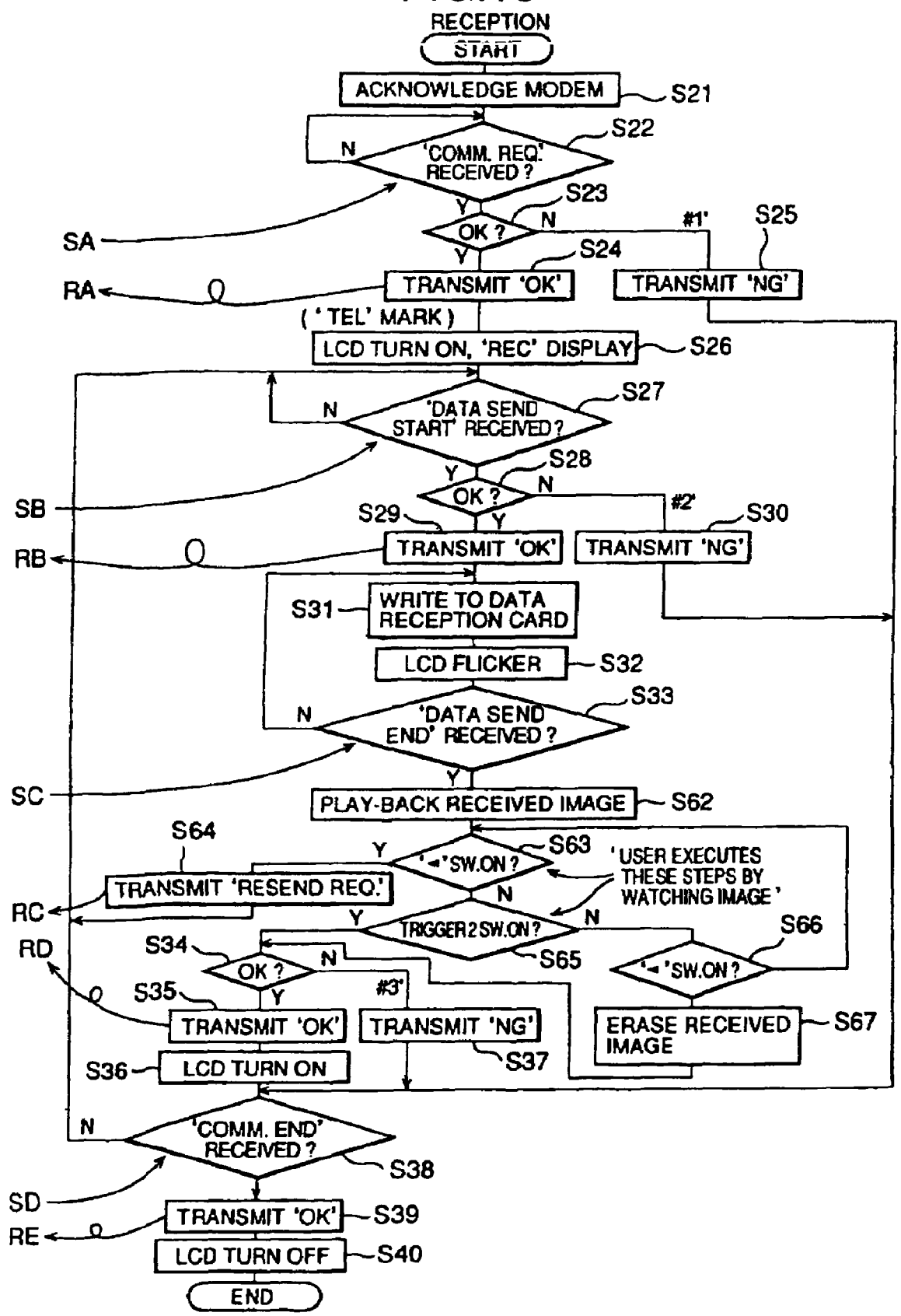

```
INFO
  SEND1    — TRANSMISSION COMMAND                        COMM.
  DATA =   92,   05,   25,   15,   40,   00    ──→  START
          └──┘ └──┘ └──┘ └──┘ └──┘ └──┘              TIME
         ( YEAR MONTH DAY  TIME  MIN.  SEC. )
                                                     PARTNER
  PHONE =  0 1 2 3 4 5 6 7 8 9                  ──→  SIDE
                                                     TEL. NO.
     1.  DSC00001.J6I  ⎫
     2.  DSC00002.J6S  ⎬  IMAGE FILE TO SEND
     3.  DSC00003.J6I  ⎪
     4.  DSC00004.J6I  ⎭
  END
```

FIG.33

|  | TRANSMISSION SIDE | RECEPTION SIDE |
|---|---|---|

(A) EXAMPLE 1
```
    INFO
        SENDI_ RESULT
            FAULT 1
        END
```

INFO        (COMM. END TIME)
```
    ACCEPT_ RESULT
        DATE=92,05,25,15,50,00
        FAULT 1
    END
```

(B) EXAMPLE 2
```
    INFO
        SENDI_ RESULT
            1.  DSC00001.J6I, OK
            2.  DSC00002.J6S, OK
            3.  DSC00003.J6I, NG
            4.  DSC00004.J6I, NG
        END
```

```
INFO
    ACCEPT_ RESULT
        DATE=92,05,25,15,50,00
        1.  DSC00001.J6I
        2.  DSC00002.J6S
        FAULT 2

END
```

(C) EXAMPLE 3
```
    INFO
        SENDI_ RESULT
            1.  DSC00001.J6I, OK
            2.  DSC00002.J6S, OK
            3.  DSC00003.J6I, OK
            4.  DSC00004.J6I, OK
        END
```
IN THE CASE THAT ALL ARE SUCCESSFUL

```
INFO
    ACCEPT_ RESULT
        DATE=92,05,25,15,50,00
        1.  DSC00001.J6I
        2.  DSC00002.J6S
        3.  DSC00003.J6I
        4.  DSC00004.J6I
    END
```

FIG.34

```
INFO
    SENDI      ······ (TRANSMISSION COMMAND)
        DATA =   92, 05, 25, 15, 40, 00
        PHONE =  0 1 2 3 4 5 6 7 8 9
            1.  IMAGE ALL
                 ( SOUND ALL )
                 ( FILE ALL  )
    END
```

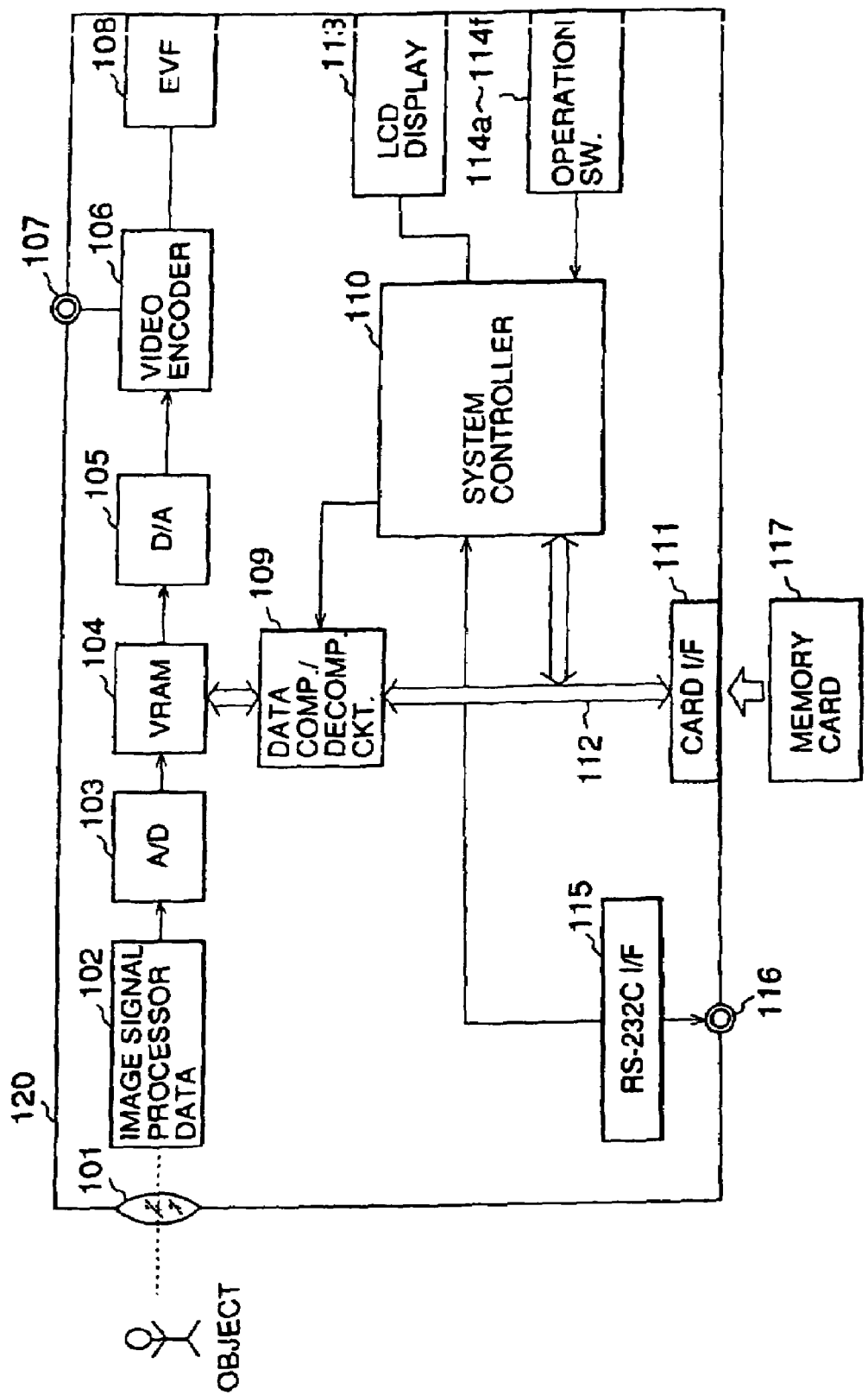

FIG. 36(A)

|  | SPACE | MARK |
|---|---|---|
| BINARY | 0 /ON | 1 /OFF |
| OUTPUT CONDITION | +5~+15V | −5~−15V |
| INPUT CONDITION | ≥+3V | ≤−3V |

FIG. 36(B)

| PIN NO. | SIGNAL NAME | SIGNAL DIRECTION DTE DCE | DESCRIPTION |
|---|---|---|---|
| 1 | FG | ←→ | FRAME GROUND (SHIELD OF GROUND OR CABLE FOR MAINTENANCE) |
| 2 | SD | → | SEND DATA |
| 3 | RD | ← | RECEIVE DATA |
| 4 | RS | → | REQUEST TO SEND |
| 5 | CS | ← | CLEAR TO SEND |
| 6 | DR | ← | DATA · SET · READY |
| 7 | SG | ←→ | SIGNAL GROUND |
| 8 | CD | ← | DATA · CHANNEL RECEIVE CARRIER DETECTION |
| 12 | BCD | ← | BACKWARD · CHANNEL RECEIVE CARRIER DETECTION |
| 13 | BCS | ← | BACKWARD · CHANNEL SENDABLE |
| 14 | BSD | → | BACKWARD · CHANNEL SEND DATA |
| 15 | ST2 | ← | SEND SIGNAL ELEMENT · TIMING (DCE) |
| 16 | BRD | ← | BACKWARD · CHANNEL RECEIVE DATA |
| 17 | RT | ← | RECEIVE SIGNAL ELEMENT · TIMING (DCE) |
| 19 | BRS | → | BACKWARD · CHANNEL SEND REQUEST |
| 20 | ER | → | DATA TERMINAL READY |
| 21 | SQD | ← | DATA SIGNAL QUALITY DETECTION |
| 22 | CI | ← | CALLED INDICATION |
| 23 | SRS | ←→ | DATA SIGNAL SPEED SELECTION |
| 24 | ST1 | → | SEND SIGANL ELEMENT TIMING (DTE) |

FIG. 36(C)

| PIN NO. | SIGNAL NAME | DESCRIPTION |
|---|---|---|
| 2 | SD | SEND DATA |
| 3 | RD | RECEIVE DATA |
| 7 | SG | SIGNAL GROUND |

FIG. 36(D)

| PIN NO. | SIGNAL NAME | DESCRIPTION |
|---|---|---|
| 2 | SD | SEND DATA |
| 3 | RD | RECEIVE DATA |
| 4 | RS | REQUEST TO SEND |
| 5 | CS | CLEAR TO SEND |
| 6 | DR | DATA SET READY |
| 7 | SG | SIGNAL GROUND |
| 8 | CD | DATA CHANNEL RECEIVE CARRIER DETECTION |
| 20 | ER | DATA TERMINAL READY |

FIG. 42(A)
FIG. 42(B)
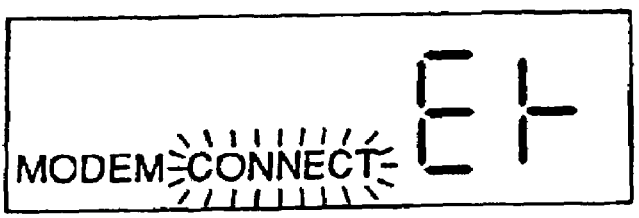
FIG. 42(C)
FIG.43
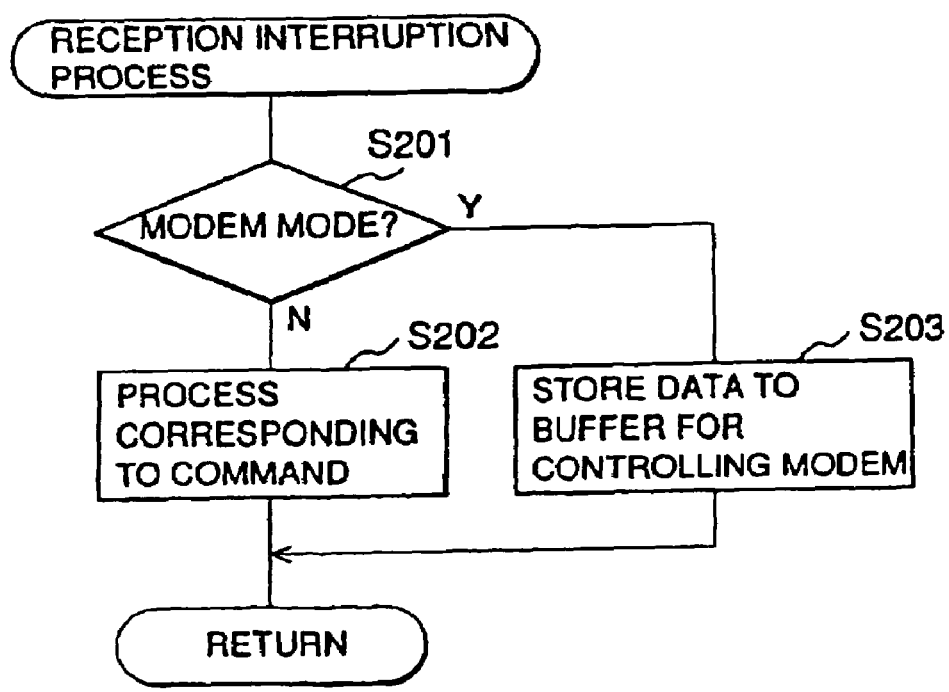

FIG. 55(A)

| No. | COMMAND | FUNCTION |
|---|---|---|
| 1 | PICK UP IMAGE | PICK UP IMAGE UNDER A SET CONDITION |
| 2 | SEND DIRECTORY | SEND DATA IN DIRECTORY IN CARD |
| 3 | SEND STATUS | SEND OPERATIONAL STASUS OF CAMERA |
| 4 | DESIGNATE FILE | DESIGNATE FILE AS A SUBJECT OF OPERATION (INCLUDING PLAY-BACK) |
| 5 | SEND COMMENT | SEND COMMENT PORTION OF HEADER IN DESIGNATED FILE |
| 6 | WRITE COMMENT | WRITE DESIGNATED COMMENT IN DESIGNATED FILE |
| 7 | SEND IMAGE PICK-UP DATA | SEND IMAGE PICK-UP DATA IN DESIGNATED FILE |
| 8 | SET IMAGE PICK-UP DATA | SEND IMAGE PICK-UP DATA OF CAMERA |
| 9 | GENERATE SUB-DIRECTORY | GENERATE SUB-DIRECTORY AND GENERATE CONTROL FILE IN SUB-DIRECTORY |
| 10 | MOVE FILE | MOVE DESIGNATED FILE TO DESIGNATED DIRECTORY |
| 11 | FILE | ERASE DESIGNATED FILE, DIRECTORY |
| 12 | CHANGE FILE NAME | CHANGE DESIGNATED FILE NAME |

FIG.56

```
FILE ; DSC 00001.J6I
IMAGE PICK UP DATA
92.11.11   15:48
COMMENT

┌─────────────────────┐
    │    TARO  YAMADA     │
    │                     │
    └─────────────────────┘
```

FIG.57

```
FILE ; DSC 00001.J6I
IMAGE PICK UP DATA
92.11.11   15:48
COMMENT

┌─────────────────────────┐
    │ TARO  YAMADA            │
    │ PICK UP IMAGE AT MT.FUJI│
    └─────────────────────────┘

DO YOU WRITE IN ?    Y [CR]
```

FIG.61
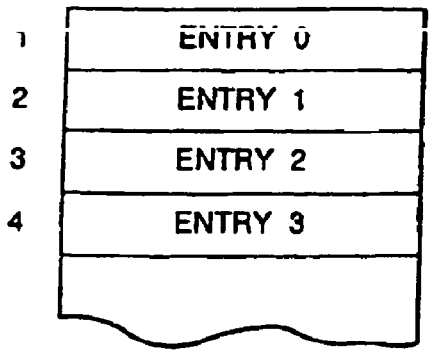
FIG.62
| 0 | 0BH | 0CH | 16H | 18H | 1AH | 1CH 1FH |
|---|---|---|---|---|---|---|
| NAME | ATTRIBUTE | (RESERVE) | TIME | DATE | LEADING CLUSTER | FILE SIZE |
FIG.62(A)
| DATA | ATTRIBUTE |
|---|---|
| 00H | COMMON FILE |
| 01H | READ EXCLUSIVE FILE |
| 02H | CONCEALED FILE |
| 04H | SYSTEM FILE |
| 08H | VOLUME ID |
| 10H | SUB-DIRECTORY |
| 20H | ARCHIVE FILE |
FIG.63
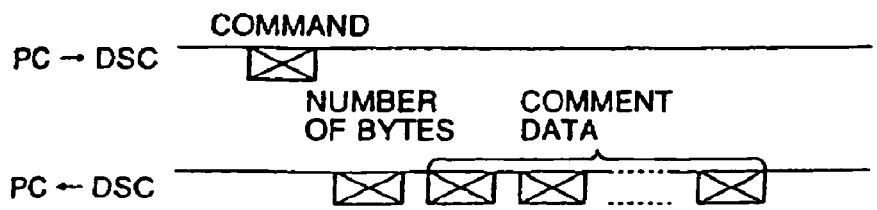

FIG.67

1. GENERATE SUB-DIRECTORY

2. MOVE FILE

NO. INPUT > 1 [CR]

FIG.68

GENERATE SUB-DIRECTORY

COMMEMT

EXECUTE? > Y [CR]

FIG.69

MOVE FILE

1. DSC 00001. J6I
2. (SDIR 02)
   2.1 DSC 02001. J6I
3. DSC 00003. J6I

MOVE WHICH FILE?

FIG. 78(A)

| TUPLE ID | ABBREVIATION | MEANING |
|---|---|---|
| 00H | CISTPL_NULL | NULL TUPLE (NULLIFY) |
| 01H | CISTPL_DEVICE | DEVICE INFORMATION TUPLE (COMMON MEMORY) |
| 02H~07H | — | RESERVE (DEVICE INFORMATION TUPLE FOR HIGH-ORDER COMPATIBLE VERSION) |
| 08H~0FH | — | RESERVE (DEVICE INFORMATION TUPLE FOR HIGH-ORDER INCOMPATIBLE VERSION) |
| 10H | CISTPL_CHECKSUM | CHECK SUM TUPLE |
| 11H | CISTPL_LONGLINK_A | LONG LINK TUPLE (TO ATTRIBUTE MEMORY) |
| 12H | CISTPL_LONGLINK_C | LONG LINK TUPLE (TO COMMON MEMORY) |
| 13H | CISTPL_LINKTARGET | LINK TARGET TUPLE |
| 14H | CISTPL_NO_LINK | NO LINK TUPLE |
| 15H | CISTPL_VERS_1 | LEVEL 1 VERSION/PRODUCT INFORMATION TUPLE |
| 16H | CISTPL_ALTSTR | EACH LANGUAGE LETTER LINE TUPLE |
| 17H | CISTPL_DEVICE_A | DEVICE INFORMATION TUPLE (ATTRIBUTE MEMORY) |
| 18H | CISTPL_JEDEC_C | JEDEC DEVICE ID TUPLE (COMMON MEMORY) |
| 19H | CISTPL_JEDEC_A | JEDEC DEVICE ID TUPLE (ATTRIBUTE MEMORY) |

FIG. 78(B)

| TUPLE ID | ABBREVIATION | MEANING |
|---|---|---|
| 1AH | CISTPL_CONF | CONFIGURATION TUPLE |
| 1BH | CISTPL_CE | CONFIGURATION ENTRY TUPLE |
| 1CH | CISTPL_DEVICE_OC | ADDITIONAL DEVICE INFORMATION TUPLE (COMMON MEMORY) |
| 1DH | CISTPL_DEVICE_OA | ADDITIONAL DEVICE INFORMATION TUPLE (ATTRIBUTE MEMORY) |
| 1EH~3FH | — | (RESERVE) |
| 40H | CISTPL_VERS_2 | LEVEL 2 VERSION INFORMATION TUPLE |
| 41H | CISTPL_FORMAT | FORMAT INFORMATION TUPLE |
| 42H | CISTPL_GEOMETRY | GEOMETRY INFORMATION TUPLE (ONLY DISC TYPE FORMAT IS POSSIBLE) |
| 43H | CISTPL_BYTEORDER | BYTE ORDER INFORMATION (ONLY MEMORY TYPE FORMAT IS POSSIBLE) |
| 44H | CISTPL_DATE | INITIALIZATION DAY-TIME TUPLE |
| 45H | CISTPL_BATTERY | BATTERY REPLACE DATE TUPLE |
| 46H | CISTPL_ORG | PARTITION CONTENT INFORMATION TUPLE |
| 47H~7FH | — | (RESERVE) |
| 80H~FEH | — | FOR MAKER INDIVIDUAL INFORMATION |
| FFH | CISTPL_END | TUPLE LINK COMPLETION TUPLE |

FIG. 78(C)

| OFFSET | NUMBER OF BYTES | CONTENTS | |
|---|---|---|---|
| +00 | 3 | ID (JUMP COMMAND TO BOOT CODE) IT SHOULD BE WHETHER EBH, xxH, 90H OR E9H, xxH, xxH. | |
| +03 | 8 | MAKER NAME AND VERSION NO. | |
| +0B | 2 | NUMBER OF BYTES PER 1 SECTOR | ⎫ |
| +0D | 1 | NUMBER OF SECTORS PER ALLOCATION UNIT | ⎪ |
| +0E | 2 | NUMBER OF RESERVE SECTORS | ⎪ |
| +10 | 1 | NUMBER OF FATS | ⎬ BPB |
| +11 | 2 | NUMBER OF ENTRIES IN ROOT DIRECTORY | ⎪ |
| +13 | 2 | NUMBER OF ALL SECTORS | ⎪ |
| +15 | 1 | MEDIA DESCRIPTOR (F8h) | ⎪ |
| +16 | 2 | NUMBER OF SECTORS PER FAT | ⎭ |
| +18 | 2 | NUMBER OF SECTORS PER 1 TRACK | |
| +1A | 2 | NUMBER OF HEADS | |
| +1C | 2 | NUMBER OF INVISIBLE SECTORS | |
| +1E | 34 | (RESERVE) | |
| +40 | – | BOOTSTRAP CODE ETC. | |

FIG. 82(E)

| ERASE MODE | OPERATION |
|---|---|
| A | WITHOUT FORMATTING MEMORY CHECK AND MANAGEMENT AREA WRITING ARE DONE, AND WITH FORMATTING ALL FILES ARE ERASED. |
| B | MEMORY CHECK AND MANAGEMENT AREA WRITING ARE DONE WITHOUT FAIL. |
| C | THE MANAGEMENT INFORMATION IS WRITTEN WITHOUT WRITING ATTRIBUTE INFORMATION OF THE COMMON MEMORY. |

FIG. 103(A)

| SWITCH | SWITCH POSITION | FUNCTION |
|---|---|---|
| MANUAL TRANSMISSION / RECEPTION SWITCH | ANS | MANUAL RECEPTION |
| | AA | AUTOMATIC (MODEM COMMAND) TRANSMISSION AND RECEPTION |
| | ORG | MANUAL TRANSMISSION |

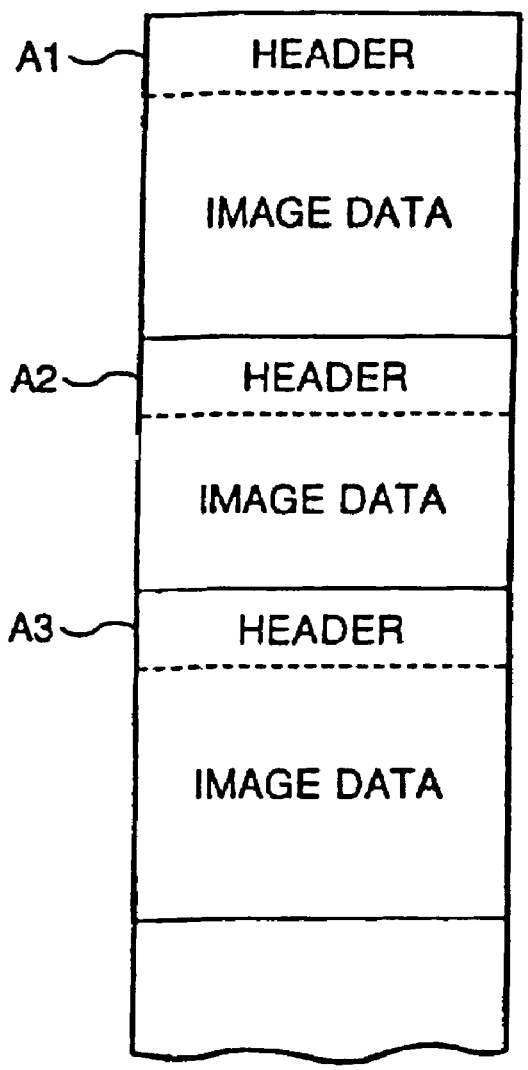 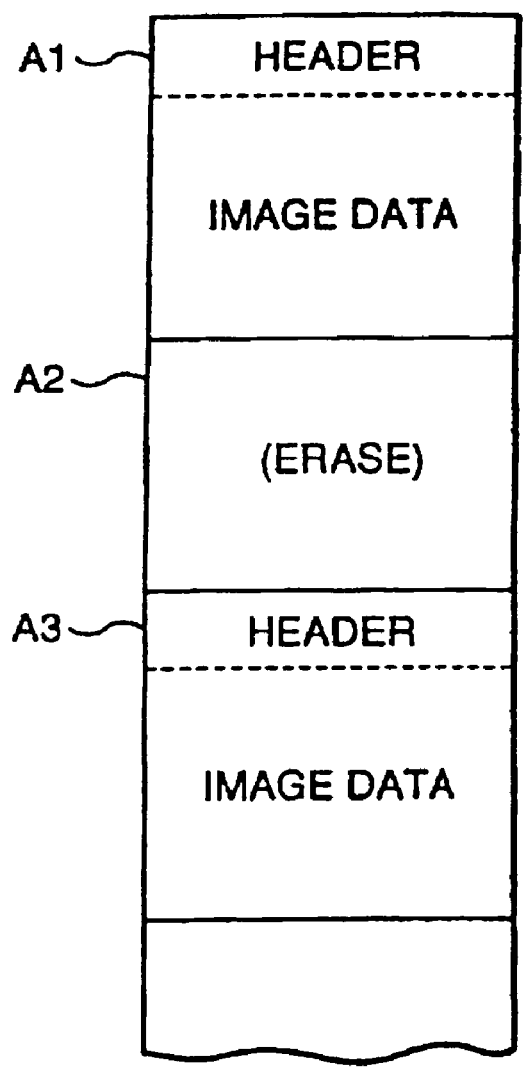

FIG. 133(A)
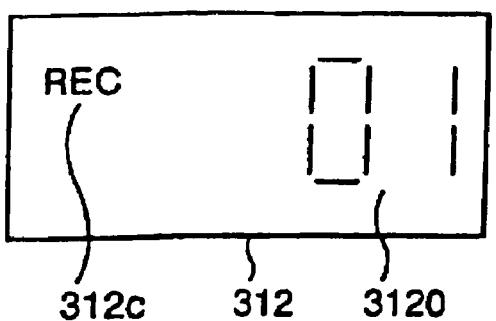
FIG. 133(a)
| 1 | NON-RECORD |
|---|---|
| 2 | NON-RECORD |
| 3 | SUB-DIRECTORY |
| 4 | NON-RECORD |
| 5 | |
FIG. 133(B)
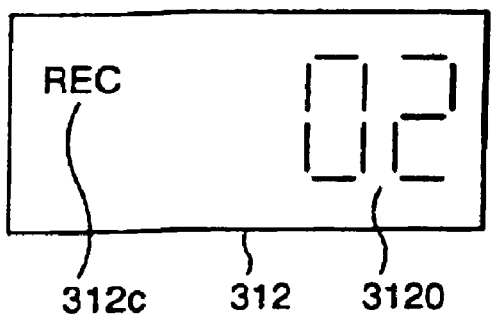
FIG. 133(b)
| 1 | "FILE A" |
|---|---|
| 2 | NON-RECORD |
| 3 | SUB-DIRECTORY |
| 4 | NON-RECORD |
FIG. 133(C)
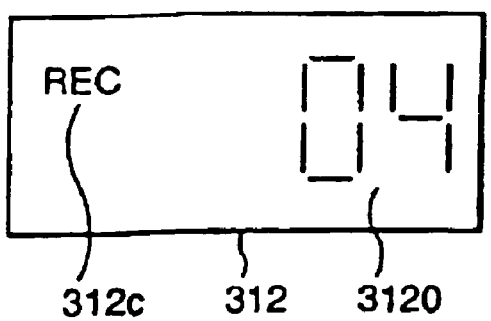
FIG. 133(c)
| 1 | "FILE A" |
|---|---|
| 2 | "FILE B" |
| 3 | SUB-DIRECTORY |
| 4 | NON-RECORD |

ELECTRONIC IMAGING APPARATUS

CROSS-REFERENCE TO RELATED APPLICATIONS

This is a divisional application of U.S. application Ser. No. 10/818,302, filed on Apr. 6, 2004, which is a continuation of U.S. application Ser. No. 09/574,455, filed on May 19, 2000, now abandoned, which is a continuation of U.S. application Ser. No. 08/786,222, filed on Jan. 21, 1997, now U.S. Pat. No. 6,111,662, which is a continuation of U.S. application Ser. No. 08/305,776, filed on Sep. 14, 1994, now U.S. Pat. No. 5,717,496, which is a divisional of U.S. patent application Ser. No. 08/154,438, filed on Nov. 19, 1993, now abandoned, which, in turn, relies for priority upon Japanese Patent Application No. 4-333707, filed on Nov. 19, 1992, Japanese Patent Application No. 4-337007, filed on Dec. 17, 1992, Japanese Patent Application No. 5-007879, filed on Jan. 21, 1993, and Japanese Patent Application No. 5-040178, filed on Mar. 1, 1993, the contents of all of which are hereby incorporated by reference in their entireties.

BACKGROUND OF THE INVENTION

The present invention relates to an electronic imaging apparatus and, more particularly, to an electronic imaging apparatus capable of transmission of the image data thereby.

There have been developed an image information storing or recording apparatus, and/or, retrieving or reproducing apparatus, such as an electronic still camera or an electronic image data filing apparatus for storing or retrieving image data on or from an applied storage device or medium. Digital still cameras or electronic still cameras, DSC or SMC, (called DSC hereinafter) of conventional type generally employ solidstate electronic imaging devices, such as CCD imagers, for photoelectric conversion to obtain a picture signal corresponding to objects intended to be picked-up, photographed. The picture signal issued from the imaging device is processed by the conventional process circuit for processing so as to obtain a video or TV signal of the fashion adaptive to be recorded or stored, and the processed signal is converted into the digital form representative of the image information intended. In the mentioned cameras, the image information is represented and conveyed in the form of digital data, and the data is stored on a semiconductor memory card as the storage device or medium applied.

The electronic imaging apparatus such as various DSC is available as commercial products for various applications. In such DSC, a great number of still pictures or image data are stored or recorded in the form of data file in the storage media such as memory cards or floppy disks. Therefore, the image data retrieval property determines the commercial value or utility value of the DSC.

A system for the transmission of the image information obtained by such an electronic imaging apparatus and the transmission and receipt of the information between the apparatus and the other apparatus is useful for effective communication. However, there has been no system capable of performing a such function with a simple structure.

SUMMARY OF THE INVENTION

According to one aspect of the present invention, there is provided an electronic imaging apparatus for taking pictures and storing them in an applied storage device, the apparatus comprising, image pick-up means for generating and outputting an image signal photoelectrically converted from an image incident thereon, image information storing means for storing image information represented by the image signal issued from the image pick-up means, a format of a signal to be stored being dependent upon a type of the applied storage device, communication means for transmitting and/or receiving image information generated in this apparatus or the other equivalent apparatuses while an operation mode of the apparatus is set for communication, and switch means for causing the communication means to start a communication mode operation.

According to another aspect of the present invention, there is provided an electronic imaging apparatus for taking pictures and storing them in an applied storage device, the apparatus comprising, image pick-up means for generating and outputting an image signal photoelectrically converted from an image incident thereon, image information storing means for storing image information represented by the image signal issued from the image pick-up means, a format of a signal to be stored being dependent upon a type of the applied storage device, communication means for transmitting and/or receiving image information, the communication means capable of permitting information communication with one of a plurality of different external devices connected to this apparatus via predetermined connection means, and interface recognition means for recognizing and causing the interface to function in a status appropriate to the external device connected via the connector means, on the basis of a recognition for a functioning status of the interface to be applied.

According to other aspect of the present invention, there is provided an electronic imaging apparatus for taking pictures and storing them on an applied storage device, the apparatus comprising, image pick-up means for generating and outputting an image signal photoelectrically converted from an image incident thereon, image information storing means for storing image information represented by the image signal issued from the image pick-up means, a format of a-signal to be stored being dependent upon a type of the applied storage device, and play-back means for playing-back an image once photoelectrically converted by the image pick-up means to an image signal or further converted to a corresponding image data appropriate to the applied storage device, on the basis of an operation of a specific operating switch or section which is usually used for a different purpose for a photographing operation.

According to further aspect of the present invention, there is provided an electronic imaging apparatus for taking pictures and storing them on an applied storage device, the apparatus comprising, image pick-up means for generating and outputting an image signal photoelectrically converted from an image incident thereon, image information storing means for storing image information represented by the image signal issued from the image pick-up means, a format of a signal to be stored being dependent upon a type of the supplied storage device, external commands receiving means for receiving various commands from an external device connected therewith via a transmission channel, and executing means for carrying out operations corresponding to the commands received via the external commands receiving means.

According to still further aspect of the present, there is provided an electronic imaging apparatus for taking pictures and storing them in an applied storage device, the apparatus comprising, image pick-up means for generating and outputting an analog image signal photoelectrically converted from an image incident thereon, image data generating means for generating digital image data corresponding to the image signal outputted from the image pick-up means, a format of the digital image data being dependent upon a type of the applied storage device, data storing means for storing the image data on the applied storage device in the form of a file organized by a directory or a subdirectory supported by a disk operating system, and erase operation mode setting means for selectively setting an operation mode of erase operation to be carried out for the applied stored device, the operation mode set thereupon to be selected from a plurality of erasing operation modes provided in advance for this apparatus.

According to further aspect of the present, there is provided an electronic imaging apparatus for taking pictures and storing them in an applied storage device, the apparatus comprising, image pick-up means for generating and outputting an analog image signal photoelectrically converted from an image incident thereon, image data generating means for generating digital image data corresponding to the image signal outputted from the image pick-up means, a format of the digital image data being dependent upon a type of the applied storage device, data storing means for storing the image data on the applied storage device in the form of a file organized by a directory or a subdirectory supported by a disk operating system, and erase operation commencing means for commencing an erasing operation for the applied storage device in response to an operation to a trigger switch means for photographing while a erase operation mode is set.

According to still further aspect of the present, there is provided an electronic imaging apparatus for taking pictures and storing them in an applied storage device, the apparatus comprising, image pick-up means for generating and outputting an analog image signal photoelectrically converted from an image incident thereon, image data generating means for generating digital image data corresponding to the image signal outputted from the image pick-up means, a format of the digital image data being dependent upon a type of the applied storage device, data storing means for storing the image data on the applied storage device in the form of a file organized by a directory or a sub-directory supported by a disk operating system, and formatting operation commencing means for commencing a formatting operation for the applied storage device in response to an operation to an erase operation switch means provided on this apparatus.

According to other aspect of the present, there is provided an electronic imaging apparatus for taking pictures and storing them on an applied storage device, the apparatus comprising, image pick-up means for generating and outputting an image signal photoelectrically converted from an image incident thereon, image information storing means for storing image information represented by the image signal issued from the image pick-up means, a format of a signal to be stored being dependent upon a type of the applied storage device, communication means for transmitting and/or receiving information signal via a network connected therewith, and power source control means for automatically making a power source circuit of this apparatus to be ready for supply power, in response to a reception of a call signal of the information signal received via the communication means.

According to further aspect of the present, there is provided an electronic imaging apparatus for taking pictures and storing them in an applied storage device, the apparatus comprising, image pick-up means for generating and outputting an analog image signal photoelectrically converted from an image incident thereon, image data generating means for generating digital image data corresponding to the image signal outputted from the image pick-up means, a format of the digital image data being dependent upon a type of the applied storage device, data storing means for storing the image data on the applied storage device in the form of a file organized by a directory or sub-directory supported by a disk operating system, communication means for transmitting and/or receiving image data or further subsidiary data via a transmission channel connected therewith, and preceding transmission means for transmitting data for the directory and/or the subsidiary data relating to a transmission of image information itself, when a transmitting operation mode is set.

According to still further aspect of the present, there is provided an electronic imaging apparatus for taking pictures and storing them in an applied storage device, the apparatus comprising, image pick-up means for generating and outputting an analog image signal photoelectrically converted from an image incident thereon, image data generating means for generating digital image data corresponding to the image signal outputted from the image pick-up means, a format of the digital image data being dependent upon a type of the applied storage device, data storing means for storing the image data on the applied storage device in the form of a file organized by a directory or a sub-directory supported by a disk operating system, communication means for transmitting and/or receiving image data or further subsidiary data via a transmission channel connected therewith, and preceding transmission means for transmitting data representative of a capacity reservable for receiving an image data, to a sender side device, in anticipation for the reception when a receiving operation mode is set.

According to further aspect of the present, there is provided an electronic imaging apparatus for taking pictures and storing them on an applied storage device, the apparatus comprising, image pick-up means for generating and outputting an image signal photoelectrically converted from an image incident thereon, image information storing means for storing image information represented by the image signal issued from the image pick-up means, a format of a signal to be stored being dependent upon a type of the applied storage device, communication means for transmitting and/or receiving information signal via a network connected therewith, and power source control means for executing a power off process for turning off a power source circuit when a communication with the other party fails to be held in a predetermined period of time.

According to still further aspect of the present, there is provided an adapter device applicable to an electronic imaging apparatus which comprises image pick-up means for obtaining an image signal by photoelectrical conversion, image data storing means for storing image data representative of the image on an applied storage device and communication means for communicating the image data to the other party via transmission channel connected therewith, the adapter device comprising, first interface means for communication with the electronic imaging apparatus, second interface means for communication via the transmission channel through a modem connected in between, and control means for establishing a transmission channel for image data communication via the second interface means by designating the other party on the basis of a user's operation to operation keys or sections thereof and for controlling the image data communication for the electronic imaging apparatus via the first and second interface means.

According to other aspect of the present, there is provided an electronic imaging apparatus for storing image data in the form of image data files allocated in an applied storage device, the apparatus comprising, dummy data adding means for adding dummy data on an image data to be stored, the dummy data of an amount corresponding to a remained capacity of a file which has a uniform capacity previously defined, an administrative uniformity of file size is maintained thereby.

According to further aspect of the present, there is provided an electronic imaging apparatus for taking pictures and storing them in an applied storage device, the apparatus comprising, image pick-up means for generating and outputting an analog image signal photoelectrically converted from an image incident thereon, image data generating means for generating digital image data corresponding to the image signal outputted from the image pick-up means, a format of the digital image data being dependent upon a type of the applied storage device, data storing means for storing the image data on the applied storage device in the form of a file organized by a directory or a sub-directory supported by a disk operating system, and frame number representing means for representing a successive frame number for respective images picked-up by the image pick-up means, on the basis of a position of a designated file in the directory.

Other objects and features will be clarified from the following description with reference to the attached drawings.

BRIEF DESCRIPTION OF THE DRAWINGS

FIG. 5 shows a timing chart for a play-back operation like that shown in FIG. 4;

FIG. 9 shows conditions #1 and #1' in the steps S4 and S23, the conditions #2 and #2' in the steps S8 and S28 and the causes #3 and #3' in the steps S12 and S34, shown in FIGS. 7 and 8;

FIG. 10 shows roles of the trigger 2 and communication mode switches 15B and 15K among the operation switches in FIG. 2;

FIGS. 15 and 16 show operation routines of the embodiment;

FIG. 33 shows examples of writing in the control file of the transmission and reception in FIGS. 29 and 30;

FIG. 34 shows another example of the relevant data (for transmission) shown in FIG. 28;

FIG. 36 shows a block diagram of a controller of the DSC 120;

FIG. 36(A) provides a table of input and output voltages in the RS-232C I/F 115;

FIG. 36(B) provides a table of pin numbers of the RS-232C I/F 115;

FIG. 36(C) shows pin numbers of a signal line of the RS-232C I/F 115 when used in communication with a PC;

FIG. 36(D) shows pin numbers of the RS-232C I/F 115 when used for communication with a modem;

FIGS. 42(A)-42(C) show examples of displays on the display 113 when the modem 123 is connected and designated;

FIG. 43 shows a flow chart for a "reception interruption process" sub-routine;

FIG. 55(A) shows commands from an external unit and the functions of those commands;

FIG. 56 shows image pick-up data in the pertinent file and current comment;

FIG. 57 shows an image pick-up data and current comment displayed on the monitor 121;

FIG. 61 shows a configuration of the root directory;

FIG. 62 shows a format of a 32-byte directory entry;

FIG. 62(A) shows attribute values and attribute contents;

FIG. 63 is a time chart for transmission of comment transmission command and comment data between the PC 122 and DSC 120;

FIG. 67 shows a menu display on the monitor in the changing operation;

FIG. 68 shows a display when producing a sub-directory;

FIG. 69 shows a menu display when the file movement is selected;

FIGS. 78(A) and 78(B) show abbreviation and meaning of tuple IDs;

FIG. 78(C) shows the format of a boot sector;

FIG. 103(A) shows functions provided by the manual transmission/reception switch 154b;

FIGS. 110(A) and 110(B) show a prior art DSC image file management method;

FIG. 116 shows a block diagram for a signal processing system of the DSC;

FIG. 117 shows a switch arrangement of the operation switch group 311;

FIG. 118 shows file name, file A, file B, . . . registered in the root directory, and image data recorded successively in the designated memory areas;

FIG. 119 shows a sub-directory;

FIG. 120 shows a view showing a further specific example of the hierarchical directory structure for image data files in the DSC;

FIG. 121 shows a directory entry;

FIG. 122 shows a plan view showing the display 312;

Figure 124A:
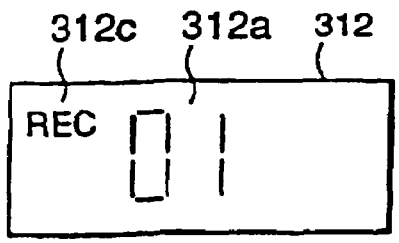
Figure 124C:
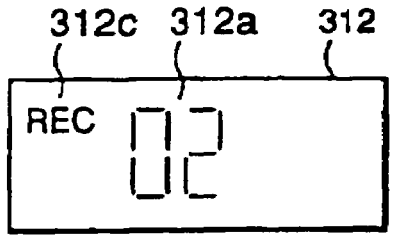
Figure 124B:
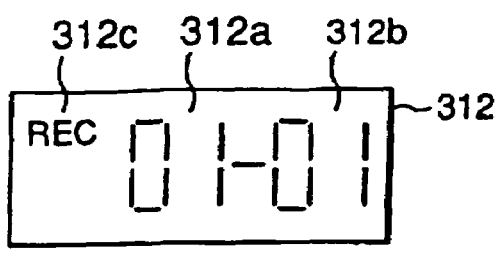
Figure 125A:
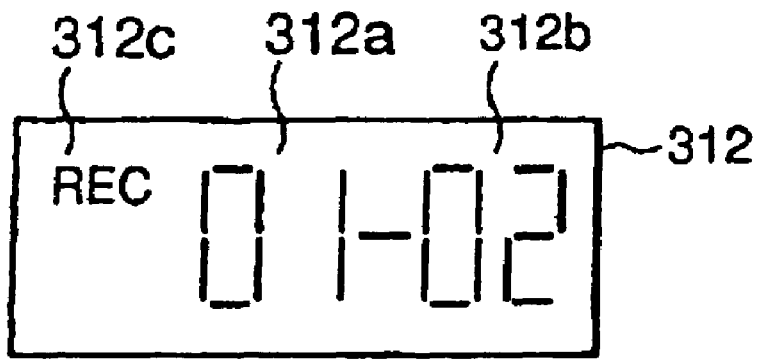
Figure 125B:
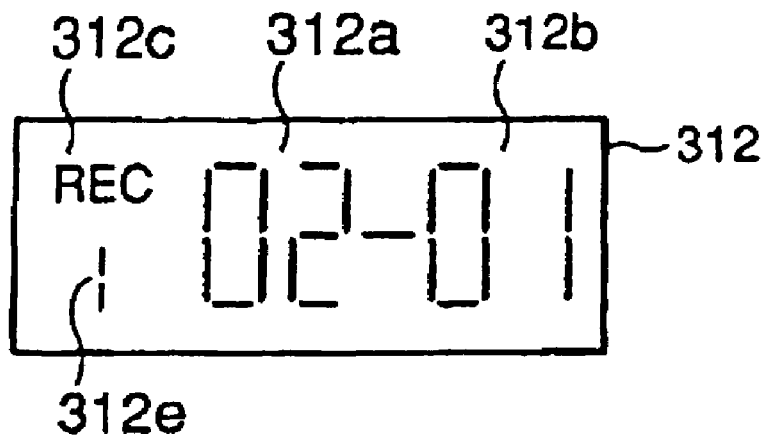
Figure 125C:
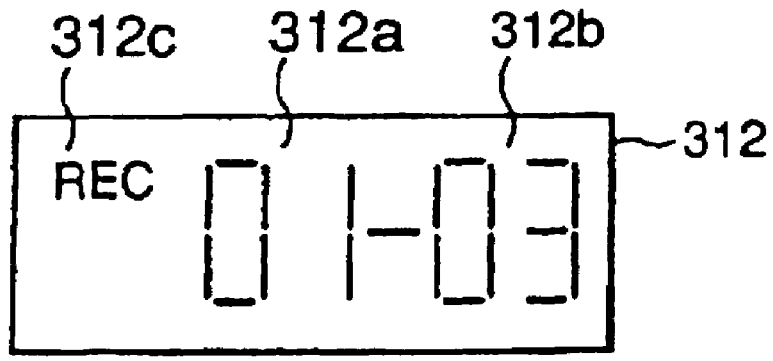
Figure 126:
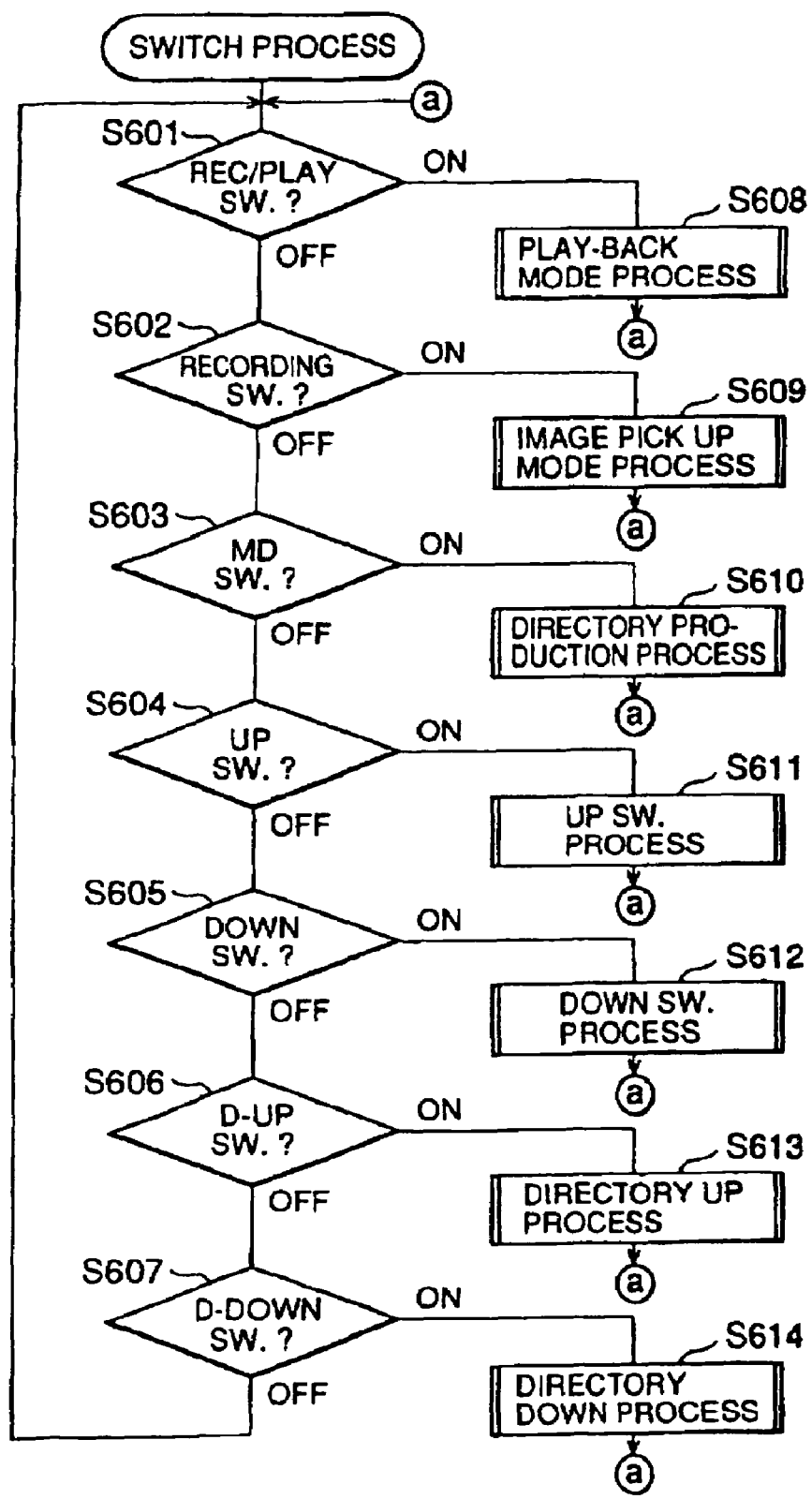
Figure 127:
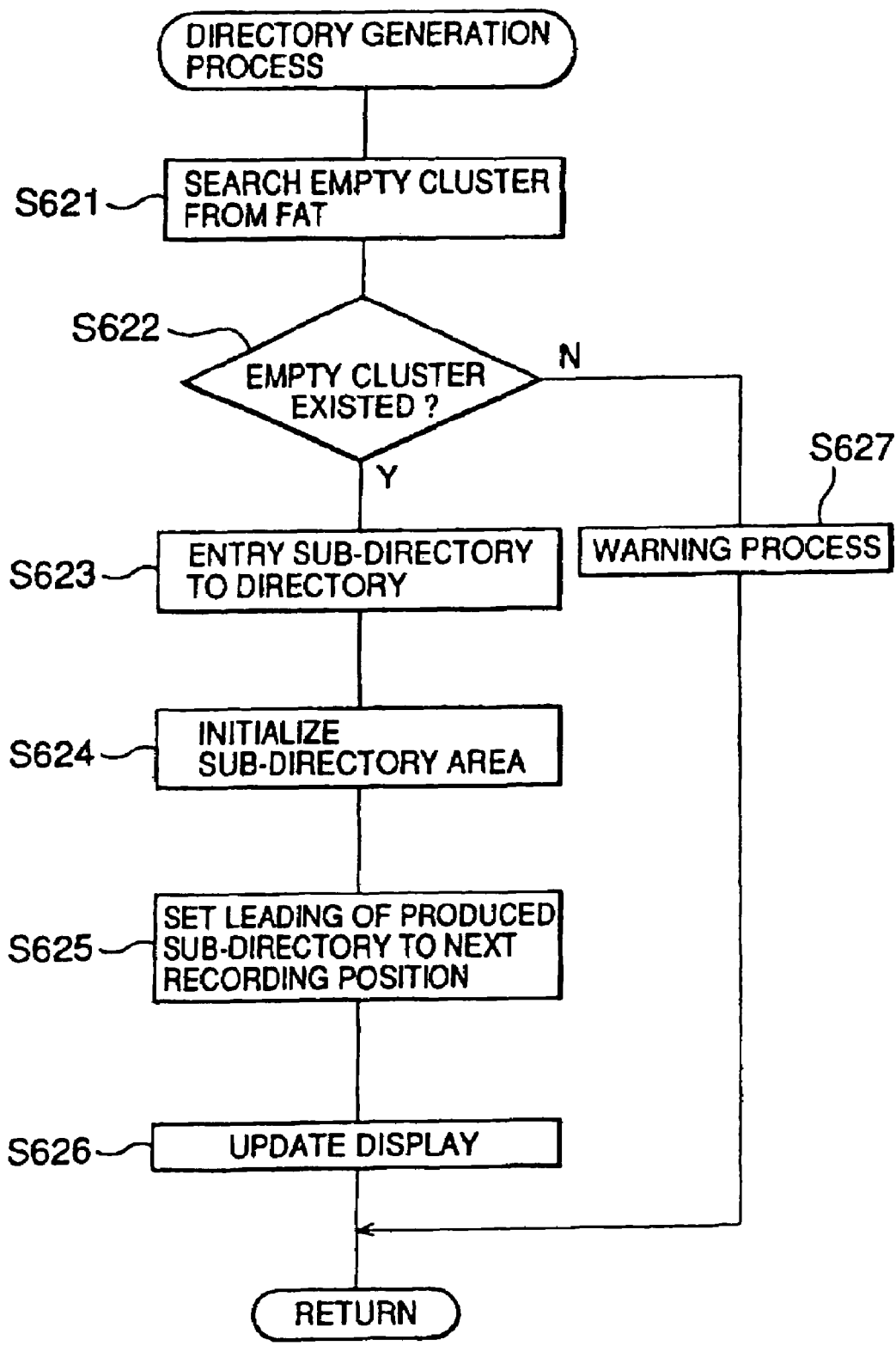
Figure 128:
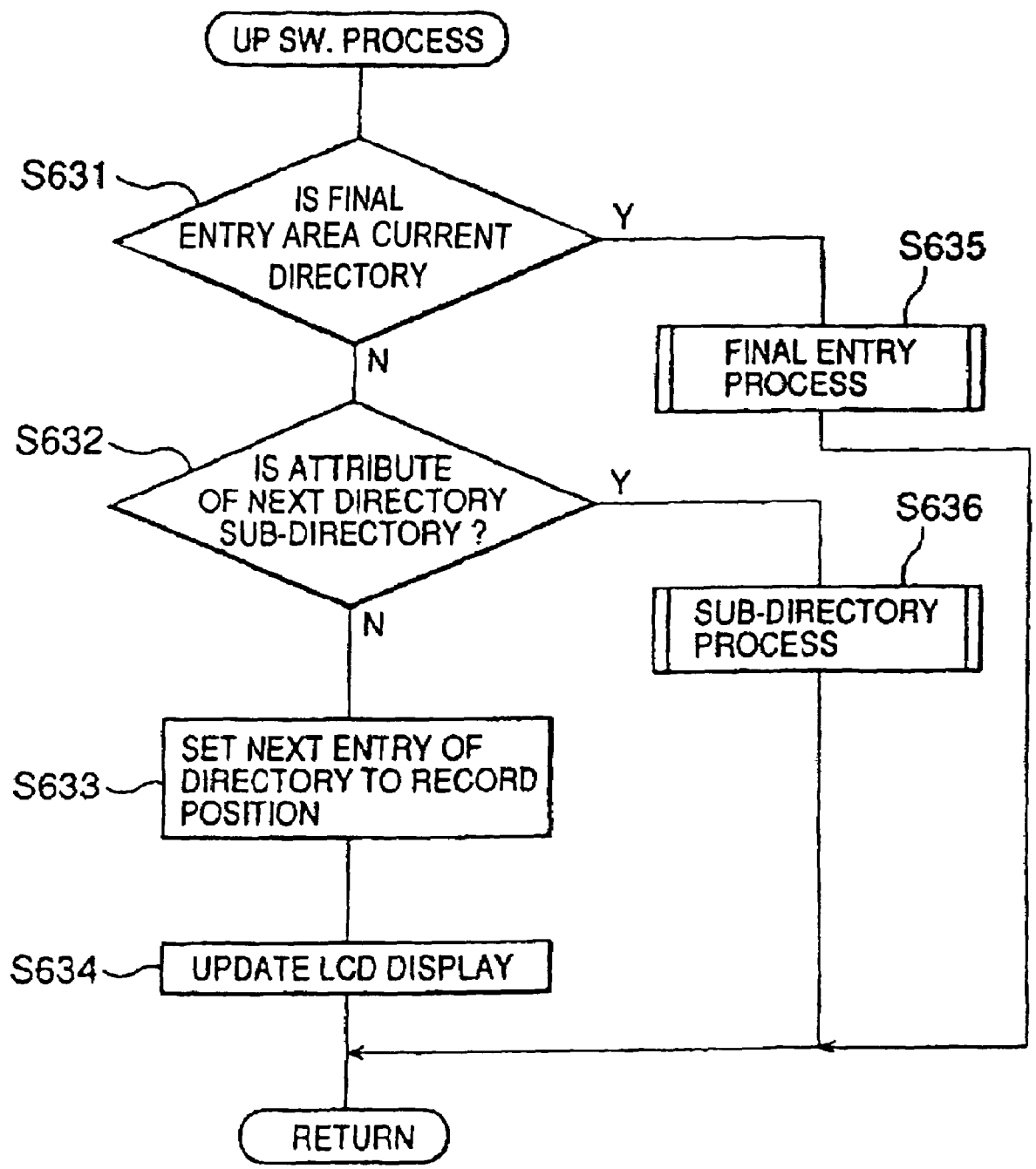
Figure 129:
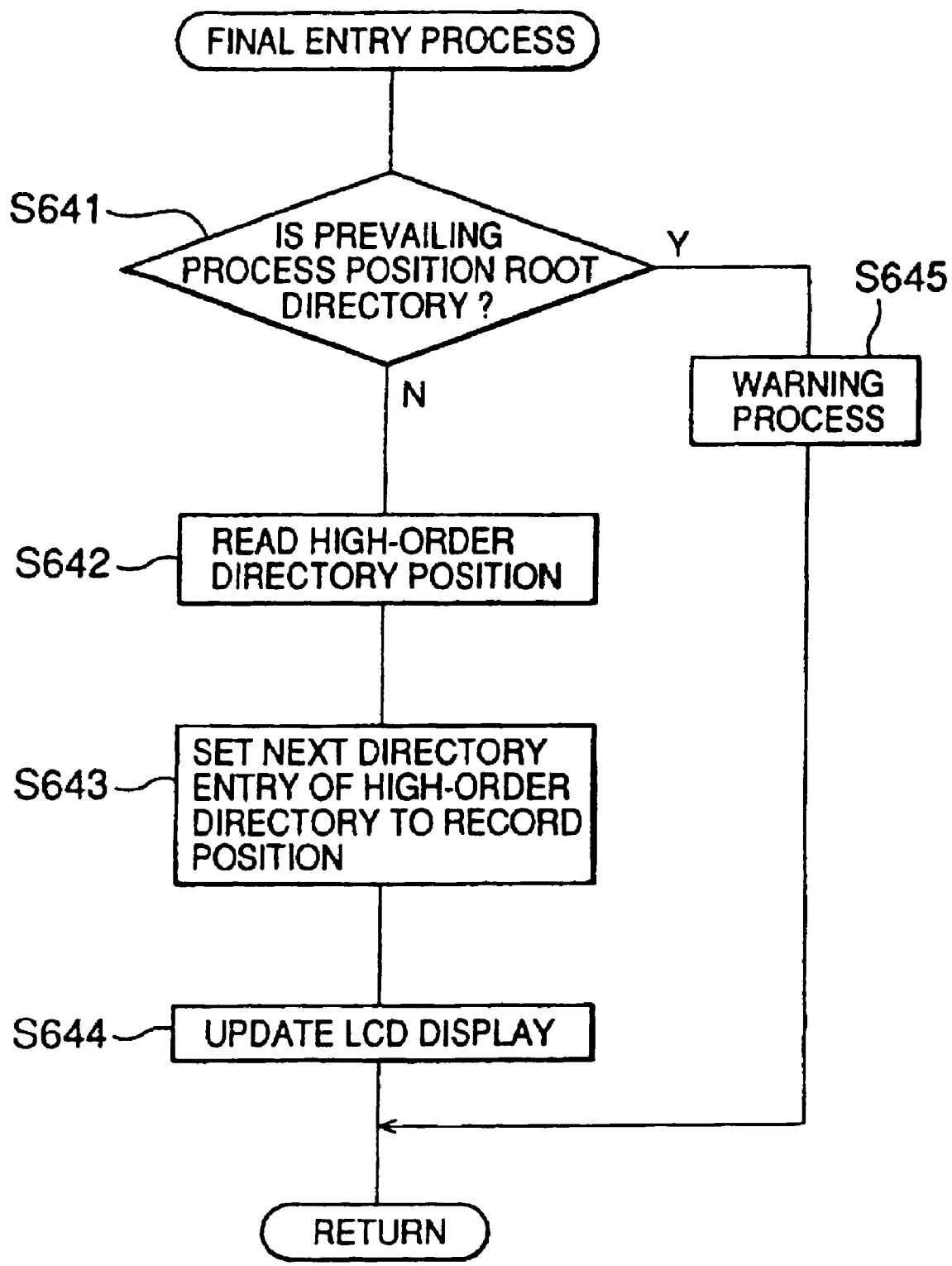
Figure 130:
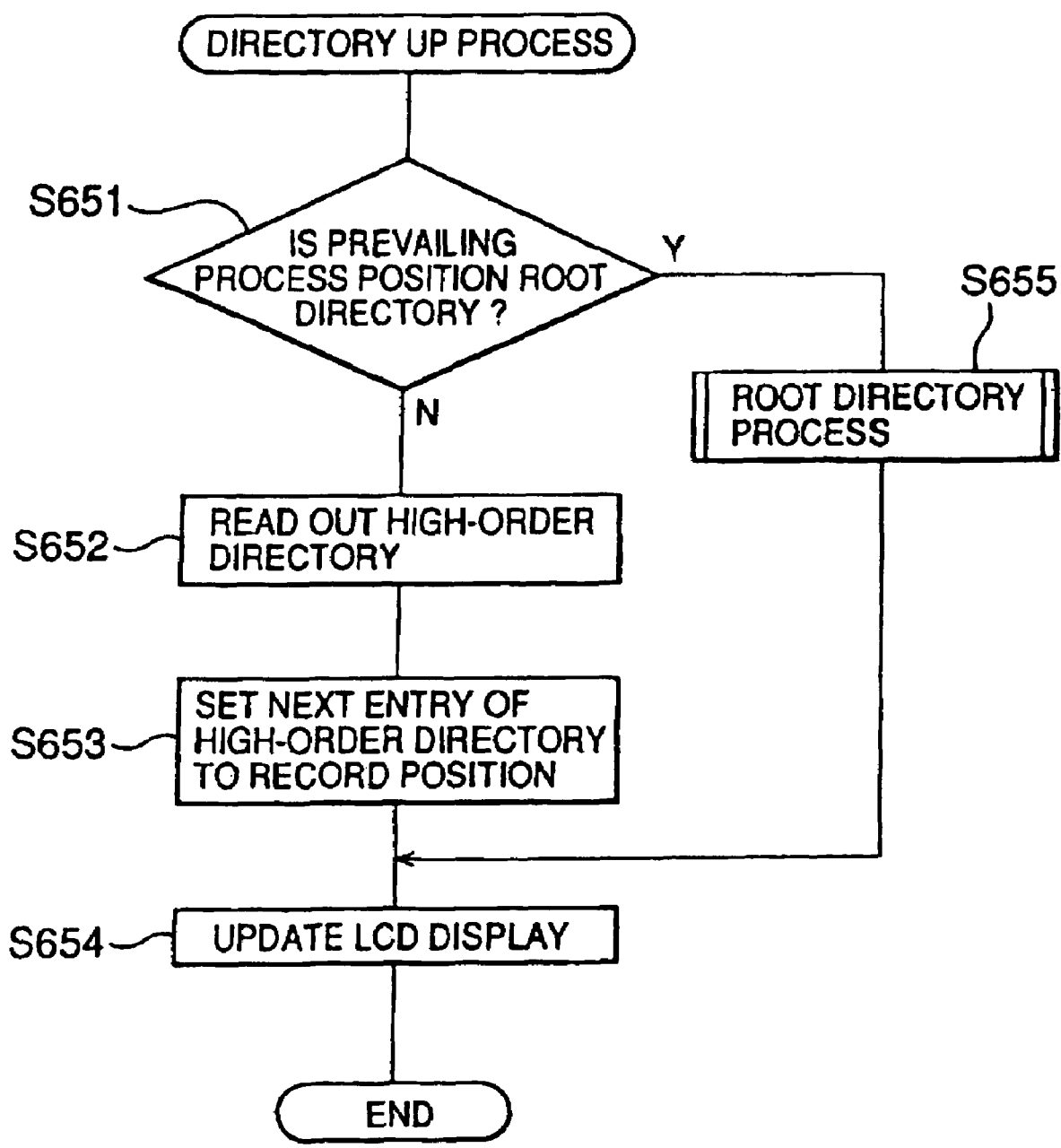
Figure 131:
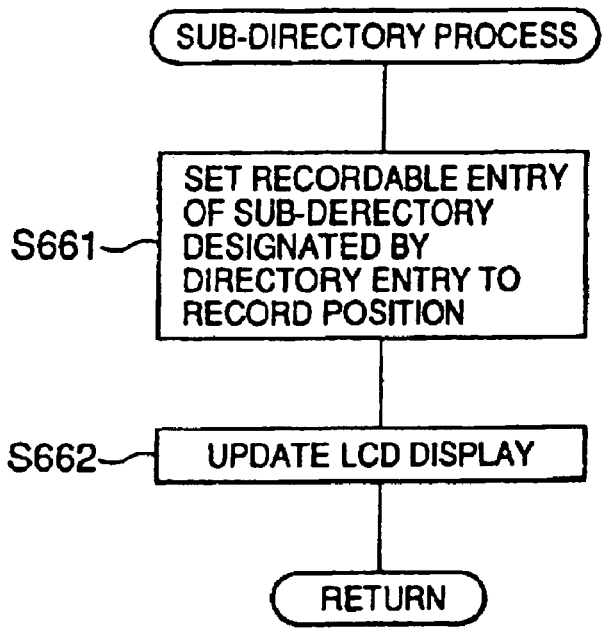
Figure 132:
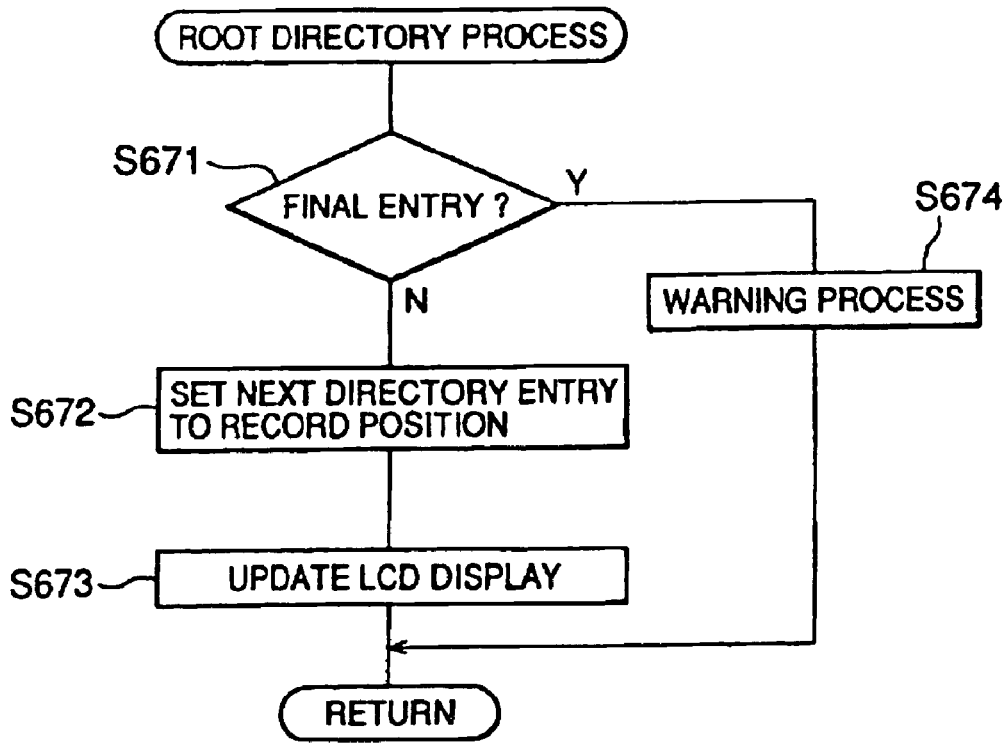

FIGS. 123(A)-123(D) show states of display on the display 123 when the recording file is moved;

FIGS. 124(A)-124(C) show a display of directory in the recording mode;

FIGS. 125(A)-125(C) show an LCD display 312 in a state of display of a second hierarchical layer sub-directory section registered in the root directory;

FIG. 126 shows a flow chart for "switch process" in the DSC;

FIG. 127 shows a flow chart for "directory production process" sub-routine;

FIG. 128 shows a flow chart for "UP switch process" sub-routine;

FIG. 129 shows a flow chart for "final entry process" sub-routine;

FIG. 130 shows a flow chart for "directory UP process" sub-routine;

FIG. 131 shows a flow chart for "sub-directory process" sub-routine;

FIG. 132 shows a flow chart for "root directory process" sub-routine;

FIGS. 133(A)-133(C) show states of display on the display 312 in a different embodiment;

FIGS. 133(a)-133(c) show a directory structure associated with the displays shown in FIGS. 133(A)-133(C), respectively;

FIGS. 134(A)-134(D) show states of display on the display section 312 in the embodiment of the DSC in the play-back operation; and FIGS. 135(A)-135(E) show states of display on the display section 312 in the DSC mainly in play-back operation.

PREFERRED EMBODIMENTS

In an embodiment of the invention, an operating switch section of a camera is provided with a switch for starting a communication function. In response to the operation of this switch, modems connected to a telephone line are controlled to permit the transmission and reception of camera (DSC) image data via a telephone line.

Figure 1:
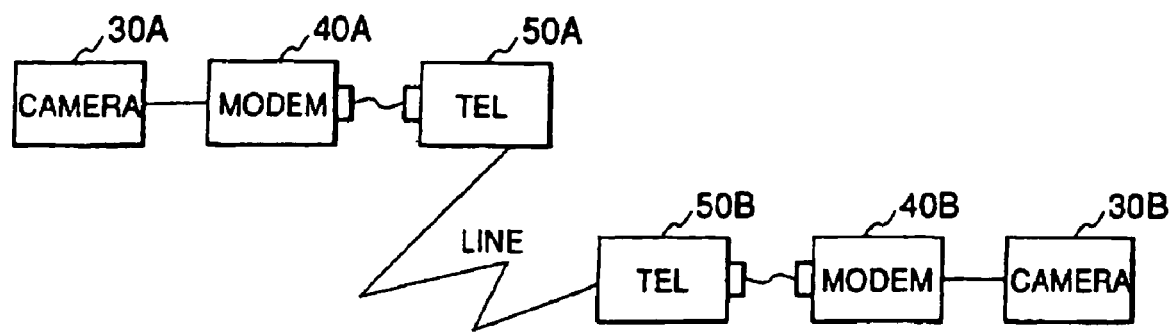
FIG. 1 shows a block diagram showing an image data transmitting and receiving system according to the present invention.

FIG. 1 is a block diagram showing an image data transmitting and receiving system using a camera according to the invention.

This system transmits and receives image data between cameras 30A and 30B which are connected to each other via a telephone line LINE. Telephone units 50A and 50B are connected to the telephone line LINE, and modems 40A and 40B are connected to the respective telephone units 50A and 50B. The cameras 30A and 30B directly access the modems 40A and 40B for transmitting and receiving image data via the telephone line.

Figure 2:
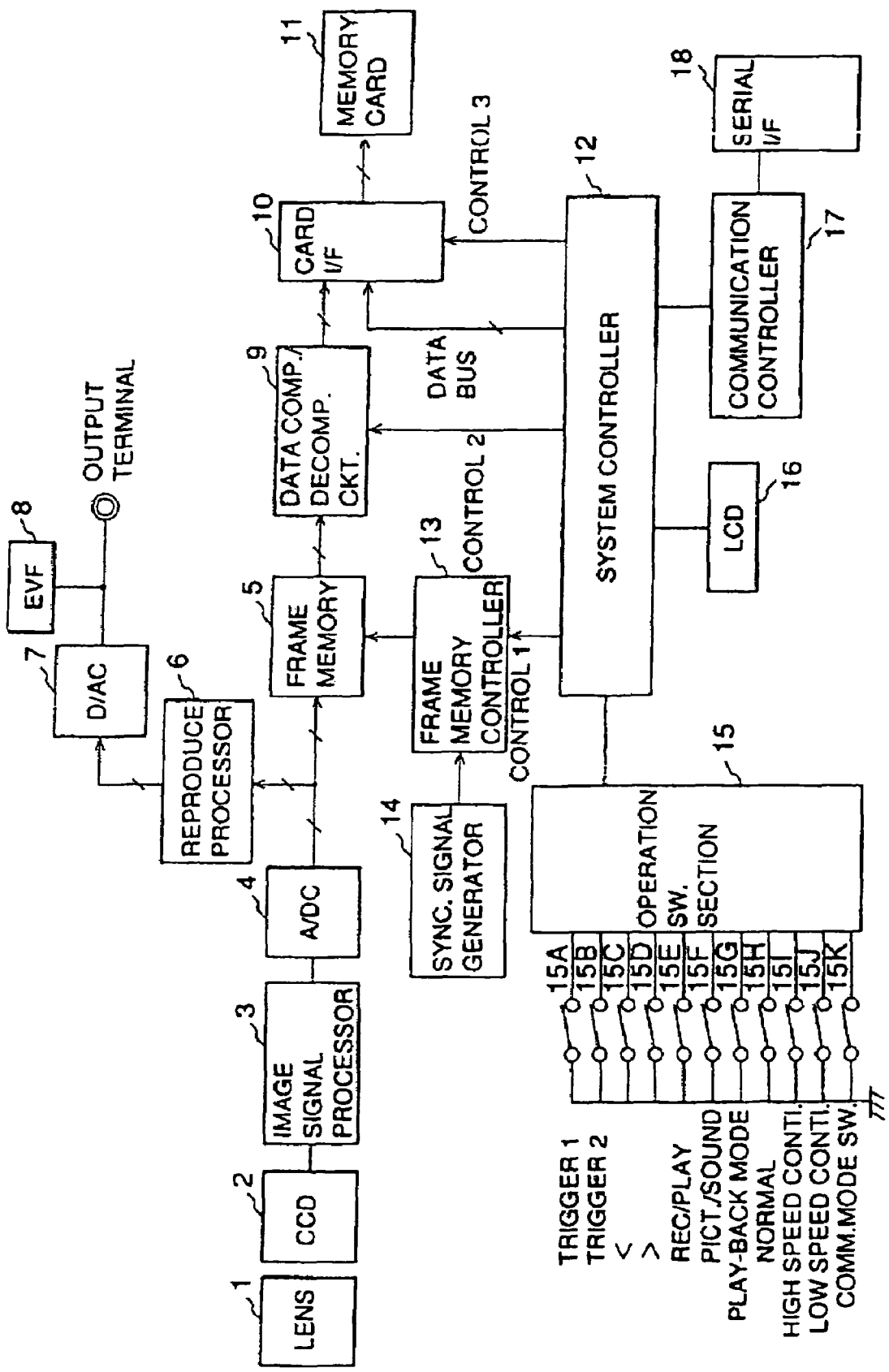
FIG. 2 shows a block diagram of an embodiment of the present invention.

FIG. 2 is a block diagram of one embodiment of the present invention.

An image focused via a lens 1 on a CCD 2 is converted to an electric signal, which is subjected to a predetermined processing in an image signal processor 3 to obtain a video signal. As is generally known, the CCD is an image pick-up device for generating and outputting an analog image signal photoelectrically converted from an image incident thereon. The video signal is converted by an A/D converter 4 into a digital signal to be recorded in a frame memory 5. The digital signal is also subjected to a reproducing process by a reproduce processor 6 and then converted by a D/A converter 7 into an analog signal which is fed to an electronic view finder 8 and also to an output terminal. Video data that is read out from the frame memory 5 is compressed in a data compressing/decompressing circuit 9 and then fed through a card interface (I/F) 10 to be recorded in a memory card 11.

In play-back, the video data that is read out from the memory card 11 via the card I/F 10 is recorded in the frame memory 5. The video data that is read out from the frame memory 5 is, like the previous case, fed through the reproduce processor 6 and D/A converter 7 to the electronic view finder 8 and output terminal.

The frame memory 5 is controlled by a memory controller 13, which is operated according to a sync signal output from a sync signal generator 14 and also to a control signal output from a system controller 12. The system controller 12 controls the data compressing/decompressing circuit 9, card I/F 10, memory controller 13, etc. in response to various operation signals issued from the operation switch section 15.

The operation switch section 15 receives information indicative of the operating state of the following various switches instructing the operation of the camera and sends out the information to the system controller 12. As the switches are a trigger 1 switch 15A for instructing exposure operation, focus lock operation, etc., a trigger 2 switch 15B for instructing recording operation, a minus and a plus feed switch 15C and 15D for selecting image in a play-back operation, a REC/PLAY switch 15E for instructing recording/play-back operation, a picture/sound recording switch 15F, a play-back mode switch 15G, a normal mode switch 15H, a high speed continuous (successive) photographing switch 15I, and a low speed continuous photographing switch 15J. An LCD 16 displays the camera operation state under control of the system controller 12.

In this embodiment, as before-mentioned, the modem connected to the telephone line for data transmission and reception through the telephone line, the communication controller 17 connected to the system controller 12 and a serial interface (I/F) 18 connected to the modem side are provided. Further, a communication mode switch 15K is provided in the operation switch section 15.

Figure 3:
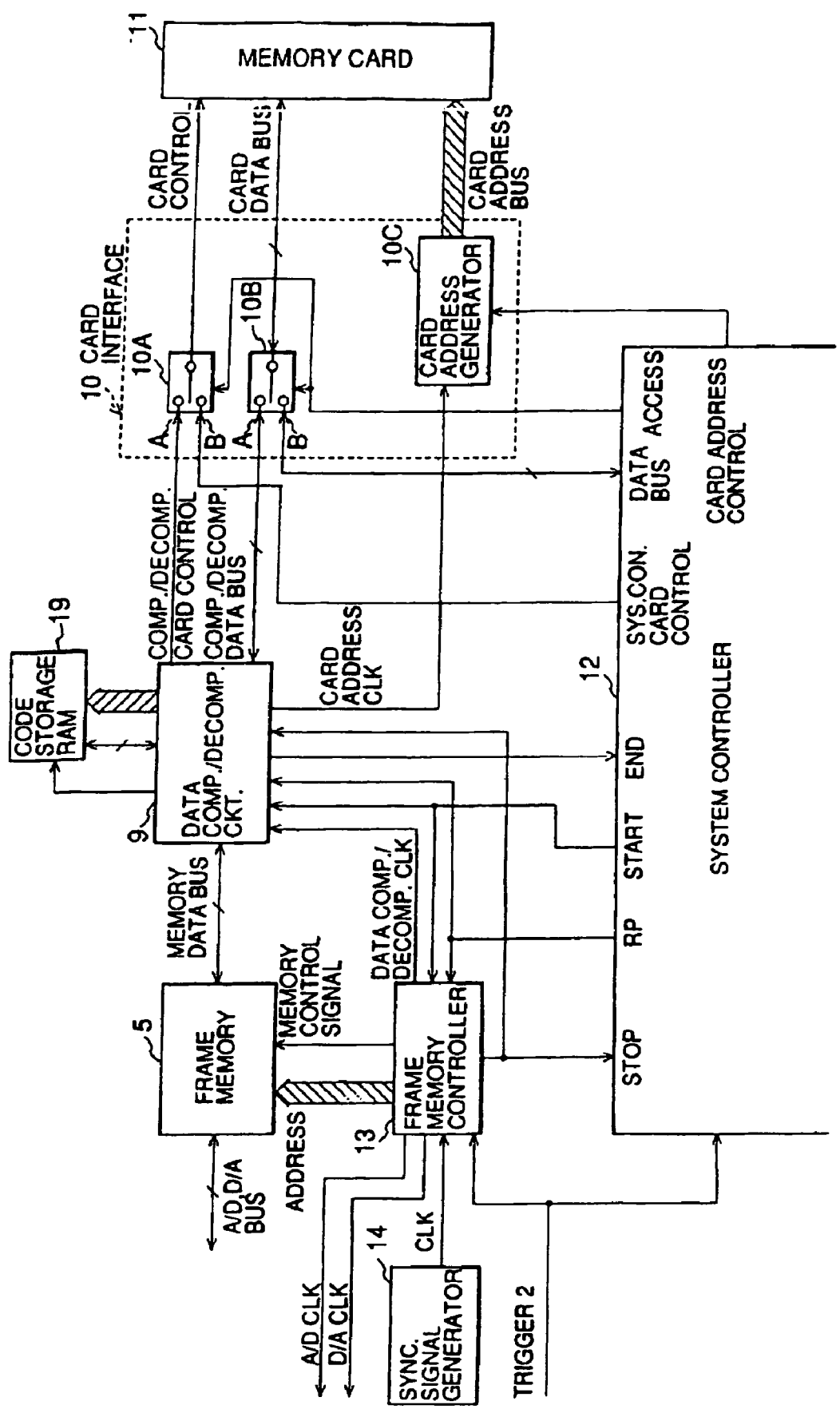
FIG. 3 shows in greater detail a system for transmitting and receiving the data between the frame memory 5 and memory card 11 under control of the system controller 12 of FIG. 1.

FIG. 3 shows in greater detail a system for transmitting and receiving the data between the frame memory 5 and memory card 11 under control of the system controller 12.

The A/D converter 4 is connected via an A/D bus and a D/A bus to the input side of the frame memory 5, to the output side of which is connected the data compressing/decompressing circuit 9 via a memory data bus. Parameters that are necessary for a compression/decompression process are stored in a code storage RAM 19, and its writing and reading are controlled by the data compressing/decompressing circuit 9.

The card I/F 10 which is connected between the data compressing/decompressing circuit 9 and the memory card 11, has switches 10A and 10B and a card address generator 10C. To two input terminals A and B of the switch 10A input connected are a data compression/decompression card control signal from the data compressing/decompressing circuit 9 and a system control card control signal from the system controller 12, respectively. To two input terminals A and B of the switch 10B connected are a compression/decompression data bus from the data compressing/decompressing circuit 9 and a data bus from the system controller 12. The switching of the input terminals of the switches 10A and 10B is controlled by an access signal from the system controller 12.

A card address generator 10C, responsive to the receipt of a card address clock (CLK) supplied from the data compressing/decompressing circuit 9 and a card address control signal supplied from the system controller 12, controls the memory card 11 via a card address bus to thereby control the reading and writing addresses.

The frame memory controller 13, as noted above, responsive to the receipt of the clock CLK from the sync signal generator 14 and the trigger 2 signal and also receives the record/play-back switching signal RP and the data compression/decompression process start signal from the system controller 12, sends out clock signals A/D CLK and D/A CLK to the A/D and D/A converters 4 and 7, respectively, an address signal and a memory control signal to the frame memory 5 and a data compression/decompression clock CLK to the data compressing/decompressing circuit 9.

The system controller 12, responsive to the trigger 2 signal and a stop signal, etc. from the frame memory controller 13, supplies a start signal START and a record/play-back signal RP to the data compressing/decompressing circuit 9 and frame memory controller 13.

Figure 4:
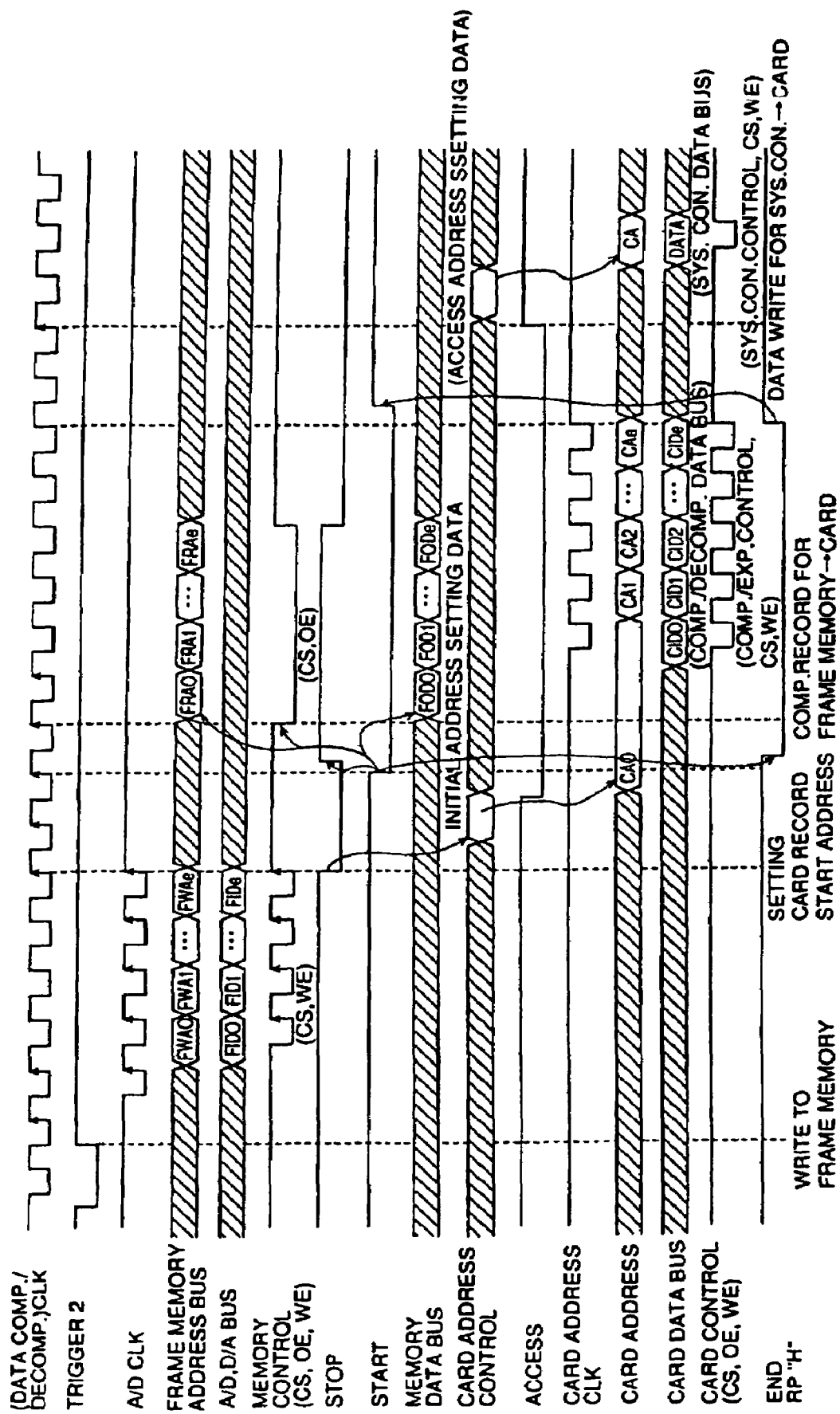
FIG. 4 shows a timing chart when signals in various parts of the circuit shown in FIG. 3 are recorded by image compression recording.

FIG. 4 shows a timing chart when signals in various parts of the circuit shown in FIG. 3 are recorded by image compression recording. In response to the input of the trigger 2 signal synchronized with the data compression/decompression clock CLK, A/D CLK is output and write addresses FWA0, FWA1, ..., FWAe and read addresses FRA0, FRA1, ..., FRAe are issued. These outputs are in response to the stop signal STOP. To the A/D and D/A buses input data FID0, FID1, ..., FIDe are supplied. The memory control signals include a chip select signal CS, an output enable signal OE and a write enable signal WE. In response to the start signal START, output data FOD0, FOD1, ..., FODe are supplied to the memory data bus.

The card address control signal causes initial address setting data to be sent out in response to the stop signal STOP and also causes access address setting data to be sent out in response to the access signal. A start address for the record in the memory card is set by the stop signal STOP. The card address data CA0 in response to the initial address setting data, card address data CA1, CA2, ..., CAe in response to the card address and card address data CA in response to the access address setting data are output.

To the card data bus, data CID0, CID1, ..., CIDe are output via the compression/decompression data bus in correspondence to these card address data, and data DATA is output to the system control data bus in correspondence to the card address data CA. As card control signals, chip select signal CS, write enable signal WE and output enable signal OE are output in the illustrated timings. The end signal END is output in response to the start signal START to control the operation of data compression recording from the frame memory 5 to the memory card 11.

FIG. 5 shows a timing chart for a play-back operation like that shown in FIG. 4. In the case of FIG. 5, the time of the data decompression process in the data compressing/decompressing circuit 9 is controlled according to the start signal START, the memory card play-back start and address setting are caused in the illustrated timings, and a decompression play-back process from the memory card 11 to the frame memory 5 and the reading and play-back operation of data in the frame memory 5 are performed.

Figure 6:
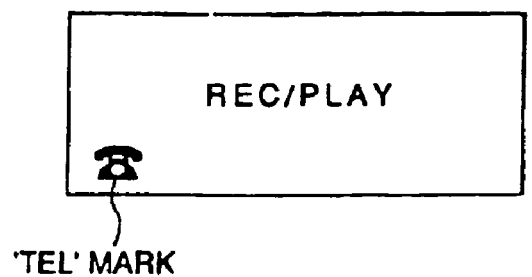
FIG. 6 shows an operation state of the camera displayed on the LCD 16 of FIG. 1.

The REC/PLAY switch 15E functions as a transmission mode changing means while the communication mode switch 15K is set to be ready for communication, that is, the switch 15K is turned on. On the LCD 16 for displaying the operation state of the camera, a record/play-back state is displayed as shown in FIG. 6. In addition, a telephone mark is displayed as an example of image data transmission and reception operation. The telephone mark represents that the communication mode is set.

Now, a process embodying the invention will be described, in which the camera is provided with a function of generating a modem control command for image transmission.

Figure 7:
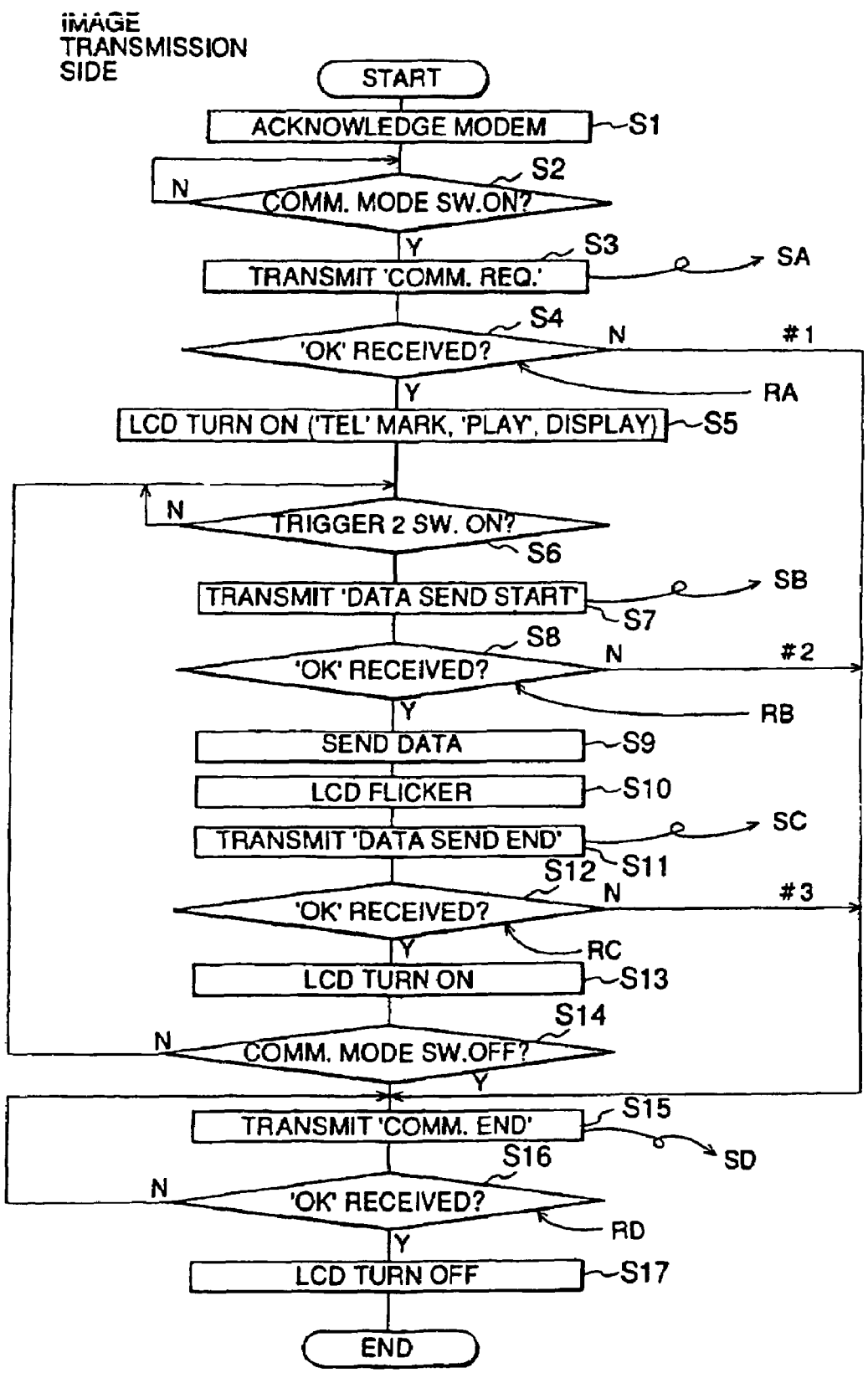
FIGS. 7 and 8 show flow charts of routines for the image transmitting and receiving side in the embodiment.
Figure 8:
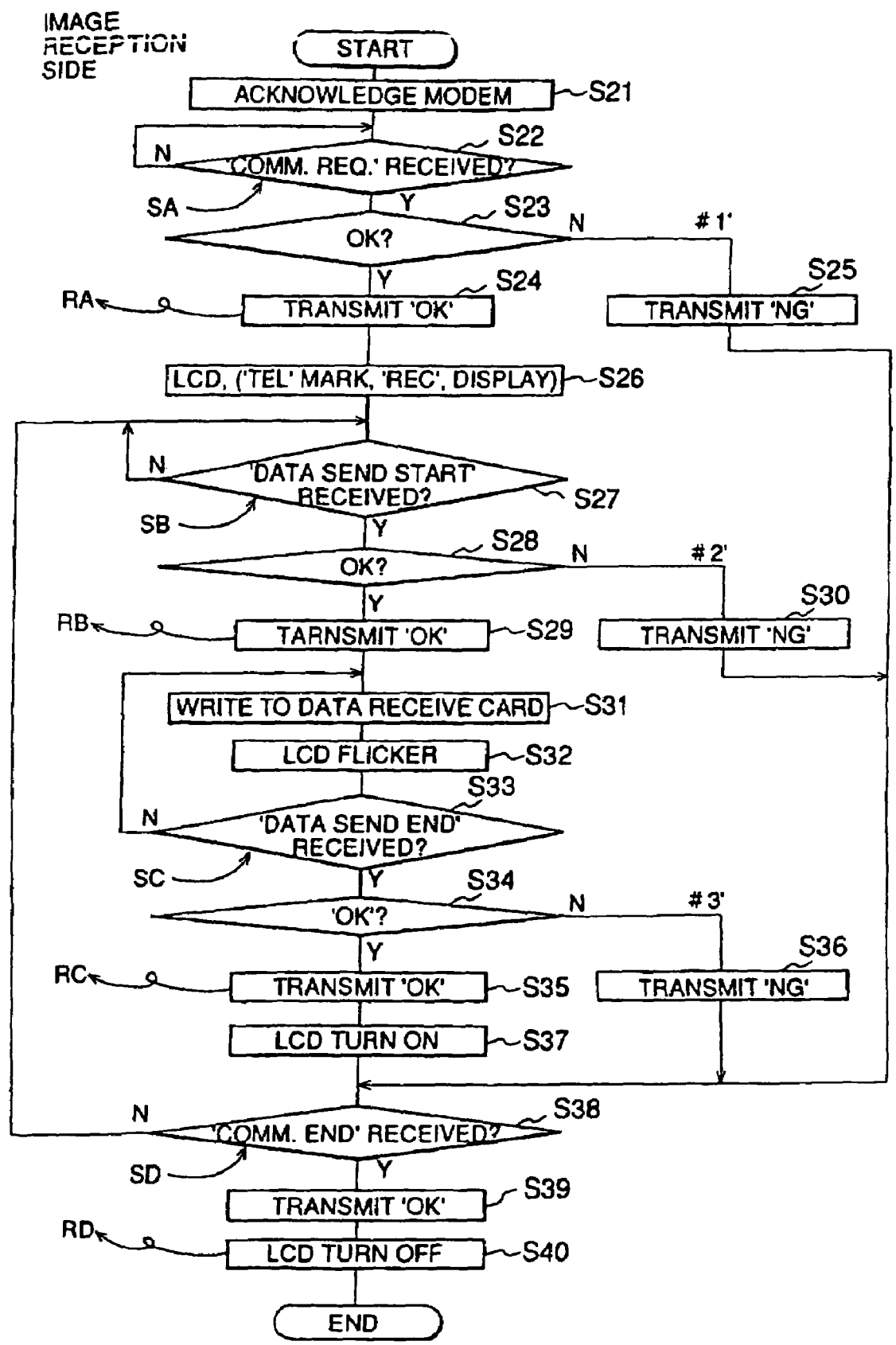

FIGS. 7 and 8 show a flow chart of routines for the image transmitting and receiving side cameras.

A transmitting mode or a receiving mode is chosen as the transmission mode to be put in effect on the basis of a designated state for the transmission mode changing means, that is, the REC/PLAY switch 15E while the communication mode switch 15K is turned on.

Referring to FIGS. 7 and 8, when the transmission side acknowledges that the modems have been connected (step S1), it waits for the turning-on of the communication mode switch 15K (step S2). In response to the turn on of the switch, "communication request" command is transmitted to the reception side. The reception side likewise acknowledges that the modems have been connected (step S21), then acknowledges the reception of the "communication request" command from the transmission side (step S22), and checks whether normal receiving operation on the reception side can be done (OK) (step S23). This check is made by checking whether the memory card has been inserted in the reception side camera, whether the memory card is provided with no protection, whether the memory card has sufficient empty capacity, whether the memory card has been formatted, and so forth. If it is not OK in the step S23, an NG command is transmitted (step S25), and the routine goes to a step S38.

If it is OK in the step S23, an "OK" command is transmitted to the transmission side for displaying the telephone mark and recording mark "REC" on the LCD as shown in FIG. 6.

When the transmission side confirms the reception of the "OK" command (step S4), it turns on the LCD of its camera to display the telephone mark and play-back mark "PLAY" (step S5). At this time, the user selects the image to be transmitted by using the minus and plus feed switches 15C and 15D. If it is determined that no "OK" command has been received, the routine goes to a step S15.

When the trigger 2 switch is turned on (step S6), a "data send (transmission) start" command START is transmitted to the reception side (step S7). When the reception side receives the "data send start" command START (step S27), it checks whether the transmission side image data file capacity is greater than the reception side memory card empty capacity (OK) (step S28). If it is not OK, an "NG" command is transmitted (step S30), and the routine goes to a step S38. If it is OK, an "OK" command is transmitted to the transmission side.

The transmission side checks the reception of the "OK" command (step S8). If the command has not been received, the routine goes to the step S15. If the reception of the command is confirmed, data is sent (transmitted) (step S9). Then, LCD flickering (telephone mark flickering) is caused (step S80), and a "data send end" command is transmitted (step S11). The reception side checks the reception of the "data send end" command (step S33). If the command has not been received, the routine goes back to the step S31. If the reception of the command is confirmed, a check is made as to whether the reception memory side memory card has sufficient empty capacity even after recording of data (OK) (step S34). If it is not OK, an "NG" command is transmitted (step S36), the LCD is turned on (step S37) and the routine goes to a step S38. If it is OK, an "OK" command is transmitted to the transmission side (step S35).

The transmission side checks the reception of the "OK" command (step S12). If the command has not been received, the routine goes to the step S15. If the reception of the command is confirmed, the LCD is lighted (step S13), and a check is done as to whether the communication mode switch 15K is "off". If the switch is not "off", the routine goes back to the step S6. If the switch is "off", a "communication end" command is transmitted to the reception side.

The reception side checks the reception of the "communication end" command (step S38). If the command has not been received, the routine goes back to the step S27. If the reception of the command is confirmed, an "OK" command is transmitted to the transmission side (step S39), and the LCD is turned off (step S40), thus bringing an end to the routine.

The reception of the "OK" command transmitted in the step S39 on the transmission side is confirmed (step S16). If the command has not been received, the routine goes back to the step S115. If the reception of the command is confirmed, the LCD is turned off (step S17), thus bringing an end to the routine.

The conditions #1 and #1' in the steps S4 and S23, the conditions #2 and #2' in the steps S8 and S28 and the causes #3 and #3' in the steps S12 and S34, shown in FIGS. 7 and 8, are as shown in FIG. 9.

FIG. 10 shows the roles of the trigger 2 and communication mode switches 15B and 15K among the operation switches. In the photographing (i.e. recording: REC) mode, the trigger 2 switch 15B causes image recording, while it causes image transmission in the transmission mode. When the communication mode switch 15K issues a "communication request" command and receives an "OK" command, the play-back and telephone marks are displayed, and the transmission mode of the camera is set.

Figure 11:
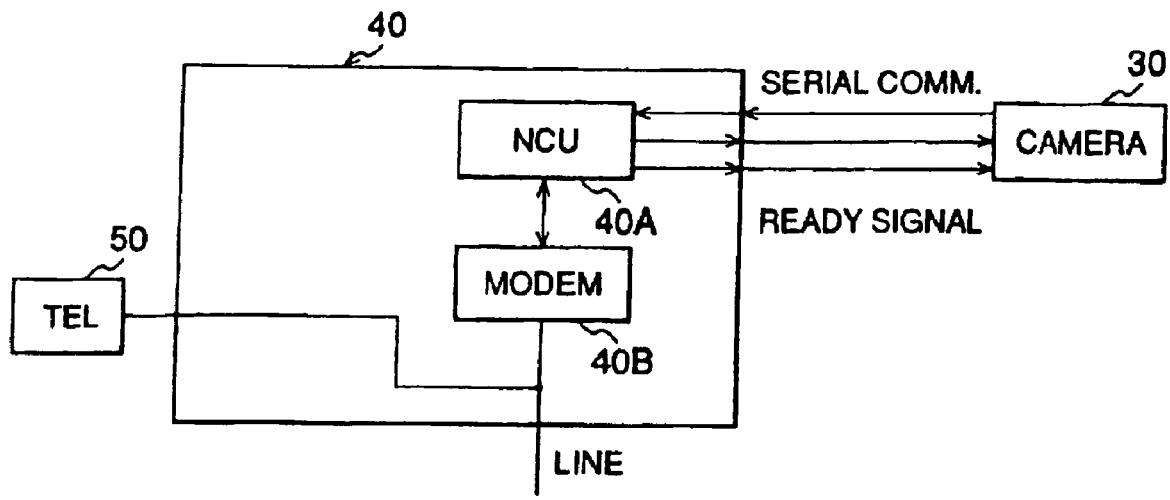
FIG. 11 shows an example of the structure of the modem 40 in FIG. 2.

FIG. 11 shows an example of the modem 40. A network control unit (NCU) 40A transmits and receives serial communication data and ready signal to and from camera 30. A modem 40B is connected to the NCU 40A, telephone unit 50 and telephone line for modulating and demodulating the image data.

Figure 12:
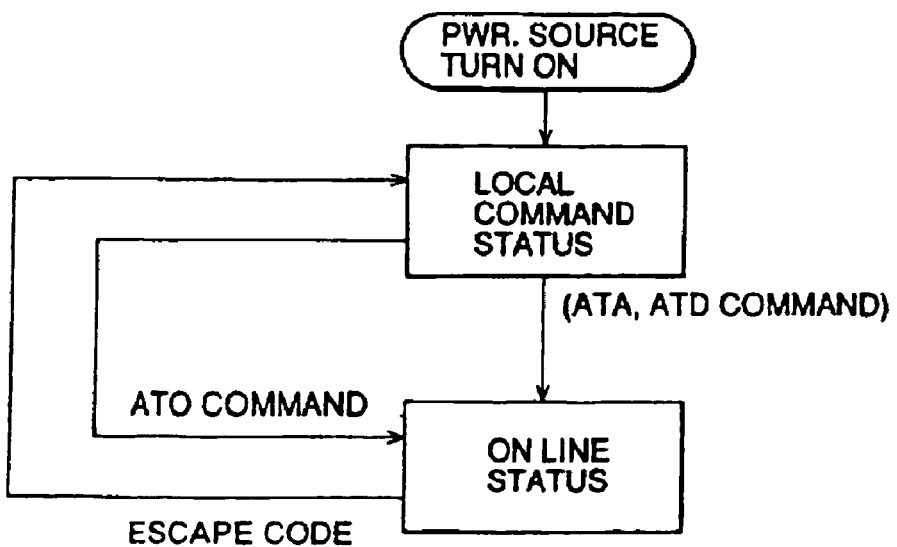
FIG. 12 shows state transitions of the modem 40.

FIG. 12 shows state transition of the modem 40. When the power source is turned on, a local command state is set up, an ATA or ATD command is output to the modem, and the camera is connected to the telephone line. The ATA and ATD commands are signals which are prescribed for avoiding interference of transmission and reception by Hayes Inc. in U.S.A. The ATA command is set on the reception side by the own modem with respect to the other side modem. The ATD command is set on the transmission side by the own modem with respect to the other side modem. An ATO command switches a local command state over to an on-line state. When re-setting system parameters with respect to the NCU 40A in the on-line state, an escape code is output to the modem.

Figure 13:
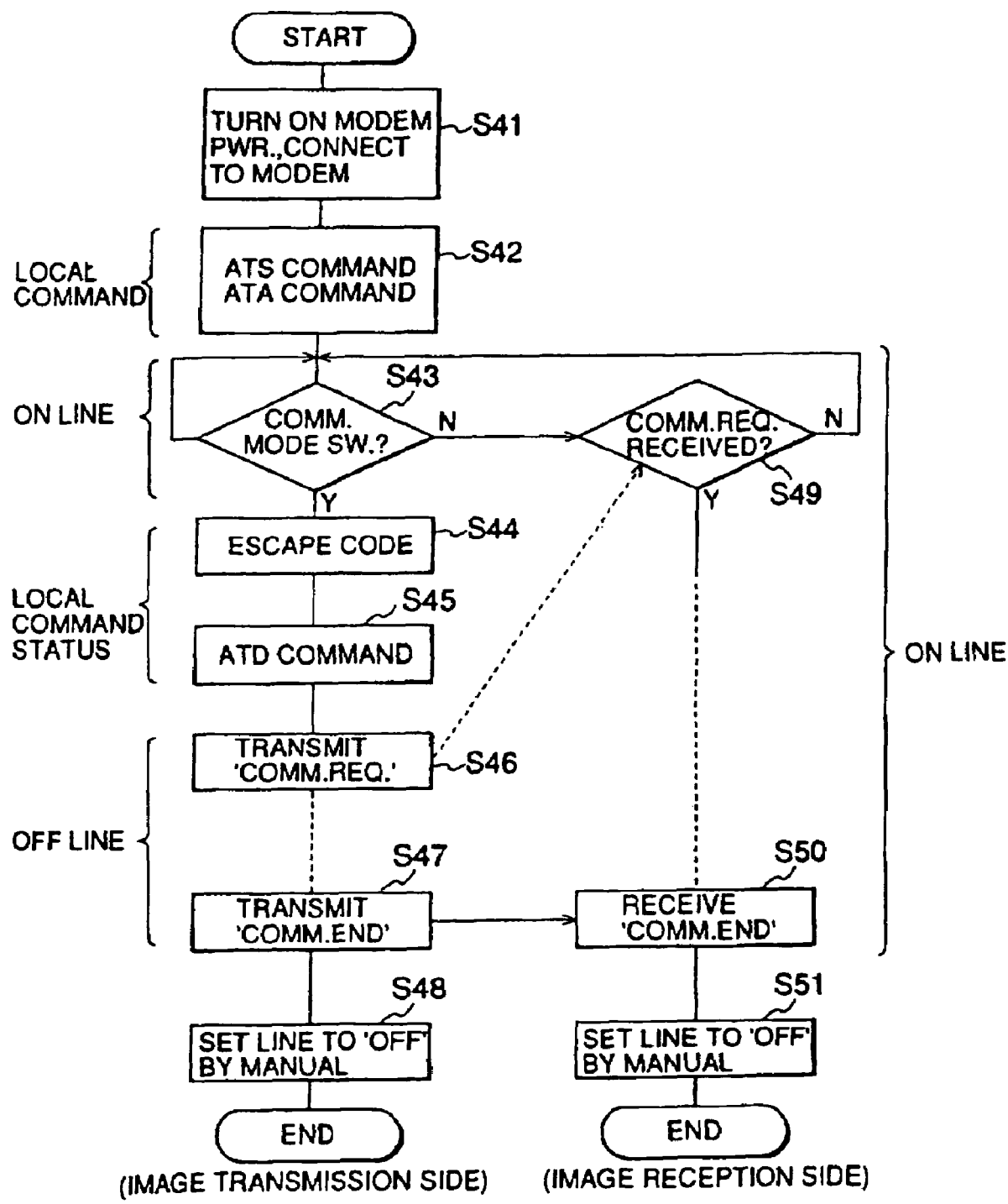
FIG. 13 shows a flow chart for a routine of the modem controlled by the camera under the condition where the modem is connected to the telephone line by the telephone unit.

FIG. 13 shows a flow chart of a routine of the modem controlled by the camera under the condition where the modem is connected to the telephone line by the telephone unit.

When a modem power source is turned on or connected to the modem on the transmission side (step S41), an ATS command for setting parameters necessary for communication, such as the communication speed, and an ATA command for restoring the on-line state of the modem are issued (step S42). In the on-line state, a check is done as to whether the communication mode switch is "on" (step S43). If the switch is "on", an escape code is issued to restore the local command state of the modem (step S44). In the local command state, an ATD command is issued (step S45). In the on-line state, a "communication request" command is transmitted to the reception side (step S46).

On the reception side, a check is done in the on-line state as to whether the communication mode switch is "on" (step S43). If the switch is not "on", the reception of the "communication request" command is checked (step S49). If the command has not been received, the routine goes back to the step S43. If the command has been received, a predetermined process is executed.

On the transmission side, a process subsequent to the process in the step S46 is executed, and then a "communication end" command is transmitted (step. S47), and the line is manually disconnected (step S48).

On the reception side, the "communication end" command is received (step S50), and the line is manually disconnected (step S51), thus bringing an end to the routine.

Now, an embodiment, in which transmitted image can be confirmed on the transmission and reception sides by watching monitors, will be described.

Figures 14, 17:
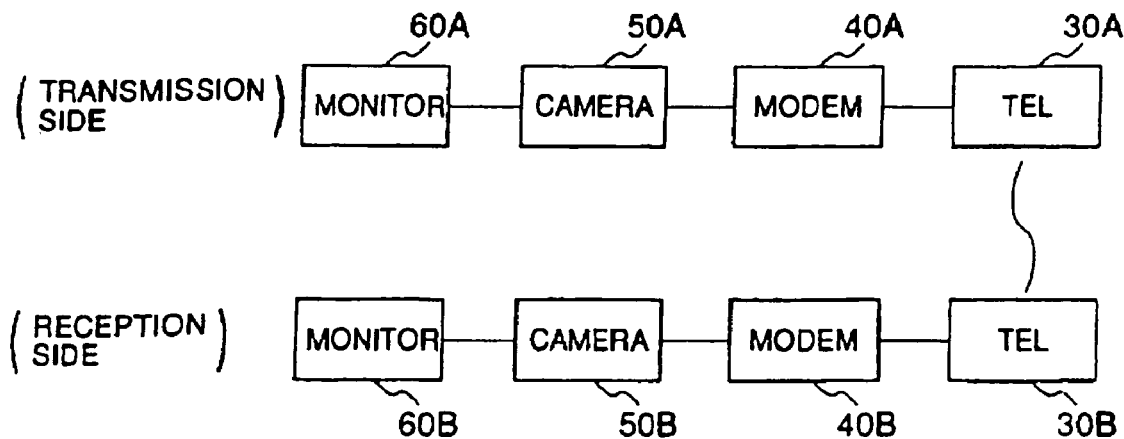
FIG. 14 shows system structure of the embodiment.
FIG. 17 shows functions of various switches in this embodiment.

FIG. 14 shows the system structure of the embodiment. In this system, monitors 60A and 60B are provided on the transmission and reception sides, respectively, in the system structure shown in FIG. 1

Figure 15:
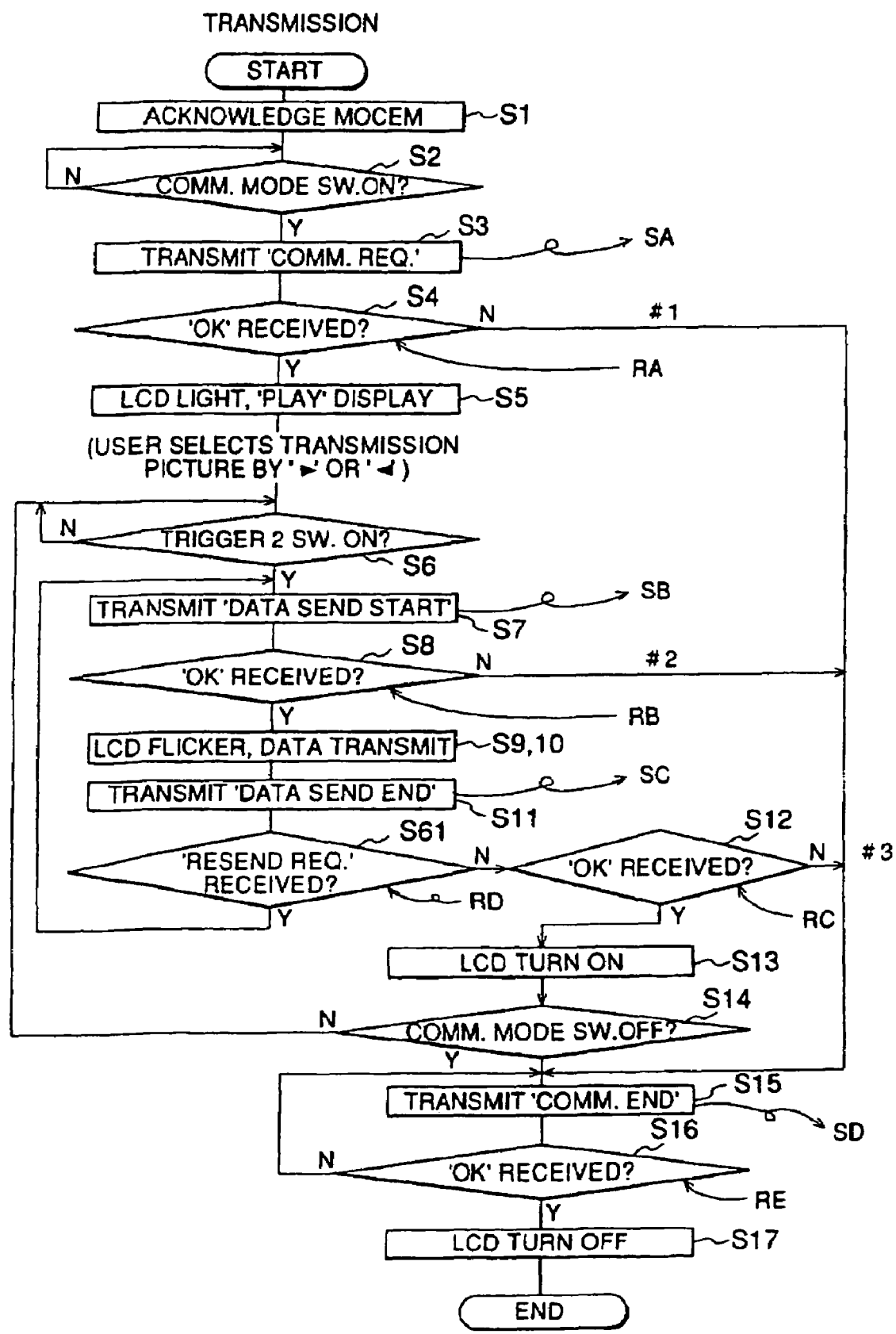

The operation routines of this embodiment will now be described with reference to FIGS. 15 and 16. FIG. 15 shows a flow chart of the transmission side routine. In the Figure, the same reference symbols as in the flow charts of FIGS. 7 and 8 are used.

In this embodiment, a step S61 is inserted between the transmission side routine steps S11 and S12 shown in FIG. 15. After a "data send end" command has been transmitted to the reception side, the reception of a "re-send request" command from the reception side is checked (step S61). If the command has not been received, the routine goes back to the step S7. If it is determined in the step S61 that the "re-send request" command has not been received, as in the embodiment of FIG. 7, a check is done as to whether an "OK" command has been received (step S12).

On the reception side, as shown in FIG. 16, upon reception of the "data send end" command transmitted from the transmission side in the step the received image is played-back (step S62). Then, a check is done as to whether the minus feed switch has been operated for the re-send request by user (step S63). If the switch has been operated, the "re-send request" command noted above is transmitted (step S64), and then the routine goes back to the step S27. If the switch has not been operated, a check is done as to whether the trigger 2 switch is "on" (step S65). If the trigger 2 switch is "on", the routine goes to a step S34 as that in FIG. 8. If the trigger 2 switch is not "on", a check is done as to whether the plus feed switch is turned on (step S66). If the switch has been turned on, the routine goes back to the step S63. If the switch has been turned on, the received image is deleted or erased (step S67), and then the routine goes to the step S34.

FIG. 17 shows the functions of various switches in this embodiment. In the recording (REC) mode, the recording operation is started with the operation of the trigger 2 switch 15B. In the play-back (PLAY) mode, the image is changed by +1 with the operation of the plus feed switch 15D and −1 with the operation of the minus feed switch 15C. In the transmission (transmitting) mode, the transmission is started with the operation of the trigger 2 switch 15B, a "communication request" command is transmitted with the operation of the communication mode switch 15K, and the transmitted image is changed by +1 and −1 with the operation of the plus and minus feed switches 15D and 15C. In the transmission (receiving) mode, an instruction "send next image" (i.e., the previously received image is OK) is given with the operation of the trigger 2 switch 15B, an instruction "send next image" (i.e., delete the previously received image) is given with the operation of the plus feed switch 15D, and an instruction "send immediately previous image" is given with the operation of the minus feed switch 15C.

Figure 18:
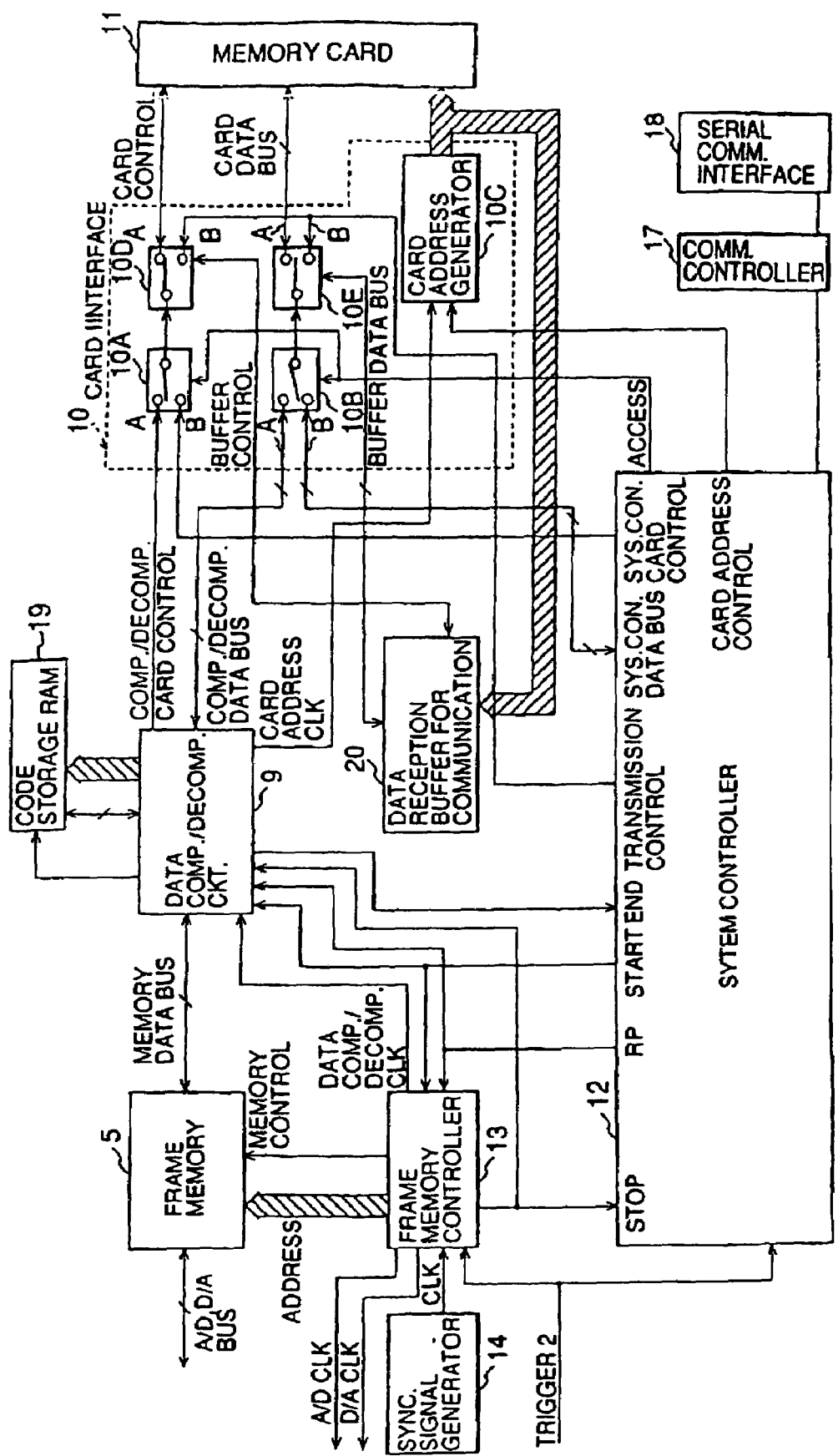
FIG. 18 shows a block diagram of an embodiment according to the present invention.

Now, an embodiment, which permits image data reception without any memory card in the camera but by using a data reception buffer for communication, will be described with reference to FIGS. 18 and 19.

To realize such a function, in this embodiment the following circuits are added to the circuit structure shown in FIG. 3. In the card interface 10, a switch 10D is provided between the switch 10A and memory card 11, and a switch 10E between the switch 10B and memory card 11. Further, a data reception buffer 20 for communication is provided.

Output terminals A of the switches 10D and 10E are connected to the memory card 11, and output terminals B of the switches 10D and 10E are connected to the data reception buffer 20 for communication. The switches 10D and 10E are controlled by a transmission control signal from the system controller 12. The data reception buffer 20 for communication is controlled by an address signal from the card address generator 10C.

Figure 19:
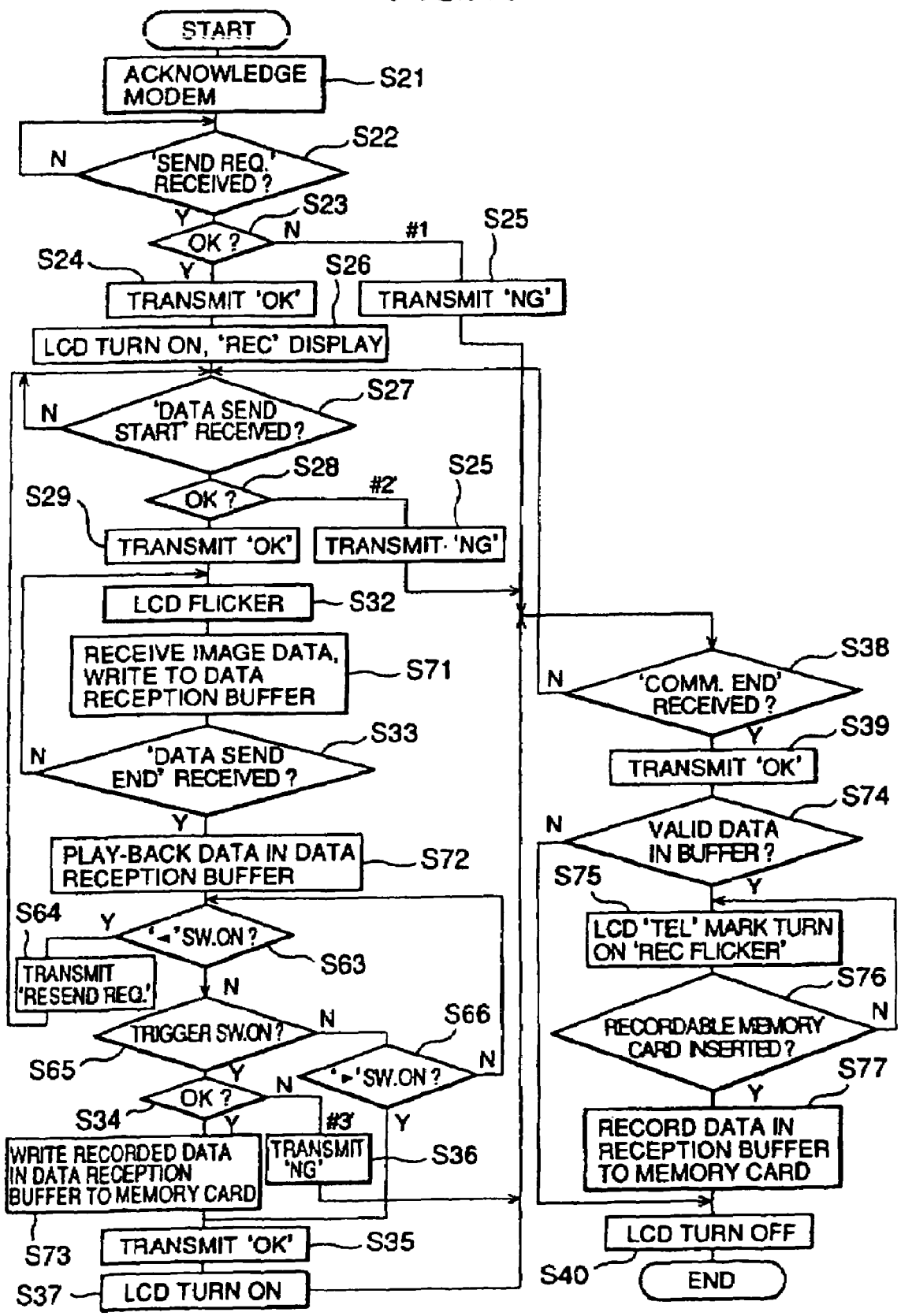
FIG. 19 shows a flow chart for the reception side routine in the embodiment.

FIG. 19 shows a system operation flow chart for reception side routine in the embodiment. In the Figure, like reference symbols as those in FIG. 16 designate like steps. The system operation flow on the transmission side is as in FIG. 15.

In this embodiment, when an "NG" command is transmitted in a step S25, a "communication end" command reception check is done (step S38). After transmission of. an "OK" command (step S39), a check is done as to whether there is valid data in the buffer (step S74). If there is no valid data, the LCD is turned off (step S40), thus bringing an end to the routine. If it is determined that there is valid data, it is notified to the user by causing a "REC" flicker display on the LCD while holding the telephone mark "on" (step S75), and a check is made as to whether a memory card capable of recording has been inserted (step S76). If no memory card capable of recording has been inserted, the routine goes back to the step S75. If the card has been inserted, data in the data reception buffer 20 is recorded in the memory card 11 (step S77), and the routine goes to a step S40.

After the LCD flicker display has been provided in the step S32, image data is received and written in the data reception buffer 20 (step S71). When the reception of a "data send end" command is determined (step S33), the data in the data reception buffer is played-back (step S72). If it is found in the step S34 that there is sufficient empty capacity, i.e., if it is OK, the data that has been recorded in the data reception buffer is written in the memory card, and the routine goes to the step S35 noted above.

Now, an embodiment, which permits image data reception without memory card in the camera but by using the image display frame memory as the data reception buffer for communication, will be described.

Figure 20:
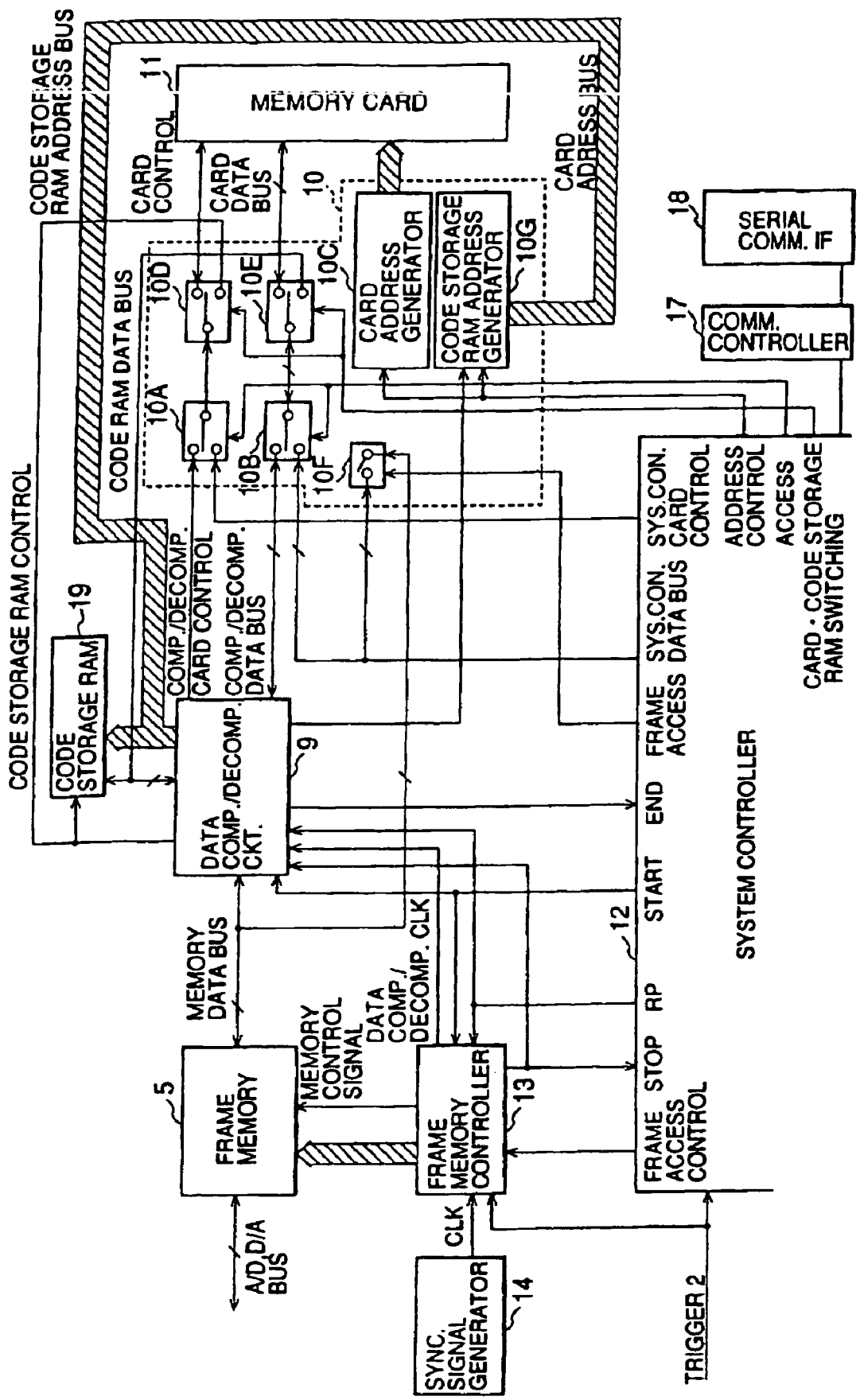
FIG. 20 shows a block diagram of the play-back system of the embodiment.

FIG. 20 shows a block diagram of the play-back system of this embodiment.

In this embodiment, the data reception buffer 20 in the previous embodiment is omitted, and its function is provided by the frame memory 5 and the code storage RAM 19. The frame memory 5 has a capacity of storing one frame of decompressed data and has a sufficient capacity for compressed data. The code storage RAM 19 is empty at the time of the reception and has valid capacity as the data reception buffer. These memories thus can be used as the data reception buffer. To the code storage RAM 19 an address signal is supplied from a code storage RAM address generator 10G.

Data that has been stored in the frame memory 5 as the data reception buffer, is recorded in the memory card 11 via a switch 10F, which is controlled for switching by a frame access signal supplied from the system controller 12, and also via the switches 10B and 10E.

Figure 21:
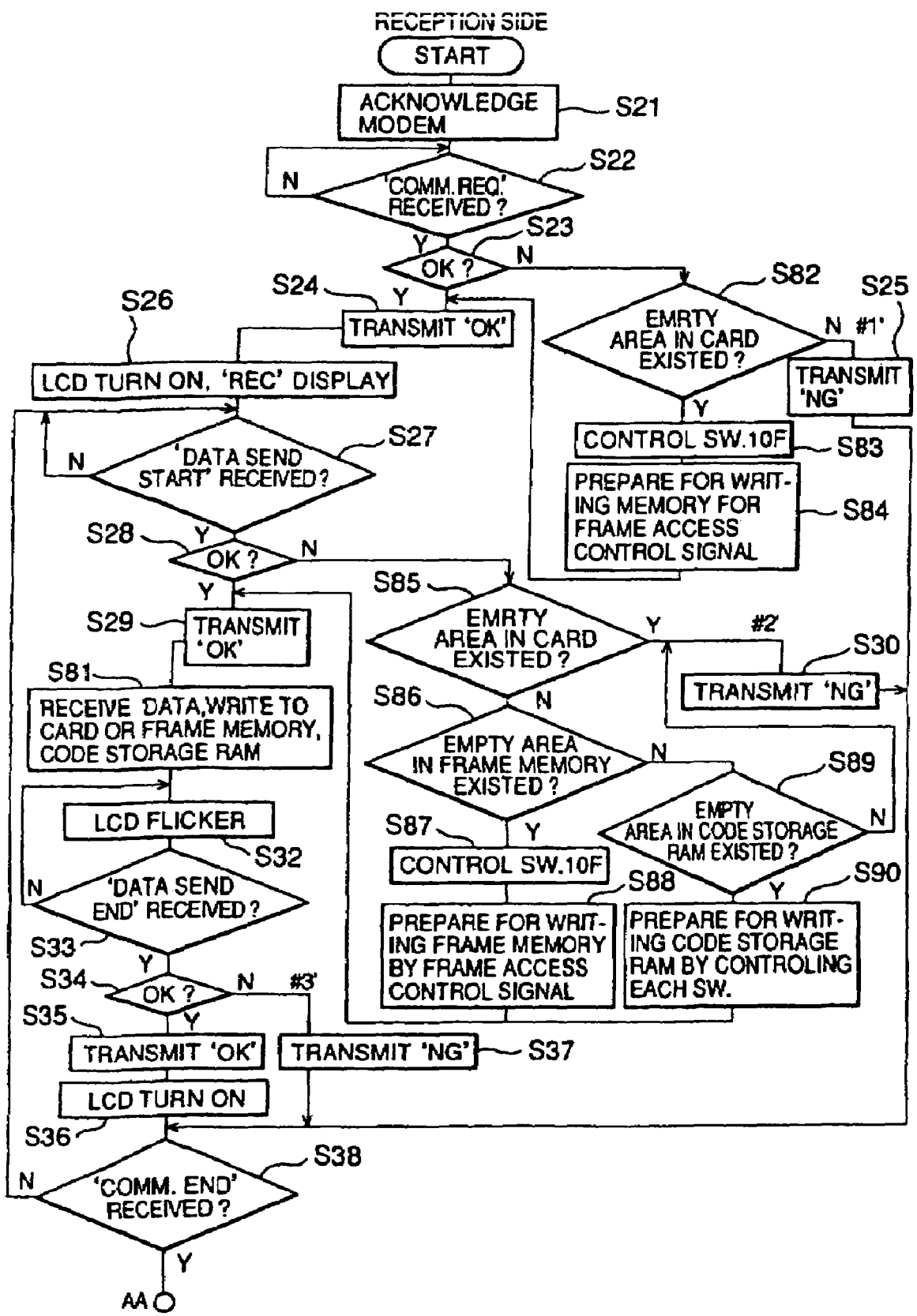
FIGS. 21 and 22 show flow charts for the reception side system operations in the embodiment of FIG. 20.
Figure 22:
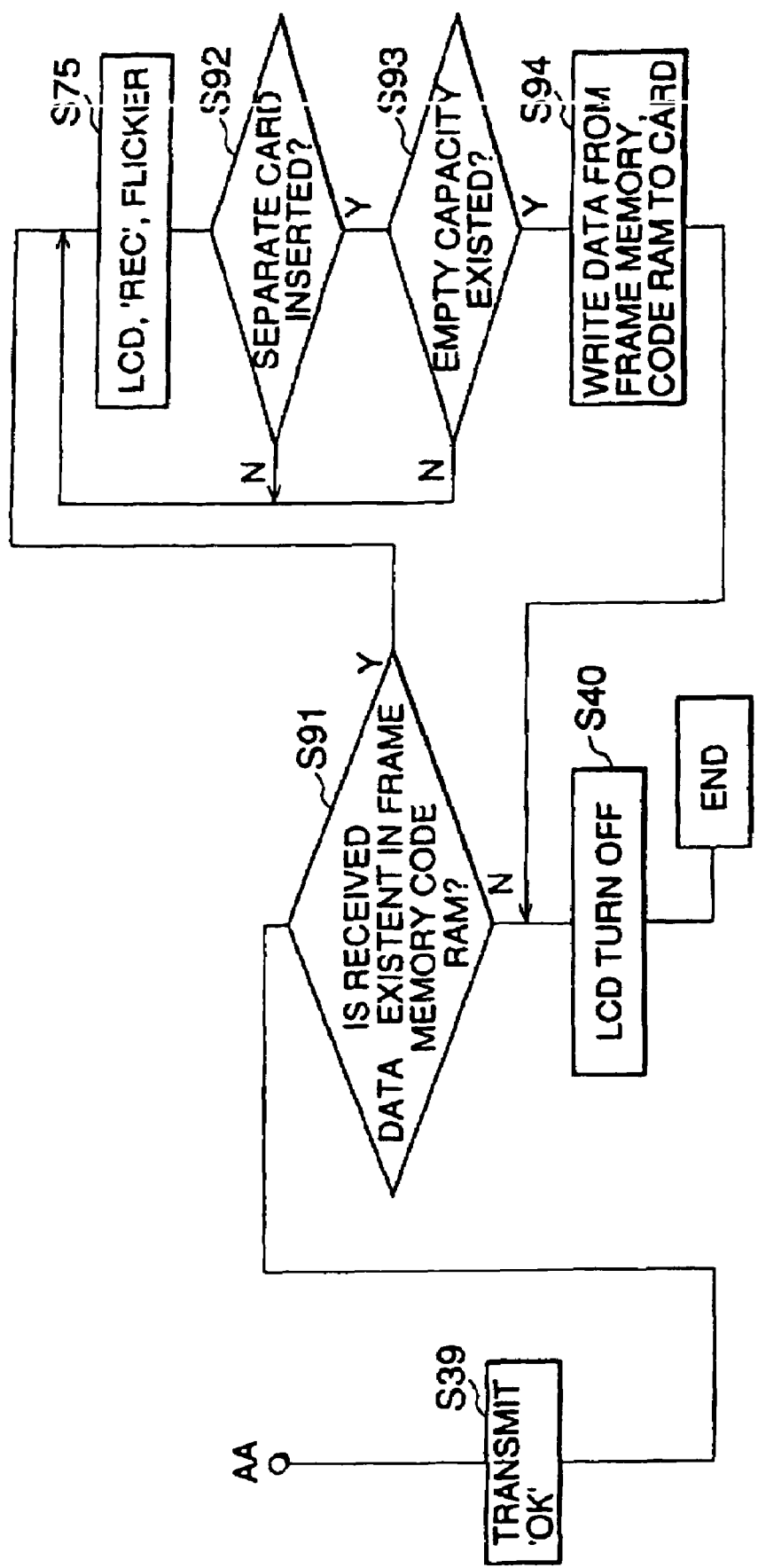

FIGS. 21 and 22 show reception side system operation flow charts in the embodiment of FIG. 20. Reference symbols like those in FIG. 19 designate like steps.

If it is not OK in the step S23, a check as to whether there is empty area in the card is done (step S82). If it is determined that there is no empty area, an "NG" command is transmitted (step S25), and the routine-goes to a step S38. If it is determined that there is an empty area, the switch 10F is controlled (step S83), and preparation for writing data in the frame memory 5 is made under control of a frame access control signal supplied from the system controller 12 (step S84), and then an "OK" command is transmitted (step S24).

In a step S27 a "data send start" command START is received. If it is found in a step S28 that it is not OK, a check for an empty area in the memory card is done (step S85). If there is an empty area, an "NG" command is transmitted (step S30), and then the routine goes to a step S38. If there is no empty area in the memory card, a check for an empty area in the frame memory is done (step S86). If there is an empty area, the switch 10F is controlled (step S87), and preparation for writing data in the frame memory 5 is made according to a frame access control signal (step S88), and the routine goes to a step S29.

If it is determined in the step S86 that there is no empty frame memory area, a check as to whether there is an empty area in the code storage RAM 19 is done (step S89). If there is no empty area, the routine goes to a step S30. If there is an empty area, preparation for writing data in the code storage RAM 19 is made through control of the switches 10A, 10B and 10D to 10F (step S90), and the routine goes to the step S29. If it is determined in the step S86 that there is an empty frame memory area, the switch 10F is controlled (step S87), and preparation of writing data in the frame memory is made according to a frame access control signal (step S88).

After transmission of an "OK" command in the step S29, data is received and written in the memory card or frame memory 5, code storage RAM 19 (step S81). Then, a process through flickering of the LCD (step S32), confirmation of the reception of a "data send end" command (step S33), check of OK (step S34), transmission of an "OK" command (step S35), turning-on of the LCD (step S36), confirmation of the reception of a "communication end" command (step S38), and transmission of an "OK" command (step S39) is executed, and a check is done as to whether there is received data in the frame memory 5 and code storage RAM 19 (step S91). If there is no received data, the LCD is turned off (step S40), thus bringing an end to the routine. If there is received data, this is notified to the user by causing "REC" flicker on the LCD (step S75). Then, insertion of a separate card is checked (step S92). If no other card has been inserted, the routine goes to a step S75. If a separate card has been inserted, the empty capacity is checked (step S93). If there is no empty capacity, the routine goes back to the step S75. If there is empty capacity, data is written from the frame memory 5 or code storage RAM 19 to the memory card 11 (step S94), and the routine goes back to the step S40.

Now, a further embodiment will be described, in which data reception, decompression and play-back can be done in synchronism to data transfer speed through control of a system clock (CLK) by the system controller 12, and also which permits economical cancellation.

Figure 23:
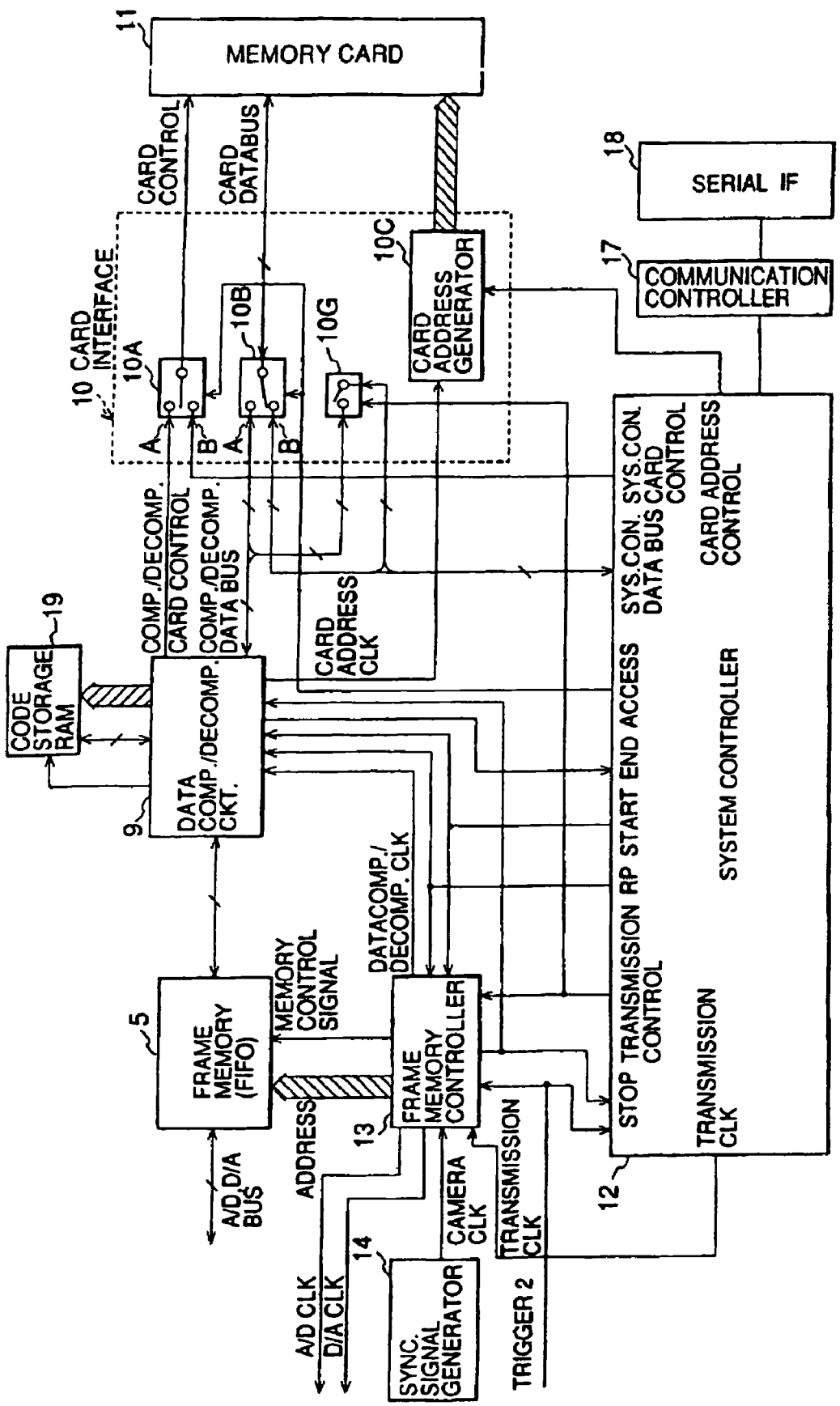
FIG. 23 shows a block diagram of an embodiment, which is similar to FIG. 20.

FIG. 23 shows a block diagram of the embodiment, which is similar to FIG. 20.

In this embodiment, the frame memory controller 13 switchingly outputs a camera clock from the sync signal generator 14 and a transmission clock from the system controller 12 and then issues necessary clocks adaptive to the instant mode, on the basis of the camera clock or the transmission clock. A switch 10G is further provided to let data that has been received through a serial IF 18 and a communication controller 17 be sent out to the compression/decompression data bus via the system control data bus. Data that has been input via the compression/decompression data bus is decompressed in the data compressing/decompressing circuit 9 to be written in the frame memory 5 which has a FIFO function via the memory data bus. The switch 10G is on-off controlled by a transmission control signal supplied from the system controller 12.

The received image data is decompressed in the data compressing/decompressing circuit 9 according to a transmission clock from the system controller 12 switched by the frame memory controller 13 and stored in the frame memory 5. Thus, while receiving image data, the image data that has been recorded in the frame 5 can be substantially real time played-back. It is thus possible to re-send necessary image or cancel (erase) image data while watching the reproduced image. Wasteful use of the telephone line thus can be eliminated to permit economical use.

Figure 24:
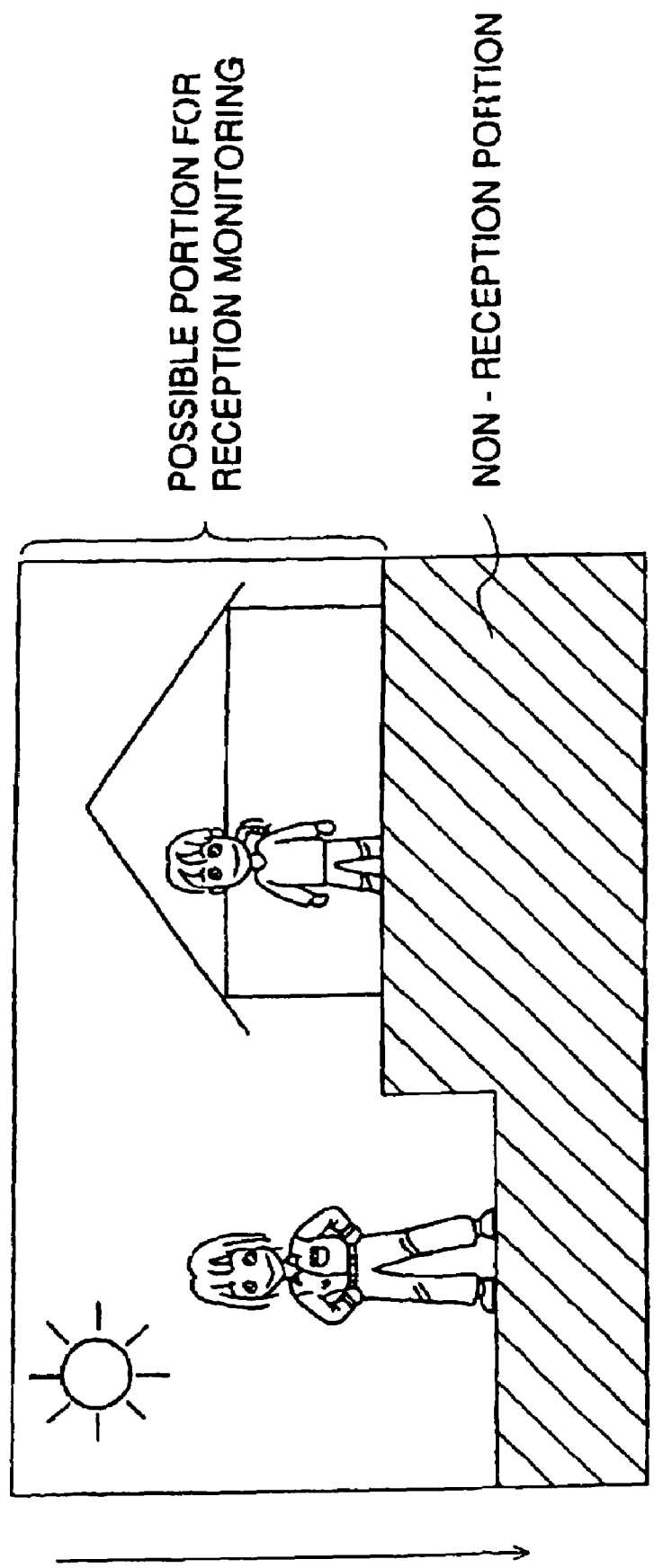
FIG. 24 shows an example of image which is reproduced by the embodiment.

FIG. 24 shows an example of image which is reproduced in this way. In the Figure, the shaded portion is a non-reception area. In the area other than the non-reception area, a reproduced monitor picture of image data recorded in the frame memory 5 is displayed. In this state, a request of the re-transmission of a predetermined portion of the monitor picture is made by operating the minus feed switch, recording of data in the memory card (during period other than the transmission period) is done by operating the trigger 2 switch, and the image transmission in force is canceled by operating the plus feed switch.

Figure 25:
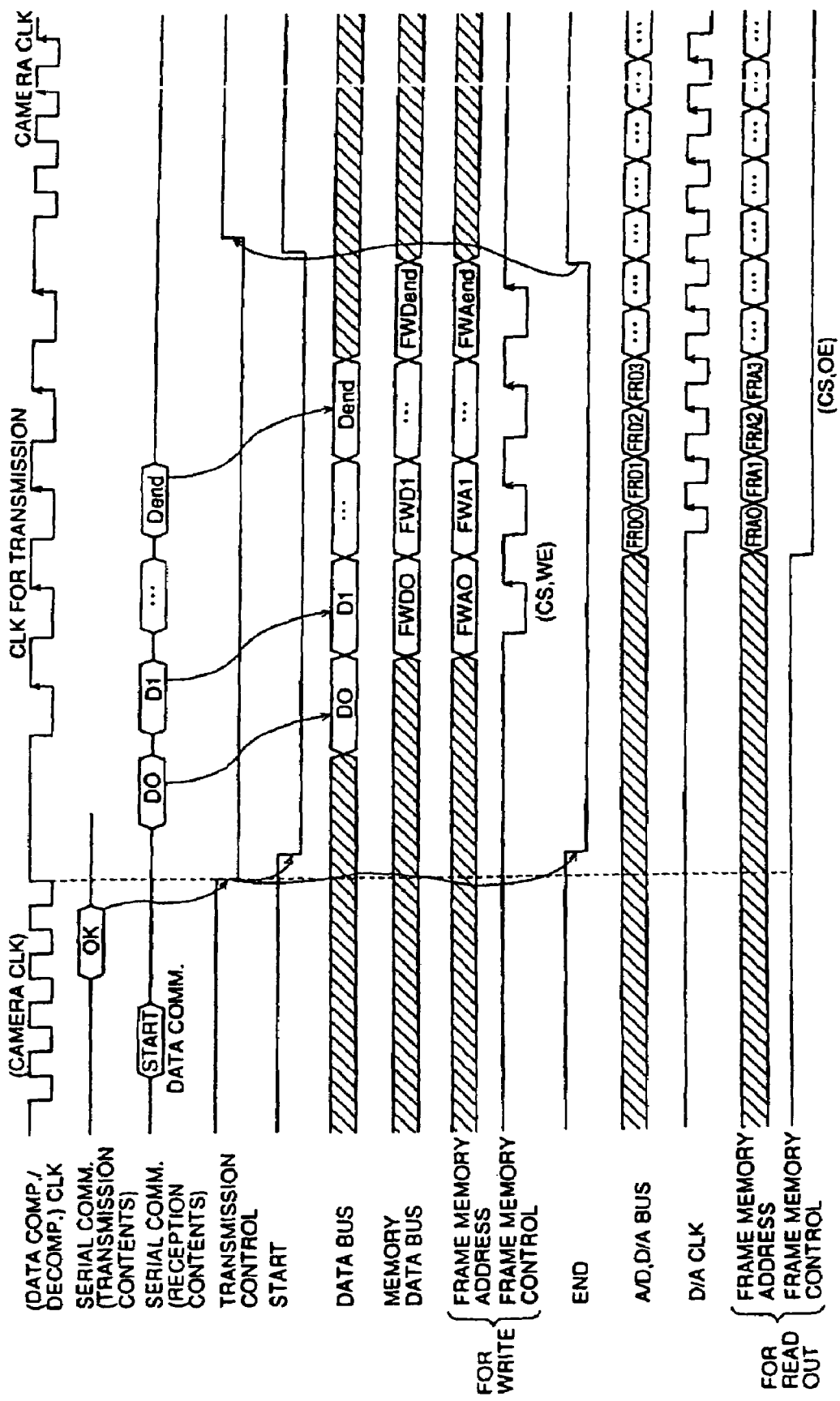
FIG. 25 shows a timing chart of the reception side operation in the embodiment shown in FIG. 23.

FIG. 25 shows a reception side operation timing chart in the embodiment shown in FIG. 23.

The frame memory controller 13 switchingly outputs the camera clock CLK and transmission clock CLK as data compression/decompression clock CLK. During serial communication, a "data send start" command is sent out from the transmission side to reception side, and subsequent to "OK" from the reception side compressed data D0, D1 . . . , Dend are sent out from the transmission side. The reception side system controller, after transmitting the "OK" command, switches a switch 10G according to a transmission control signal to set up a data reception state. After a start signal START has been output from the system controller 12, received compressed image data D0, D1, . . . , Dend are input to the data compressing/decompressing circuit 9 via the data bus according to the transmission clock noted. above. The decompressed data FWD0, FWD1, . . . , FWDend are written in the frame memory 5 according to write address FWA0, FWA1, . . . , FWAend and also frame control signal (CS or WE) and under control of the transmission clock. Image data FRD0, FRD1, . . . are read out from the frame memory 5 according to frame memory address data FRA0, FRA1, . . . generated in synchronism to the D/A CLK and frame control signal (CS, OE) and sent out to the A/D and D/A buses. At this time, the RP is set to "L". Afterwards, the RP is switched to "H" by the trigger 2 switch to bring about compression recording.

Now, an embodiment, which permits automatic transmission and reception of image on the basis of information stored in a predetermined specific file (called control file hereinafter), will be described.

Figure 26:
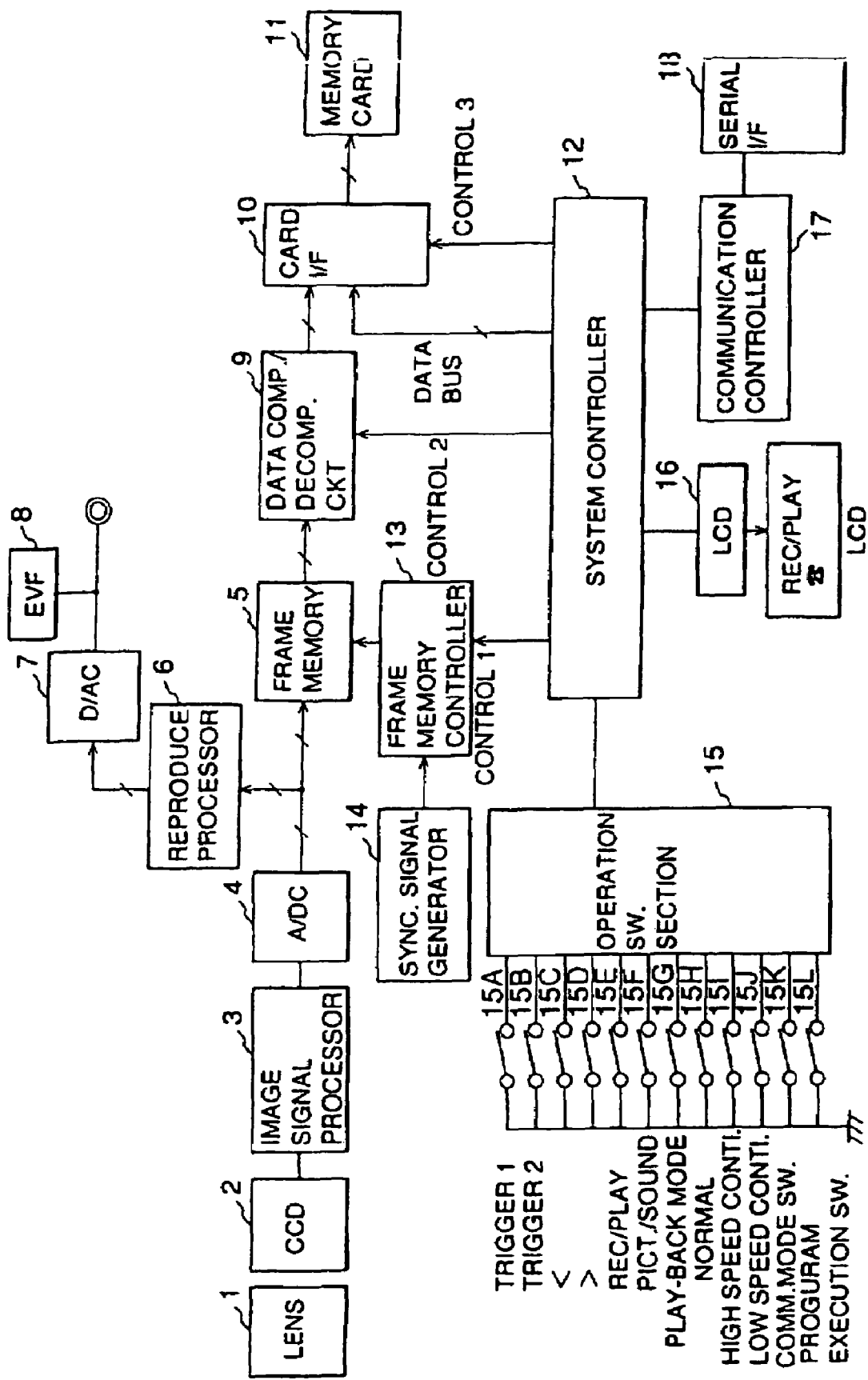
FIG. 26 shows a block diagram of an embodiment.

FIG. 26 shows a block diagram of this embodiment. In the Figure, parts like those in FIG. 2 are designated by like reference numerals. In this embodiment, a program execution switch 15L is provided in the operation switch section in addition to the switches 15A to 15K shown in FIG. 2.

This embodiment is effective when recording data as image files, sound files and control files in the memory card. An apparatus of the embodiment is operated on the basis of a control file using a personal computer.

Figures 27, 28:
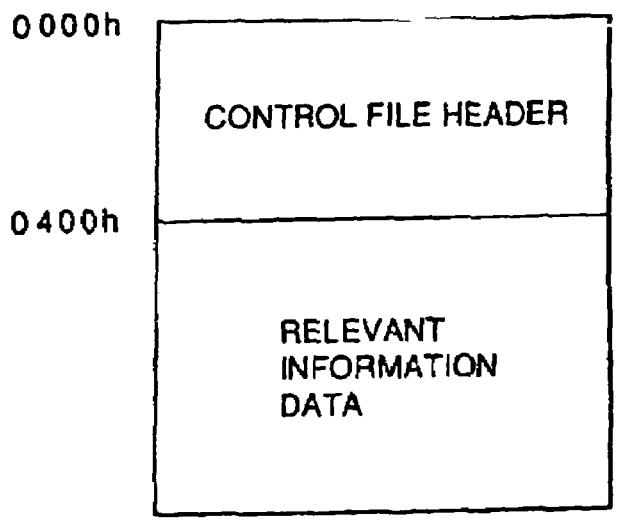
FIG. 27 shows a view of the configuration of the control file.
FIG. 28 shows the relevant data.

FIG. 27 shows a view of the configuration of the control file (DSC00001.J6C). This file comprises a control file header and relevant data section for transmission.

FIG. 28 shows the relevant data. SEND1 prescribes the transmission command. DATE prescribes the communication start instant (in this example '92, May 25, 15 o'clock, 40 minutes, 0 second). PHONE prescribes the partner side telephone number, the image files to be transmitted (DSC00001.J6I, DSC00003.J6I, DSC00004.J6I) and sound file (DS00002.J6S).

Figure 29:
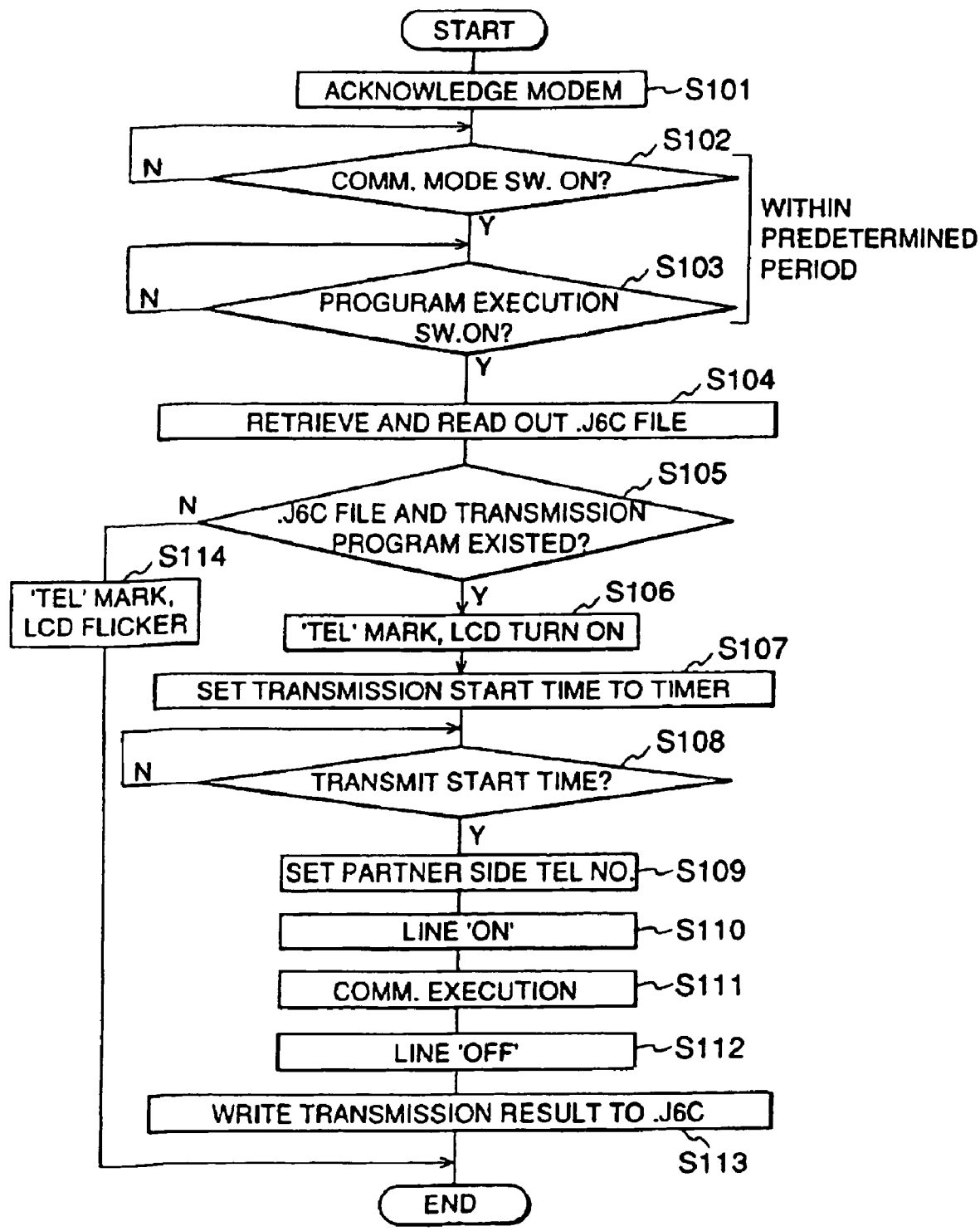
FIGS. 29 and 30 show flow charts of the routine for the transmission and reception system controllers 12 in the embodiment.
Figure 30:
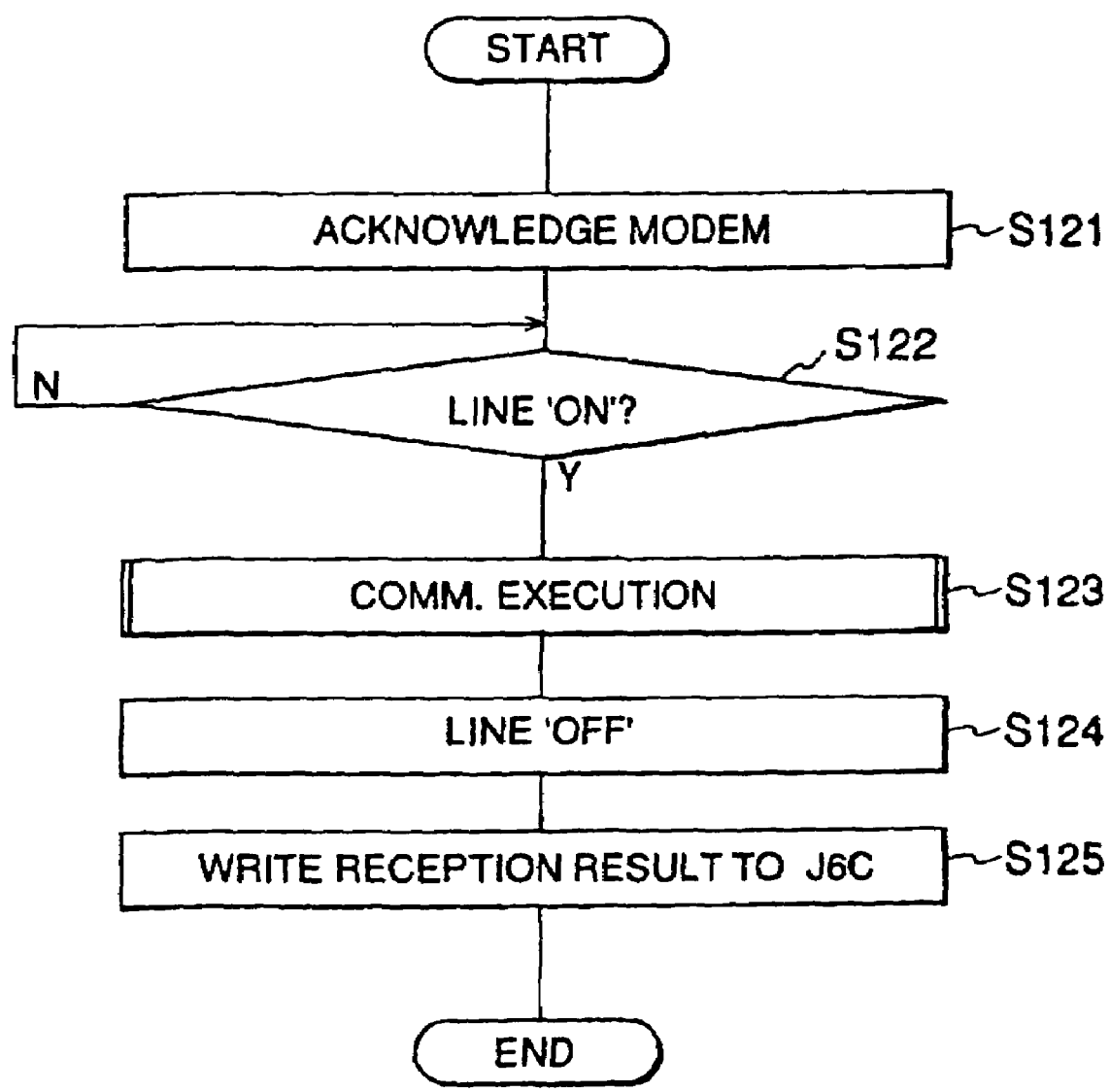

FIGS. 29 and 30 show flow charts of the routine of the transmission and reception system controllers 12 in this embodiment.

On the transmission side by recognizing the connection of modems (step S101), the turning-on of the communication mode switch 15K is waited (step S102). Then after waiting the turning-on of the program execution switch 15I in a predetermined period of time (step S103), the decompression file and control file .J6C are retrieved and read out (step S104), and a check is done as to whether there is a transmission program in the control file (step S105). If there is no transmission program, this is notified to the user by causing LCD flicker (telephone mark) display (step S114), thus bringing an end to the routine.

If it is determined in the step S105 that there is a transmission program, the LCD is turned on (step S106), and a transmission start instant (DATE part in FIG. 28) is set in the timer (step S107), and it is waited (step S108). When the transmission start instant is reached, the partner side telephone number (PHONE part in FIG. 28) is set (step S109)., the line is turned on (step S110), and a communication process to be described later is executed (step S111). Subsequently, the line is turned off (step S112), and the result is written in the control file .J6C, thus bringing an end to the routine.

On the reception side, likewise the modems are acknowledges (step S121), the tuning-on of the line is waited (step S122), and a communication process to be described later is executed (step S123). Then the line is turned off (step S124), and the result of reception is written in the control file (step S125), thus bringing an end to the routine.

Figure 31:
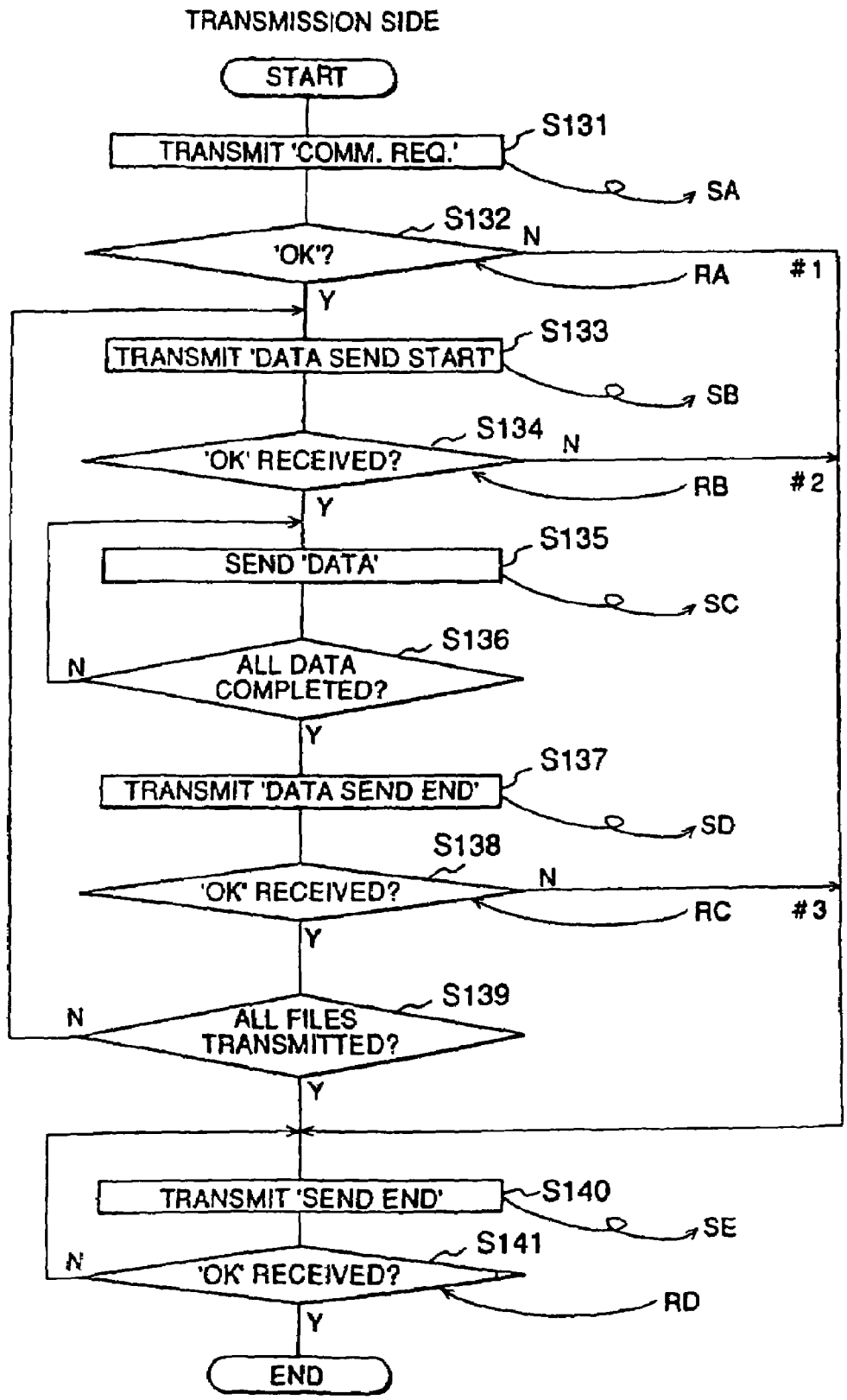
FIGS. 31 and 32 show flow charts for the routine of the communication process.
Figure 32:
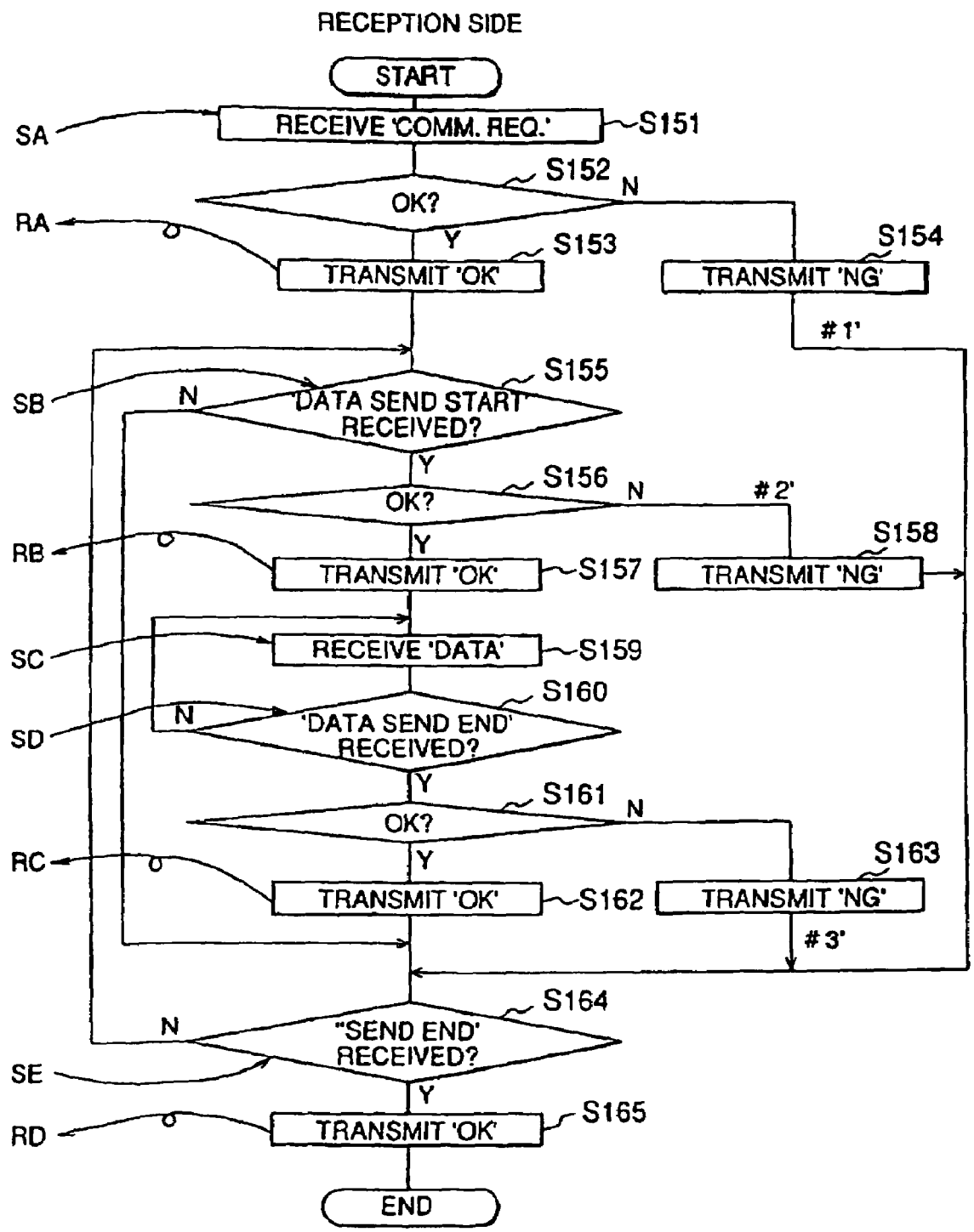

FIGS. 31 and 32 show the routine of the communication process noted above.

A "communication request" is transmitted from the transmission side (step S131). When this "communication request" is received on the reception side (step S151), OK checks such as a check as to whether the reception side memory empty capacity is sufficient and a check as to whether the formatting has been completed are done (step S152). If not OK, an "NG" command is transmitted (step S154), the routine goes to a step S164. If OK, an "OK" command is transmitted to the transmission side (step S153).

On the transmission side, a check is done as to whether the "OK" command has been received (step S132). If the command has not been received, the routine goes to a step S140. If the command has been received, a "data send start" command START is transmitted to the reception side.

On the reception side, the reception of the "data send start" command START is checked (step S155). If the command has not been received, the routine goes to a step S164. If the command has been received, an OK check is done as to whether the transmission image data file capacity is greater than that of the reception side memory card (step S156). If not OK, the step S164 is executed. If OK, an "OK" command is transmitted to the transmission side (step S157).

On the reception side, the reception of the "OK" command is checked (step S134). If not OK, the routine goes to a step S140. If OK, data is transmitted (step S135), and a check is done as to whether all data has been transmitted (step S136). If all data has not been transmitted, the routine goes back to the step S135. If all data has been transmitted, a "data send end" command END is transmitted (step S137).

On the reception side, after the process in the step S159 the reception of the "data send end" command END is checked (step S160). If the command has not been received, the routine goes back to the step S159. If the command has been received, a check is done as to whether the reception side memory card has empty capacity even after the data recording (step S161). If not OK, an "NG" command is transmitted (step S163), and the routine goes to a step S164. If OK, an "OK" command is transmitted to the transmission side (step S162).

On the transmission side, the reception of the "OK" command is checked (step S138). If the command has not been received, the routine goes to the step S140. If the command has been received, a check is done as to whether all the transmission files written in the control file have been transmitted (step S139). If not, the routine goes to a step S133. If all the files have been transmitted, a "send end" command END is transmitted to the reception side (step S140).

On the reception side, the reception of the "send end" command is checked (step S164). If the command has not been received, the routine goes back to the step S155. If the command has been received, an "OK" command is transmitted to the reception side (step S165), thus bringing an end to the routine.

In the step S141 on the transmission side, the reception of the "OK" command is checked (step S141). If the command has not been received, the routine goes back to the step S140. If not, the routine is ended.

FIG. 33 shows an example of writing in the control file (.J6C) of the transmission and reception results in the steps S113 and S125 in FIGS. 29 and 30.

In (A) in the Figure, the transmission and reception results are shown as "SEND1-RESULT" and "ACCEPT-RESULT". "FAULT1" on the transmission side indicates NG due to causes #1 and #1'.

In example (B), it is shown that while the upper two image and sound files have been transmitted on the transmission side, the transmission of the lower two image files was NG due to causes of #2 and #3. On the reception side, the received data are only the above two files, indicating that NG was caused in FAULT2 due to causes #2 and #3.

In the example (C), it is shown that the transmission and reception of all the files have been completed on the transmission and reception sides.

The user thus can readily recognize the transmission and reception status with reference to the above transmission and reception results. The reception result can, if necessary, be displayed on the monitor screen.

FIG. 34 shows a different example of the relevant data (for transmission) shown in FIG. 28. In the Figure, "SEND1" is a transmission command, "IMAGE ALL" is a command instructing the transmission of all the image files in the memory card, "SOUND ALL" is a command instructing the transmission of all the sound files in the memory card, and "FILE ALL" is a command instructing the transmission of all the files in the memory card.

While the above embodiments have concerned the use of the memory card, it is possible as well to use any recording medium such as an optical magnetic disk, a half memory, etc.

As shown above, according to the invention the camera itself has a modem control function, thus readily permitting image communication by merely utilizing modems and without agency of any other transmitting and receiving units.

In the DSC which is used with such recording media as IC memory cards, magnetic recording media, optical magnetic recording medium, etc., there are many proposals for diversification of functions. Among such proposals is one, in which the camera has interface (hereinafter referred to as I/F) means for connecting it to an external unit, thus permitting transmission and reception of various kinds of information.

For example, as earlier proposal by the applicant, there is a camera disclosed in Japanese Patent Application No. H2-108468, which includes I/F means with respect to a personal computer (hereinafter referred to as PC), thus permitting such processes as remote control operation of the camera, transmission and reception of video signal with the PC with communication thereof. As another earlier proposal by the applicant there is a camera disclosed in Japanese Patent Application No. H4-333707, which includes I/F means with respect to a modem to permit video information communication via a telephone line through modems.

However, if it is intended to apply the DSC in the above first and second proposals in the Japanese Patent Application No. H2-108468 and Japanese Patent Application No. H4-333707 to information communication with a plurality of different external units such as PCs and modems, it is necessary to provide the camera with I/F means including a connector having two independent systems for the PC and the modem.

The provision of the I/F means including such a two-system connector in the camera is not only disadvantageous in view of the cost, but is also disadvantageous in view of the size reduction of the camera body due the installation space of the connector for connection to the PC and the modem.

Heretofore, however, it has been impossible to provide a connector or an I/F for common use the detailed specifications of the I/F are different with the PC and the modem although RS-232C is basically conformed to.

The reasons for the impossibility of the common use is that in the connection to the modem, in comparison with the direct connection to the PC:

(1) the communication speed is reduced because the general public telephone line is utilized;

(2) it is necessary to use a control line for interface with the modem; and (3) connection control is necessary for controlling the connection between the modem and telephone line.

The following embodiment of the invention has been contemplated in order to overcome the above deficiencies. It is a highly functional camera, which permits information communication with a plurality of different external units and does not go counter to the camera body size reduction.

In this embodiment, one of the plurality of different external units is connected to the connector, and it is recognized by interface recognition means for causing the interface to function in a status fitted to the connected external unit.

Figure 35:
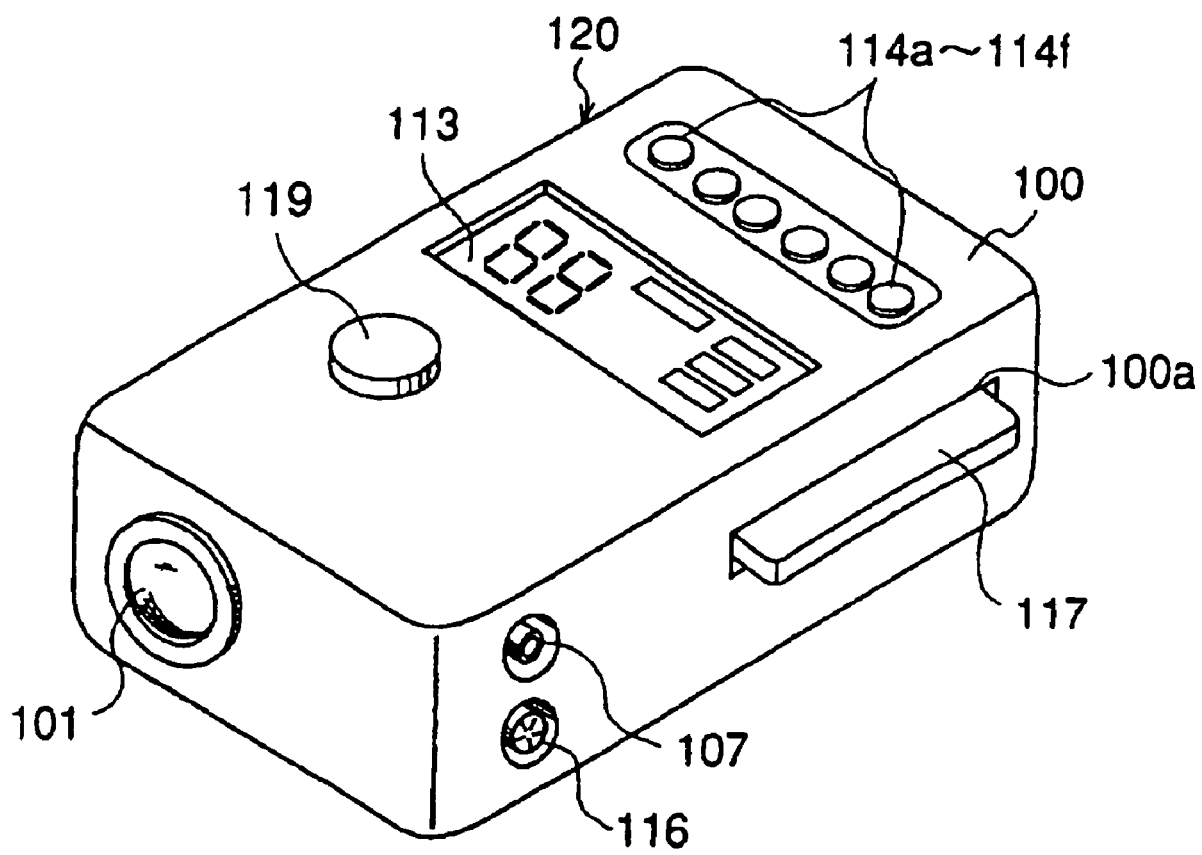
FIG. 35 shows a perspective view of the DSC 120 in the embodiment.

FIG. 35 is a perspective view showing a DSC (digital still camera) 120 in this embodiment. The DSC 120 is used with an IC memory card 117 as image information recording medium. It is capable of communication with PCs and modems, which are among a plurality of different kinds of external units with different interfaces to be applied, with a single connector and an external I/F connected thereto. The I/F is a unit, which couples together and can be used commonly for two systems or units, or it is a register common to a plurality of programs. The I/F may be provided not only as a unit but also a circuit using LSI.

The DSC includes means for changing file data, for instance comment data, concerning image, means for changing the position in a hierarchical data structure (directory) of the file, i.e., changing the management area, means for permitting play-back of recorded pictures by one-touch operation of a specific operating switch or section which is usually used for a different purpose, for instance an erase switch, and means for permitting selection of the operation of memory check and formatting when deleting all the memory card data and the operation of deleting only file.

In the DSC 120, as shown in FIG. 35, the front of the camera casing 100 is provided with an image pick-up lens 101 for picking up images. The top of the casing 100 has operation switches 114a and 114f for instructing control operations, a LCD display 113 and a release switch 119 for instructing the photographing operation. The camera casing 100 further has its side wall provided with a connector 116, for instance a mini DIN connector, for transmission and reception of signal between a video signal output terminal 107 and a plurality of external units such as PCs and modems, and also provided with an insertion opening 100a, through which a memory card 117 as recording medium is inserted.

FIG. 36 is a block diagram showing a controller of the DSC 120. In the instant DSC, image pick-up signal is recorded in the loaded memory card 117 in response to the depression of a release switch 119. Also, recorded image pick-up signal in an image file of a designated file number is played-back from the memory card 117 in response to operation of operation switches 114a to 114f to be described later, and the video signal is output from the video signal output terminal 107. The individual control elements of the DSC 120 are controlled by a system controller 110.

The construction of the DSC will now be described. At the time of the image pick-up, an image is focused by the image pick-up lens 101 on a CCD or like image pick-up element in an image signal processor 102. An image signal is thus output from the processor 102 to an A/D converter 103 for conversion to digital image data, which is temporarily stored in a VRAM 104 which is an image memory. The image data in the VRAM 104 is analog converted in a D/A converter 105 to be provided as video signal from the video output terminal 107.

When recording image data, the image data is read out block by block from the VRAM 104 and compressed in a data compressing/decompressing circuit 109 on the basis of the JPEG (joint photographic expert group) system of the like. The compressed image data is fed via a bus 112 to a card I/F 111, and it is written in a designated area of the memory card 117.

At the time of the play-back, the frame number, etc. is designated by operating an UP and a DOWN switch 114c and 114d to be described later. The frame or file number or the like is displayed on a LCD display 113. According to the designation, the pertinent memory area of the memory card 117 is selected, and corresponding image data is fed through the card I/F 111 and bus 112 to the data compressing/decompressing circuit 109. The image data is thus decompressed and then stored in the VRAM 104. The stored image data is then read out from the VRAM 104 and converted in a D/A converter 105 into an analog signal which is input to a video encoder 106. The signal is thus encoded in the video encoder 106 to be output to the video output terminal 107 as video signal. The DSC 120 further has a RS-232C I/F 115 as an I/F for communication with external units. It further has a connector 116, which is a mini DIN connector capable of connection to PCs and modems. The RS-232C I/F 115 provides an I/F function of the status recognized by the interface recognition means provided in the system controller 110.

FIG. 36(A) shows input and output voltage levels in the RS-232C I/F 115. The output voltage range of +15 to −15 V shown in FIG. 36(A) is taken in after conversion to a range of 0 to 5 V by a built-in voltage level converter IC.

FIG. 36(B) shows pin numbers, JIS standard signal names, etc. of the RS-232C I/F 115. In FIG. 36(B), DTE means "data terminal equipment". That is, it means a terminal, in the instance case a camera. DCE means "data communication equipment" and refers to a modem or a camera.

FIG. 36(C) shows pin numbers of signal line of the RS-232C I/F 115 when used in communication with a PC. As shown, for communication with the PC, the I/F is constructed with three signal lines. If necessary, a control line is added. For example, ER or RS (refer to FIG. 36(B)) is used as a BUSY signal.

FIG. 36(D) shows pin numbers, signal names, etc. of the RS-232C I/F 115 when used for communication with a modem. As shown, the I/F is constructed. with a greater number of lines than the communication lines with the PC noted above. If necessary, a control line is added. For example, FG or CI (refer to FIG. 36(B)) is added.

Figure 37:
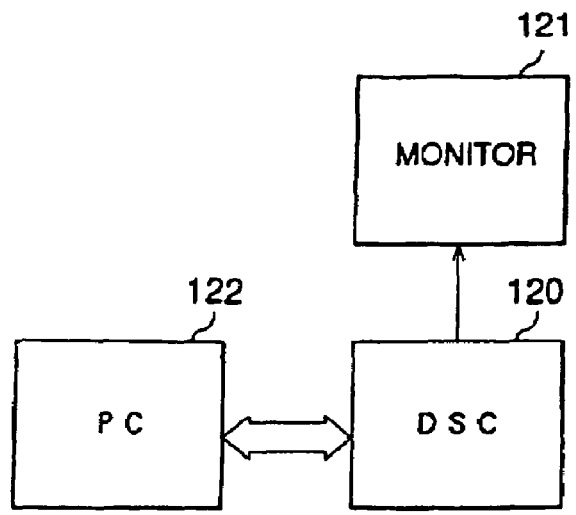
FIG. 37 shows a block diagram of a system formed by connecting a PC 122 as an external unit to the connector 116 of the DSC 120.

FIG. 37 is a block diagram showing a system, which is formed by connecting a PC 122 as an external unit to the connector 116 of the DSC 120. A monitor 121 is for displaying played-back pictures of the DSC 120 or file management information, etc. In many cases where the PC 122 is connected in this way, usually communication control. such as file management control of the DSC 120 or image pick-up control is made by the PC 122.

Figure 38:
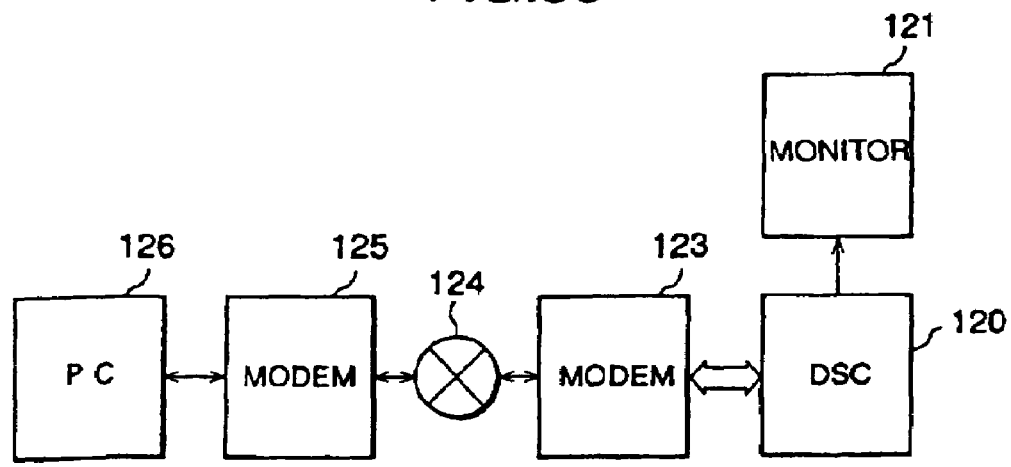
FIG. 38 shows a block diagram of the system formed by connecting a modem 123 to the DSC 120.

FIG. 38 shows an example of the system, in which a modem 123 is connected as an external unit to the connector 116 of the DSC 120. The monitor 121 is again a monitor for a play-back screen or the like. The modem 123 is connected for communication to the PC 126 via a telephone line 124 and further a modem 125. In many cases where the modem 123 is connected in this way, usually picked-up image data is transferred from the DSC 120 to the PC 126 via the modems 123 and 125 and telephone line 124.

Figure 39:
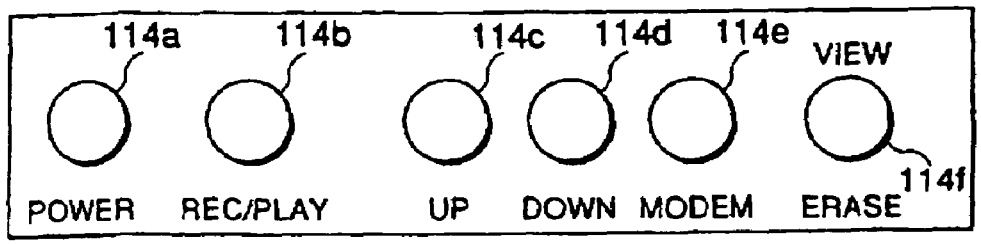
FIG. 39 is an enlarged-scale view showing the operation switches 114a to 114f in FIG. 36.

FIG. 39 is an enlarged-scale view showing the operation switches 114a to 114f noted above. Among these switches, the switch 114a is a POWER switch of a camera power source. The switch 114b is REC/PLAY switch for instructing play-back. The switch 114c is an UP switch for increasing play-back/erase frame designation frame number by one frame. Switch 114d is a DOWN switch for reducing the play-back/erase designation frame number by one frame. The switch 114e is a MODEM switch for modem switching to give an instruction to cause functioning of the I/F such as to meet the connected modem. The switch 114f is an ERASE switch for instructing the erasing of a recorded image file. The ERASE switch also serves as a VIEW switch for causing play-back right after image pick-up by one-touch operation.

Figure 40:
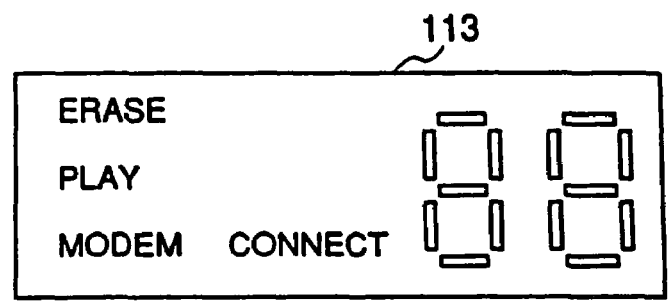
FIG. 40 is a view showing the display 113 in FIG. 36.

FIG. 40 is a view showing the display 113 in detail. The display 113 has a display segment "ERASE", which is turned on when erasing recorded image data, a segment "PLAY" which is turned when playing-back picked-up image data, a segment "MODEM" which is turned on when a modem is selected as an external unit, a segment "CONNECT" which is turned on when the connected modem becomes ready for communication, and a seven-segment display section for displaying the frame number, file process state, etc.

Figure 41A:
FIGS. 41(A)-41(C) show examples of displays on the display 113 in FIG. 36.
Figure 41B:
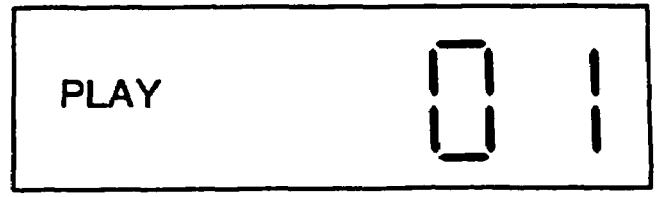
Figure 41C:

FIGS. 41(A)-41(C) each show an example of the display on the display 113. Shown in FIG. 41(A) is a frame number display state when a play-back frame number is designated by switches 114c and 114d. Shown in FIG. 41(B) is a state of display of "PLAY" and frame number during play-back after designation of frame No. 1. Shown in FIG. 41(C) is a "MODEM" display when modem designation is done by connecting a modem as an external unit to the connector 116 via a cable. In the state of the DSC 120 with the POWER switch 114a turned on, the external I/F is set by a command from the PC to be ready for data reception by an interruption from the system controller 110. Thus, for bringing about a state ready for communication with a modem, the MODEM switch 114e is turned on.

FIGS. 42(A)-42(C) each show an example of display on the display 113 when the modem 123 is connected and designated. The procedure of data transmission using the modem 123 of the DSC 120 will now be described with reference to FIGS. 42(A)-42(C). When the modem 123 is selected and connected to be ready for data communication as shown in FIG. 42(A), the segment "CONNECT" is flickered. In this state, the communication is started. First, the telephone number of the partner side, which is stored in the system controller 110, is called by making use of an AT command which is usually provided in the modem. Then, a carrier is transmitted by making the transmission request signal "RS" shown as in FIG. 36(D) active. The carrier is detected by the partner side with a carrier detection signal "CD" shown as shown in FIG. 36(D). For the confirmation of the partner side, a signal "CAMERA" is transmitted. When a confirmation signal "ACK" from the PC 126 on the partner side has been received, "CONNECT" on the display is turned on to indicate the completion of connection as shown in FIG. 42(B), and frame No. "01" of transfer image data, for instance, is displayed, as shown in FIG. 42(B).

When the connection has not been completed in a predetermined period of time, for instance one minute, "Er" indicative of an error is displayed as shown in FIG. 42(C). Then, the power source is once turned off, and then re-trial is made. Each of the above displays can also be displayed on the monitor 121.

When the connection has been completed, the frame number is selected by operating the UP and DOWN switches 114c and 114d, and image for transmission is displayed on the monitor 121. By depressing the trigger switch 119, the image data is transmitted. For the image data transmission, the file size is first transmitted, and then the image file is transmitted as binary data. When the reception side PC 126 receives data for the file size, it stores the received data as a file in a medium. The modem control is usually done by using an "AT" command as noted above. It may also be done by using the CCITT standards.

Now, each control operation in the DSC 120 will be described in greater detail by using flow charts.

FIG. 43 is a flow chart showing a "reception interruption process" sub-routine. When the power source of the DSC 120 is turned on, the RS-232C I/F 115 is set by the system controller 110 to be ready for communication with the PC. Then, the modem mode is set by operating the MODEM switch 114e. When signal transmitted through the telephone line 124 is received in this state, the system controller 110 executes an interruption process to take in the reception signal through the telephone line 124.

Referring to the flow chart of FIG. 43, a check is done in a step S201 as to whether the modem mode has been set up. If the PC mode prevails instead of the modem mode, the sub-routine goes to a step S202 for a process corresponding to command of the PC. If the modem mode prevails, the reception data is stored in a modem control buffer in the system controller 110. The process on this data is executed in a modem process sub-routine.

Figure 44:
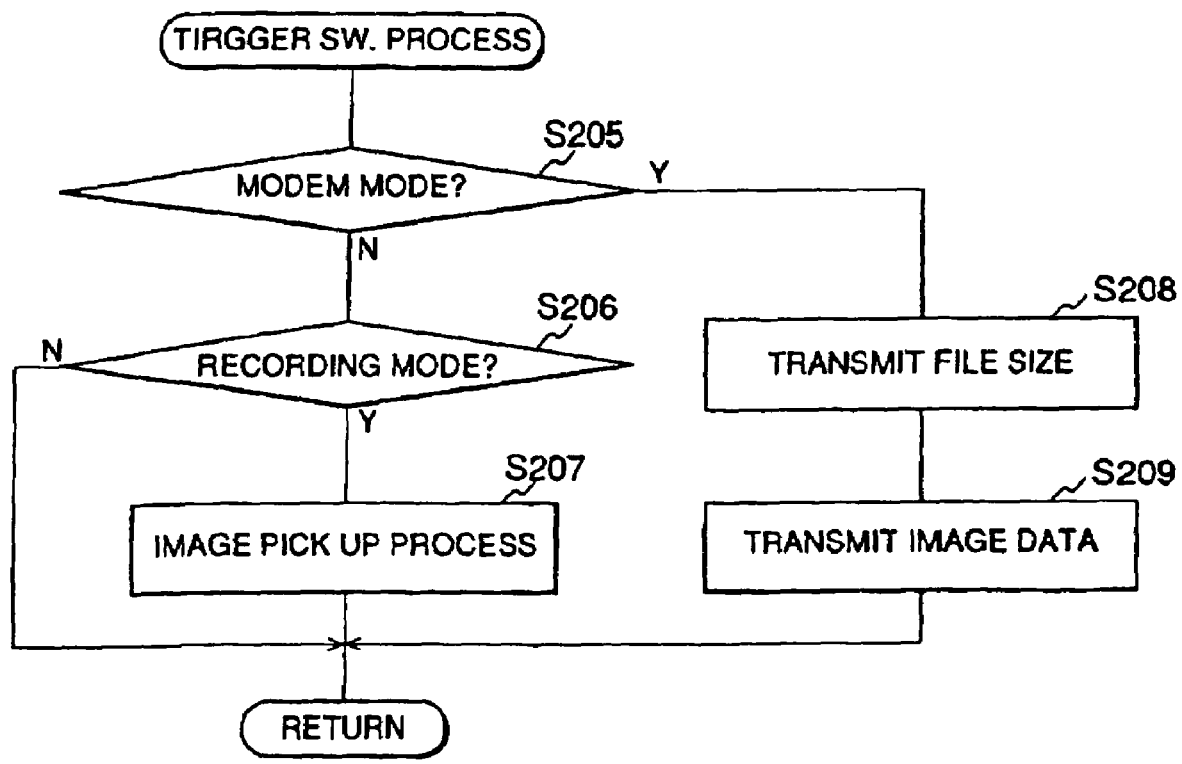
FIG. 44 shows a flow chart for a "trigger switch process" sub-routine when the trigger switch 119 is operated.

FIG. 44 is flow chart of a "trigger switch process" sub-routine when the trigger switch 119 is operated.

In this sub-routine, a check is done in a step S205 as to whether the modem mode prevails. If the modem mode does not prevail, a step S206, i.e., a check for a recording mode, is executed. If the recording mode does not prevail, an end is brought to this sub-routine. If the recording mode prevails, the sub-routine goes to a step S207 of image pick-up process. If it is determined in the check of the step S205 that the modem mode prevails, the file size of image data is transmitted in a step S208, and image data is transmitted in a step S209, thus bringing an end to this sub-routine.

Figure 45:
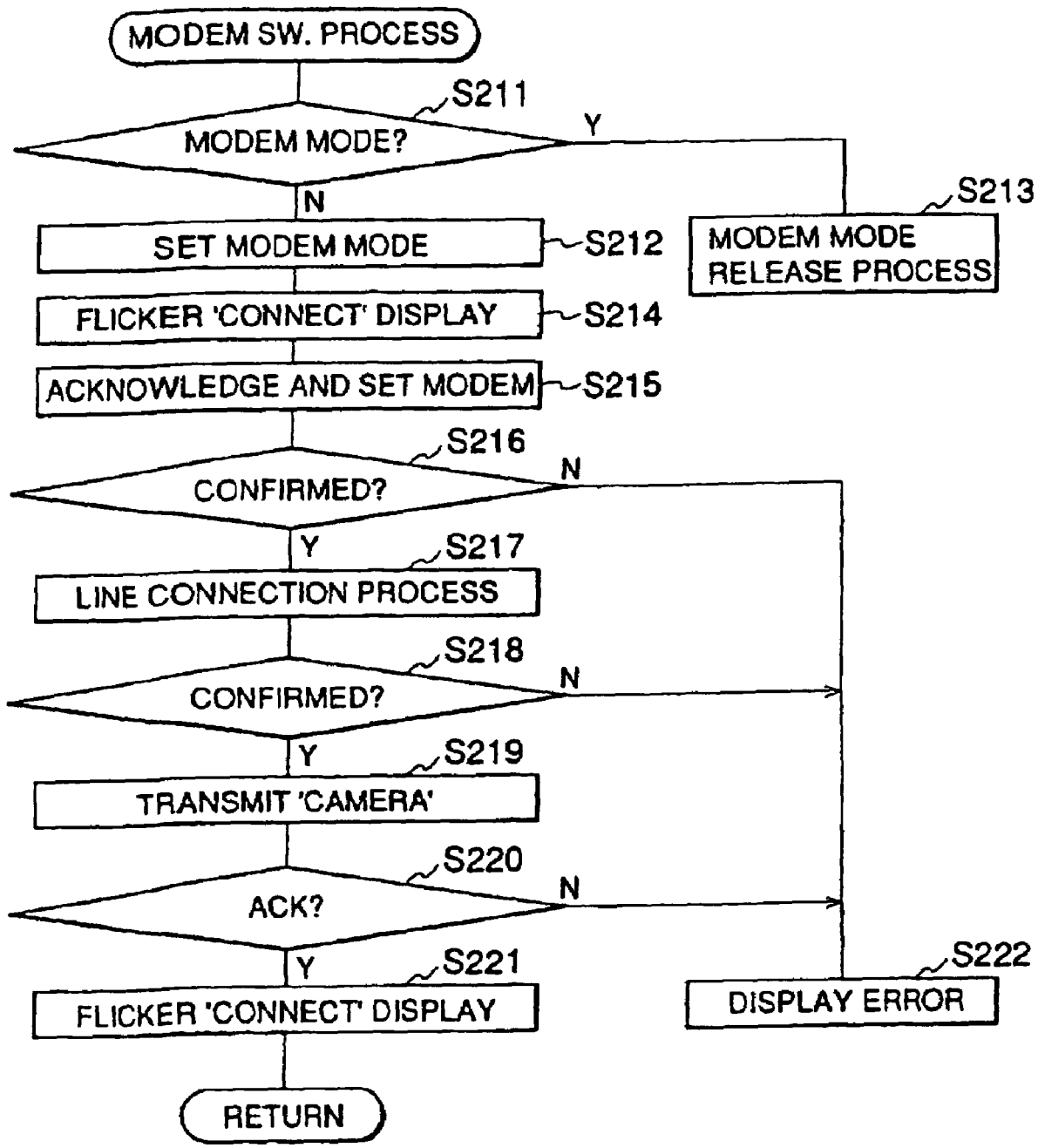
FIG. 45 shows a flow chart for a "modem switch process" sub-routine which is called when the modem switch 114e is operated.

FIG. 45 is a flow chart of a "modem switch process" sub-routine which is called when the modem switch 114e is operated.

In a step S211, a check is done as to whether the modem mode prevails. If the modem mode prevails, the sub-routine goes to a step S213 to call a "modem mode release process" sub-routine to be described later. If the modem mode does not prevail, the sub-routine goes to a step S212 to set the modem mode so as to be ready for modem communication. The mode setting is done by setting a flag of "1" indicative of the modem mode. Then in a step S214 flicker of the "CONNECT" display on the display 113 is caused. In steps S215 and S216, the modem recognition and setting are done. In this process, a signal "ER" in FIG. 36(D) is output from the side of the DSC 120, and when it is confirmed that an active signal of signal "DR" has been returned from the modem side, a step S217 is executed. If not, a step S222 is executed for error display, thus bringing an end to the sub-routine.

In the step S217, a line connection process according to the AT command is executed. In this process, a signal "RS" is output to the modem 123 to cause the modem 123 to output a carrier. When it is confirmed in a step S218 that the line connection has been completed with detection of a signal "CS" shown in FIG. 36(D) and also with detection of a signal "CD" as a carrier detection signal from the modem, a step S219 is executed. If the completion of the connection is not confirmed, the step S222 of error display is executed, thus bringing an end to the sub-routine.

In steps S219 and S220, a signal "CAMERA" is transmitted to acknowledge the partner side, and a check is done as to whether an acknowledgment signal "ACK" from the partner side can be received. When the signal "ACK" could be received, "CONNECT" on the display 113 is turned on, thus bringing an end to the sub-routine. If the acknowledgment signal "ACK" from the partner side has not been received in a predetermined period of time, the sub-routine goes to the step S222 for error display.

Figure 46:
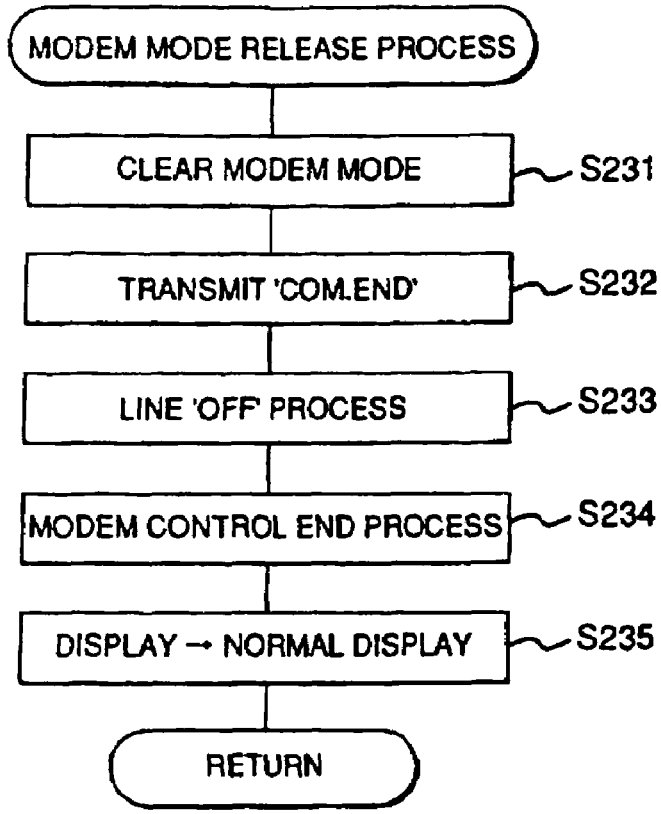
FIG. 46 shows a flow chart for a "modem mode release process" sub-routine in FIG. 45.

FIG. 46 is a flow chart of a "modem mode release process" sub-routine which is called in the step S213. In this sub-routine, the modem mode is cleared (step S231), and a signal "COM-END" is transmitted to the partner side (step S232). In response to the signal "COM-END", the partner side stops the transmission of a carrier signal for signal transmission. If the stopping of the carrier transmission fails to be detected in the step S233, an "AT" command is transmitted for turning off the line. Then in a step S234 a signal "ER" that has been transmitted to the modem is turned off, thus bringing an end to the modem control. Further, in a step S235 the display 113 is set to the normal display state in recording or play-back, thus bringing an end to the routine.

In DSC 120 as has been described, the system controller 110 recognizes the kind of the unit, such as modem or PC, that is connected to the connector 116 which is the sole connector connected to an external I/F, thus providing an interface function that is matched to the status of the unit for communication of information. It is thus possible to provide an apparatus, which permits communication of information with a plurality of different external units, has high functional versatility and has a body of a reduced size.

Figure 47:
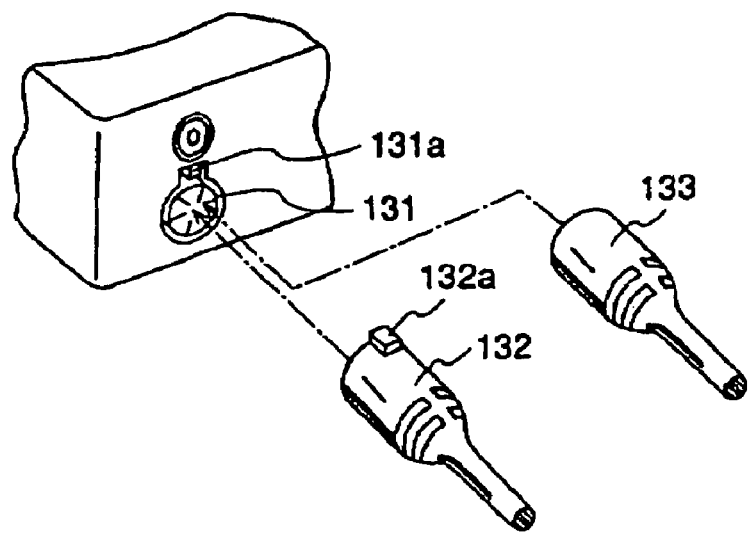
FIG. 47 shows a modification of the connection of the DSC in FIG. 35.

The DSC 120 in this embodiment has the connector 116 as a connector with external units, and the switching of communication with the PC and also the modem is done by operating the modem switch 114e. FIG. 47 shows a modification of the embodiment, in which a switch operation section 131a for operating the mode switch is provided above the top of the reception side connector 131. A modem as an external unit applied to this modification, has a connector 132 having a projection 132a for depressing the switch operation section 131a, while the connector 133 of a PC which is a second external unit, has no projection for depressing the switch operation section 131a.

When the connector 132 for the modem is connected, the modem mode is set automatically with turning-on of the mode switch operation section 131a. When the PC is connected to the connector 132, the PC mode is set up with the turning-off of the mode switch. In this modification, the mode switching is possible without manual switching operation.

In a further modification, a PC/modem mode designation signal line is provided as a signal line between the external unit and connector. In this case, when either unit is connected, it is possible to select the mode of the communication unit through detection of the voltage level on the designation signal line.

Figure 48:
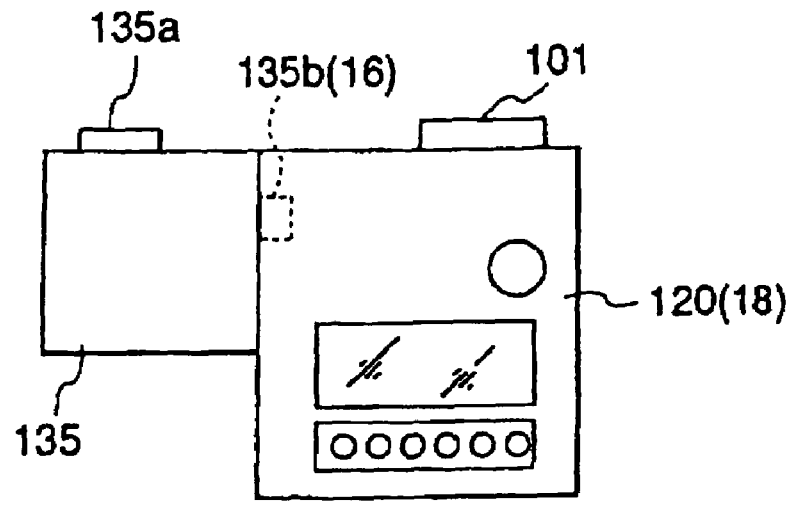
FIG. 48 shows a view when the remote control unit 135 is connected to the DSC 120.

In the above embodiment, the normal state after the power source has been turned on is the PC communication mode, remote control operation through the PC communication status I/F is possible by connecting a remote control unit or the like to the connector 165 shown in FIG. 35 in this state. FIG. 48 shows that a connector 135b of remote control unit 135 is inserted in the connector 116 of the DSC 120. In this state, remote control is possible.

The DSC 120 in this embodiment, as noted above, includes means for changing part of file data such as comments concerning image, means for changing the management area of the file, means for reproducing recorded picture by one-touch operation of a switch which is usually used for a different purpose, for instance the ERASE switch 114f for file erasing, and means for selecting the process of memory check and formatting in the operation of entirely erasing the memory card and the process of the sole file erasing. The operations of these means will now be described successively.

Figure 49:
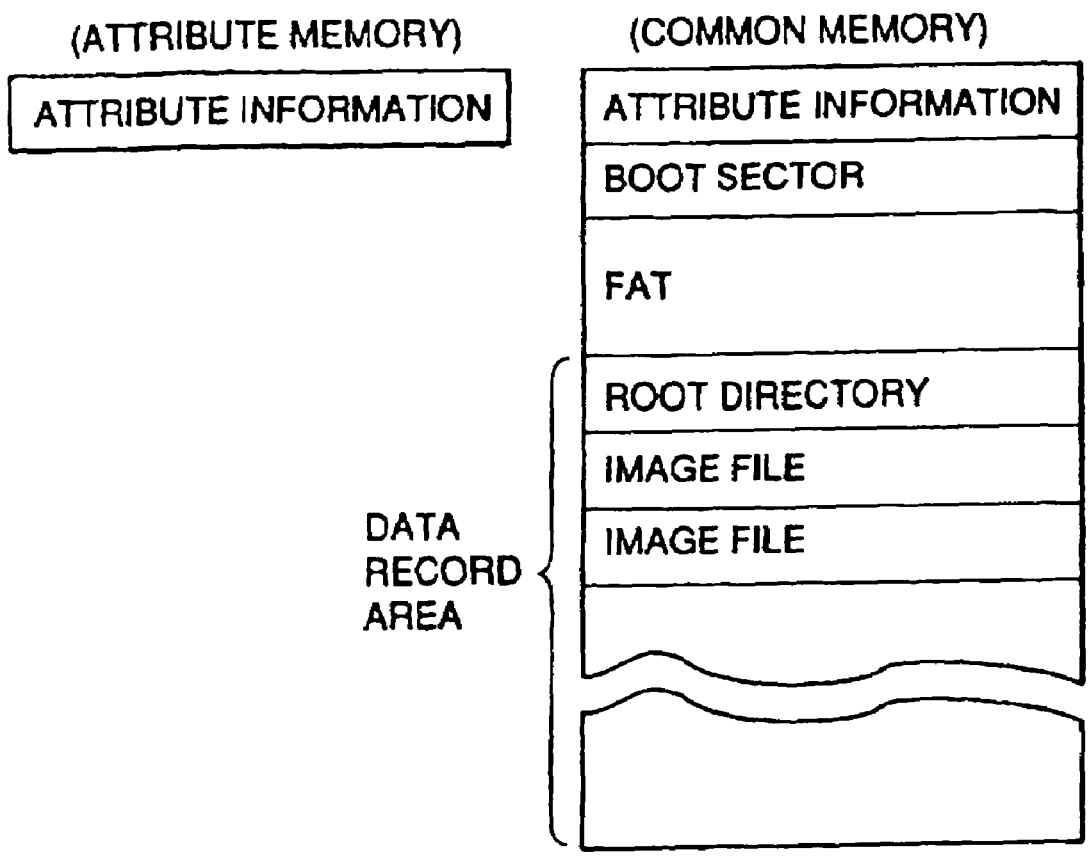
FIG. 49 is a view showing the configuration of data in the memory card 117.

FIG. 49 is a view showing the configuration of data in the memory card 117 as recording medium. As shown, the data area comprises an attribute memory, in which attribute information providing versatility information of the basic card as proposed by JEIDA (Japan Electronic Industries Development Association) is recorded, and a common memory, in which image information is recorded.

The leading of the common memory is an attribute information area, in which versatility information of the card is recorded. Next is a boot sector area, management area information of FAT (file allocation table) and a rood directory (of a hierarchical structure) are recorded because the OS (operating system) of the IJF of the DSC 120 uses DOS. In the FAT area noted above, data recording area information is recorded in a chain type. In the root directly area, information about the way of recording data in a data recording area to be described later is recorded.

Figure 50:
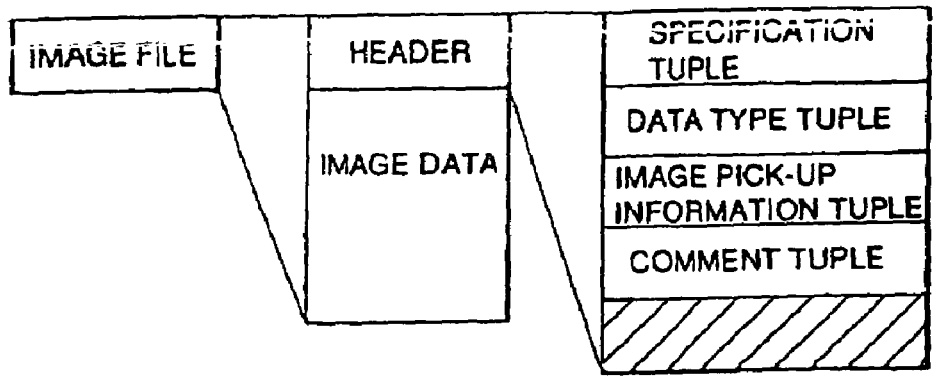
FIG. 50 shows an image file comprising a header and image data.

The following data recording area is constituted by image files. In each image file, data about one frame of image is written. As shown in FIG. 50, the image file comprises a header and image data. In the header are recorded a specification tuple, a data type tuple, an image pick-up information tuple, a comment tuple, etc. The specification tuple provides a specification version, the kind of file, i.e., video, sound and control. The data type tuple provides the type of the file body, i.e., JPEG, non-compression, PICT and other image data holding types. The comment tuple is a recording of a photographing explanation or the like. The DSC 120 in this embodiment features that it is possible to re-write the comment tuple.

In the image file recording area are recorded, in addition to image data files, sound files, in which sound information corresponding to image of the image data is recorded, and control files, in which information about the correspondence relation between the image files and sound files is stored. Again in the control file, all data are recorded in the tuple form. In the image file recording area, sub-directory entries are also stored.

Figure 51:
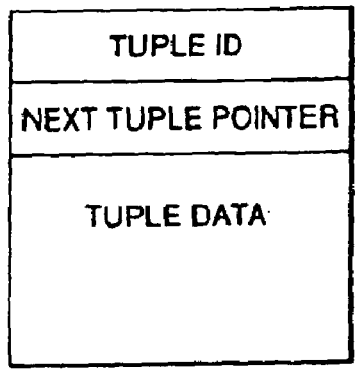
FIG. 51 is a view showing the data configuration of the tuple.

FIG. 51 is a view showing the data configuration of the tuple form noted above. The tuple comprises tuple ID representing prescription data, next tuple pointer and tuple data.

Figure 52:
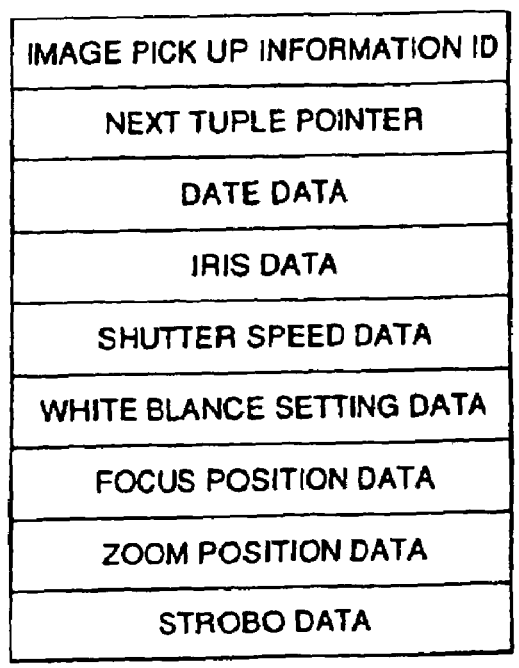
FIG. 52 shows an image pick-up information tuple in the memory card.

FIG. 52 shows the image pick-up information tuple. As shown, this tuple comprises image pick-up information ID, next tuple pointer, date data, iris data, shutter speed data, white balance setting data, focus position data, zoom-position data, and strobe data.

Figure 53:
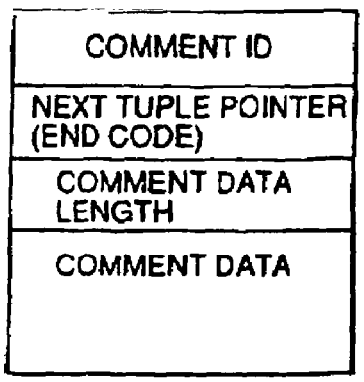
FIG. 53 shows a comment tuple in the memory card.

FIG. 53 shows the comment tuple. This tuple comprises comment ID, next tuple pointer (end code), comment data length and comment data. At the time of the image pick-up, an area of a predetermined size is secured for the comment tuple.

Figure 54:
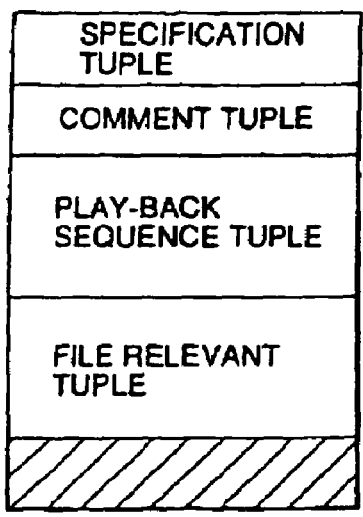
FIG. 54 shows a control file in the memory card.

FIG. 54 shows the control file. As shown, this file comprises a specification tuple, a comment tuple of the directory, in which the file is stored, a play-back sequence tuple as play-back sequence information, and tuple relevant file providing information relevant to image file and corresponding sound file. The control file is stored in the same directory area as the image file, but it can also be stored in a sub-directory.

The DSC 120 performs control operations by receiving various commands from an external unit such as a PC. The commands received from the PC or the like and the functions of these commands are shown in FIG. 55(A). The commands are transmitted to the DSC 120 by a transmission signal based on hexadecimal numerical data.

Now, such operations of the DSC 120 as referring to comment data, writing data, writing additional data, etc. will be described. For the description of the operations, it is assumed that the PC 122 is connected to the DSC 120 as shown in FIG. 37, for the writing of comments stored in the header of image files in the memory card 117 and also writing of additional comment according to instructions from the PC side.

Figure 55:
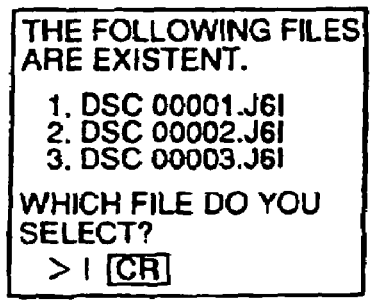
FIG. 55 shows a display on the monitor.

First, the PC 122 takes out image file directory information from the memory card 117, and file names are displayed on the PC 122, as shown in FIG. 55. A file for writing command is selected from the illustrated file numbers. When file No. 1 is designated, image pick-up data in the pertinent file DSC00001.J61 and current comment are displayed, as shown in FIG. 56. At this time, on the side of the DSC 120, the image pick-up data and current comment are displayed on the monitor 121 (FIG. 37). Usually, when a memory card without any comment area is used, an enquiry as to whether the area is to be produced is provided.

FIG. 57 shows a state that new comment data is written in superimposition to the comment data in the header.

When a "write comment" command shown in FIG. 55(A) is transmitted and a comment is input, new comment data is written regularly in the comment area in the header. If the input comment data capacity is greater than the comment area that has been secured in advance, a warning is provided. The area is decompressed when it is to be done so.

When picking up image under remote control from the PC 122, it is possible to set image pick-up data from the side of the PC 122 and instruction of an image pick-up timing and the writing of a comment right after the image pick-up from the side of the PC 122.

Figure 58:
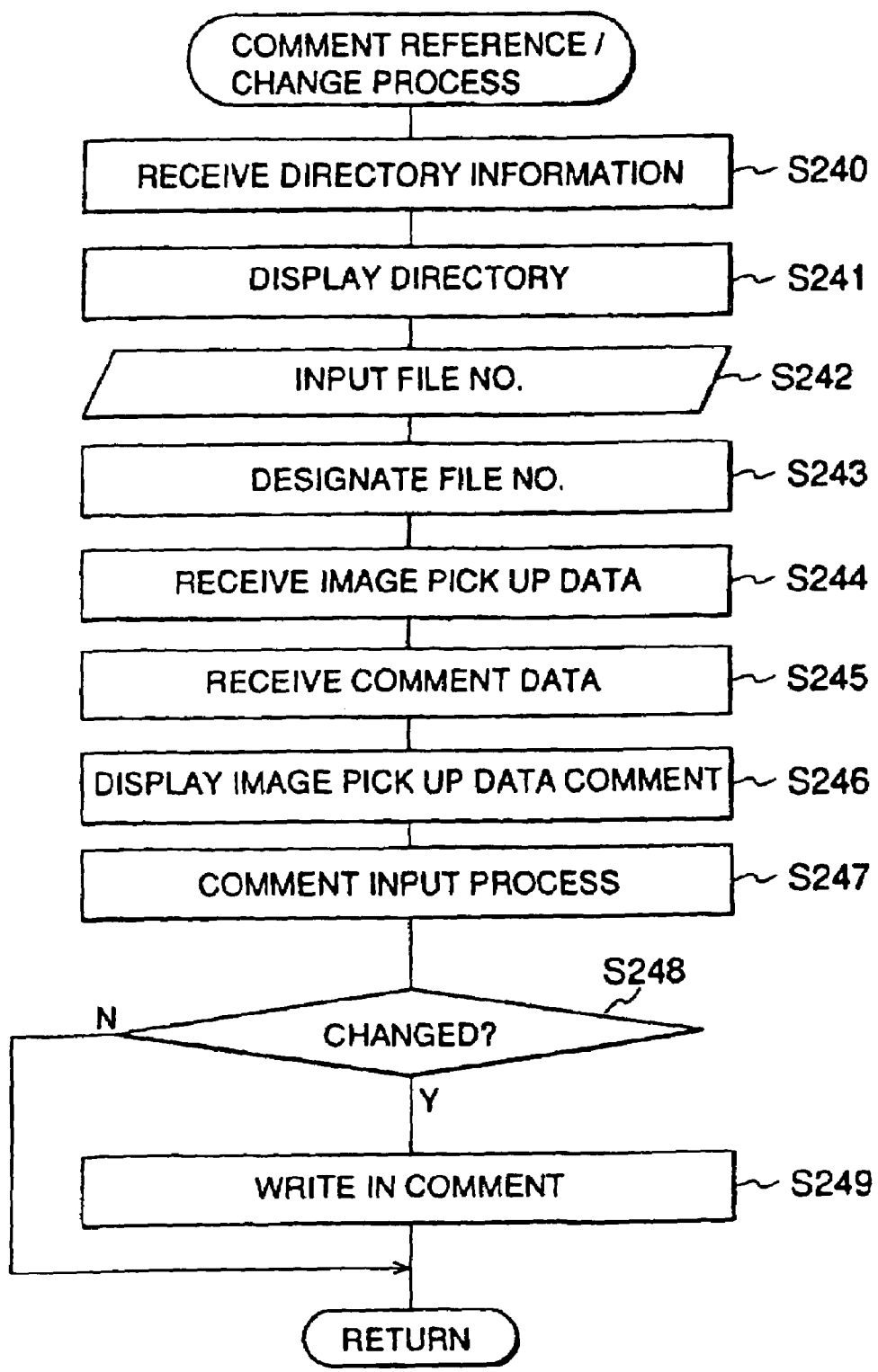
FIG. 58 shows a flow chart for a "comment reference/ change process" sub-routine.

The operation of referring to and changing comment as noted above, will be described with reference to the flow chart of a "comment reference/change process" sub-routine shown in FIG. 58.

In steps S240 and S241, the PC 122 receives and displays image file directory information from the memory card 117. Then, a file number for changing comment is input (step S242). The display at this moment is shown in FIG. 55.

In a step S243, a file corresponding to the input file number is designated. Then, image pick-up data and comment data of the designated file are received (steps S244 and S245) and displayed (step S246). The display at this moment is shown in FIG. 56. In a step S247, addition/change comment data is input. Then, a check for any comment change is done (step S248). If there is no comment change, the sub-routine is ended. If there is a comment change, the comment is written (step S249), thus bringing an end to the sub-routine.

Figure 59:
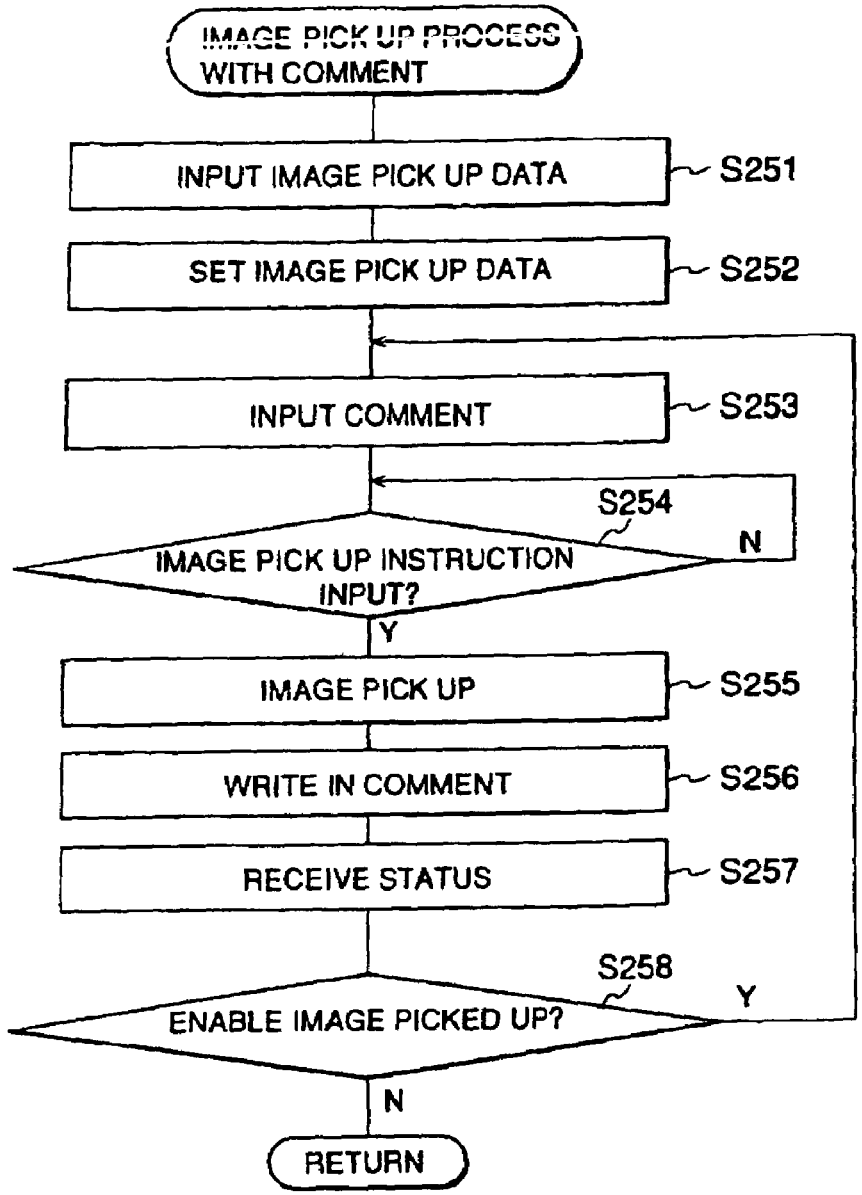
FIG. 59 shows a flow chart for an "image pick-up with comment" sub-routine operation.

Now, the operation of image pick-up with comment, will be described with reference to the flow chart of an "image pick-up with comment" sub-routine shown in FIG. 59. When this image pick-up operation is performed under remote control from the PC 122, comment designation is done after image pick-up data designation, and then an image pick-up instruction is given from the PC 122. Then, immediately afterwards the comment is written.

Specifically, image pick-up data is input and set (steps S251 and S252). Then, a comment is input (step S253), and a check as to whether there is an image pick-up instruction input is done (step S254). If there is an image pick-up instruction, an image pick-up step S255 is executed. Then, a comment on an immediately previously picked-up picture is written (step S256), then a status signal from the DSC 120 is read out (step S257), and then a check as to whether the DSC 120 is ready for image pick-up is done (step S258). If it is ready, the sub-routine returns to the step S253. If not, the sub-routine is ended.

Now, some command process operations in the communication between the PC and DSC as shown in FIG. 55(A) will be described in detail.

Figure 60:
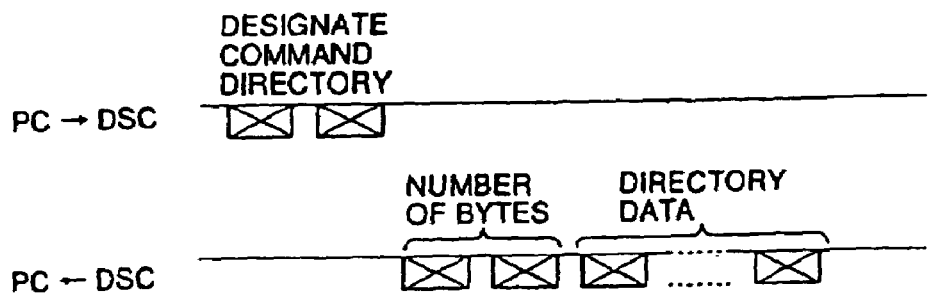
FIG. 60 is a time chart for transmission of directory transmission command and directory data between the PC 122 and DSC 120.

First, a directory transmission command process will be described. FIG. 60 is a time chart of transmission of directory transmission command and directory data between the PC 122 and DSC 120. A command signal and a directory designation signal, each being a one byte signal, are transmitted from the PC 122 to the DSC 120 in conformity to the RS-232C standards. The directory designation signal represents a root directory when it is "0" and represents a sub-directory in a directory entry at the designated position when it is other than "0". When the DSC 120 receives the signal, it transmits the number of bytes data of maximum number K byte directory data and directory data to the PC 122 by an interruption process.

FIG. 61 shows the configuration of the root directory. Entries 0, 1, . . . that constitute the root directory correspond to image files in the data areas of the respective frame numbers. When a sub-directory is produced, however, the corresponding entry comes to a directory entry for the sub-directory. The sub-directory data is stored in the data area. Sub-directory entry "0" is given a file name "." to store its own position information. Entry "1" is given a file name ".." to store high-order directory position information. Entry "2" and following entries are for storing directory data.

FIG. 62 shows the format of a 32-byte directory entry. FIG. 62(A) shows attribute values and attribute contents.

Now, comment transmission will be described. FIG. 63 is a time chart for transmission of comment transmission command and comment data between the PC 122 and DSC 120. The PC transmits command signal which is 1 byte signal to the DSC in conforming to RS-232 standard. Receiving the signal, the DSC transmits the number of bytes data of comment data and comment data to the PC by an interruption process. These processes are executed after a file designation command.

Figure 64:
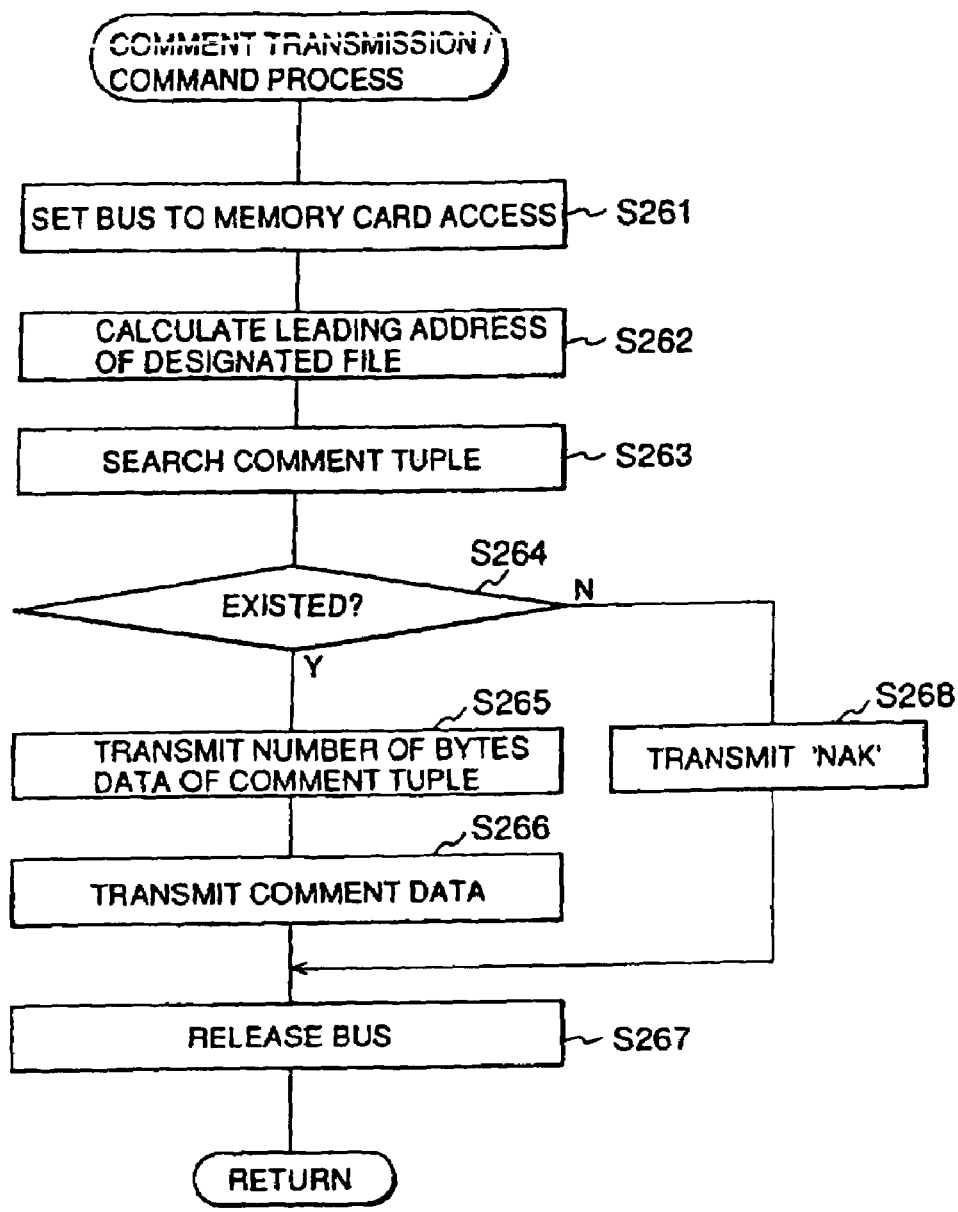
FIG. 64 is a flow chart for the "comment transmission command process" sub-routine in the comment transmission operation.

FIG. 64 is a flow chart of the "comment transmission command process" sub-routine in the comment transmission operation noted above. In a step S261, the bus 112 is set to a memory card access mode. The leading address of the file designated in a step S262 is calculated from the directory start cluster. Then, a comment tuple search is done (Step S263), and a check as to whether there is the comment tuple is done (step S264). If the memory card is not provided with any comment tuple because of its recording specifications, a step S268 is executed, in which a signal "NAK" is transmitted to notify the provision of no comment tuple to the side of the PC 122. Then, a step S267 is executed. Afterwards, a comment tuple is produced to be ready for writing a comment, and then the comment transmission command process is executed afresh.

If a comment tuple is detected, a step S265 is executed, in which the number of bytes data of comment tuple is transmitted. Then, comment data is sent (step S266). Then, in a step S267 the bus 112 is released to bring an end to the sub-routine.

Figure 65:
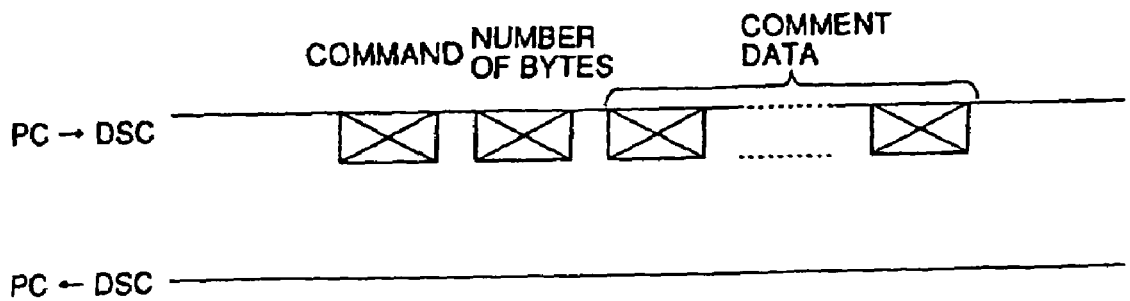
FIG. 65 is a time chart for transmitting comment write command and write command data between the PC 122 and DSC 120.

Now, a comment write operation will be described. FIG. 65 is a time chart for transmitting comment write command and write command data between the PC 122 and DSC 120. Specifically, a command signal, the number of bytes data signal and a write signal are transmitted from the PC 122 to the DSC 120 in conformity to the RS-232C standards. Upon receipt of the signals, the DSC 120 writes the comment data by an interruption process. At this time, no data is transmitted from the DSC 120 to the PC 122.

Figure 66:
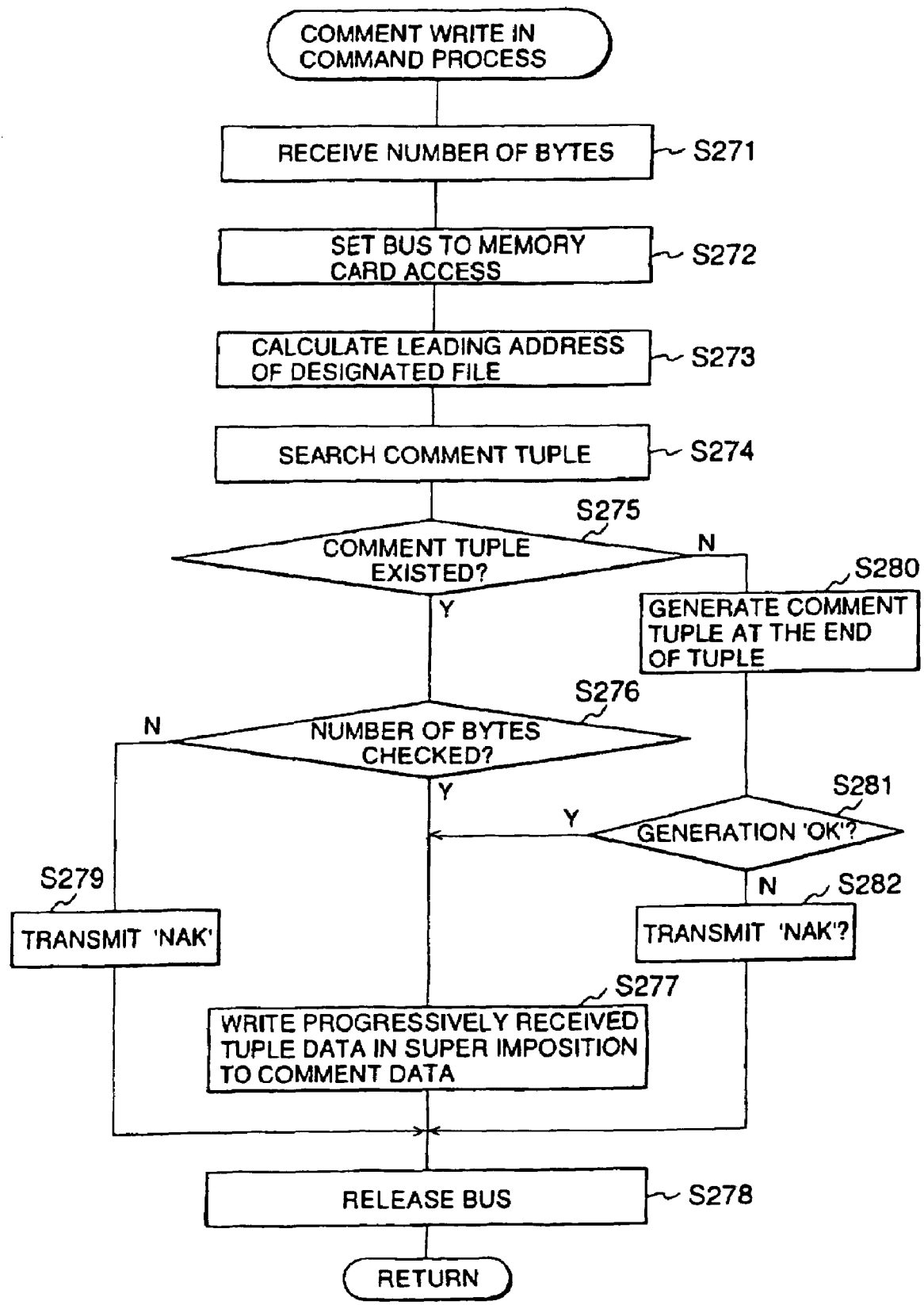
FIG. 66 is a flow chart for the "comment write command process" sub-routine in the command write operation.

FIG. 66 is a flow chart for the "comment write command process" sub-routine in the command write operation. In a step S271 the number of bytes data signal is received, and in a step S272 the bus 112 is set to a memory card access mode. The leading address of the designated file is calculated from the directory start cluster (step S273). Then, a comment tuple search is done (step S274), and a check as to whether there is the comment tuple is done (step S275). If the memory card is provided with no comment tuple, a step S280 is executed. If there is the comment tuple, a step S276 is executed.

In the step S276, a check is done as to whether the byte number of the currently prepared comment tuple is sufficient for writing. If the byte number is insufficient, a signal "NAK" indicative of the impossibility of writing is transmitted to the PC 122 (step S279), and then a step S278 is executed. If the byte number is sufficient, received tuple data is progressively written in superimposition to the comment data (step S277). Then, the bus 112 is released (step S278), thus bringing an end to the sub-routine.

In the step S280 noted above, a comment tuple is generated at the tuple end, and then the size of the generated tuple area is checked (step S281). If the generated tuple area size is sufficient to write the comment data, a step S277 is executed. If the size is insufficient, a signal "NAK" is transmitted to the side of the PC 122 (step S282), and a step S278 is executed. If the generated comment tuple area size is sufficient, the bus 112 is released (step S278), thus bringing an end to the sub-routine.

Now, an operation in the DSC 120 will be described, in which a hierarchical data structure management area is changed from an external unit via an external I/F, that is, a management area directory is changed by an operation on the side of the PC 122 connected to the DSC 120.

FIG. 67 shows a menu display in the PC 122 in the changing operation. When producing a sub-directory, for instance, key No. 1 is selected. As a result, the display is changed to one as shown in FIG. 68. Then, a comment accompanying the sub-directory generation is input by operating keys in the PC 122, and "Y" is input by key operation. As a result, the sub-directory is generated.

Figure 70:
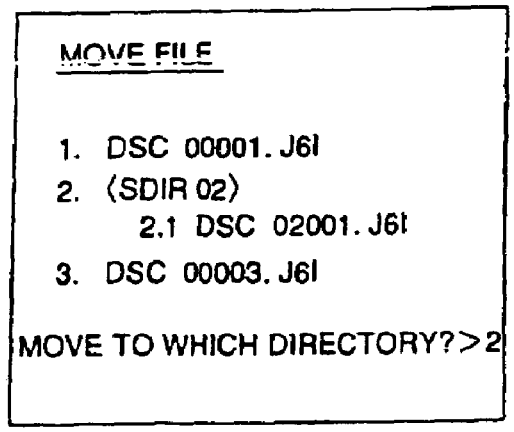
FIG. 70 shows a display for the destination of the file movement.

By selecting key No. 2 for file movement is selected in the menu display in FIG. 67, file and sub-directory names are displayed, as shown in FIG. 69, for selecting the file to be moved. At this moment, as shown in FIG. 69, in the memory card images files DSC00001.J6I and DSC00003.J6I are stored, and further a sub-directory (SDIR 02) is stored, in which a picture file DSC02001.J6I is stored. In this state, an instruction for moving the image file DSC00001.J6I is given by inputting "1" with a key operation. As a result, a state is brought about, in which an input representing the destination of the file movement is waited, as shown in FIG. 70.

Figure 71:
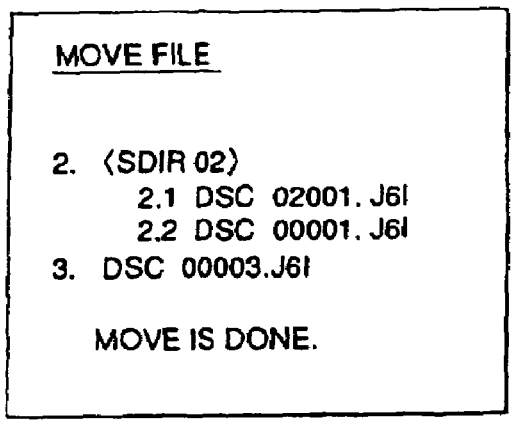
FIG. 71 shows a display for the file movement destination.

When "2" is input as the file movement destination with key operation, a display as shown in FIG. 71 is brought about, showing a state, in which the image file DSC00001.J6I has been moved to the sub-directory (SDIR 02). In case when the destination is a root directory, "R" is input as the key input.

Figure 72:
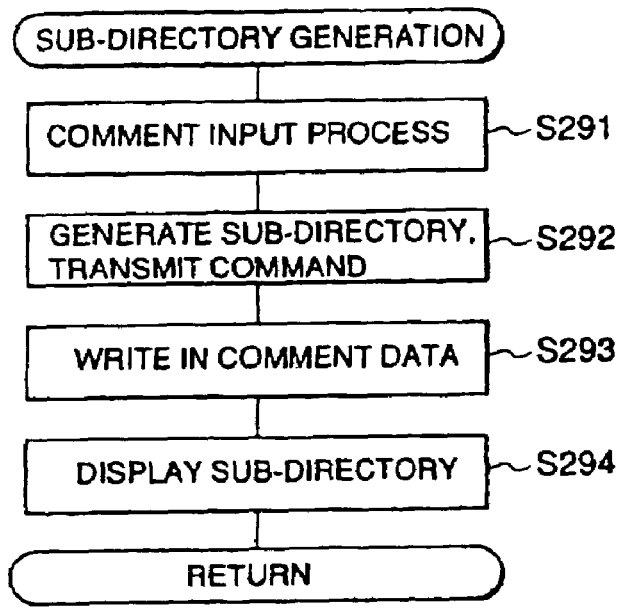
FIG. 72 shows an operation on the side of the PC 122 in the above sub-directory generation process.

Now, the operation on the side of the PC 122 in the above sub-directory generation process, will be described with reference to the "sub-directory" sub-routine flow chart shown in FIG. 72. First, a sub-directory comment input process is executed (step S291), and a sub-directory generation command is transmitted to the DSC 120 (step S292). Then, a comment is written (step S293), and the sub-directory is displayed (step S294), thus bringing an end to this sub-routine.

Figure 73:
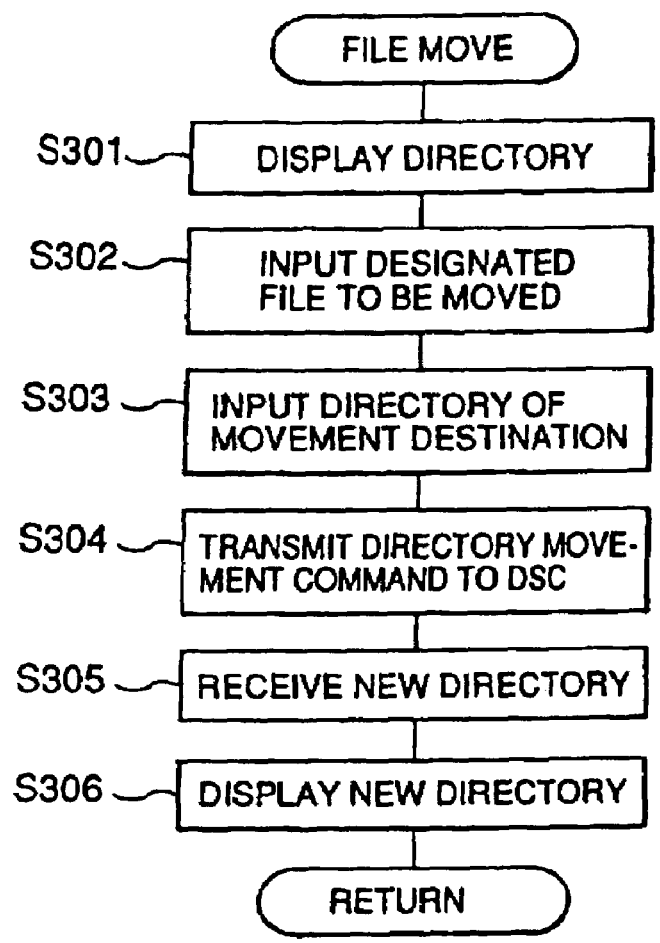
FIG. 73 shows a flow chart for "file movement" sub-routine.

An operation on the side of the PC 122 in the file movement process will now be described with reference to a "file movement" sub-routine flow chart shown in FIG. 73. First a directory display is made (step S301), and then the designated file to be moved is input (step S302). Then, the destination of the directory movement is input (step S303). Then, a directory movement command is transmitted to the DSC 120 (step S104). After the movement, the new directory is received (step S305 and displayed (step S306), thus bringing an end to the sub-routine.

Figure 74:
FIG. 74 is a time chart of communication signals between the PC 122 and DSC 120 when generating a sub-directory.

Now, a DSC side process for sub-directory generation will be described in detail. FIG. 74 is a time chart of communication signals between the PC 122 and DSC 120 when generating a sub-directory. A sub-directory generation command is transmitted from the PC 122 to the DSC 120. On the DSC side, the earliest empty directory is searched, and a sub-directory is generated therein.

Figure 75:
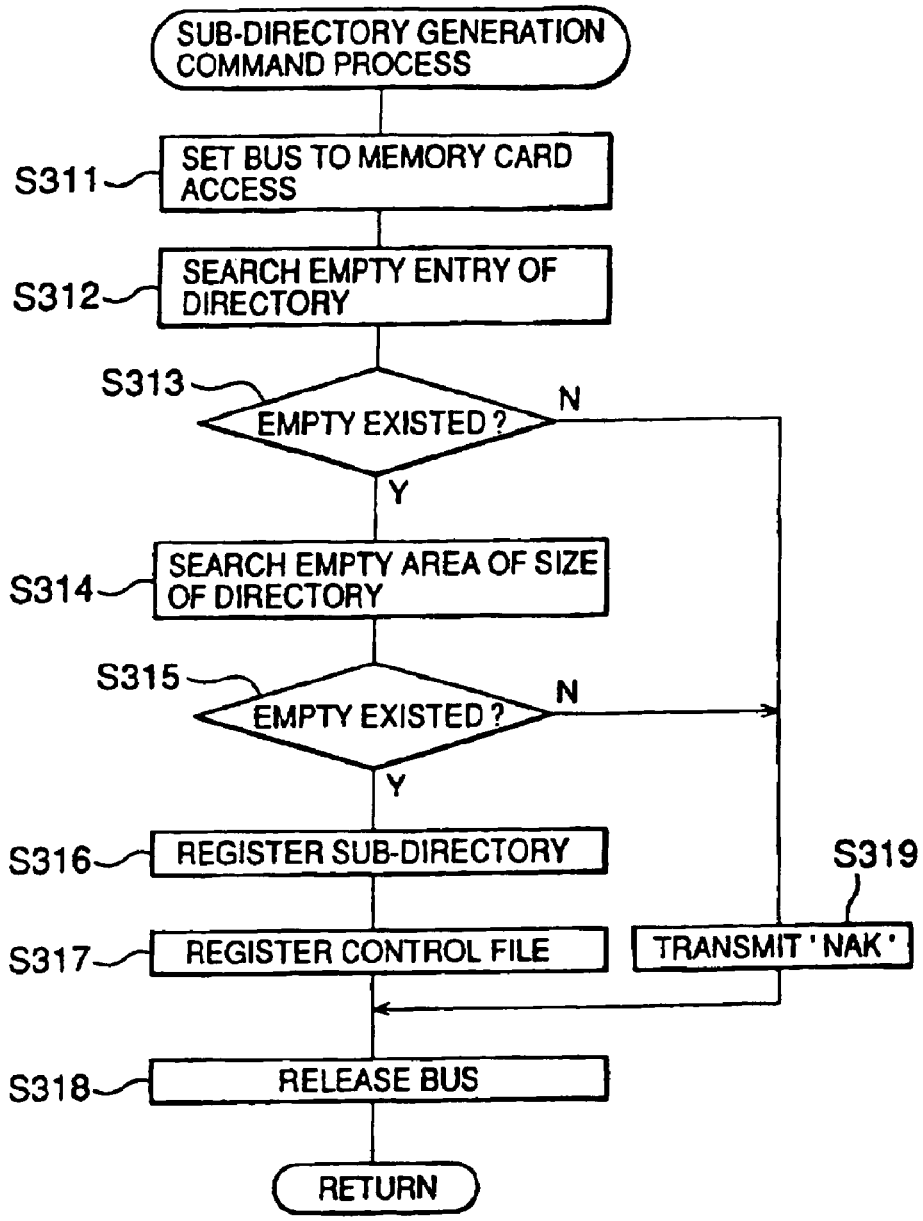
FIG. 75 is a flow chart for "sub-directory generation command process" sub-routine in FIG. 74.

FIG. 75 is a flow chart of the "sub-directory generation command process" sub-routine. In a step 311, the bus 112 is set to memory card access mode. Then, an empty entry of directory is searched (step S312). Then, a check is done as to whether there is any empty entry (step S313). If no empty entry is found, a signal "NAK" is transmitted to the PC 122 (step S319), and then a step S318 is executed. If there is an empty entry, an empty area of the directory size is searched (step S314). If there is no such empty area, a step S319 is executed. If there is an empty area, the sub-directory is registered (step S317). Then, a control file is registered in the sub-directory (step S317). Then the bus 112 is released (step S318), thus bringing an end to the sub-routine.

Figure 76:
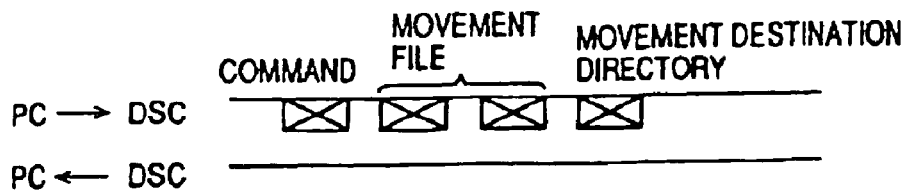
FIG. 76 is a time chart of communication signals between the PC 122 and DSC 120 in the file moving operation.

Now, a DSC side process in the file moving operation will be described in detail. FIG. 76 is a time chart of communication signals between the PC 122 and DSC 120 in the file moving operation. A file movement command is transmitted from the PC to the DSC, and movement file data and further movement destination directory data are transmitted. The movement file data is 2-byte data up to the sub-directory. The movement destination directory data is one-byte data because it represents the sole root directory. By taking in these data, the DSC 120 registers the file for movement in the destination directory.

Figure 77:
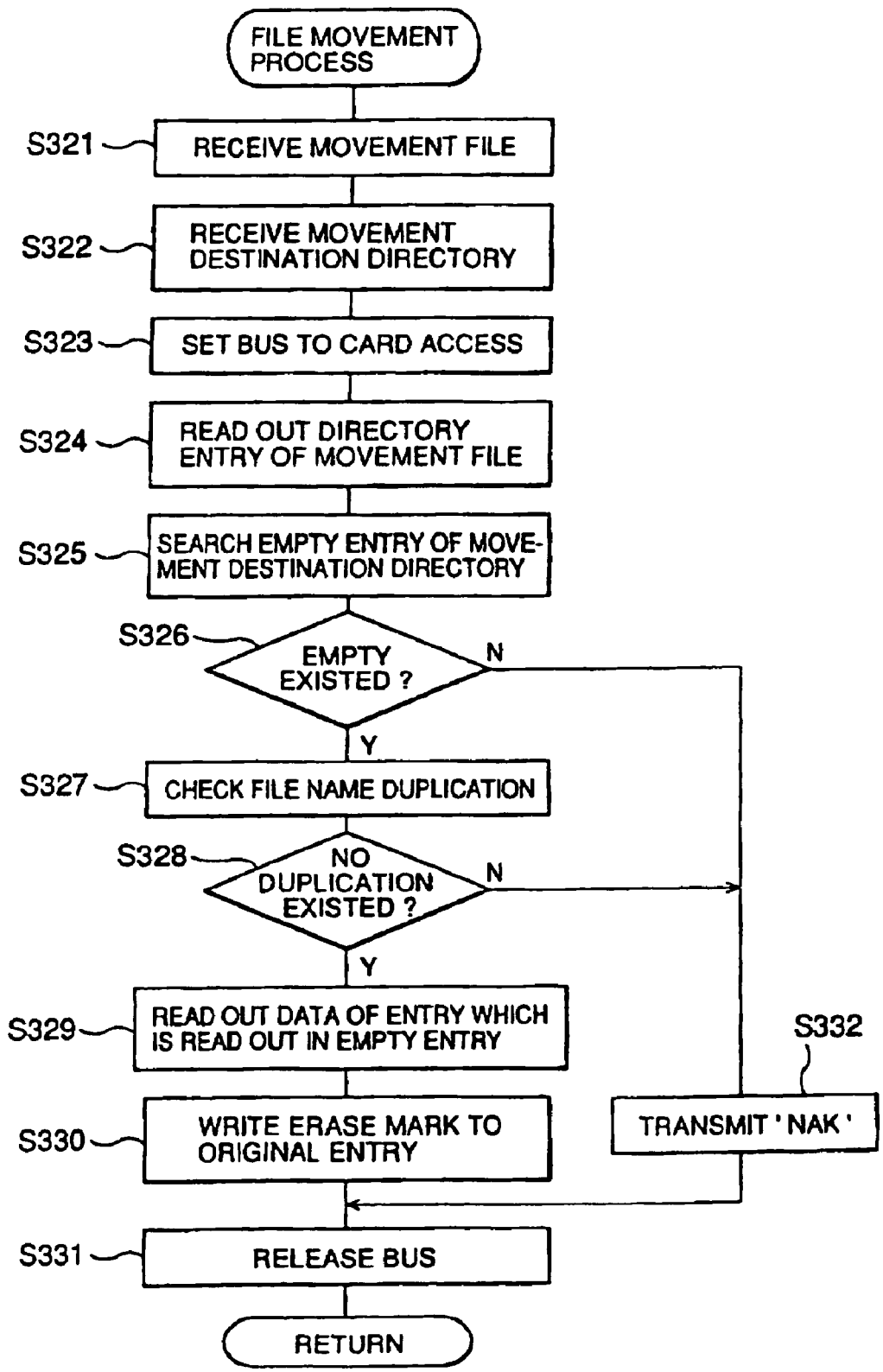
FIG. 77 is a flow chart for "file movement process" sub-routine in FIG. 76.

FIG. 77 is a flow chart of the "file movement process" sub-routine. In this sub-routine, the movement file data is received in a step S321, and the movement destination directory data is received in a step S322. Then, the bus 112 is set to card access (step S323). Then, the movement file directory entry is read out. (step S324). Then, an empty entry in the movement destination directory is searched (step S325), and a check is done as to whether there is any empty entry (step S326). If there is no empty entry, a signal "NAK" is transmitted to the PC 122 (step S332), and then a step S331 to be described later is executed.

If there is an empty entry, file name duplication is checked for (step S327). If duplication is confirmed in a step S328, a step S329 is executed. If no duplication is found, entry data which has been read out in the empty entry is read out (step S329). Then, an erase mark is written in the original entry (step S330), and the bus 112 is released (step S331), thus bringing an end to the sub-routine.

The DSC 120 is capable of such processes as file name change, file deletion, etc. as functions assembled in the camera in addition to the sub-directory generation and file movement.

Now, play-back of picked-up picture in the DSC 120 by one touch operation will be described. In the one-touch play-back operation, by depressing the ERASE switch 114f after image pick-up, the picture that is picked up immediately before is played-back.

In the prior art DSC with a view finder, an operation of writing data in a recording medium is made after storing picked-up picture in a field memory and confirming the picture with the view finder. However, these operations are cumbersome and inconvenient. The above process overcomes these inconveniences, and permits ready confirmation of the still picture that has been picked up. Besides, the number of switches that are mounted in the DSC 120 is reduced.

Figure 78:
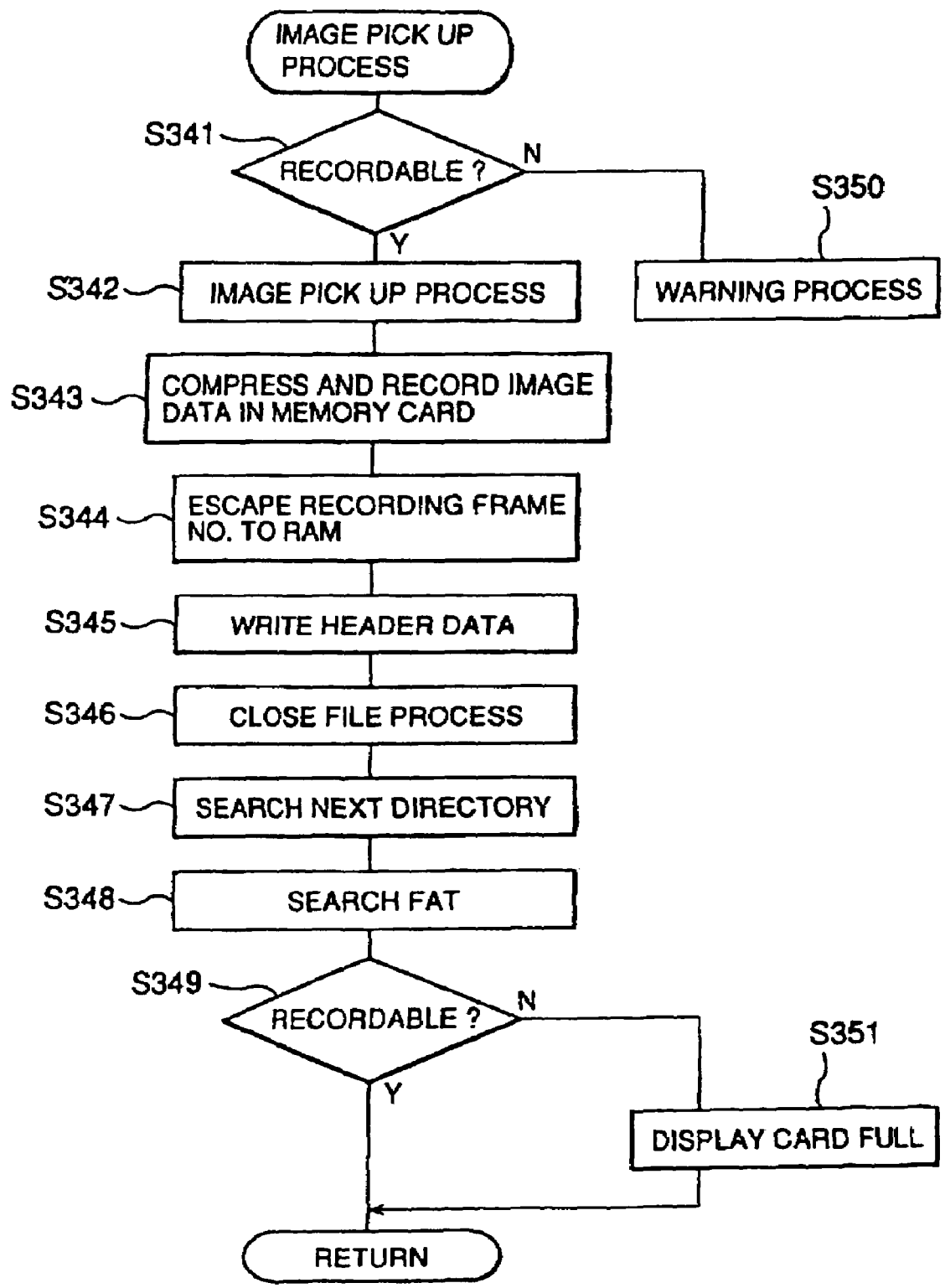
FIG. 78 is a flow chart for "trigger switch process" sub-routine in the image pick-up process operation based on trigger switch operation in the DSC 120.

FIG. 78 is a flow chart of a "trigger switch process" sub-routine in the image pick-up process operation based on trigger switch operation in the DSC 120.

In a step S341, such checks as whether write protection of the memory card loaded in the DSC has been released, whether there is an empty capacity for image data recording, and whether the applicable format is done etc. If recording is impossible, a warning process is executed (step S350). If recording is possible, an image pick-up process, such as taking in image data, is executed (step S342). Then, the image data is compressed and recorded in the memory card 117 (step S343).

Then, the recording frame No. is escaped to the RAM in the system controller 110 (step S344). Then, a header data such as image pick-up time, image pick-up data, etc. are written in the header file noted above (step S345). Then, a file close process in a step S346 is executed, in which the FAT and directory data in the memory card 117 are written in accordance with the recording state. Then, the following directory and FAT are searched (steps S347 and S348) for the next image pick-up recording. A check as to whether there is remaining memory area capable of recording is done (step S349). If such memory area exists in the memory card 117, this subroutine comes to end. If there is no such memory area, a "card full" display is made (step S351), thus bringing an end to the sub-routine.

Figure 79:
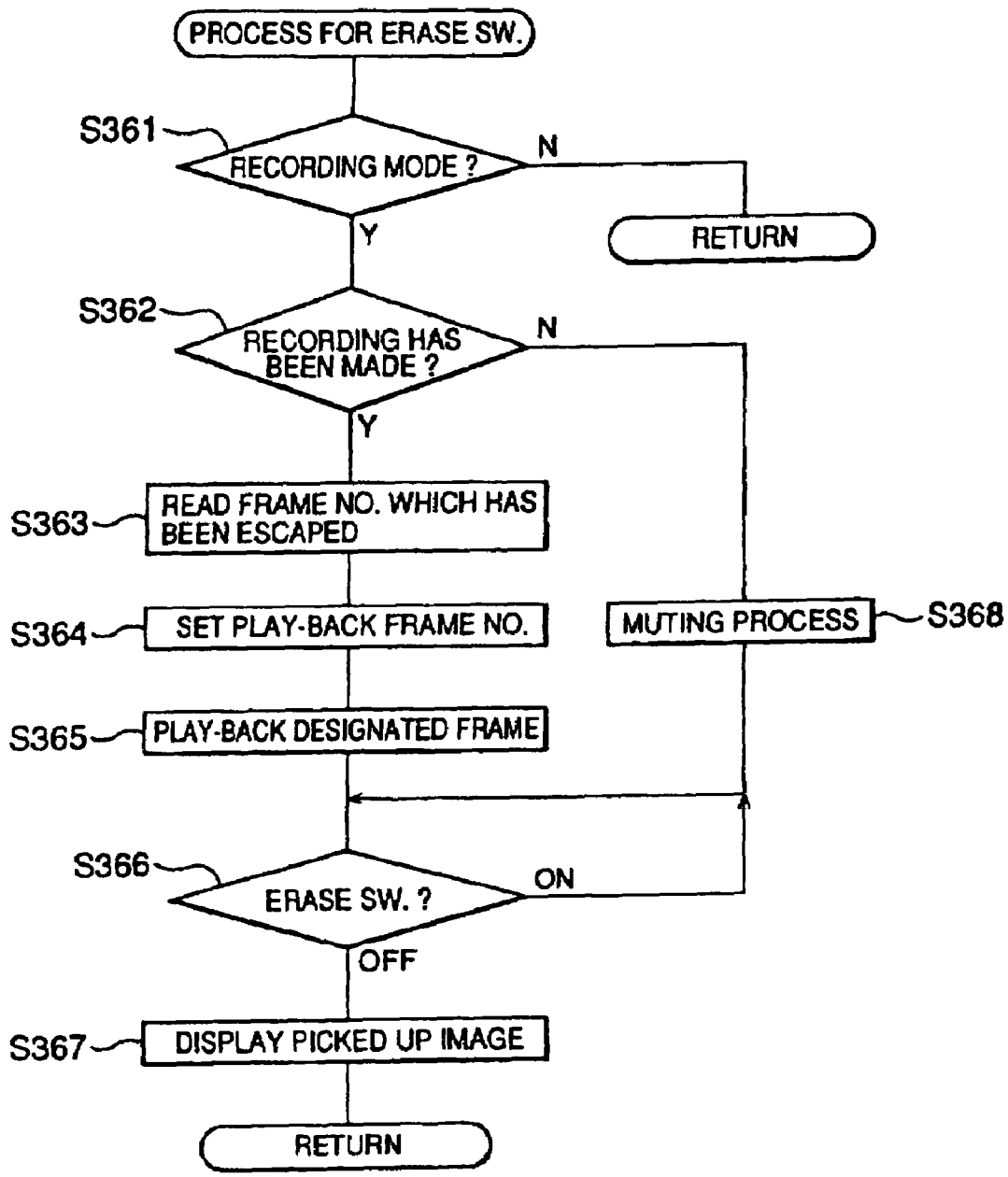
FIG. 79 shows a flow chart for "erase switch" sub-routine.

Now, an operation which is brought about in response to the depression of the ERASE switch 114f for playing-back immediately previously picked-up and recorded image will be described with reference to an "ERASE switch process" sub-routine flow chart of FIG. 79.

In a step S361, a check as to whether a recording mode prevails is done. If the recording mode does not prevail, the sub-routine returns. If the recording mode prevails, a check as to whether recording has been made is done (step S362). This check is done by checking whether the recording frame No. escape process in the step S344 in FIG. 78 has been done. If the recording has been made, a step S363 is executed. Otherwise, a muting process of making the picture black or blue is made (step S368), and then a step S366 to be described later is executed.

In the step S363, the frame No. that has been escaped in the step S344 in the image pick-up process in FIG. 78 is read out, and a playback frame No. is set (step S364). Then play-back the designated frame No. and corresponding image along with frame No., date of recording, etc. is executed (step S365). Then, when the ERASE switch 114f is turned off (step S366), a picked-up picture that has been input via the image pick-up lens is displayed (step S367), thus bringing an end to the sub-routine.

In the process shown in FIG. 78, it is possible to store a plurality of image pick-up frame numbers in the system controller 110. In this case, previously picked-up recorded pictures may be played-back by using the ERASE switch 114f together with the UP or DOWN switch 114c or 114d.

Now, an operation of erasing all the data recorded in the memory card in the DSC 120 will be described. In this all data erase operation, at the time of the erasing either a mode; in which memory check is done, or a mode, in which no memory check is done, is set up.

In the prior art DSC, which is used such a memory card, an optical magnetic disk or a floppy disk as the recording medium, initialization, i.e., memory check of memory card, writing of management data and all data erase operation to erase all recorded data, is necessary before recording image data in the memory card, for instance.

To provide for improved camera operation control property, the all data erase operation and initialization have heretofore been carried out as a single continuous operation. In the initialization, however, the memory check requires a long time. Therefore, a long waiting time has been necessary whenever the all data erase process is performed. Further, it is naturally considered that it is desired to maintain the format type prior to the erasing all data, and in such a case inconveniences are felt.

In the all data erase process in the DSC 120 in this embodiment, initialization and all data erase operation may be done easily as necessary operations. Besides, it is possible that the user designates the initialization format.

In the attribute memory or common memory in the data arrangement of the memory card 117 as shown in FIG. 49, attribute data is recorded in a tuple type as shown in FIG. 51.

FIGS. 78(A) and 78(B) show abbreviation and meaning of tuple IDs. These tuple IDs and so forth are based on "ID Memory Card Guideline Ver. 4.1" proposed by the JEIDA. It is assumed that basic tuples concerning the versatility are arranged in the attribute memory, while tuples concerning the versatility of higher level data are arranged in the common memory.

In a boot sector which is provided subsequent to a common memory attribute information area in the data arrangement of the memory card 117, information about the management of FAT and directory is recorded. FIG. 78(C) shows the format of the boot sector. Again this format is based on the "IC Memory Card Guideline Ver. 4.1" proposed by the JEIDA. In this boot sector, in a forefront portion, a command for jumping to boot code, manufacturer's name, etc. are stored, and in a subsequent region shown as BPB, DOS management information, i.e., information about the management of FAT and directory noted above, is stored. By reading out these data, it is possible to interpret FAT and directory. The data is provided with a certain degree of freedom.

Figure 80:
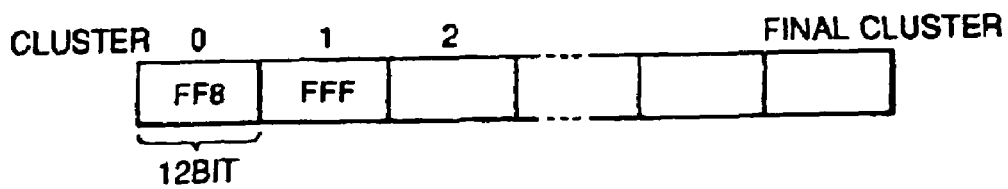
FIG. 80 shows a configuration of FAT which is recorded subsequent to the boot sector.

FIG. 80 is a view showing the configuration of FAT which is recorded subsequent to the boot sector. In the FAT data recording area, individual entries are divided according to clusters. For example, the individual entries correspond to cluster 2, cluster 3, . . . , final cluster. Individual entries have the structure of 12 bits. The first two entries 0 and 1 are for system reservation. The FAT data structure is a chain structure starting with an entry designated by directory and for designating successive used clusters. The chain is ended with OFFFH (H being indicative of the hexadecimal number system). Entry data 0 indicates non-use state.

Now all data erase operation will be described with reference to display states.

When an operation of erasing all data in the memory card 117 is done, the management area is checked. If the known format is done, only file erasing is made. If the known format is not done, memory check and formatting are made.

FIGS. 81(A)-81(D) show the display screen of the display 113 or monitor when all data erasing is made in a state, in which a non-formatted memory card requiring formatting is mounted. In this case, an erasing mode to be described later is made "mode A". In the erasing operation, an all data erase preparation mode is set by multiplex depressing the ERASE switch 114f and UP switch 114c. As a result, "A mode" is displayed as in FIG. 81(A) with flicker of segment "ERASE". Then, by depressing the trigger switch 119 it is confirmed that the memory card is the non-formatted one. Thus, initialization, i.e., memory check and formatting, are started.

Figure 81A:
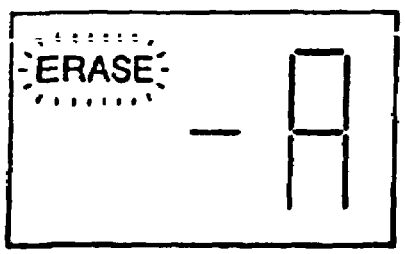
FIGS. 81(A)-81(D) show display screens of the display 113 or monitor for all data erasing process.
Figure 81B:
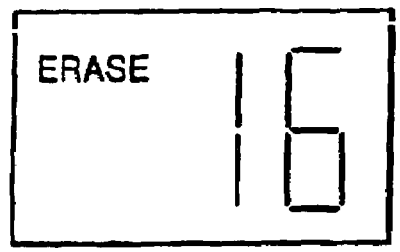
Figure 81C:
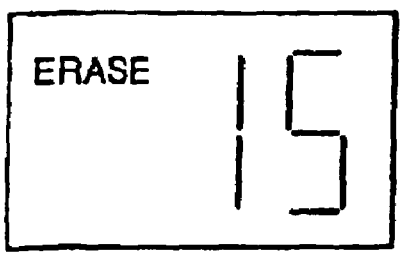
Figure 81D:
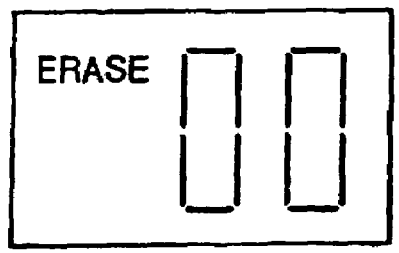

FIGS. 81(B) and 81(C) are displays during the initialization process. Since the memory check requires long time, the total memory capacity of the memory card is divided into blocks each of 64 k bytes, and during the memory check operation the non-process blocks are counted down as shown in FIGS. 81(B) and 81(C). These displays indicate that the remaining blocks are 16 and 15, respectively, in number. When the number of remaining blocks becomes "00" as shown in FIG. 81(D), the initialization is ended.

When the same operation is done as when a formatted memory card is located, an all data erase preparation state is brought about, and a display as shown FIG. 81(A) is made. When a trigger switch 119 is depressed, the memory card format is checked. If formatting is detected, the all data erasing is ended by merely erasing data that has been stored in the management area, and the end display as shown in FIG. 81(D) is given immediately. This operation is ended in a short period of time.

Now, an operation of erase mode selection will be described. As the erase mode to be selected, there are "A mode", "B mode" and "C mode" as shown in FIG. 82(E). These plurality of erase modes are necessary in order to be able to cope with various formats including those, in which attribute information is not written in the common area of the memory card.

In the "A mode", all data erase operation as described before in connection with FIG. 81 is made. With a non-formatted memory card, memory check and management area writing are executed. With a formatted memory card, only data recorded in the management area is erased. In the erasing operation in the "B mode", memory check and management area writing are executed irrespective of whether formatting is done or not. In the "C mode" erasing operation, the management area writing is made without writing common memory attribute information. These modes are selected by repeatedly depressing the UP switch 114c while holding the ERASE switch 114f depressed.

Figure 82A:
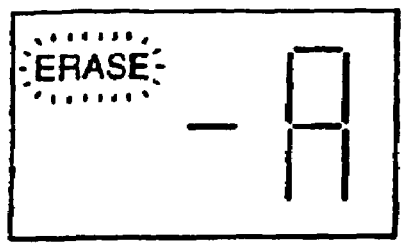
FIGS. 82(A)-82(D) show displays on the display 113 or monitor at the time of the erasing mode selection.
Figure 82B:
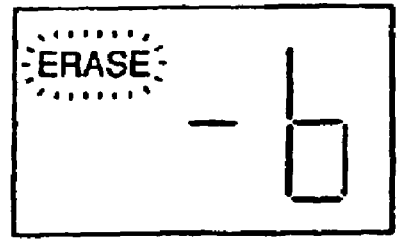
Figure 82C:
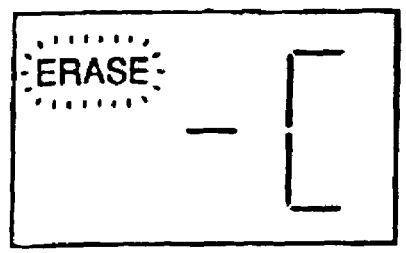
Figure 82D:
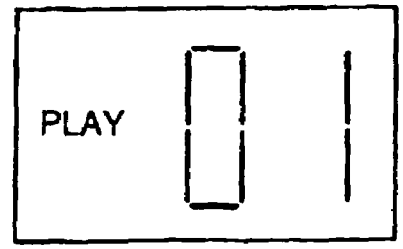

FIGS. 82(A)-82(D) show the display on the display 113 or monitor at the time of the erasing mode selection. FIGS. 82(A)-82(C) are displays when the "A mode", "B mode" and "C mode" are selected, respectively, by repeatedly depressing the UP switch 114C while holding the ERASE switch 114f depressed. When each mode is designated, flicker of the "ERASE" display is caused. By depressing the UP switch 114c, the play-back mode is restored, and a normal display at the time of the play-back is provided as shown in FIG. 82(D).

Figure 83:
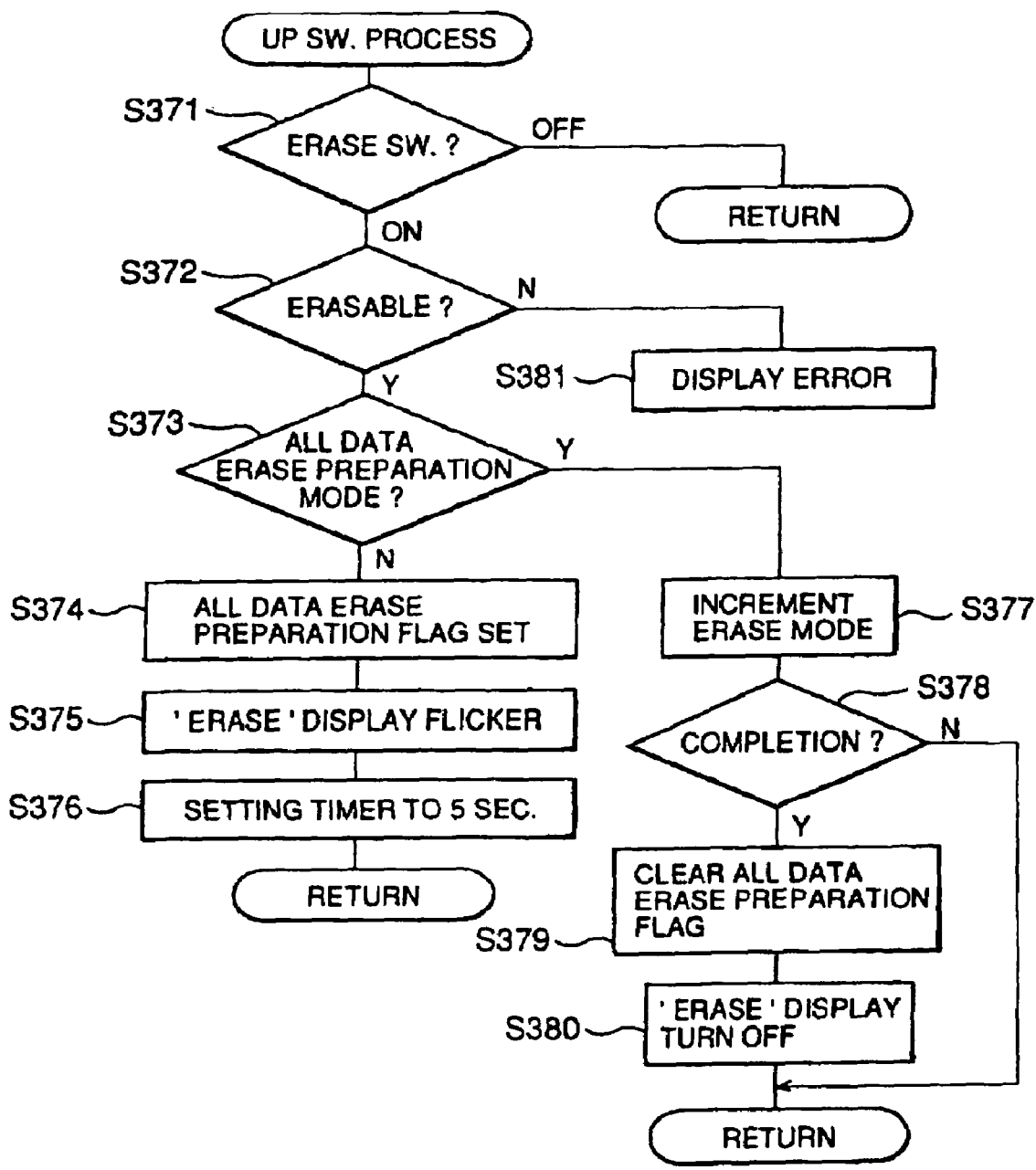
FIG. 83 is a flow chart for "UP switch process" sub-routine.
Figure 84:
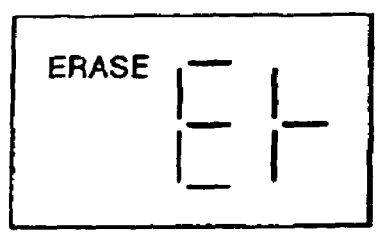
FIG. 84 shows a display when the memory card is incapable of erasing.

FIG. 83 is a flow chart of an "UP switch process" sub-routine for selecting the above mode by depressing the ERASE switch 114f and UP switch 114c. With the depression of the UP switch 114c the present sub-routine is called, and either "on" or "off" state of the ERASE switch 114f is checked (step S371). If the switch is "off", the sub-routine is returned. If the switch is "on", a check is done as to whether the memory card is capable of erasing (step S372). This check is done by checking whether the memory card is provided with a write protection and also checking the kind of the memory card, for instance checking whether the memory card is an I/O card or the like, in which attribute information for inhibiting access is recorded. If the memory card is incapable of erasing, an error display as shown in FIG. 84 is made on the display 113 or monitor, thus bringing an end to the sub-routine. If the memory card is capable of erasing, a step S373 is executed.

In the step S373, a check is done as to whether the all data erase preparation mode has already been set. If the all data erase preparation mode has not been set, an all data erase preparation flag is set (step S374). Then, flicker of the "ERASE" display is caused, and "–A" is displayed (step S375). Subsequently, if the UP switch 114c is not depressed, a timer is set to 5 sec. (step S376), thus bringing an end to the sub-routine. If it is found in the step S373 that the all data erase preparation mode prevails, the erase mode index corresponding to each erase mode is incremented (step S377). Then the erase mode index is checked (step S378). If the erase mode has already been the "C mode", the all data erase preparation flag is cleared (step S379), and the "ERASE" display is turned off (step S380), thus causing the sub-routine to be returned.

Then, a "trigger switch process" sub-routine for effecting erasing by operating the trigger switch 119 will be described with reference to the flow chart of FIG. 85.

Checks as to whether the all data erase preparation mode is "A mode", "B mode" or "C mode" (steps S391, S392 and S393). In subsequent steps S396, S397 and S398, "all data erase A mode process", "all data erase B mode process" and "all data erase C mode process" sub-routines to be described later are called. If none of these mode prevails, the state of the ERASE switch 114f is checked (step S394). If the switch is "off", the sub-routine is ended. If the switch is "on", a "one frame erase process" sub-routine to be described later is called (step S395). After execution of one frame erasing, the sub-routine is ended.

Figure 86:
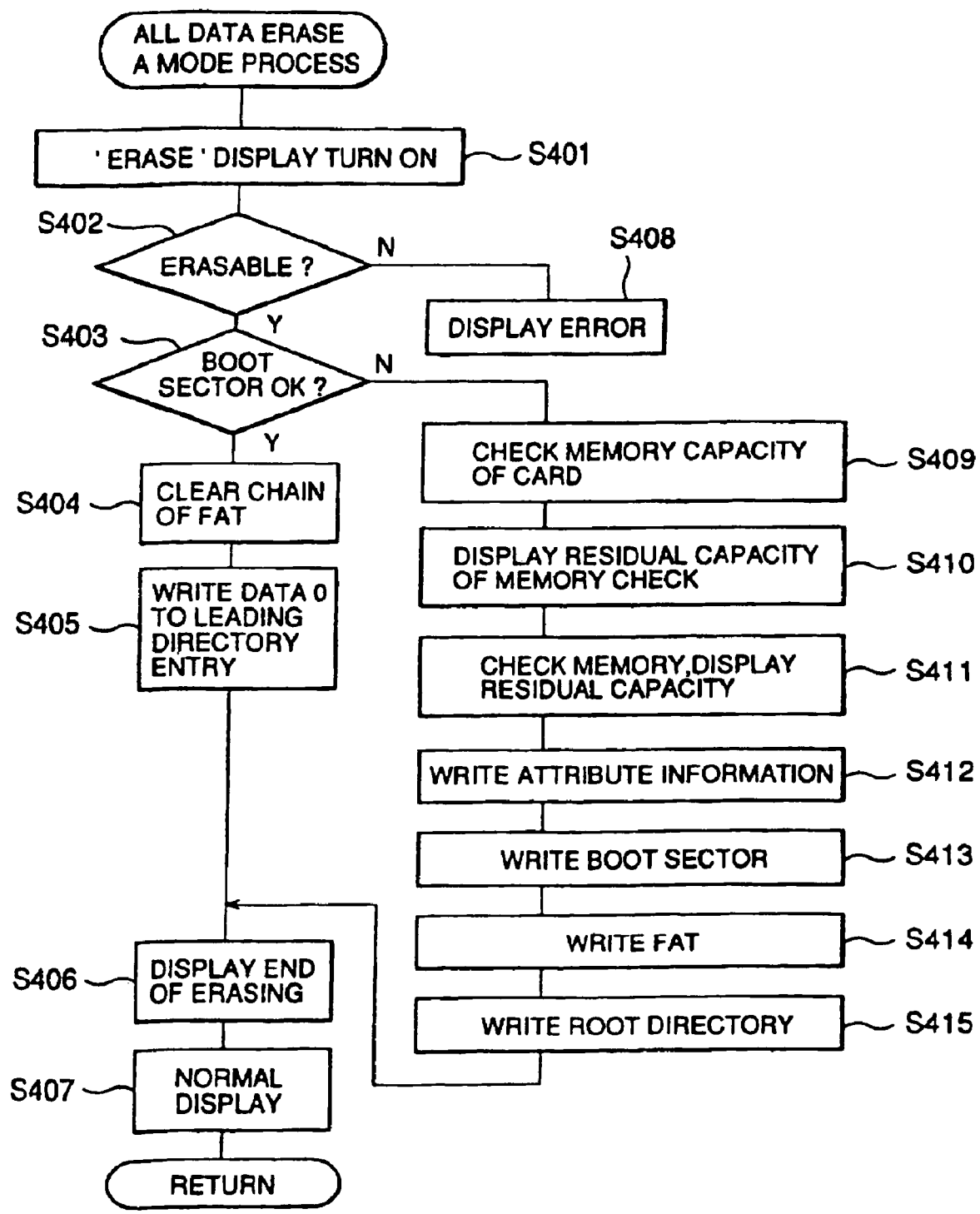
FIG. 86 is a flow chart for "all data erase A mode process" sub-routine.

FIG. 86 is a flow chart of the "all data erase A mode process" sub-routine, which is called in the step S396. When this sub-routine is called, the "ERASE" display is turned on (step S401), and a check as to whether it is possible to erase is done (step S402). This process is the same check as in the process in the step S372 shown in FIG. 83 and serves as a write protection check process. If it is impossible to erase, an error display (see FIG. 84) is made on the display 113 or monitor (step S408). Further, as warning from a buzzer is produced, thus bringing an end to the sub-routine.

If it is possible to erase, the boot sector is checked (step S403). If the boot sector data is known, no memory check is necessary, and only re-writing of management information is needed. Thus, a step S404 is executed. If it is found as a result of the boot sector check that the boot sector is not known or of non-formatting, for the memory check a step S409 is executed, in which all data erase process including memory check is made by taking a long time.

In the step S404, FAT chain data is cleared, and then data "0" is written in the leading directory entry (step S405). Then, the end of erasing is displayed (step S406), and the display 113 or monitor is restored to the normal display state (step S407), thus bringing an end to the sub-routine.

In the step S409, the memory capacity of the card is checked. This check is done by reading out memory capacity data recorded in the device information tuple. If the data has not been recorded, the memory capacity is obtained through memory check. In a subsequent step S410, the whole memory capacity is divided by, for instance, 64 k bytes, and the quotient is displayed as the non-check residual memory capacity. In a subsequent step S411, a memory check is done to display the non-check residual memory capacity in the unit of 64 k bytes. The memory check is done by successively writing values of 55H and AAH for every 64 k bytes, then reading out the written data and checking the coincidence of value. The operation is continued until the residual memory capacity is "0". Then, attribute information, boot sector, FAT and root directory are written (steps S412 to S415) to bring an end to the all data erasing, and then the step S406 is executed. The attribute information and other written data have different data values depending on the memory capacity of the memory card.

Figure 85:
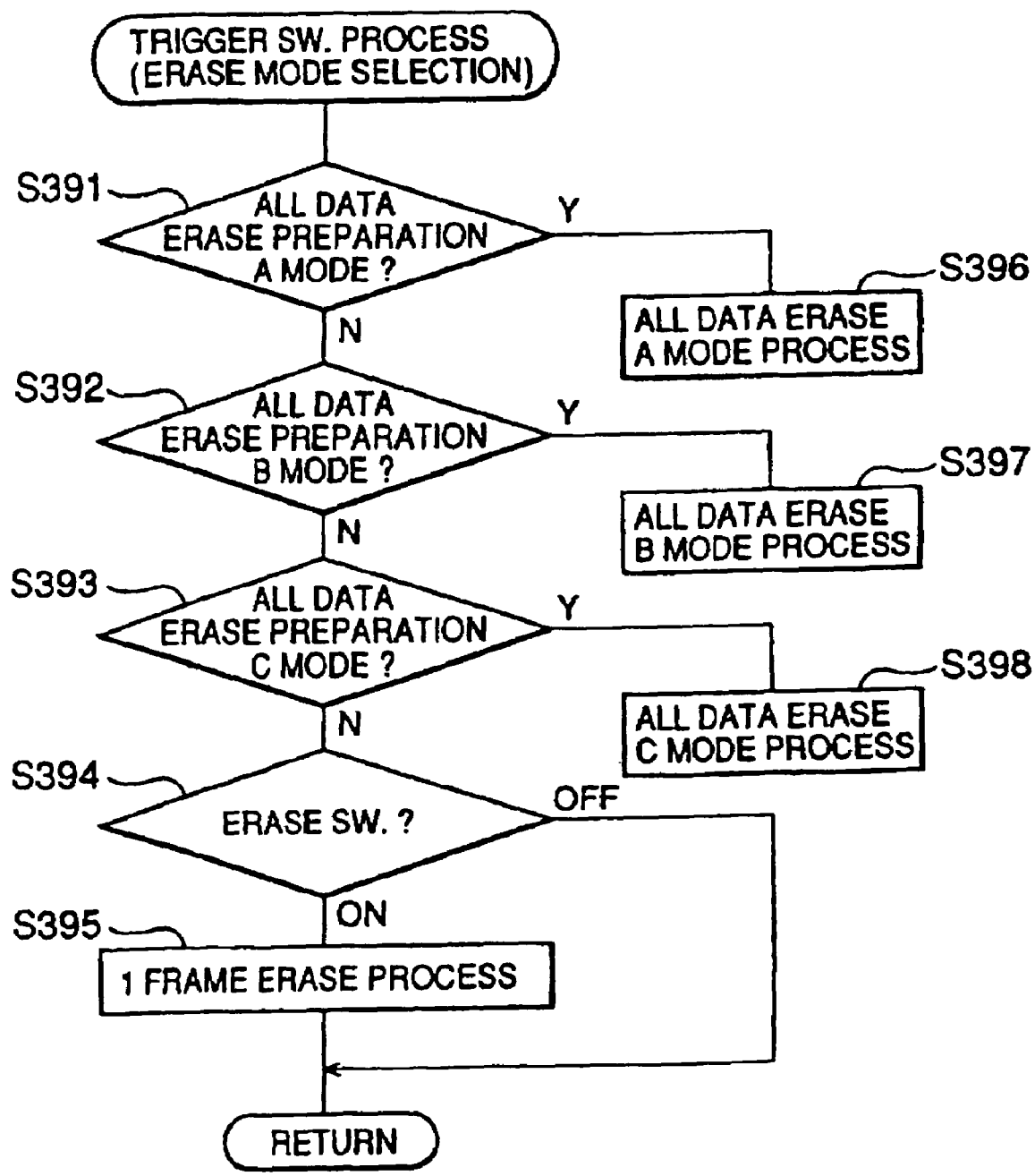
FIG. 85 shows a "trigger switch process" sub-routine for effecting erasing by operating the trigger switch 119.
Figure 87:
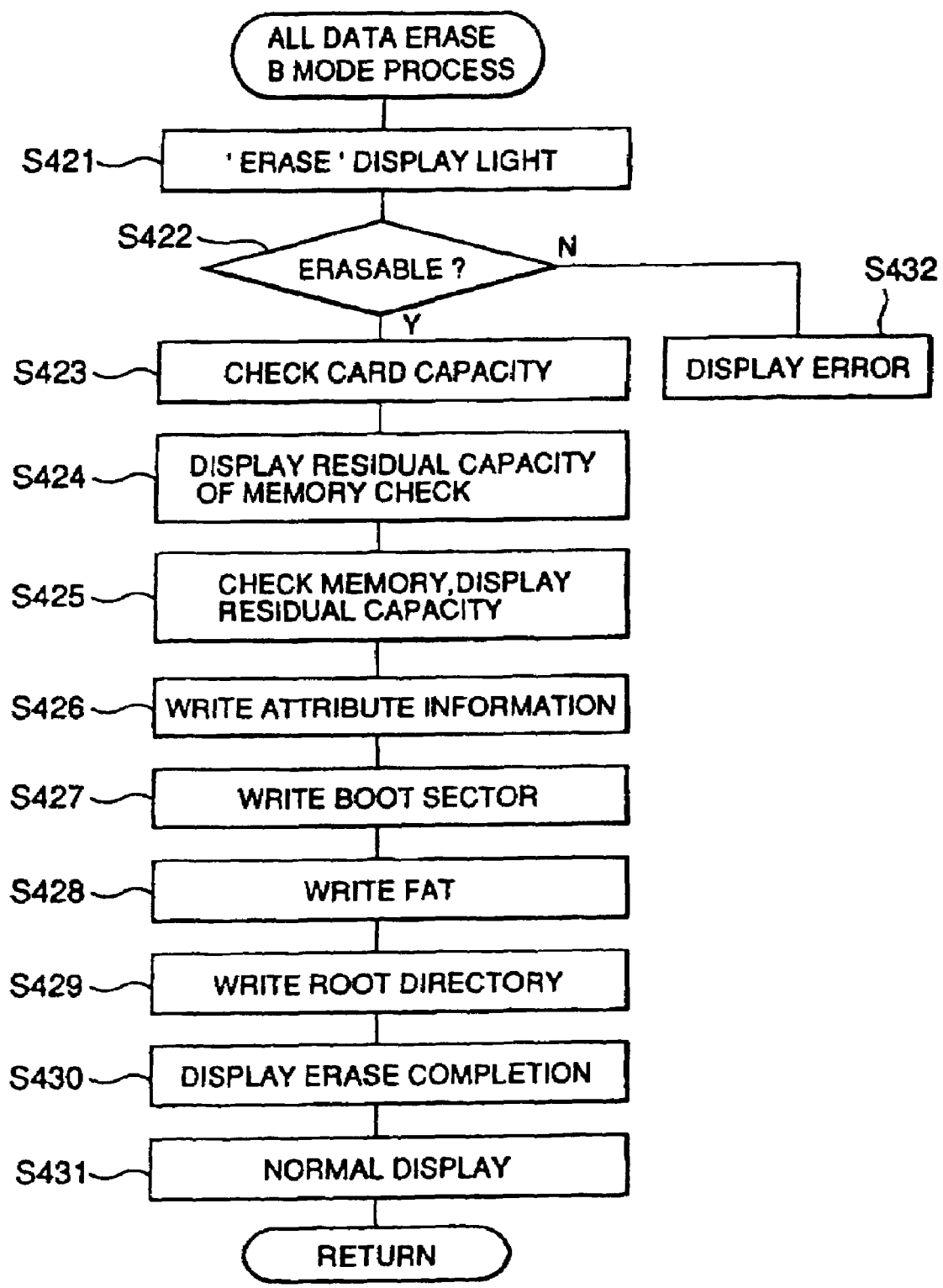
FIG. 87 is an "all data erase B mode process" sub-routine.

FIG. 87 is an "all data erase B mode process" sub-routine which is called in the step S397 in FIG. 85. In this sub-routine, the "ERASE" display is turned on (step S421), and a check as to whether it is possible to erase is done (step S422). If it is impossible to erase, an error display is made (step S432), and bringing an end to the sub-routine. If it is possible to erase, a step S423 and following steps are executed. The process in steps S423 through S431 is the same as the series of erasing operations in the steps S409 to S415, steps S406 and S407 shown in FIG. 86.

Figure 88:
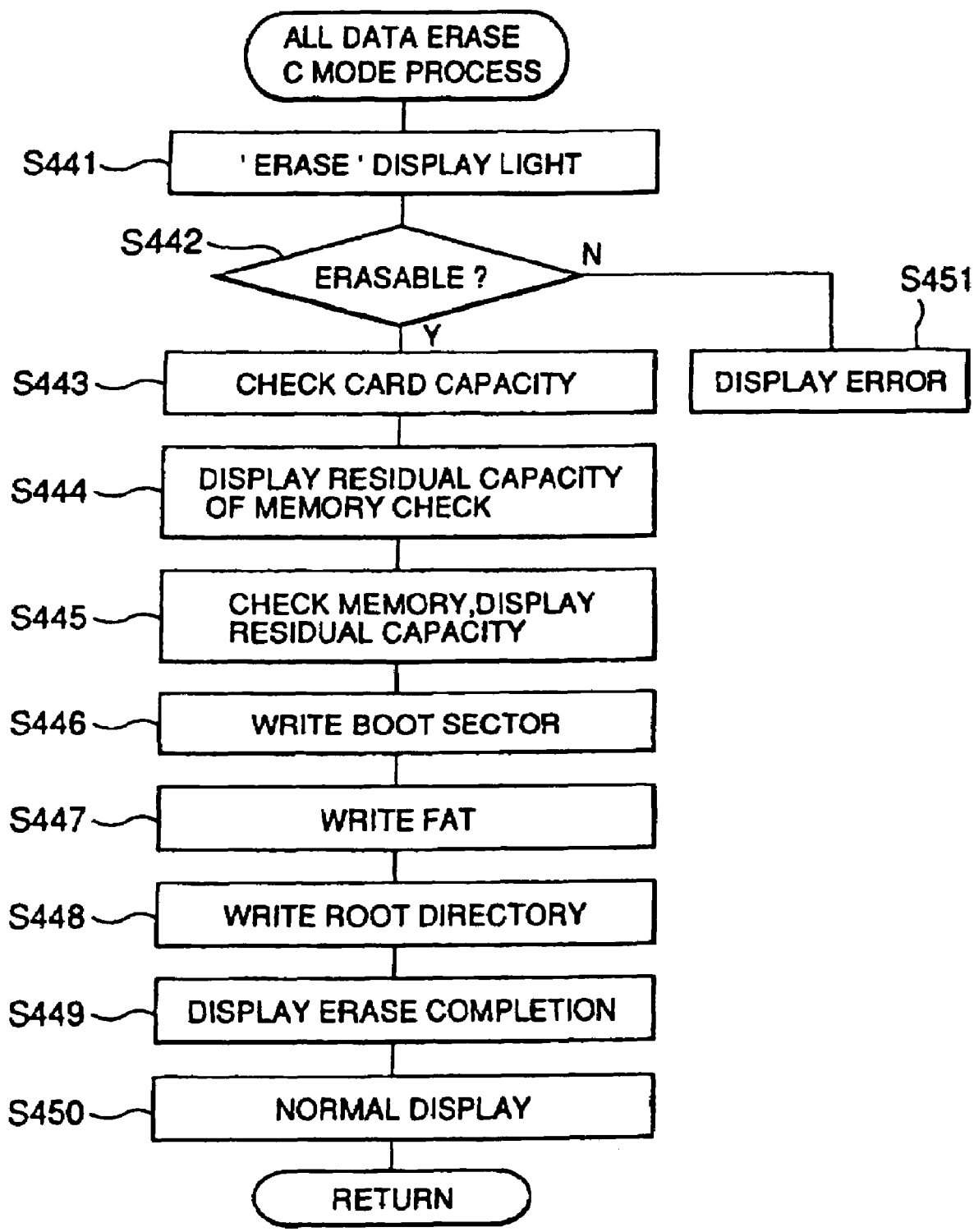
FIG. 88 is a flow chart of the "all data erase C mode process" sub-routine in FIG. 85.

FIG. 88 is a flow chart of the "all data erase C mode process" sub-routine which is called in the step S398 shown in FIG. 85. The process in steps S441 through S451 in this sub-routine is the same as those except the step S426 of writing attribute information from the "all data erase B mode process" sub-routine shown in FIG. 87.

Figures 89, 90:
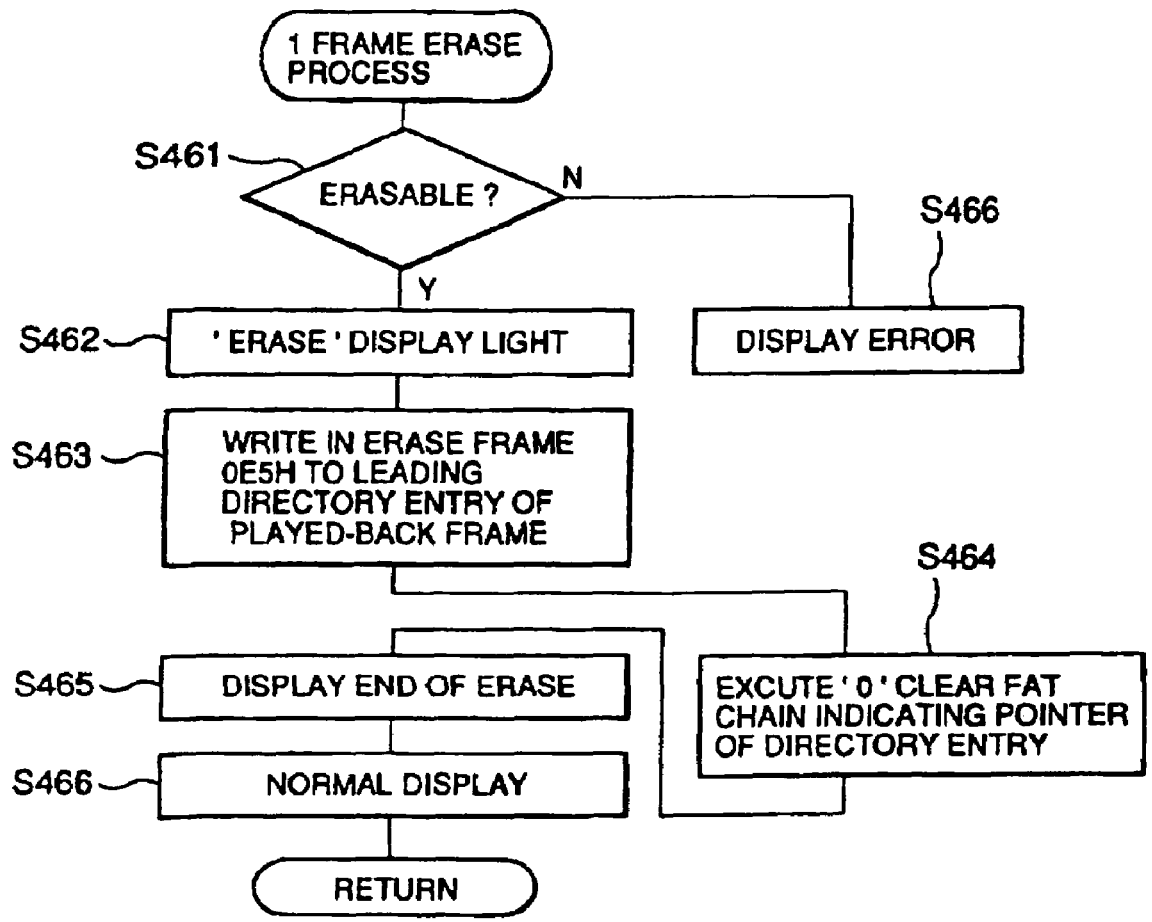
FIG. 89 is a flow chart of the "one frame erase process" sub-routine in FIG. 85.
FIG. 90 is a view showing a leading of directory entry which has been subjected to one frame erasing.

FIG. 89 is a flow chart of the "one frame erase process" sub-routine which is called in the step S395 shown in FIG. 85.

In this sub-routine, a check as to whether it is possible to erase is done (step S461). If it is possible to erase, an error display is made (step S466), thus bringing an end to the sub-routine. If it is possible to erase, a step S462 and following steps are executed.

The "ERASE" display is turned on (step S462), and 0E5H indicative of a frame to be erased is written in the leading directory entry of the played-back frame (step S463). In the step S405 shown in FIG. 86, "0" is written in the directory entry. This indicates that this directory and following directories have not been used. In the case of the one frame erase process, 0E5H is written to indicate that the process is for one frame erasing. Further, FAT chain as pointed out by the directory pointer is cleared to "0" (step S464). Then, the end of erasing is displayed (step S465), and the display 113 or monitor is restored to the normal display state (step S466), thus bringing an end to the sub-routine.

FIG. 90 is a view showing the leading directory entry which has been subjected to one frame erasing in the step S463 noted above. In the illustrated state, 0E5H has been written in the leading directory entry of the fourth frame, and the frame has been erased independently. Since 00H is written in the sixth frame, it is shown that the following frames are the non-recorded frames. Thus, it is possible to discriminate a file, which has been erased by one frame erasing, and a file which is followed by non-recorded files. Further, it is possible to quickly set a directory entry and following to the non-recorded state by writing 00H in the leading directory entry.

While the erasing has been described so far, the erasing operation involves two operations, i.e., formatting of the medium and erasing of data. So far has been described the camera's function of selecting the formatting and erasing, if necessary. Further, the embodiments described so far concerned with a case, in which with the loading of a non-formatted memory card the user formats the medium to be ready for use by executing the all data erase operation.

Figure 91:
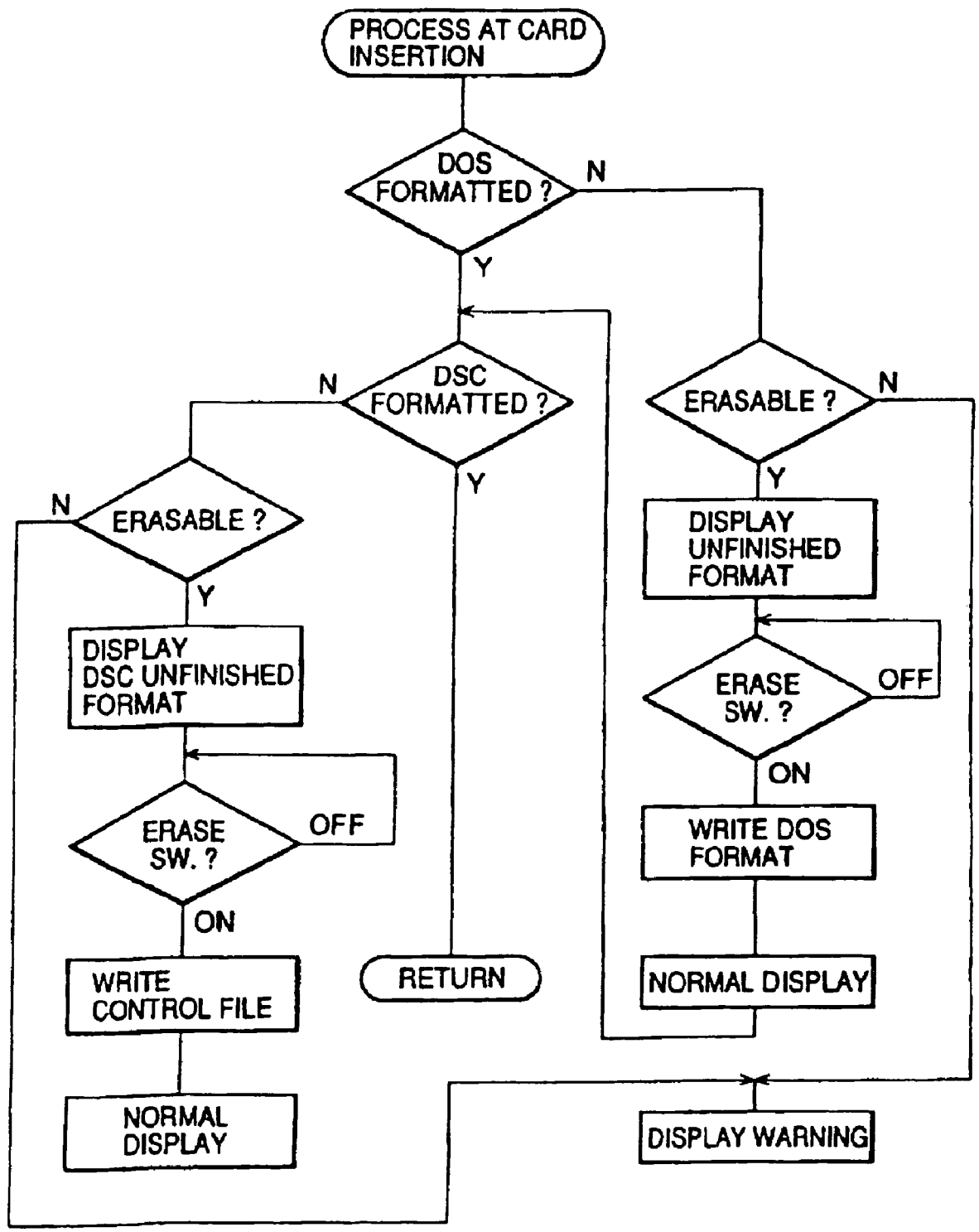
FIG. 91 shows a flowchart for production of a warning.

Accordingly, for the user who is not familiar with the concept of the formatting, it is possible to check the card format at the time of the loading of the card, produce an alarm in the case of a non-formatted memory card and permit formatting by operating the ERASE switch. This process is shown in the flow chart of FIG. 91.

In the flow chart, "DOS formatted" means a state, in which the attribute information, boot sector, FAT and directory have been written correctly, and "DSC formatted" means a state, in which necessary control files have been written. For executing the formatting, a format switch may be provided exclusively, or the ERASE switch may be used to this end as well, as noted above.

As noted above, with the camera according to the invention an external unit is connected to the connector, to which any of a plurality of external units can be connected, and interface functions which are suited to the connected external unit are provided by recognizing the external unit with the interface recognition means. Thus, while it is possible to permit communication of information with a plurality of external units, it is possible to reduce the camera body size and provide high versatility.

A following embodiment of the invention concerns an image recording apparatus, in which upon receipt of a call signal from a connected communication line the power source is automatically turned on to be ready for supplying signal to be recorded, thus permitting improvement of the versatility and reduction of the power consumption.

Figure 92:
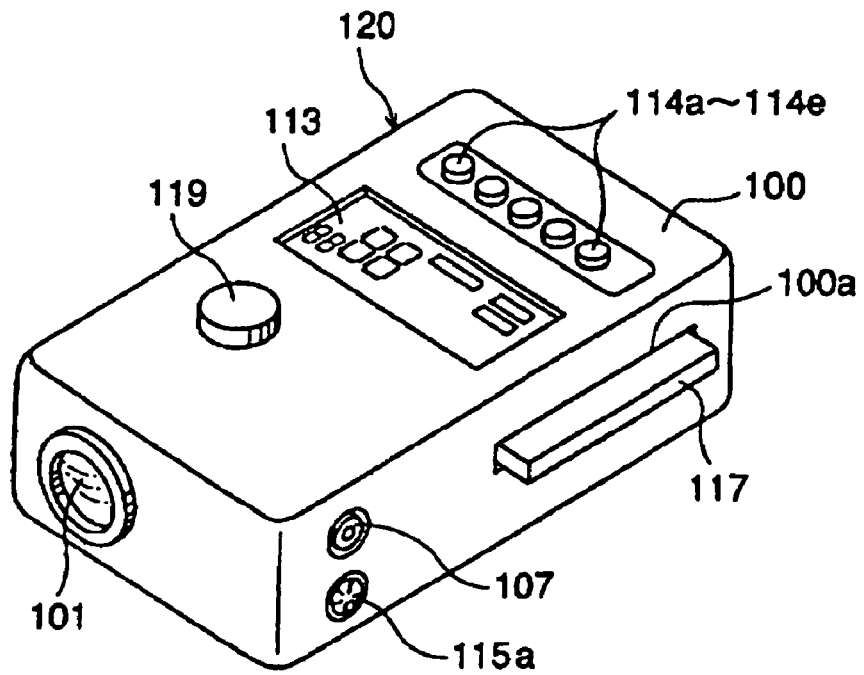
FIG. 92 shows a perspective view showing a DSC according to an embodiment.

FIG. 92 is a perspective view showing a DSC (digital still camera) 120 as the embodiment of the image recording apparatus according to the invention. The DSC 120 is used with an IC memory card 117 as image information recording medium.

The DSC 120 has a camera casing 100, which has an image pick-up lens 101 provided at its front for picking up images. The top of the casing 100 has operation switches 114a to 114e for instructing control operations, an LCD display 113 and a release switch 119 for instructing the image pick-up operation. One side of the casing 100 has a video signal output terminal 107, a connector 115a, which is formed as a mini DIN connector or the like for transmitting and receiving signals with respect to an external unit such as a PC, a modem, etc., and an insertion opening 100a for inserting the memory card 117 as the recording medium.

Figure 93:
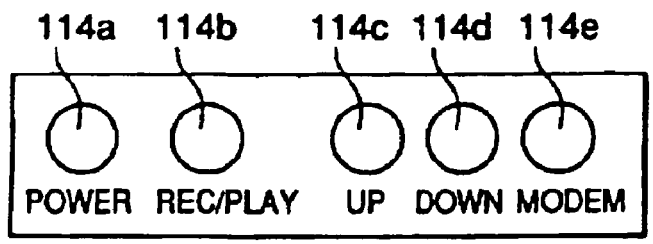
FIG. 93 shows an enlarged-scale view showing the operation switches 114a to 114e.

FIG. 93 is an enlarged-scale view showing the operation switches 114a to 114e. The switch 114a is a "POWER" switch for turning on and off the camera power source. The switch 114b is a "REC/PLAY" switch for instructing the recording or play-back. The switch 114c is an "UP" switch for effecting one-frame-up of the play-back/erase frame designation number, and the switch 114d is a "DOWN" switch for effecting one-frame-down of the play-back/erase frame designation number. The switch 114e is a "MODEM" switch for providing an instruction to function the I/F such as to correspond to a connected modem.

Figure 94:
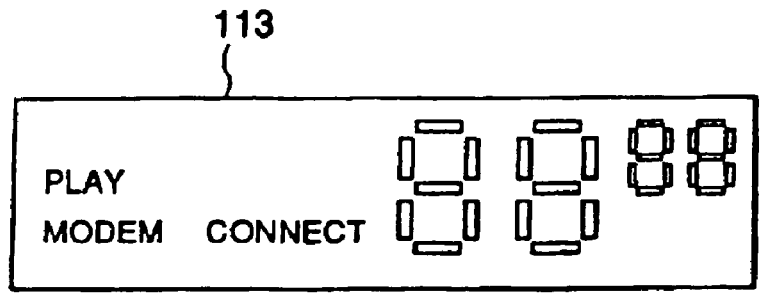
FIG. 94 shows a detailed view of the display 113.

FIG. 94 shows a detailed view of the display 113. The display 113 has a segment "PLAY" to be turned on when playing-back picked-up picture data, a segment "MODEM" to be turned on when a modem is selected as communication unit, a segment "CONNECT" to be turned on when the connected modem is ready or communication, and two different 7-segment display sections. Of the two 7-segment display sections, one is for displaying the frame number, file process state, etc., and the other is for displaying the number of remaining frames capable of image pick-up.

Figure 95:
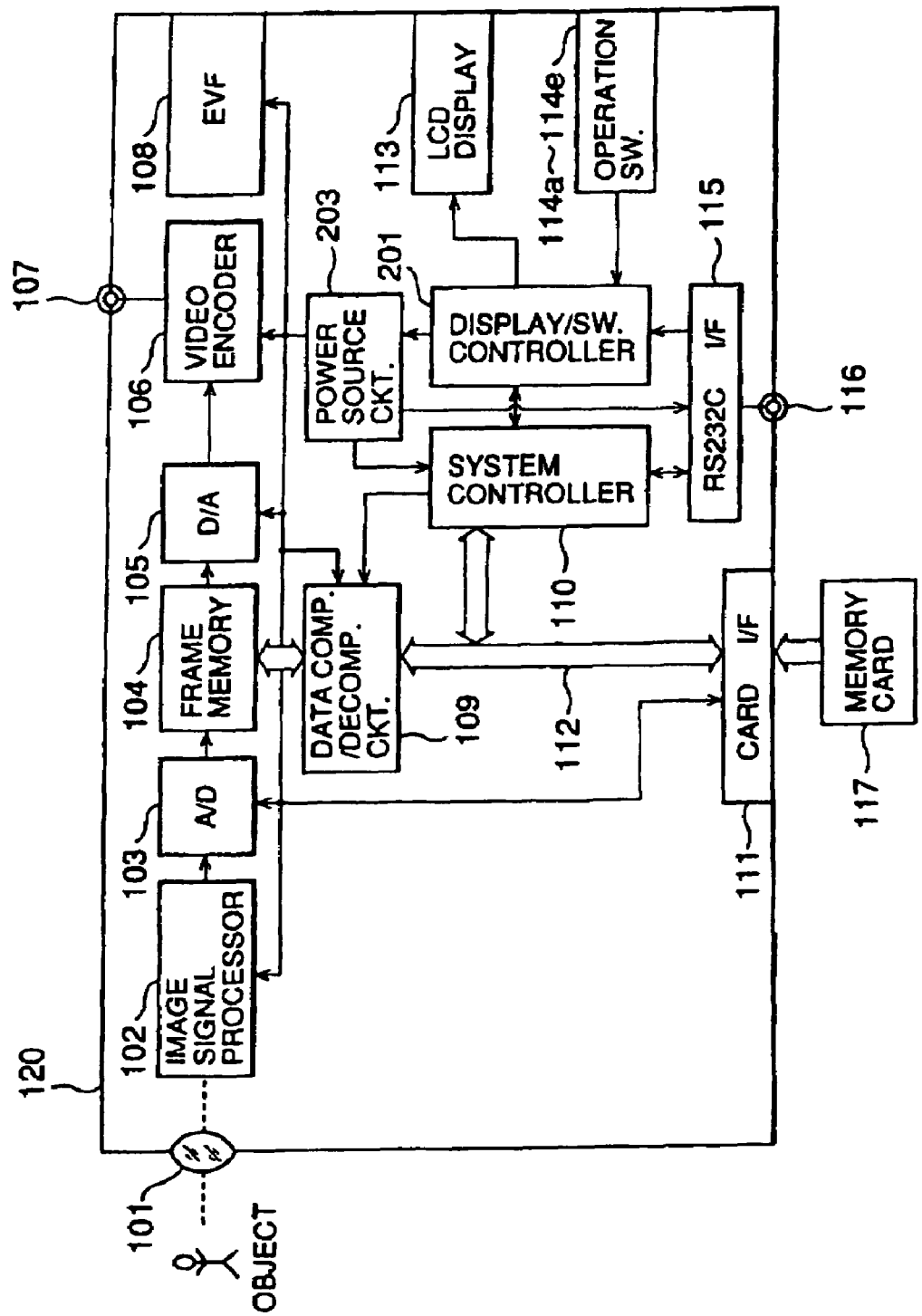
FIG. 95 shows a block diagram showing a controller of the DSC 120.

FIG. 95 is a block diagram showing a controller of the DSC 120. In response to the depression of the release switch 119 (see FIG. 92), the DSC records image pick-up signal as recording signal on the mounted memory card 117. Also, it plays-back image pick-up recording signal in an image file of a designated frame number from the memory card 117 in response to the operation of operation switches 114a to 114e, thus outputting the corresponding video signal from a video signal output terminal 107. Further, via a modem the communication of image information is possible through RS-232C I/F 115 as external interface circuit for communication, which is a recording signal supply means.

The construction will now be described in detail. At the time of the image pick-up, an image of the foreground subject is focused by the image pick-up lens 101 onto a CCD or like image pick-up element provided in an image signal processor 102, which is a recording signal supply means. As a result, an image signal is output to an A/D converter 103. The A/D converter 103 digitally converts the image data, and the converted image data is temporarily stored in a frame memory 104 of the image memory which is a recording signal supply means. The image data in the frame memory 104 is analog converted again in a D/A converter 105 to be output as a video signal through a video encoder 106 to the video output terminal 107.

When recording image data on the memory card 117, image data is read out block by block from the frame memory 104 and compressed in a data compressing/decompressing circuit 109 by a JPEG (joint photographic expert group) system or the like to be input via a bus to a card I/F 111 as a recording signal supply means. The compressed data is written in a designated area of the memory card 117.

In play-back, the frame number, etc. are designated by operating the UP and DOWN switches 114c and 114d. The designated frame number, file number, etc. are displayed on the LCD display 113. According to the designation, a memory area of the memory card 117 is selected, and corresponding image data is fed through a card I/F 116 and a bus to the data compressing/decompressing circuit 109 for decompression. The decompressed image data is stored in the frame memory 104. This image data is read out again from the frame memory 104 to be converted in the D/A converter 105 into an analog signal which is input to the video encoder 106 for encoding to be output as a video signal from the video signal output terminal 107.

The individual elements of the DSC 120 are controlled by a system controller 110. Input signals from the operation switches 114a to 114e are input through a display/switch controller 201 which also serves as power supply control means to the system controller 110 for control processes. The display on the LCD display 113 is effected by the display/switch controller 201 according to instructions from the system controller 110.

A power source circuit 203 is further provided as power source means, which serves as a drive power source section for the individual control elements. The power supply operation of the power source circuit 203, as will be described later, is controlled by the display/switch controller 201 according to a signal from the POWER switch 114a among the operation switches and also to a CI signal as a called signal provided with completion of connection of an external communication line.

Figure 96:
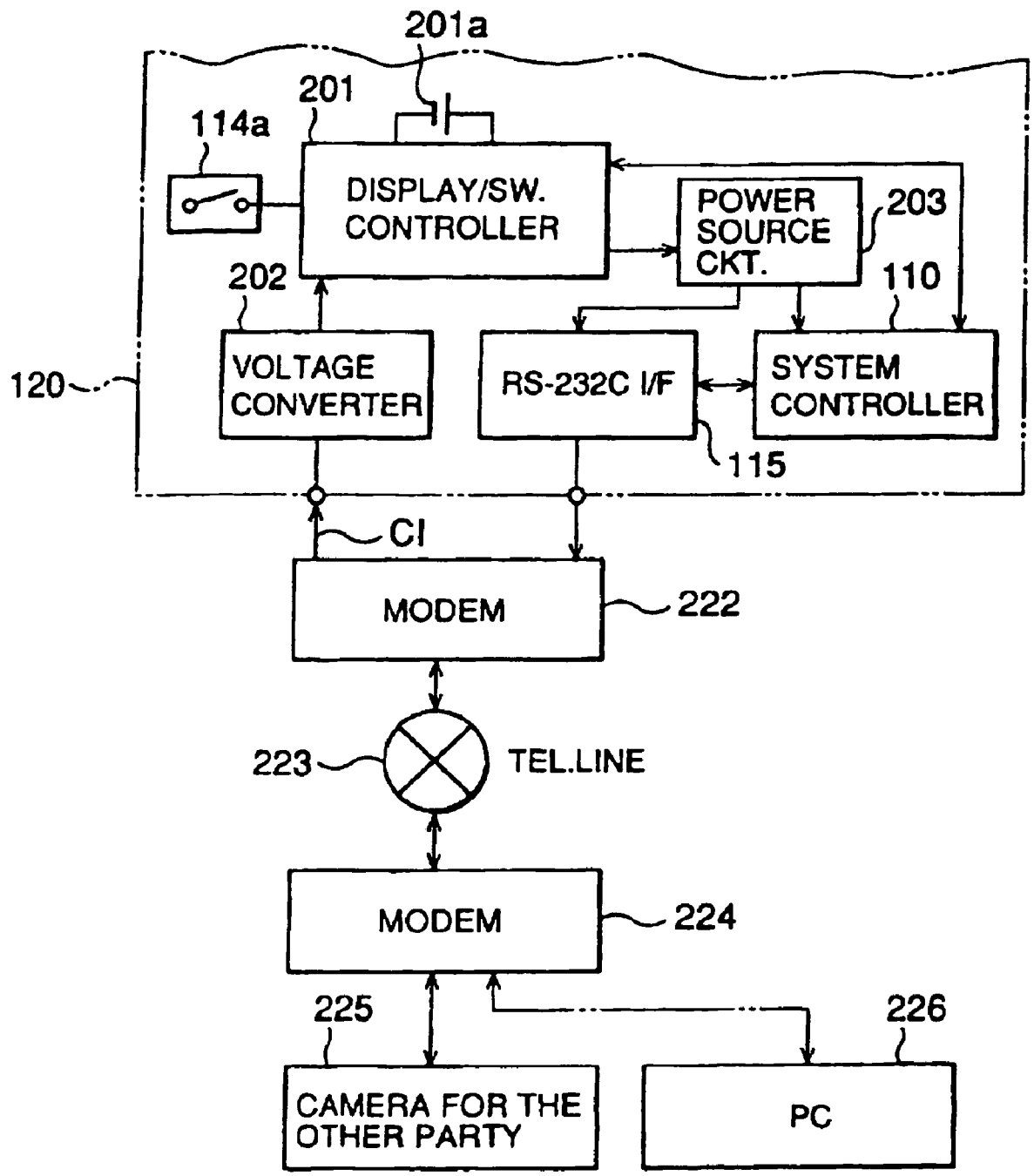
FIG. 96 shows a block diagram of a system for communication with an external unit via a telephone line.

FIG. 96 is a block diagram of a system, which is formed when a modem 222 or the like is connected to the DSC 120 for communication with an external unit via a telephone line. As shown, a telephone line 223 is connected to the modem 222, and it is also connected via a modem 224 to the camera for the other party (the party side camera) 225 or PC (personal computer) 226.

The DSC 120 is shown only for its circuit portion concerning the power supply and communication control, i.e., a circuit portion including the system controller 110, display/switch controller 201 and RS-232C I/F 115. In this circuit portion, the display/switch controller 201 and a voltage converter 202 have an exclusive power source 201a in order that they are held operative at all times irrespective of the connection of the "POWER" switch 114a or modem. The power source circuit 203 which is controlled by the display/switch controller 201 executes power supply to the system controller 110 and RS-232C I/F 115 in response to an instruction from the display/switch controller 201.

When the camera for the other party 225 is made ready for communication via the telephone line 223 and modems 224 and 222, a called signal CI is input via the modem 222. The called signal CI is input to the display/switch controller 201 via the voltage converter 202. The called signal is input via the voltage converter 202 due to the necessity of voltage conversion because the modem's output voltage range is ±15 V whereas the operating voltage range on the side of the DSC 120 is 0 to 5 V. As noted above, the display/switch controller 201 and voltage converter 202 have the internal power source 201a and are held operative at all times.

The power-on operation of the circuit portion of the DSC 120 shown in FIG. 96, having the above construction, will now be described.

When the "POWER" switch 114a is operated, the power source circuit 203 is made operative by an instruction from the display/switch controller 201 to supply power to the system controller 110, RS-232C I/F 115 and other control elements, thus making it ready to perform recording or play-back in the camera mode.

Meanwhile, when an external unit is connected via modem and made ready for communication in the "off" state of the "POWER" switch 114a, a called signal CI is input from the external unit. The CI signal is input via the voltage converter 202 to the display/switch controller 201. According to this input, the display/switch controller 201 makes the power source circuit 203 to be ready for supply power, thus causing power supply to the system controller 110 and other control elements. Now, it is ready to write recording signal from the camera for the other party to the memory card 117.

As shown in FIG. 96, communication is possible with the PC 226 as well via the telephone line. Also, the PC 226 can transmit and receive image data with respect to the DSC 120. Further, operation under remote control by the PC 226 is possible. Further, power-on process by the called signal CI is possible at the time of the start of communication of the DSC 120.

Figure 97:
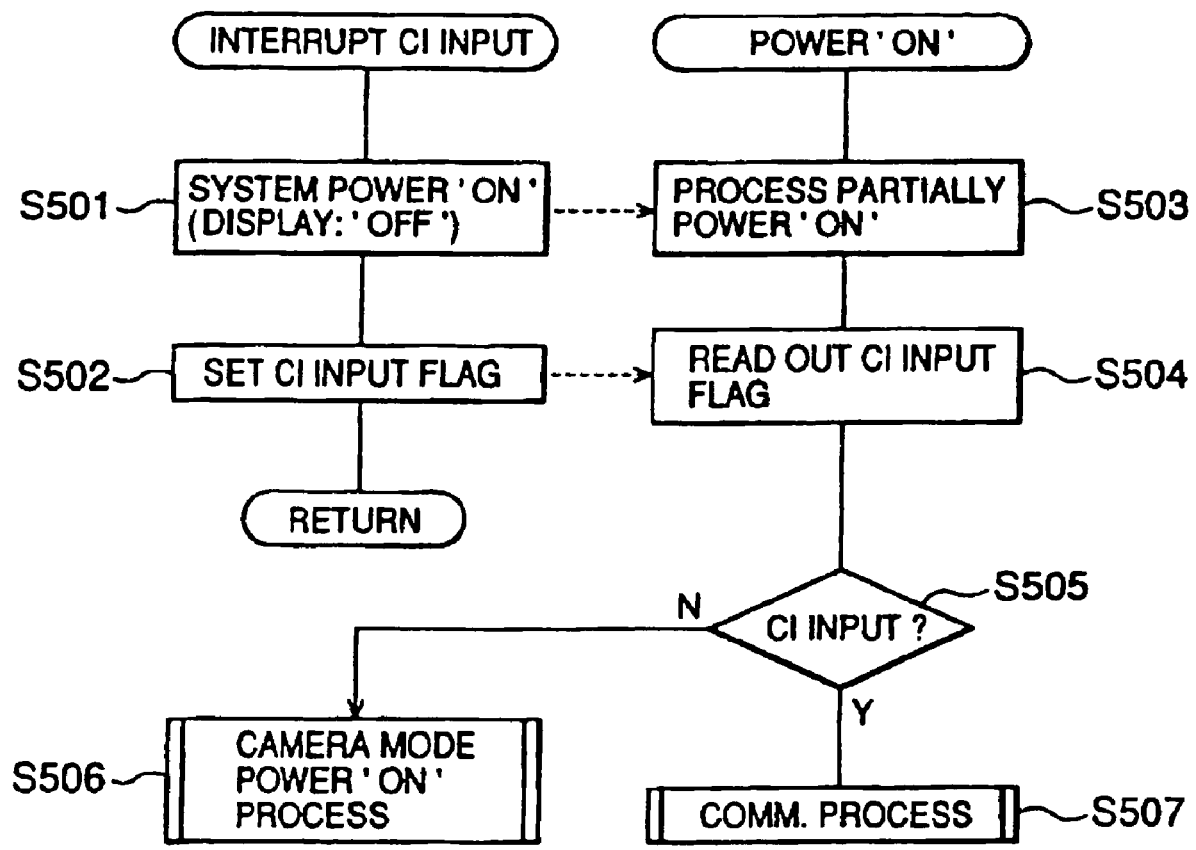
FIG. 97 shows a flow chart for the power-on operation.

The power-on operation will now be described with reference to the flow chart of FIG. 97.

When a called signal is input, a "CI interruption" routine is started. First, the entire system is brought to a power-on state (step S501). At this time, the display 113 is held "off". The display is turned on when the DSC becomes ready for communication. Subsequently, a CI input flag is set to "1" (step S502).

With the system power-on, a "power-on process" sub-routine on the side of the system controller 110 is called, and a partial power-on process corresponding to the power-on in the step S501 is executed (step S503). This partial power-on process is not displayed on the display 113, but it is for making preparations for operations of other control elements. Subsequently, the CI flag is read out (step S504).

Then, the CI flag is checked (step S505) to check whether a new called signal CI has been input. If the signal CI has been input, a step S507 is executed to call a "communication process" routine. If no signal CI has been input, it means that the POWER switch 114a has been operated. In this case, a power-on process is executed for preparations for operation corresponding to the camera mode to execute image pick-up by the DSC 120 itself or play-back of image.

Figure 98:
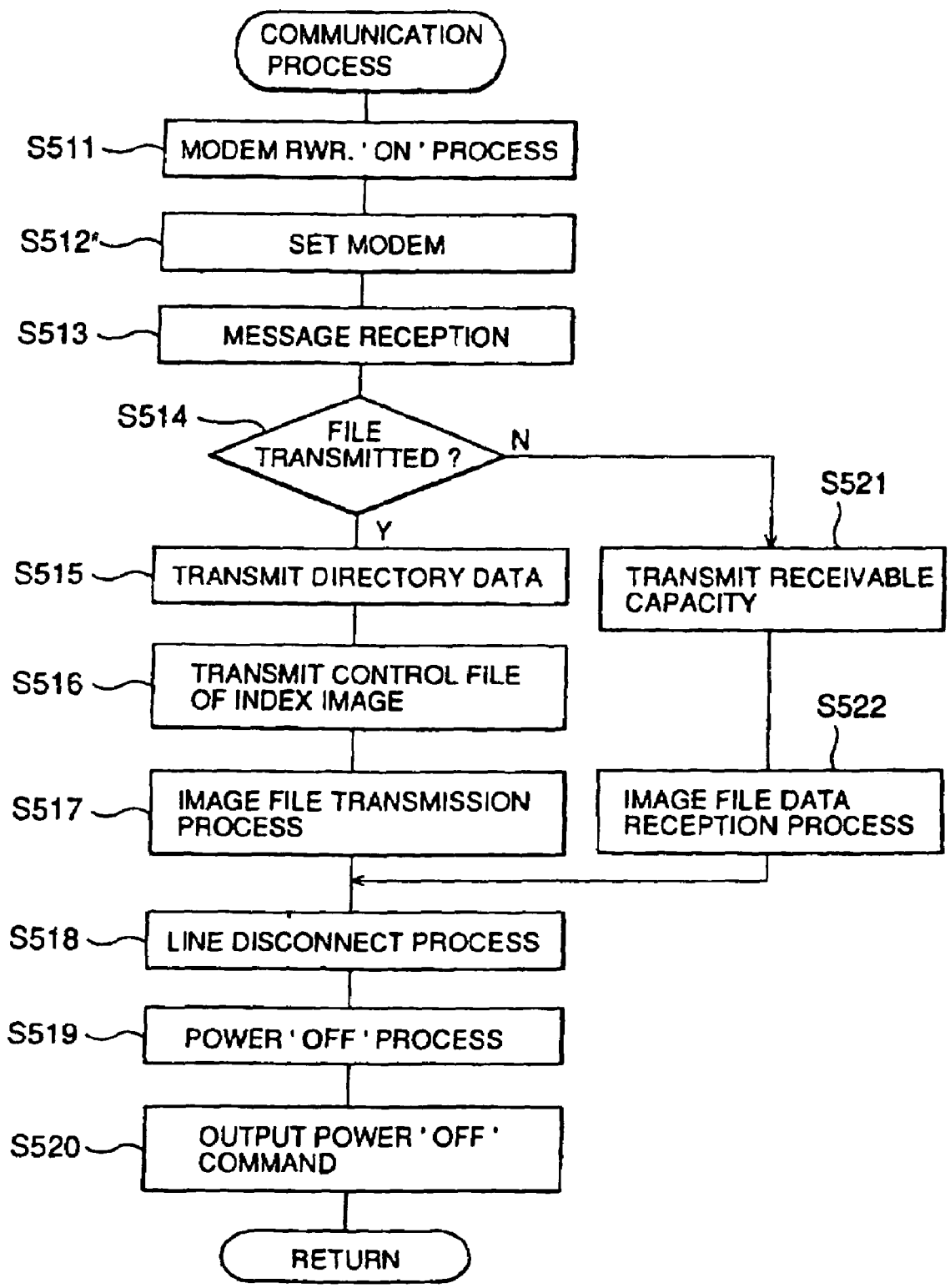
FIG. 98 shows a flow chart of the "communication process" routine.

FIG. 98 is a flow chart of the "communication process" routine. As shown, a power-on process corresponding to the modem communication mode is executed (step S511). This process causes a display on the display 113 to notify that the power-on state is brought about. Then, modem setting is done by transmitting an AT command (step S512). Then, a communication message from the partner side is waited (step S513). Then, whether file transmission is to be done is checked according to the communication message (step S514). When image file data is to be transmitted from the DSC 120 to the camera for the other party 225, a step S515 is executed. When image file data from the camera for the other party 225 is to be received in the DSC 120, a step S521 is executed.

In the step S515, directory data is transmitted, and then a control file of index image with less pixels is transmitted (step S516). Then, image file data is transmitted (step S517), and a step S518 is executed. When the step S521 is selected, memory capacity data, which can be received by the DSC 120, is transmitted (step S521). Then, image file-data is received (step S522), and a step S518 is executed.

In the step S518, the line 223 is disconnected, and then a power-off process is executed (step S519). Then, a power-off command is output from the system controller 110 to the display/switch controller 201 (step S520). Thus, a power-off state is brought about for the system controller 110 and other control elements than the display/switch controller 201, thus bringing an end to the routine.

As has been shown above, when the DSC 120 in this embodiment is to execute communication with an external unit, the power-on state can be brought about simultaneously with the start of communication without need for operation of the power switch of the reception side camera by the user. Further, in the normal waiting state, only the display/switch controller 201 and voltage converter 202 are held operative, while the other circuits are supplied with no power. Thus, effective power saving is possible.

The above embodiment is applied to the DSC as the image recording apparatus, but this is by no means limitative; the invention is applicable as well to a recording and reproducing (play-back) system, the apparatus of which has no image pick-up means.

Now, a modification will be described, in which a PC (personal computer) is applied as an external communication unit for the DSC.

Figure 99:
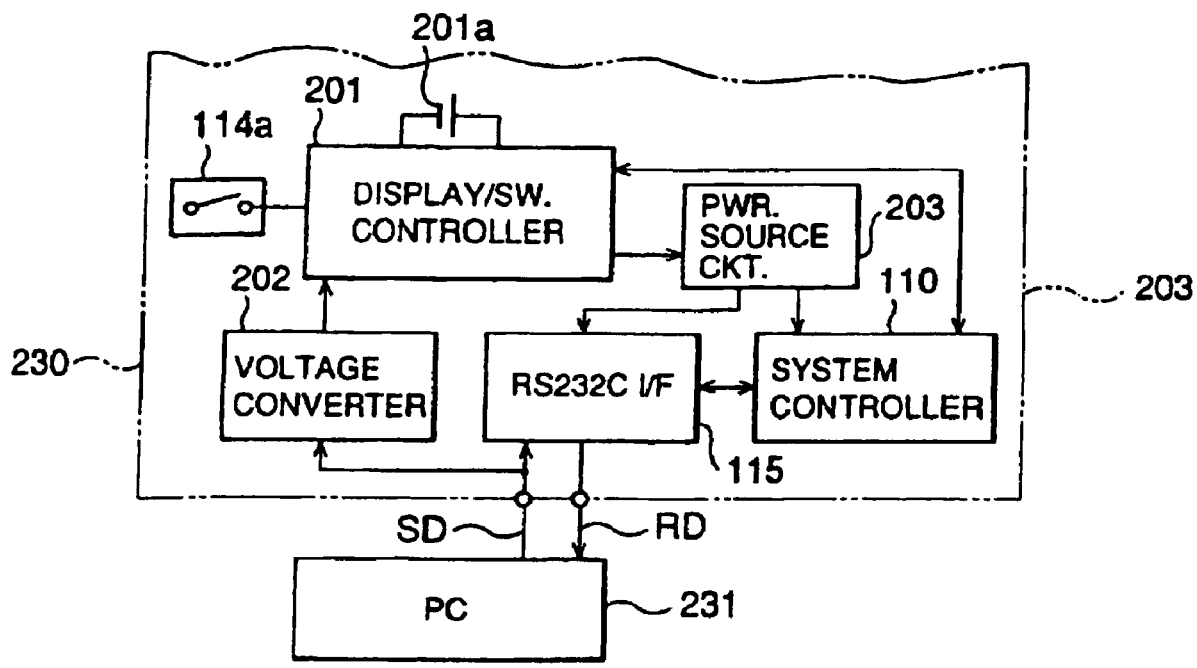
FIG. 99 shows a block diagram showing a system formed by connecting a PC 231 to the DSC 230.

FIG. 99 is a block diagram showing a system, which is formed by connecting a PC 231 to the DSC 230 in this modification. Of the DSC 230 in this modification, only a circuit portion concerning the power supply and communication control, including the system controller 110, display/switch controller 201 and RS-232C I/F 115, is shown. However, elements like those in the preceding embodiment are designated by like reference numerals. The structure which is not shown is the same as in the preceding embodiment.

In this circuit portion, when the PC 231 is connected to be ready for communication, a transmission signal SD is input, which is utilized as a called signal. The transmission signal SD is input to the RS-232C I/F 115, and is also input via the voltage converter 202 to the display/switch controller 201, thus causing a power-on process to make the DSC 230 ready for communication as will be described later. As in the previous embodiment, the signal is input via the voltage converter 202 because of the necessity of voltage conversion since the output voltage range of the PC is ±15 V whereas the operation range on the side of the DSC 230 is 0 to 5 V. When the DSC 230 transmits data to the PC 231, it outputs the transmission data RD of the PC 231 through the RS-232C I/F 115. The connector in the state of communication between the DSC 230 and PC 231 has three leads including the grounding line.

Figure 100:
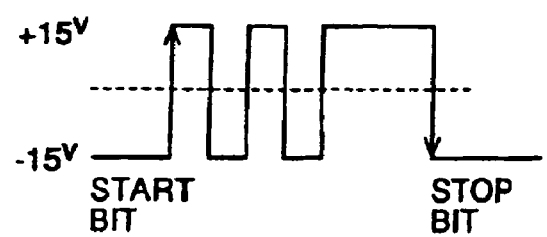
FIG. 100 shows a time chart for the transmitted and received signals SD and RD.

FIG. 100 is a time chart of the transmitted and received signals SD and RD. The signals include a start bit signal, which rises up from −15 V to +15 V at the time of the transmission start and has a predetermined pulse duration, and a stop bit signal, which falls down from +15 V to −15 V at the end of transmission and has a predetermined pulse duration.

Figure 101:
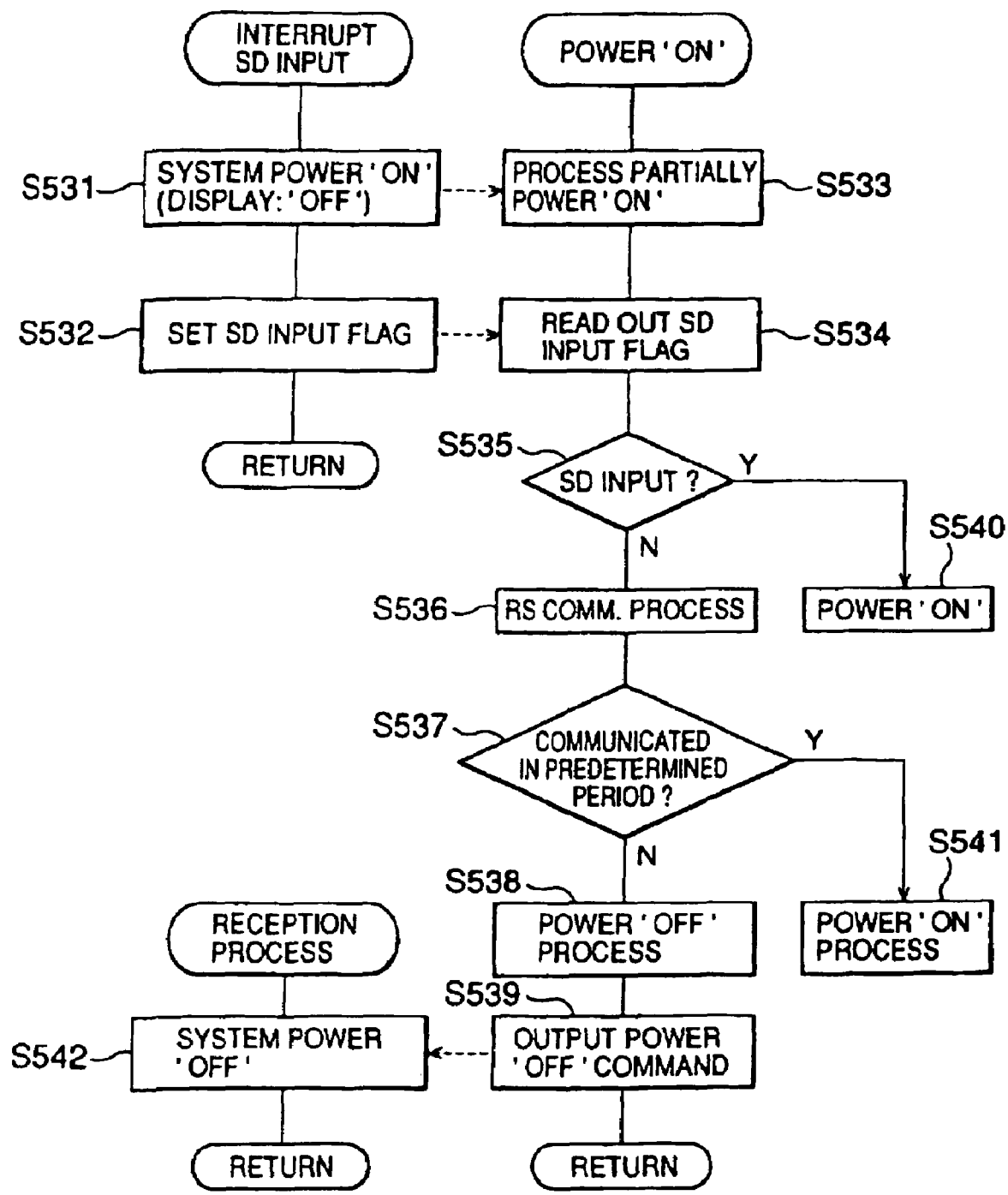
FIG. 101 shows a power-on operation of the circuit portion of the DSC 220 shown in FIG. 96.

Now, the power-on operation of the circuit portion of the DSC 230 shown in FIG. 99 having the above construction, will be described with reference to the flow chart of FIG. 101.

When the transmitted signal SD is input from the side of the PC 231, a "SD interruption" routine is started. First, the power-on state of the entire system is brought about (step S531). At this time, the display 113 is held "off". The display 113 is subsequently turned on when the DSC is made ready for communication. Subsequently, the SD input flag is set to "1" (step S532).

Meanwhile, with the system power-on, a "power-on process" subroutine on the side of the system controller 110 is called, and a partial power-on process corresponding to the power-on in the step S531 is executed (step S533). Again in this partial power-on, no display on the display 113 is caused.

Then, the SD flag is read out (step S534). Then the SD flag is checked (step S535) to check whether there has been the SD input.

If there has been no SD input, it means that the POWER switch in the DSC 230 has not been operated, and a power-on process is executed in correspondence to the camera mode for image pick-up or play-back in the DSC 230 itself.

If there has been the SD input, the communication process by the RS-232C is started (step S536). However, if communication fails to be held in a predetermined period of time, for instance 0.5 second, it is determined that normal data fails to be input (step S537). Then, steps S538 and S539 are executed to execute a power-off process and output a power-off command, thus bringing an end to the routine. When the power-off command is output, a "reception process" routine is called, and a system power-off process by the display/switch controller 201 is executed.

As has been shown, with the DSC 230 in this modification it is possible to bring the camera from the power-off to the power-on state with two signal lines for transmission and reception (three lines with inclusion of a common line). It is thus possible to improve the operation control property of the remote control of the PC from the camera. Of course there are effects noted above obtainable with the DSC in the previous embodiment.

Now, an image communication adapter will be described, which is an apparatus or unit related to the DSC 120 or 230 noted above. It is an externally connected unit, which permits concentrated operations such as modem control, data transmission and reception, camera control, etc. through an external communication line and can improve the cumbersomeness of the camera body key operation and display.

In the prior art DSC, it has been impossible to transmit data directly by using a telephone line, and it has been necessary to provide setting from the PC (personal computer) for the transmission. Further, the recording medium is taken out of the camera and mounted in a separate exclusive transmitter for data transmission therefrom. Further, in a DSC disclosed in Japanese Patent Application No. H2-309875, an adapter is mounted on the camera for transfer of data with the PC via the adapter.

However, the above status of data transmission from the DSC, has cumbersomeness in connection with the take-up of data to the PC for data transmission and also preparations for the exclusive transmitter. Further, the provision of a transmission process section in the DSC complicates the software and also the display and operations. Therefore, this concept has been impractical.

Further, with the DSC disclosed in the Japanese Patent Application No. H2-309875, if it is intended to make communication with an external unit by using a telephone line, it is necessary to connect a telephone set separately from the adapter and call the partner side with the telephone set, which is a very cumbersome status.

The present image communication adapter can preclude the above deficiencies and permits the operation and display concerning the data transfer to be effected on it, thus preventing the operation control of the camera and display from becoming cumbersome.

Figure 102:
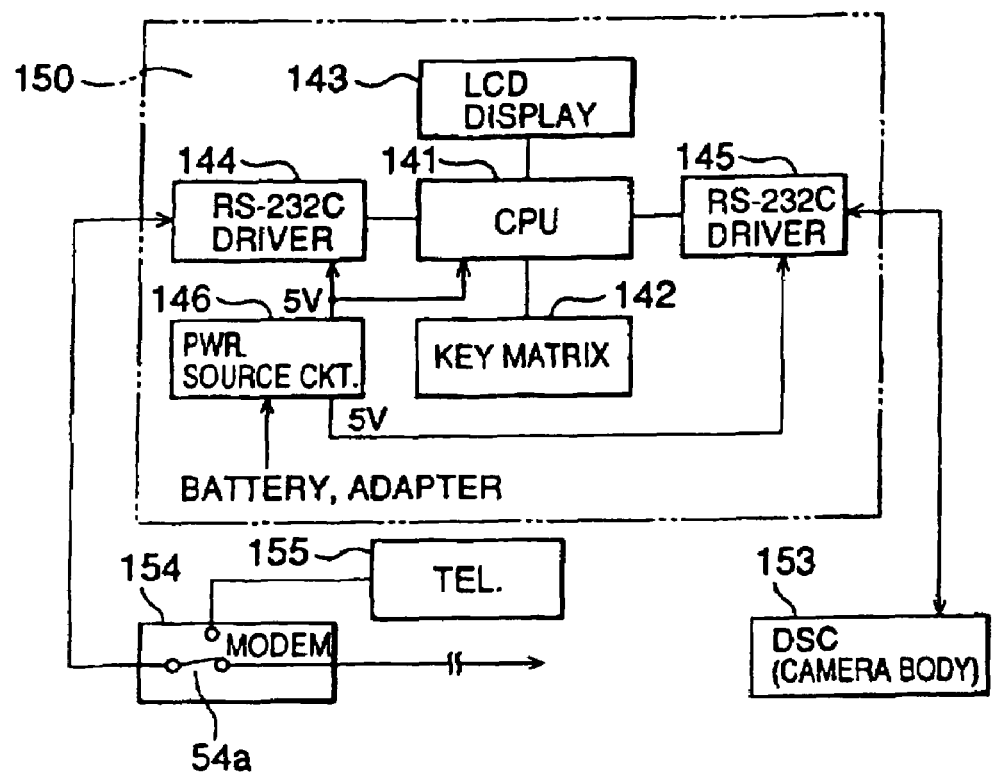
FIG. 102 shows a block diagram of the adapter 150 and the connection of DSC 153.
Figure 103:
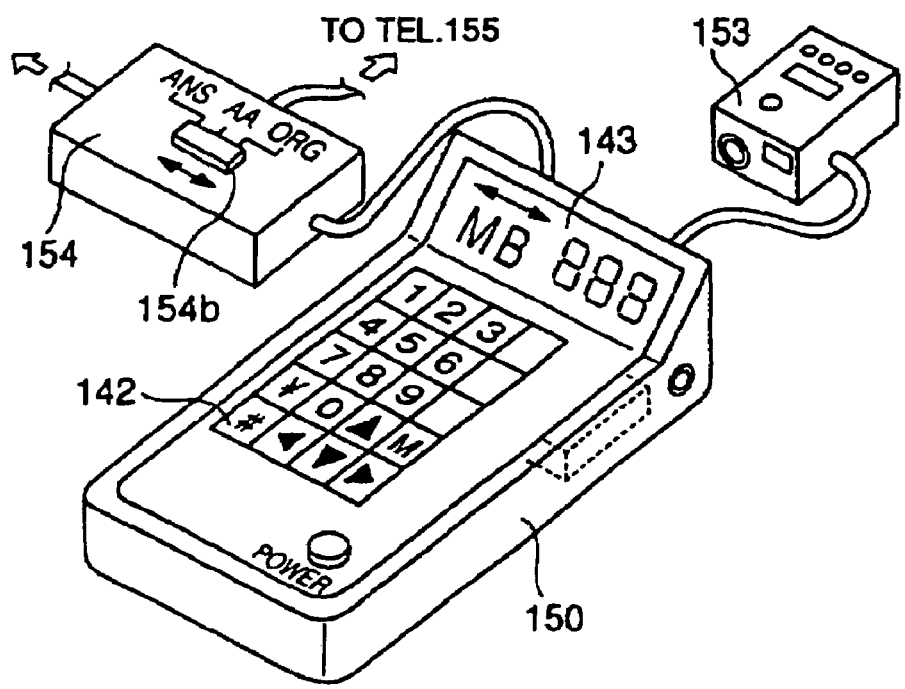
FIG. 103 is a perspective view showing the state of connection between the adapter 150 and each connected apparatus or unit.

FIG. 102 shows a block diagram of the present adapter 150 and also the connection of DSC 153, which is a camera connected to the adapter 150, modem 154 and telephone set 155. FIG. 103 is a perspective view showing the state of connection between the adapter 150 and each connected apparatus or unit.

The adapter 150 has its control elements controlled by a CPU 141. Communication with the modem 154 is made via an RS-232C driver 144 which is a second interface, and communication with the DSC 153 is made via an RS-232C driver 145 which is a first interface. A key matrix 142 is disposed as operating means, which comprises ten keys and frame designation key for designating the telephone number of a communication telephone line or instructing an operation to the DSC 153 or memory keys for storing a telephone number. Its output is input to the CPU 141. An LCD display 143 is provided for displaying a telephone number, a frame number, the partner side of communication, whether currently the camera or modem side is in operation, whether data is being transmitted or received, etc. A power source circuit 146 is provided to supply drive power to the RS-232C drivers 144 and 145 and CPU 141.

The modem 154 includes a switch 154*a* to permit switching of the connection to the telephone set 155 or a different DSC or PC. The telephone set 155 is not essential, but it is possible to call the partner side of communication via the telephone set 155. The modem 154 also includes a manual transmission/reception switch 154*b* to be described later. As the basic specifications of the modem 154, generally utilized modem specifications may be used.

The operation of the DSC 153 utilizing the adapter 150 having the above construction will now be described in connection with communication. When a called signal from the modem 154 is received by the RS-232C driver 144 of the adapter 150, it is output from the RS-232C driver 145 via the CPU 141 to the DSC 153, whereby a power-on process for starting communication with an external unit is executed. This process is the same as the power-on process described before in connection of the previous embodiment of the invention. However, it is possible to execute a modem power-on process. Subsequently, image information or the like may be transmitted or received via the drivers and CPU.

By the way, using the adapter it is possible to select, prior to communication, the partner side thereof by operating the ten keys in the key matrix 142 shown in FIG. 103, and setting designation and management of the frame number on the side of the camera 153, and image pick-up conditions and so forth. The communication switching between the telephone line and camera in the modem 154 is possible by operating the knob of the manual transmission/reception switch 154*b* shown in FIG. 103. The manual transmission/reception switch 154*b* provides functions as shown in FIG. 103(A) below corresponding to switch knob positions ANS, AA and ORG. The adapter 150 may of course be integral with the modem 154.

Now, an image data file management system in the DSC 120 in the above embodiment will be described, which may be a FAT system supported by the DOS as described before or an image data management system using a similar memory management system and capable of convenient use.

Figure 104:
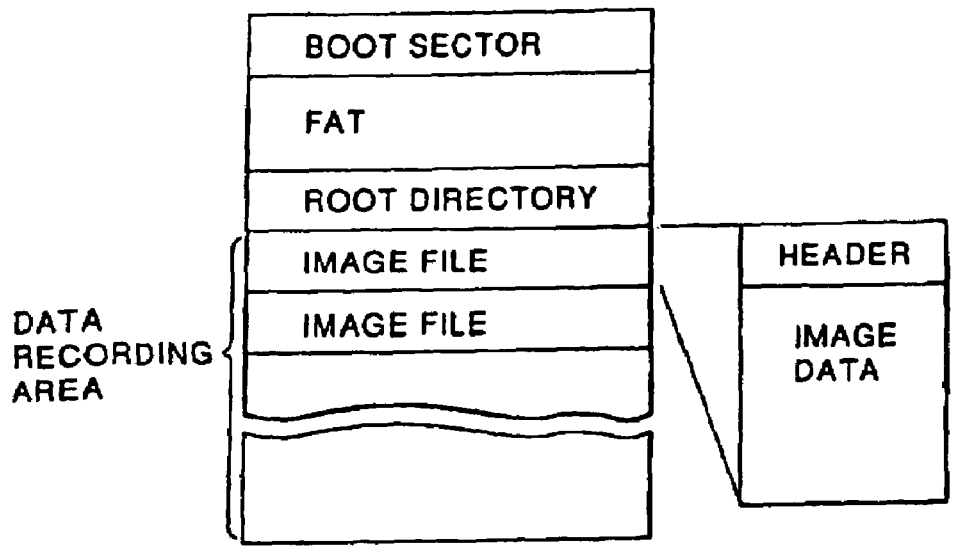
FIG. 104 is a view of the memory area arrangement in the memory card as recording medium.

In the DSC image data is recorded as data file in the memory card as recording medium by image pick-up or communication. FIG. 104 is a view the memory area arrangement in the memory card as recording medium. As for the memory area, as proposed by JEIDA (Japan Electronic Industries Development Association), in a boot sector area FAT (file allocation table) to be described later and root directory (hierarchical structure) are stored as management area information because the OS (operating system) of the I/F of the DSC uses DOS.

The format of the boot sector is shown in FIG. 78(C). This format conforms to "IC Memory Card Guideline Ver. 4.1" as proposed by the JEIDA. In the boot sector, in a forefront portion a command for jumping to boot code, manufacturer's name, etc. are stored, and in a subsequent region shown as BPB is stored DOS management information, i.e., management information about FAT and directory. By reading out these data, it is possible to interpret FAT and directory. These data are given some degree of freedom.

Further, data recording area information is recorded in a chain form in the FAT area, and information about how data is recorded in data recording area to be described later is recorded in the root directory area.

Figure 105:
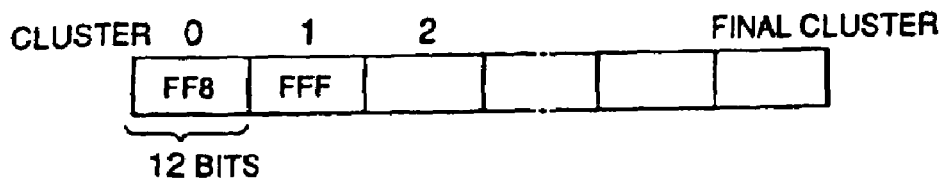
FIG. 105 is a view showing the configuration of the FAT which is recorded subsequent to the boot sector.

FIG. 105 is a view showing the configuration of the FAT which is recorded subsequent to the boot sector. In the FAT data recording area, individual entries correspond to respective clusters, e.g., 2nd cluster, 3rd cluster, . . . , final cluster. Each entry has a 12-bit configuration. The first two entries, i.e., entries 0 and 1, are for system reservation. The FAT data structure is of a chain structure starting with an entry designated by directory and designating successive clusters. The chain ends with OFFFH (H being indicative of the hexadecimal system). Entry data "0" indicates the non-use state. Subsequent to the FAT root directory information is stored.

Figure 106:
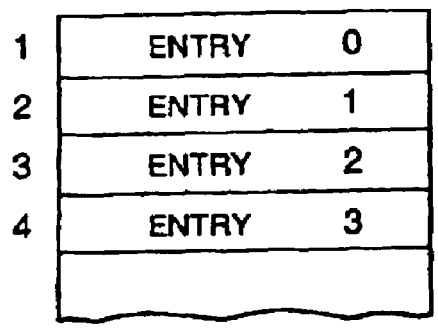
FIG. 106 shows entries constituting the root directory.

FIG. 106 shows entries constituting the root directory. These entries 0, 1, . . . correspond to image files of data areas of respective frame numbers. When a sub-directory is produced, however, the corresponding entry becomes a directory entry for the sub-directory. The sub-directory data is stored in the data area. In entry 0 of the sub-directory are stored the file name "•" and own position information. In entry 1 are stored the file name "••" and higher-order directory position information. Directory data are stored in entry 2 and following entries.

Figure 107:
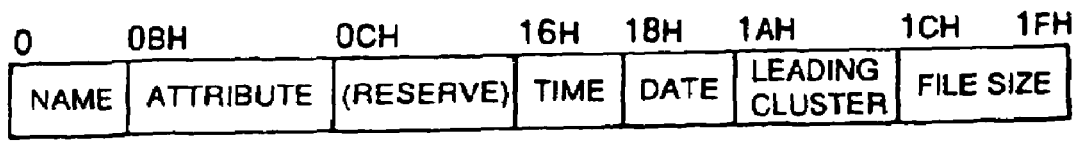
FIG. 107 shows a format of a 32-byte directory.

FIG. 107 shows the format of a 32-byte directory entry. Attribute values and attribute contents are shown in FIG. 62(A).

The data recording area provided subsequent to the root directory area is constituted by image files. In each image file is written data for one frame of image. As shown in FIG. 104, each image file comprises a header and an image data section for storing image itself.

Figure 108:
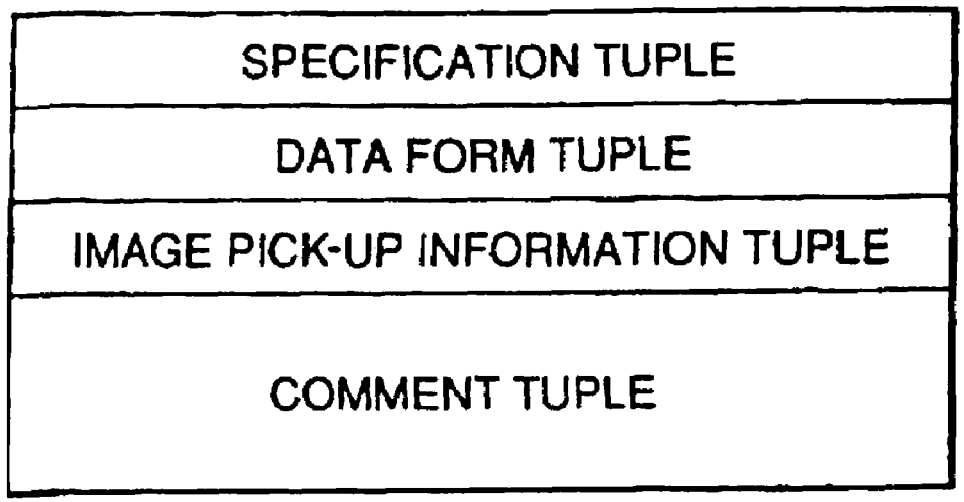
FIG. 108 shows a specification tuple, a data form tuple, an image pick-up information tuple and a comment tuple stored in the header. entry.

As shown in FIG. 108, in the header are stored a specification tuple, a data form tuple, an image pick-up information tuple and a comment tuple. The specification tuple gives specification version, kind of file, i.e., whether the file is of video, sound or control, and header size. The data form tuple gives the form of the file body, i.e., the form of holding image data such as JPEG, non-compressed, PICT, etc. In the image pick-up information tuple is recorded image pick-up information such as the shutter speed, stop, etc. In the comment tuple is recorded explanation of image pick-up, etc.

Figure 109:
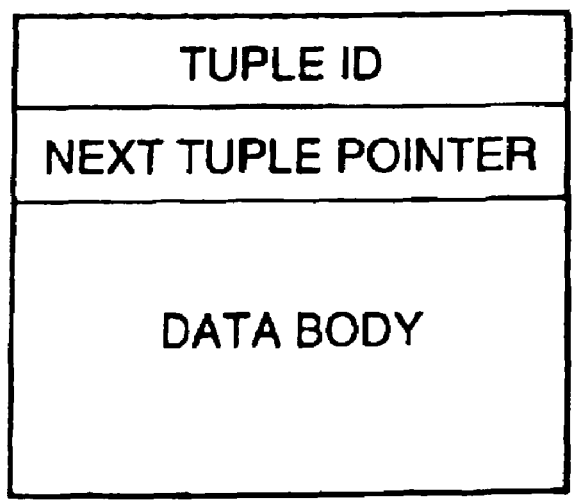
FIG. 109 is a view showing the data configuration of the tuple type.

FIG. 109 is a view showing the data configuration of the tuple type. This tuple comprises a tuple ID representing prescribed data, the next tuple pointer and tuple data.

In the prior art DSC image file management method, the size of one image file area, as shown in FIG. 110(A), is determined and variable according to the extent of compression of picked-up image data. However, when erasing one image data and recording a separate image data in that area, the data area may be small and insufficient. In such a case, it has been necessary to record the excess portion of the image data in a separate cluster. Further, since the size is variable, it has been impossible to indicate the accurate number of remaining frames ready for recording.

Accordingly, an apparatus and a method of image data encoding have been proposed, as disclosed in Japanese Patent Laid-Open Publication H4-167868. The disclosed apparatus concerns an encoder for controlling the coding amount to be constant. By applying this image data encoding, it is possible to make the coding amount per picture to be constant with a DSC, in which data is compressed by means of quantization and entropy encoding method in conformity to JPEG standards.

However, because of the data compression by entropy encoding a certain error is produced in the coding amount as a result. Therefore, it has been impossible to accurately determine the number of image data files ready for recording.

Japanese Patent Laid-Open Publication H4-183066 discloses an image processing system, in which a compression rate is set by identifying the input image size. In a presently proposed image data management system to be described later, the input image size is preliminarily fixed, and thus the method of encoding is different.

The proposed image data management system can overcome the above deficiency. In this system, means is provided, which can make the file size constant or fixed even if the size of the image data body is not accurately constant. Thus, the number of image data frames capable of recording in a medium can be certified, thus improving the convenience of use. Now, the image data processing system as noted above will be described in detail.

Figure 111:
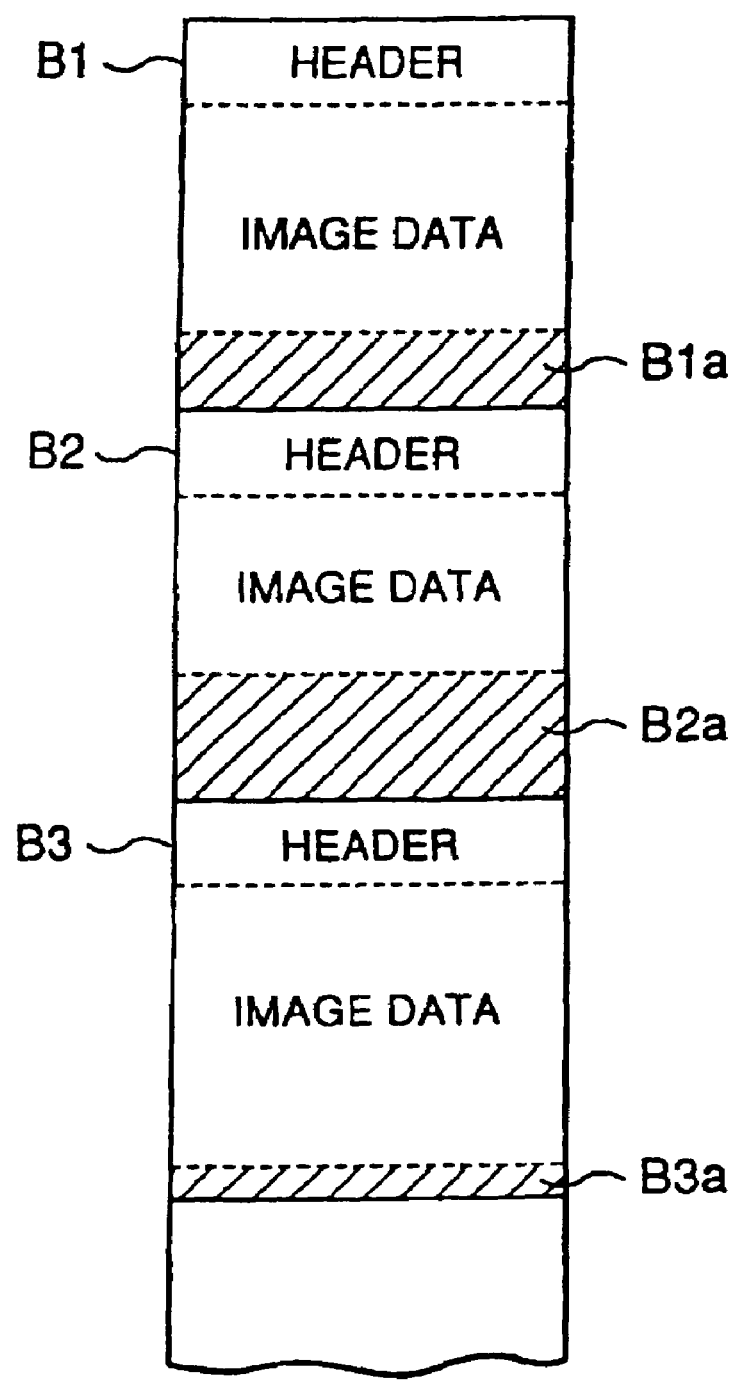
FIG. 111 is a view showing an image data recording area which is provided subsequent to a data management area in the proposed image data management system.

FIG. 111 is a view showing an image data recording area which is provided subsequent to a data management area in the proposed image data management system. As shown, each of image files B1, B2 and B3 comprises a header, an image data section and each of "0" data sections B1a, B2a and B3a. In the "0" data sections B1a, B2a and B3a, value "0" is written. As shown, the size of the area is varied according to image data. Further, the header recording area need not be constant. While in the example of FIG. 111 the image file size is constant, the file size may suitably be varied using a switch or the like.

The operation of data recording in image data file using the proposed image data management system, will now be described with reference to the flow charts of FIGS. 112 and 113. The DSC itself is of the same structure as described before in connection with FIG. 95 and will be described with the same reference numeral.

Figure 112:
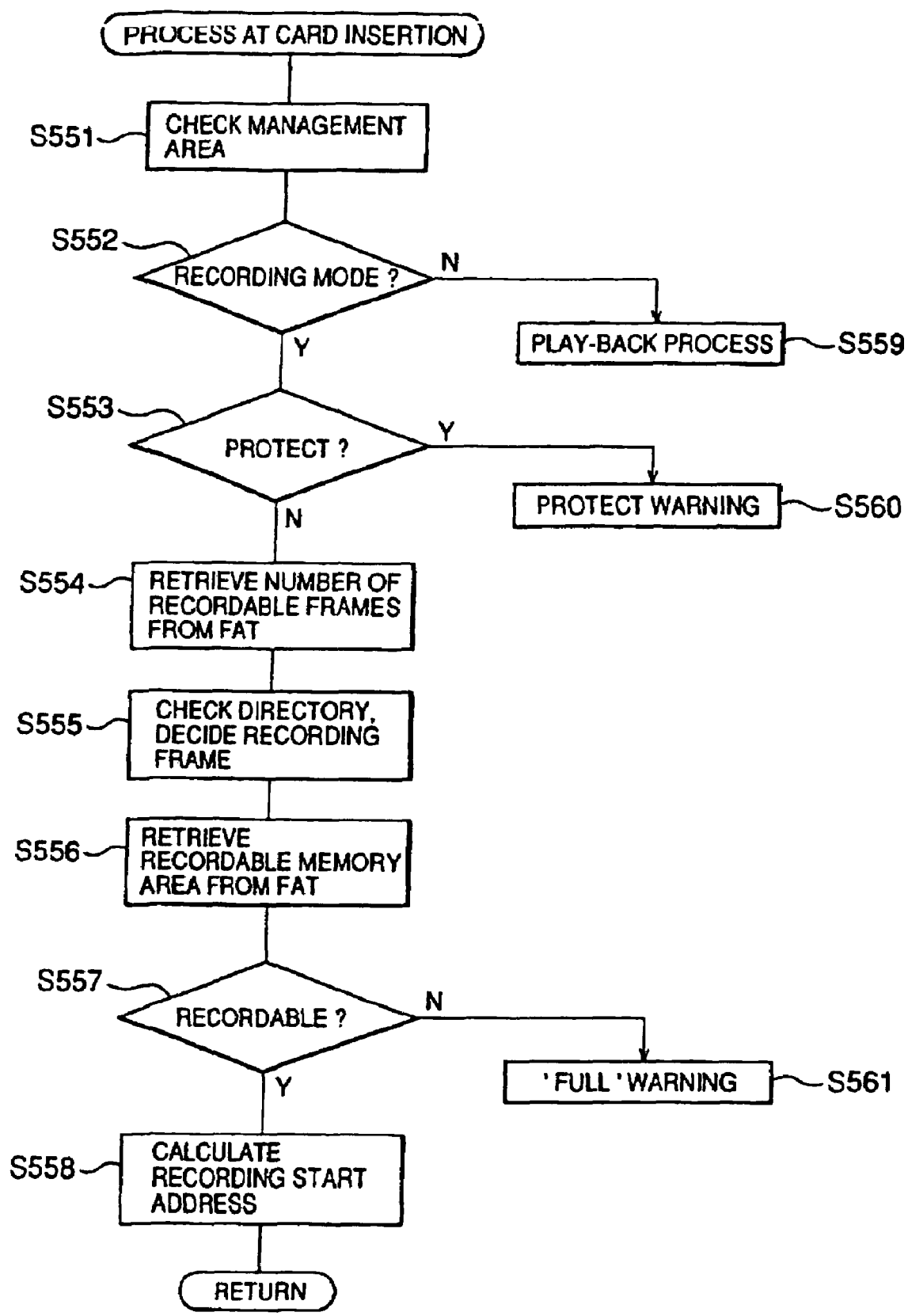
FIG. 112 shows a "process at the time of card insertion"
Figure 113:
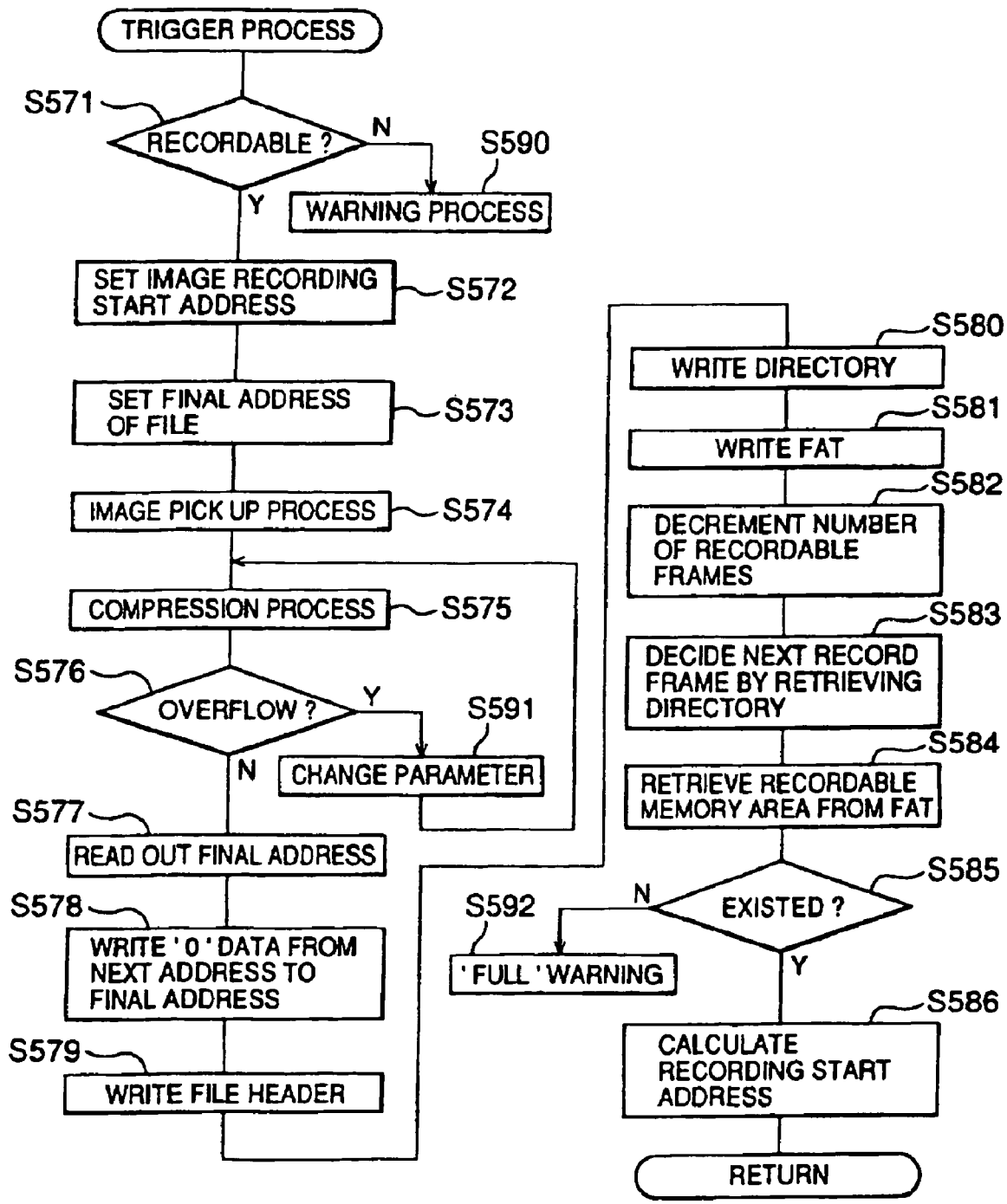
FIG. 113 shows an operation of executing image pick-up with depression of the trigger switch 119.

FIG. 112 shows a "process at the time of card insertion". First, a management area such as boot sector in the memory card 117 is checked (step S551). Then, a check as to whether the recording mode prevails is done (step S552). If the recording mode does not prevail, a play-back process is executed (step S559). If the recording mode prevails, a check is done as to whether the memory card 117 is provided with protection (step S553). If the protection is provided, warning is issued (step S560). If no protection is provided, the number of frames capable of recording is retrieved from the FAT (step S554). In this case, the accurate number of frames capable of recording can be obtained because the image file size is fixed or set.

Further, recording frames are determined by checking the directory (Step S555). Then, a sufficient memory area for writing image data is retrieved from the FAT (step S556). If it is found as a result of a check (step S557) that there is no area capable of recording, a warning is issued (step S561). If an area capable of recording is detected, a step S558 is executed, in which the recording start address is calculated and is stored in a memory in the system controller 110, thus bringing an end to the routine.

Now, the operation of executing image pick-up with depression of the trigger switch 119 will be described with reference to the flow chart of a "trigger process" shown in FIG. 113.

When the trigger switch 119 is depressed while the recording mode has been set up, the trigger process is called, and a check as to whether it is ready to record is done (step S571). If there is no empty memory area, unless it is impossible to record data such as the presence of the protection, a warning is generated (step S590). If it is possible to record data, an image recording start address is set (step S572). Then, the file final address is set from the fixed file size noted above (step S573). Further, compression specifications, i.e., compression parameters, which do not exceed that address are set. Then an image pick-up process is executed (step S574), and a compression process is executed (step S575). A check is then done as to whether there has been an overflow of the compressed data (step S576). If there is an overflow, the compression parameters are changed (step S591), and then the step S575 is executed. The parameter change process is not executed so much if appropriate setting has been done in the step S573.

If it is confirmed in the step S576 that there is no overflow, the final address is read out (step S577). Further, value "0" is written in the next address to the final address of the pertinent image data file (step S578). If the data in this area may not be "0" but may be indefinite data, the process in the step S578 is unnecessary. In a subsequent step S579 the file header is written, and then a step S580 is executed.

In the step S580, the directory is written. In this case, the file size is fixed. Then, FAT is written (step S581). This is done so for setting a state, in which the FAT of the used memory area has been used. When this process is done, the DOS management area setting has all been ended.

Then, the number of frame capable of recording is decremented (step S582), and the next recording frame is determined by retrieving the directory (step S583). Then, a memory area capable of recording data is retrieved from the FAT (step S584), and a check is done as to whether there is the area (step S585). If there is no area capable of recording, a warning is generated (step S592). If there is an area capable of recording, a step S586 is executed, in which the recording start address is calculated and stored in a memory in the system controller 110, thus bringing an end to the routine.

As has been shown, with a camera, to which this system is applied, it is possible to permit speed increase of the compression process through control such as to permit certain fluctuations so long as the image data size is less than a predetermined value. Further, by fixing the file size it can be guaranteed that the an intermediate memory area is in a released memory area in the one frame erase mode, thus permitting effective use of memory. Further, it is possible to increase the continuous image pick-up speed of the camera, thus facilitating the DOS management.

While the DSC used with the memory card as the recording medium has been described, the invention is applicable as well to other recording media, such as flexible disks, hard disks and other magnetic recording media and further optical recording media.

In the DSC that has been described earlier, a large number of still images are recorded as data files in an information recording medium such as a memory card or a floppy disk. Thus, the image information retrieval property naturally determines the commercial value or utility value of the DSC.

In the meantime, the DOS (disk operating system) of personal computers which is currently popular in various fields, generally uses an information file management method based on a hierarchical structure, i.e., hierarchical directories. In the method of information file management based on the hierarchical structure directories, the position of recording area on memory for recording each file data (corresponded by memory cluster number) and file name are registered in a register, i.e., a commonly termed directory. The file may, if necessary, be designated via the directory name and file name in dependence on its kind and content, thus permitting retrieval of a file of desired information.

Figure 114:
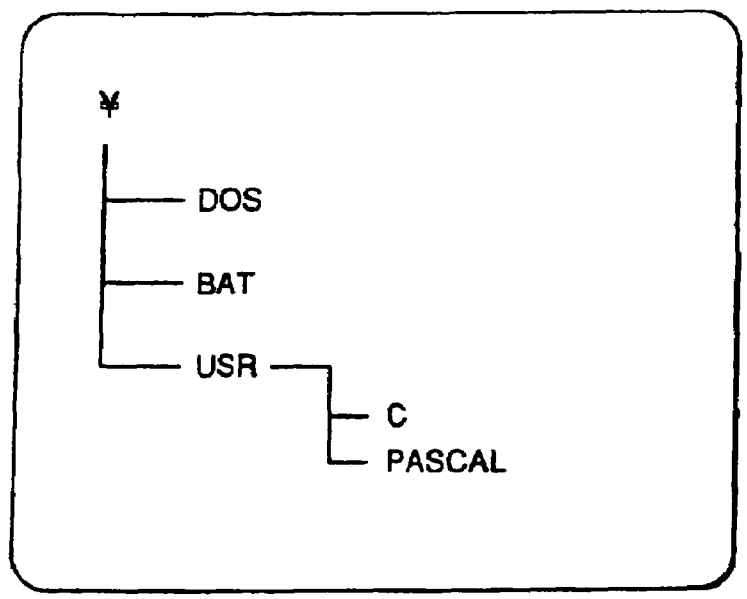
FIG. 114 shows an example of display of the tree structure.

When the operator of the personal computer desires visual observation of the status of classification of information files on the basis of hierarchical directories, registered positions of information files can be known by displaying the tree structure of the hierarchical directories on a monitor. FIG. 114 shows an example of display of the tree structure. A root directory which is shown by mark "V" comprises three sub-directories "DOS", "BAT" and "USR". As for the sub-directory "USR", it is readily possible to designate or confirm a desired information file by operating a keyboard while observing the sub-directory tree structure of "C" and "PASCAL" which are in a one level lower layer. This method of file selection and designation is particularly very useful in case when file has many complicated branches.

In the personal computer file system, the files that are recorded have various sizes. For economically utilizing the memory area, the file data are recorded successively by finding empty memory areas, usually clusters as units of memory area. The state of sequence of one file area is stored, and at the time of play-back and output, the sequence is played-back or output as a file. The file arrangement information area, in which the sequence of file recording area is stored, is called FAT (file allocation table).

With the prior art DSC, image information is picked up for each theme, for instance "sports meeting", "picnic", "trip", etc., and is merely successively recorded in a recording area of the medium. However, when it is desired to play-back picked-up pictures, these pictures have to be selected from a large quantity of image information for specific themes or dates. If the search is done by mere button operation, the efficiency is inferior, and the user can not withstand the cumbersomeness. This inconvenience is pronounced in case of a recording medium, in which recorded data is erased or superimposed image data is present. Further, with an electronic camera which is used with a large capacity memory card as recording medium, the conventional sole button operation as noted above is disadvantageous time-wise as well, thus greatly spoiling the commercial value.

The use of the method of the hierarchical structure directory tree type display as noted above for the management and display of image information records obtained with an DSC, is suitable for the management of a large quantity of still image information as noted above and further extends the scope of utility of the DSC itself.

However, the electronic camera should be compact in shape in view of its portability. In addition, it can not be provided with a keyboard, which has a switch group for the tree display. Therefore, it has been in practice to have resort to the conventional pure button operation to select play-back images.

The following embodiment of the invention can preclude the above deficiencies. The embodiment is an electronic image pick-up apparatus, in which even without any large size monitor section or a keyboard section that is applicable to a personal computer or the like file, file information of image information recorded with a directory structure is displayed in a limited display section area by making use of the merits of the tree display, thus permitting efficient and quick selection of play-back pictures of image information as required for the electronic image pick-up apparatus.

The embodiment includes directory structure information recording/reproducing (play-back) means for recording or playing-back image information with a directory structure on or from a recording medium. The embodiment also includes directory structure position display means, which can display on its own display the positioning on directory of information that is to be or has been recorded or played-back by the directory structure information recording/reproducing means.

Figure 115:
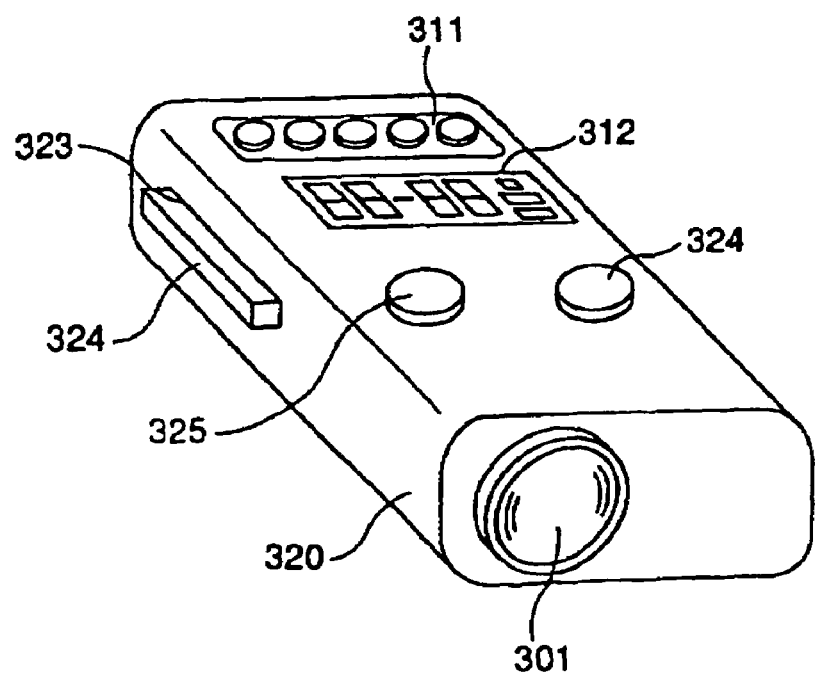
FIG. 115 shows a perspective view showing DSC as the embodiment of the electronic image pick-up apparatus.
Figure 122:
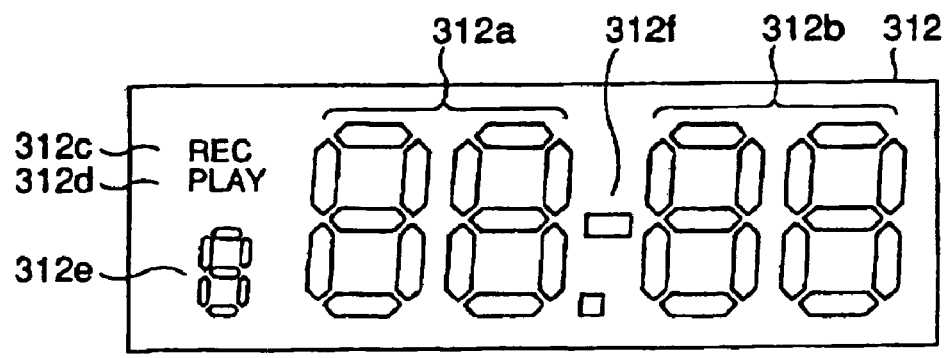

FIG. 115 is a perspective view showing an DSC as the embodiment of the electronic image pick-up apparatus. The DSC as this embodiment is used with a solid memory card as image information recording medium. This type of DSC is hereinafter referred to as DSC (solid-state memory camera). In the DSC, picked-up image data for each picture is stored as data file in the memory card. At this time, as file information (i.e., information about the configuration of file that is set on the recording medium), is used positioning information about file configuration which may have a hierarchical structure supported by the personal computer DOS, i.e., (hierarchical) directory file information, for recording or playing-back image data. Further, the display of the file information with the hierarchical directory is provided as a display on a LCD display 312 as shown in FIG. 122, which is a one-line hierarchical structure positioning information display means comprising a first and a second display section 312a and 312b.

As shown in FIG. 115, in the DSC a camera casing 320 has an image pick-up lens 301 provided at its front, and one of its sides has a card insertion opening, through which a memory card 314 can be inserted and taken out. The top of the camera casing 320 has a power switch 324 for turning on and off the power source and a recording switch 325 as a release switch. Further, a top rear portion of the camera casing 320 is provided with operation switches 311 for recording and play-back operations, etc. and also with a LCD display 312 for displaying file information (i.e., information about the file configuration) by hierarchical directory (root directory and sub-directory) of image data.

Figure 116:
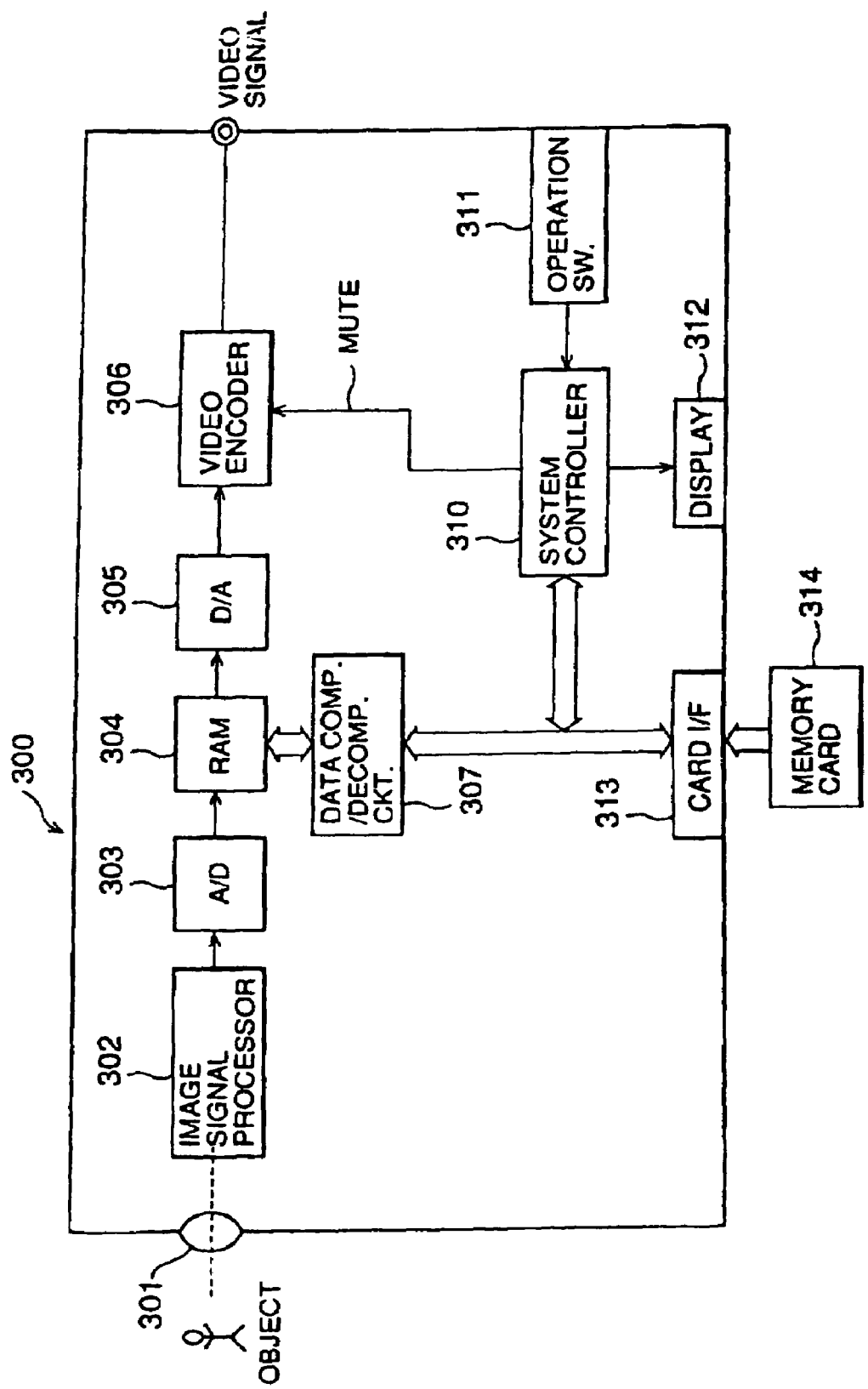

FIG. 116 is a block diagram showing a signal processing system of the DSC. As shown, in the DSC when recording or playing-back image, the memory card 314 is inserted in a card interface (I/F) 313 to be ready for recording or play-back. In the image pick-up state, foreground image is focused by the image pick-up lens 301 on a CCD or like image pick-up element which is provided in an image signal processor 302, whereby an image signal is output to an A/D converter 303. Image data that corresponds to the image signal having been digitalized in the A/D converter 303, is converted again to an analog signal in a D/A converter 305 and then subjected to a predetermined encoding process in a video encoder 306 to be output as a video signal. When the play-back data is from a non-recorded area, a muting process is performed in the video encoder 306 according to a mute signal provided from a system controller 310.

When recording image data on memory card, image data from a RAM 304 is read out block by block and then compressed in a data compressing/decompressing circuit 307 in an orthogonal conversion encoding process using DCT (discrete cosine transform) or the like before being input through a bus to the card I/F 313. The compressed data is thus written in a designated area of the memory card 314. The recording area is designated by the hierarchical directory.

In play-back, an image file to be played-back is designated with reference to directory information of the image file as a subject of access as displayed on the LCD display 312. According to this designation, a memory area of the memory card 314 is selected, and corresponding image data is read out via the card I/F 313 to be input via the bus to the data compressing/decompressing circuit 307. In the circuit 307, the image data is decompression decoding processed. The processed data is stored in the RAM 304. The image data is read out again from the RAM 304 to be converted in a D/A converter 305 into an analog signal. The analog signal is then encoded in a video encoder 306 to be output as a video signal.

A system controller 310 supplies predetermined control signal to various parts of the DSC according to instructions from the operation switch group 311. It also effects hierarchical structure information play-back control with image data directory and also display control management of the hierarchical structure (i.e., file information).

Figure 117:
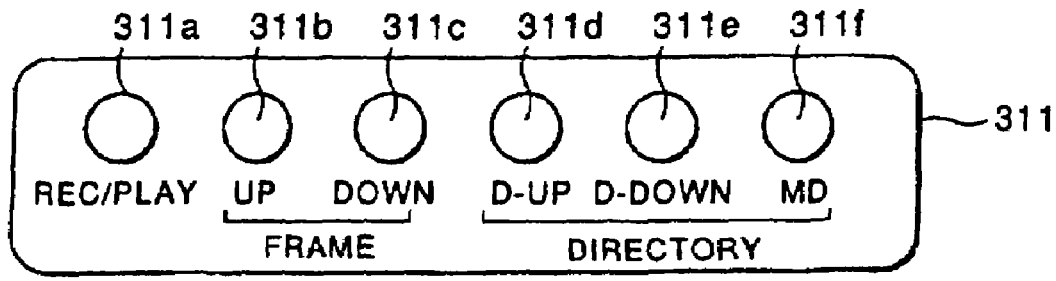

FIG. 117 shows the switch arrangement of the operation switch group 311. As shown, the switch group comprises a REC/PLAY switch 311a for switching recording and play-back modes, a frame UP switch 311b for one frame up accessing image data file registered in the hierarchical directory according to the directory sequence at the time of the recording/play-back, a frame DOWN switch 311c for one frame down accessing image data file, a D-UP switch 311d for up shifting the layer of the hierarchical directory of the image data file as a subject of retrieval for recording/play-back, a D-DOWN switch 311e for down shifting the hierarchical directory layer, and a MD switch 311f for producing an area of the hierarchical directory to let image file to be ready for recording in that directory.

As for the DSC image data, one frame of image data is handled as a file. The hierarchical directory file system is utilized to manage the recording and play-back of the image file. The file system in the DSC will now be described briefly.

Figure 118:
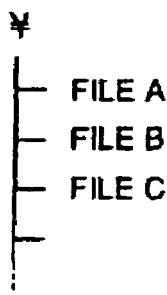
Figure 119:
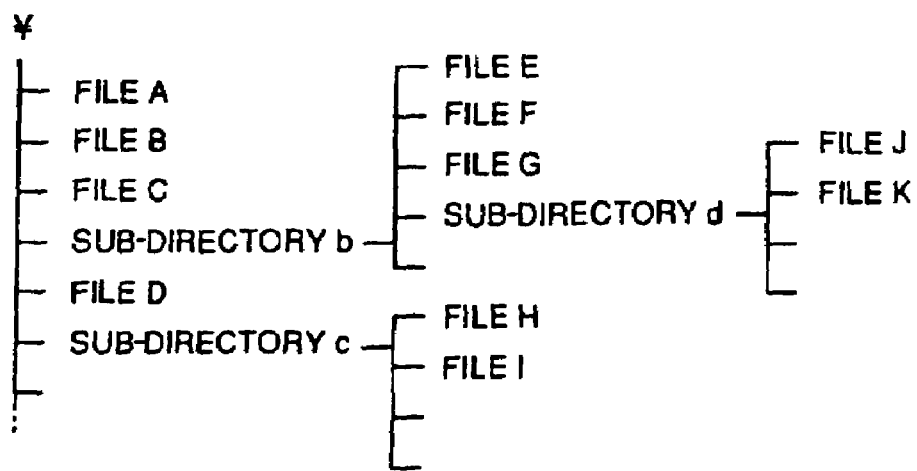

The memory card 314 has memory areas which are assigned to a FAT area for recording the FAT information therein, a root directory area for recording root directory information therein, and a data area for recording image data body therein. When recording image data in the non-use state, i.e., in a state without provision of any new directory area, as shown in FIG. 118, the file name, file A, file B, . . . are registered in the root directory, and image data are recorded successively in the designated memory areas. In FIG. 118, mark "Y" designates the root directory. When a sub-directory is produced in the root directory, sub-directory b is registered in the root directory, thus securing a sub-directory in the low-order layer, i.e., the second layer, with directory name b, as shown in FIG. 119. In the sub-directory b, image data files, the file names of which are files E to G, can be registered. As the directory information, cluster numbers indicative of the positions of memory areas, in which file data are stored, are written in directory entries to be described later, and files are accessed according to that information.

It is possible to produce a sub-directory d in the third layer in the sub-directory b. In such sub-directory, files J, K, etc. can be recorded. Further, as shown in FIG. 119, by producing a separate sub-directory c in the root directory, files H, I, etc. can be registered in the second layer directory. The image files to be recorded in the above individual sub-directories may be registered in a classified state, for instance into a group of the same theme scene pictures or a group of pictures picked up in the same image pick-up period.

As for the image data play-back, if it is desired not only to successively play back image data files A, B and C in the root directory but also to play back sole files E, F and G of classified image data, this can be done by selecting the sub-directory b directly. By so doing, desired data can be quickly played-back.

Figure 120:
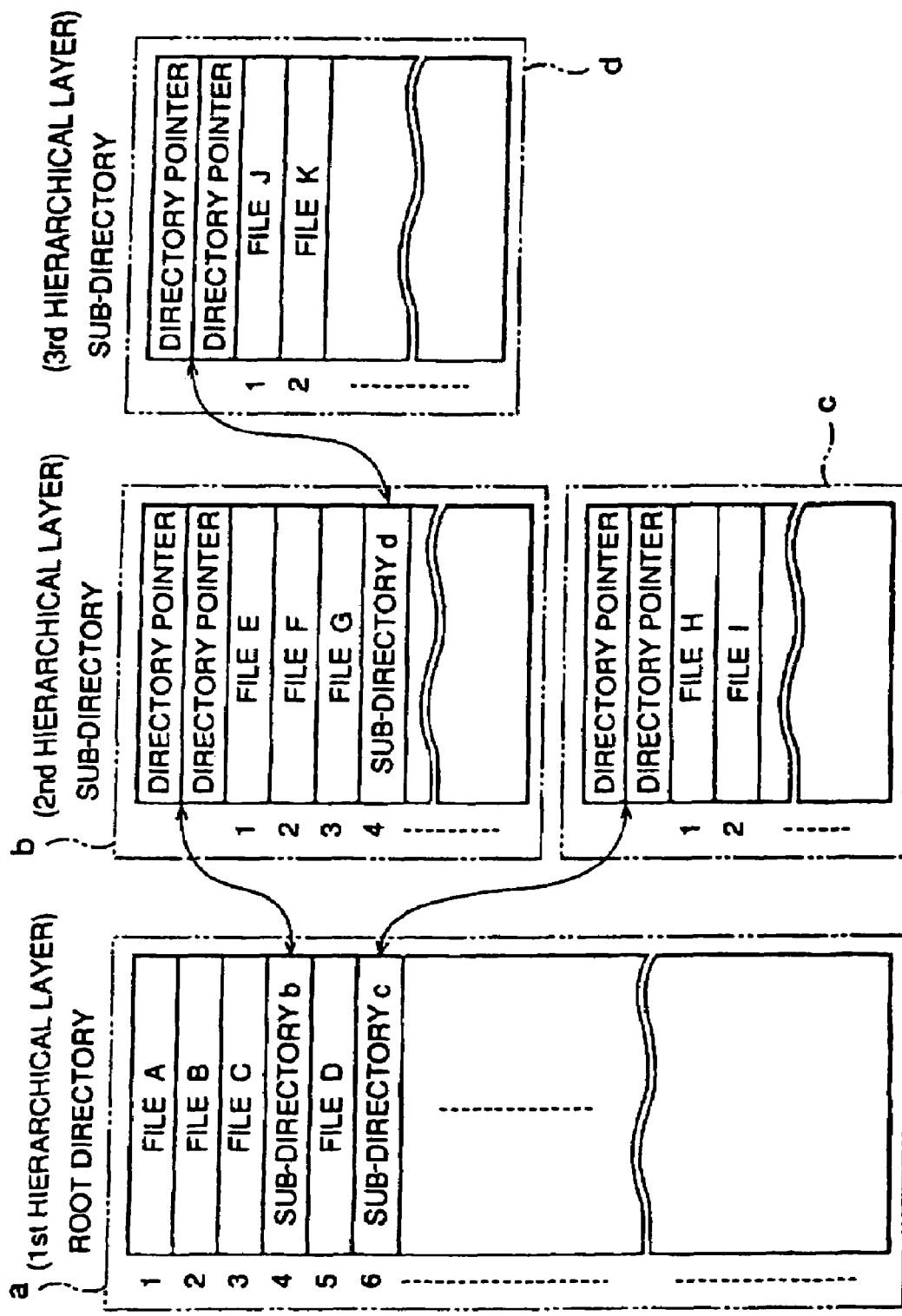

FIG. 120 is a view showing a further specific example of the hierarchical directory structure shown in FIG. 119 for image data files in the DSC. This hierarchical directory comprises a root directory a, second layer sub-directories b and c and a third layer sub-directory d, these directory and sub-directories being in a tree-like relation to one another. In each directory information recording area, except for the root directory, at the leading 2-byte directory pointer indicative of the a memory area, in which the high-order directory information is stored, is written. It is possible to return from this pointer to the high-order directory position. In a subsequent area, a sub-directory or directory entry as image data file directory information is recorded.

Figure 121:
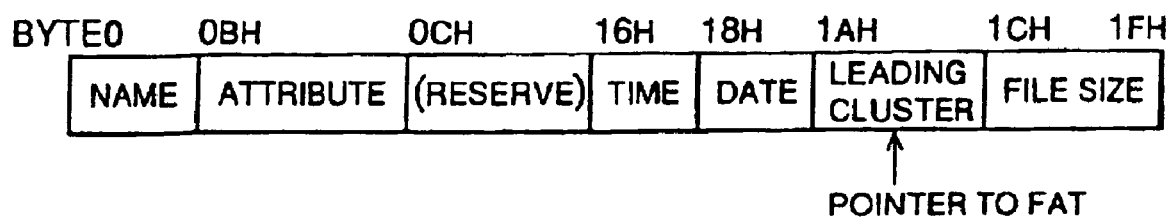

FIG. 121 shows the directory entry. As shown, the file name, attribute, time instant of production, date of production, leading cluster number at the position of recording of the corresponding file or sub-directory, file size, etc. are recorded. As for the file name, the file name is registered when the corresponding file is a data file, while a directory name is registered when the file is a sub-directory. As for the attribute, file data shows the kind of sub-directory or kind of file. It is possible to access image file data or sub-directory with the leading cluster number. In the case of image file, as for the cluster number of the area, in which data constituting one file is recorded, the leading cluster number and following cluster number information are written in the FAT area of the memory card 114. The directory information of the sub-directory is written in an area provided in the file area of the memory card 114 when the directory is produced.

When registering a file as image data to be recorded on the sub-directory by using the hierarchical directory, a directory is produced by operating the MD switch 311f among the operation switches 311 shown in FIG. 117 to secure the image file recording area. For vertically moving the directory position for file accessing, the hierarchical directory access position is moved vertically by operating the D-UP or D-DOWN switch 311d or 311e. The image file to be recorded is selected with the frame UP and frame DOWN switches 311b and 311c. It is possible to obtain access of tree work system by continuously operating the frame UP and frame DOWN switches 311b and 311c. In accessing, the files in the prevailing hierarchical directory are accessed successively. When a sub-directory appears, files in the pertinent low order hierarchical sub-directory are accessed. When the accessing of the files in that sub-directory is completed, files positioning in the high-order hierarchical directory are accessed.

With respect to the file name of a recording-free image file directory entry, a value "0" is written. Whenever image data is written, a serial number is given for registration as the file name of the pertinent directory entry. As for the position on memory for file recording, a non-used area is searched according to the FAT information, and recording is done in that area.

When playing-back image data, the hierarchical position of the hierarchical directory of file is vertically moved by operating the D-UP or D-DOWN switch 311d or 311e. The image file to be played-back is selected with the frame UP and frame DOWN switches 311b and 311c. The mode designation for the recording or play-back operation is done by operating the REC/PLAY switch 311a.

FIG. 122 is a plan view showing the display 312. The displays "REC" 312c and "PLAY" 312d are turned on when the recording and play-back modes of the camera are set respectively. A first and a second display section 312a and 312b are one-line 7-segment display sections. In this embodiment of the DSC, the directory name or file name, to which an image file to be recorded or played-back belongs, is given a number, such as 1, 2, . . . , in correspondence to the file or sub-directory in directory information shown in FIG. 120. A hyphenation display 312f is a connection symbol between the first and second display sections 312a and 312b. Further, a one-digit display section 312e is provided. The first and second display sections 312a and 312b can display only two hierarchical layers. The display section 312e thus displays the number of concealed high-order hierarchical layers the hierarchical directory displayed on the first display section 312a.

Figure 123A:
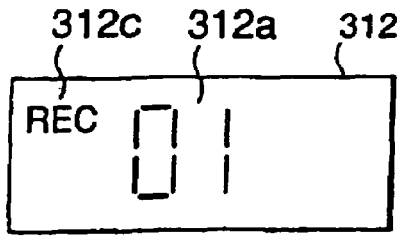
Figure 123B:
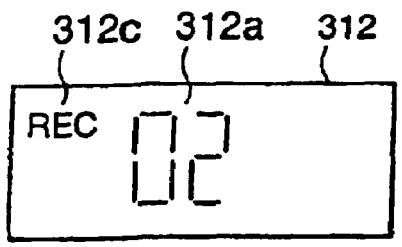
Figure 123C:
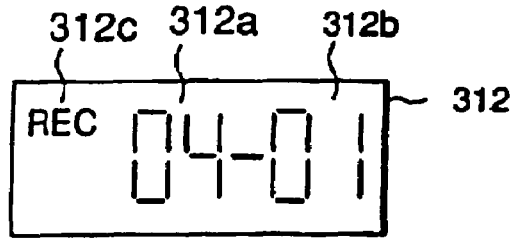
Figure 123D:
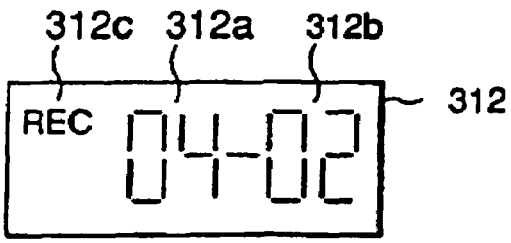

FIGS. 123(A)-123(D) show states of display on the display 312 when the recording file is moved by operating the frame UP and frame DOWN switches 311b and 311 c among the operation switches 311 in the recording mode. In the state of display shown in FIG. 123(A), "01" is displayed on the first display section 312a, indicating that the image file to be recorded is a file of file name 1 in the root directory (corresponded by file A in FIG. 120). Likewise, the state of display shown in FIG. 123(B) is that "02" is displayed on the first display section 312a, indicating that the image file for recording is a file 2 in the root directory (corresponded by file B in FIG. 120). The file name thus displayed can correspond to the frame number, and this is a feature of the embodiment. In the state of display shown in FIG. 123(C), "04" is displayed on the first display section 312a, while "01" is displayed on the second display section 312b. This means that the recording image file designation is a file of file name 1 (corresponded by file E shown in FIG. 120) in a sub-directory designated by directory name 4 of the root directory (corresponded by sub-directory b shown in FIG. 120). In FIG. 123(D) is shown that the recording image file designation is a file of file name 2 (corresponded by file F in FIG. 120) in a sub-directory designated by directory name 4 of the directory (corresponded by sub-directory b in FIG. 120). The switching of files from the state shown in FIG. 123(A) to the state shown in FIG. 123(D), is effected by operating the frame UP and frame DOWN switches 311b and 311c among the operation switches 311. By subsequently continually depressing the frame UP switch 311b, in the directory hierarchy shown in FIG. 120 the sub-directory b is returned to the root directory, and the file D is accessed.

Shown in FIG. 124(A) is a display of directory in the recording mode which is set up after power-on subsequent to the mounting of the new memory card 314 in the DSC. At this time, no sub-directory has been produced yet, and it is shown as "01" on the first display section 312a that the directory as the subject of access is of the first file name 1 in the root directory. Thus, by depressing the MD switch 311f for directory production, sub-directory 1 is produced in the first directory of the root directory, and "01" is displayed on the second display section 312b to indicate that file name 1 in sub-directory 1 is ready for recording (in FIG. 124(B)). When the recording is subsequently continued successively until reaching of a file registration limit in the registration permissible area in the sub-directory, the directory hierarchy returns to the high-order layer, in this case to the root directory, and "02" is displayed as the next file recording position (in FIG. 124(C)).

If it is desired to move to a separate sub-directory before the reaching of the file registration limit of the sub-directory, by operating the D-UP switch 311d the directory position may be moved to a high-order layer, for instance the root directory, for recording. While the designated file is switched successively by operating the frame UP and frame DOWN switches 311b and 311c, if there is a sub-directory, the hierarchy may be moved to the pertinent sub-directory for successive designation in that directory. If there is no sub-directory, the files in the root directory are successively accessed.

While the directory or file designation in the recording mode has been described, the directory up-down operation in the play-back mode may be similarly performed with the operation of the frame UP and frame DOWN switches 311b and 311c.

The sub-directory position is of course not limited to the above two hierarchical layers, and it is possible to shift the access position to deeper hierarchical layer sub-directories.

Shown in FIG. 125(A) is the LCD display 312 in a state of display of a second hierarchical layer sub-directory section registered in the root directory. In this state, "02" is displayed as the second hierarchical layer directory in the root directory "01". By operating the D-DOWN switch 311e, the directory position is lowered as shown in FIG. 125(B). That is, the second hierarchical layer display "02" is shifted to the first display section 312a, and the first file "01" in the third hierarchical layer sub-directory is newly displayed. At this time, data "01" indicative of the root directory designation position, which has been displayed in the first display section 312a, is erased. However, "1" is displayed in the display section 312e to permit visual recognition of the fact that there is one concealed hierarchical layer. By subsequently returning the directory to the high-order level by operating the D-UP switch 311d, the root directory name "01" is displayed again in the first display section 312a. In the second display section 312b, the file access position of the second hierarchical layer sub-directory is incremented by one, and file name "03" is displayed (in FIG. 125(C)).

The display of directories of a plurality of hierarchical layers may be made more readily recognizable by increasing the digits in the display sections. Further, while in the embodiment numbers are used for displaying the file or directory name, it is also possible to use alphabet letters for the display. Further, it is possible to use dot matrix LCDs for the display sections.

The operations of the recording and play-back processes in the embodiment of the DSC having the construction as described above on the basis of the hierarchical directory image file management, will now be described with reference to the flow charts of FIGS. 126 to 132.

FIG. 126 shows a flow chart of a "switch process" in the DSC. This process is a routine, in which an image file management directory is produced by operating the switches in the operation switch group 311 and also the recording switch 325, or in which recording or play-back is made by image file accessing by utilizing the directory information. First the state of the REC/PLAY switch 311a is checked (step S601). If the switch is "on", i.e., if the play-back mode has been selected, a step S608 is executed to call a "play-back mode process" sub-routine for playing-back the accessed image file. If the switch is "off", the state of the recording switch 325 is checked (step S602). If the switch is "on", it is determined that an image pick-up instruction has been output, and thus a step S609 is executed to call an "image pick-up mode process" sub-routine for performing image pick-up. If the switch is "off", a step S603 is executed.

In the step S603, the state of the MD switch 311f is checked. If the switch is "ON", it is determined that a directory production instruction has been output, and thus a step S610 is executed to call a "directory production process" sub-routine (see FIG. 127) to be described later. If the switch is "off", a step S604 is executed.

In the step S604, the state of the frame UP switch 311b is checked. If the switch is "on", it is determined that an instruction for incrementing the pertinent directory access position has been output, and a step S311 is executed to call an "UP switch process" sub-routine (see FIG. 128). If the switch is "off", a step S605 is executed.

In the step S605, the state of the frame DOWN switch 311c is checked. If the switch is "on", it is determined that an instruction for decrementing the pertinent directory access position has been output. Thus, a step S612 is executed to call a "DOWN switch process" sub-routine to be described later.

If the frame DOWN switch 311c is "off", a step S606 is executed.

In the step S606, the state of the D-UP switch 311d is checked. If the switch is "off", it is determined that an instruction for shifting the directory to be accessed to high-order hierarchical layer, and thus a step S613 is executed to call a "directory UP process" sub-routine (see FIG. 130) to be described later. If the switch is "off", a step S607 is executed.

In the step S607, the state of the D-DOWN switch 311e is checked. If the switch is "on", it is determined that an instruction for shifting the directory to be accessed to low-order hierarchical layer has been output, and thus a step S614 is executed to call a "directory DOWN process" sub-routine to be described later. If the switch is "off", the routine goes back to the step S601 to repeat the process described above.

FIG. 127 shows a flow chart of the above "directory production process" sub-routine. In this process, first an empty cluster as a recording-free area is searched from the FAT in the memory card 314 (step S621), and then a check whether the empty cluster is present is done (step S622). If there is no empty cluster, a warning such as flickering of the display 312 is generated (step S627), thus bringing an end to the sub-routine. If there is empty cluster, the sub-directory is registered in the directory entry (step S623), and the sub-directory area is initialized (step S624). At this time, code "0" is written at the leading of the file directory entry. Then, the first file of the sub-directory thus produced is made the next recording position (step S625). Then, the directory name and file name on the display 312 are updated (step S628).

FIG. 128 shows a flow chart of the "UP switch process" sub-routine. In this process, first a check as to whether the current directory is the final entry area (step S631). If so, no file can be registered in the pertinent sub-directory, and thus a step S635 is executed to call a "final entry process" sub-routine (see FIG. 129) to be described later. If the directory is not the final entry, a check as to whether the attribute of the next directory represents a sub-directory is done (step S632). If a sub-directory is represented, a step S636 is executed to call a "sub-directory process" sub-routine (see FIG. 131) to be described later. If no sub-directory is represented, the next directory entry is designated as a recording position (i.e., recording frame position) (step S633). Then, the display on the LCD display 312 is updated (step S634), thus bringing an end to the sub-routine. While this sub-routine has been concerned with the recording mode, process in the play-back mode is similarly carried out. The "DOWN switch process" sub-routine is a reverse access process with respect to the "UP switch process" noted above.

FIG. 129 shows a flow chart of the "final entry process" sub-routine. In this process, a check as to whether the prevailing process position is the root directory is first done (step S641). If the position is the root directory, a warning is generated (step S645), thus bringing an end to the sub-routine. If the position is not the root directory, the pointer of high-order directory is read out for moving to the high-order hierarchical layer directory (step S642). The hierarchy then goes to the high-order directory to designate the file shown by the next directory entry of the directory as the next recording file (step S643). Then, the display on the LCD display 312 is updated (step S644), thus bringing an end to the sub-routine. While the sub-routine has been the "UP switch process" in the recording mode, the play-back 20 mode process is a similar process.

FIG. 130 shows the "directory UP process" sub-routine. In this process, a check as to whether the prevailing process position is the root directory is first done (step S651). If the position is the root directory, a step S655 is executed to call a "root directory process" sub-routine (see FIG. 132) to be described later. If the position is not the root directory, the high-order directory pointer is read out for moving to the high-order hierarchical layer directory (step S652). Then, the hierarchy goes to the high-order directory to designate the file shown by the next directory entry of the directory as the next recording file (step S653). Then, the display of the LCD display 312 is updated (step S654), thus bringing an end to the sub-routine. This sub-routine has been the "directory UP process" in the recording mode, while the play-back mode process is a similar process. The "directory DOWN process" noted above is similar to the "directory UP process". In this case, the directory is moved to low-order layer.

FIG. 131 shows a flow chart of the "sub-directory process" sub-routine. In this process, able-to-write entry of sub-directory designated by directory entry is designated as recording position (step S661). Then, the display on the LCD display 312 is updated (step S662), thus bringing an end to the sub-routine.

FIG. 132 shows a flow chart of the "root directory process" sub-routine. In this process, a check is first done as to whether the current directory is the final entry area (step S671). If so, no file can be registered in the pertinent directory, and thus a warning is generated (step S674), thus bringing an end to the routine. If the directory is not the final entry, the next directory entry is designated as the recording position (i.e., recording frame position) (step S672). Then, the display on the LCD display 312 is updated (step S673), thus bringing an end to the sub-routine.

As has been shown, in this embodiment of the DSC image files are classified with the DOS FAT system and sub-directory structure. The results are displayed by tree display with a limit number of operation switches that can be mounted on the camera and few digit display sections, thus permitting a directory process of image files making use of the merits of the tree display. For example, it is possible to produce sub-directories for different themes, such as an image pick-up trip or a sports meeting. Further, it is possible to group continuously picked-up image files as a group distinct from other general images. Further, the file registration state can be recognized with the operation of the above limited number of switches and also with few digit display sections of the camera. These effects are similar to those obtainable by the tree display.

The directory information in the memory card used with the DSC of the embodiment may be input to a personal computer for hierarchical directory process thereon.

FIGS. 133(A)-133(C) show states of display on the display 312 in a different embodiment of the DSC according to the invention. The display is obtained when selecting a recording-free file as a subject of access for recording by operating the frame UP and frame DOWN switches 311b and 311c among the operation switches in the recording mode. In the display shown in FIG. 133(A), "01" is displayed in a directory display section 3120. This indicates that the image file to be recorded is the first file in the root directory (corresponded by the first file in FIG. 133(a), the Figure being of the same expression form as that of FIG. 120). Likewise, in the display shown in FIG. 133(B), "02" is displayed on the directory display section 3120. This indicates that the image file to be recorded is the second file of the root directory (corresponded by the second file in FIG. 133(b)). In the display shown in FIG. 133(C), "04" is displayed on the directory display section 3120. This indicates that the image file to be recorded is the fourth file in the root directory (corresponded by the fourth file in FIG. 133(c)). The file name which is displayed in this way can be corresponded by a frame number, which is one of the features of the embodiment. This embodiment of the DSC, unlike what has been described before as compared with FIGS. 123(A)-123(D) or the like, does not have any structure for accessing sub-directories. Thus, the construction is simpler and more inexpensive. Again in this embodiment, like the case of FIG. 122, the "REC" display 312c indicates that the camera is in the recording mode.

Figure 134A:
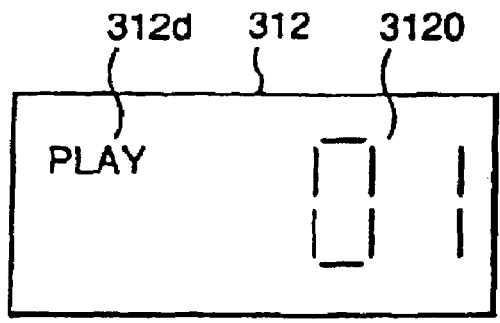
Figure 134B:
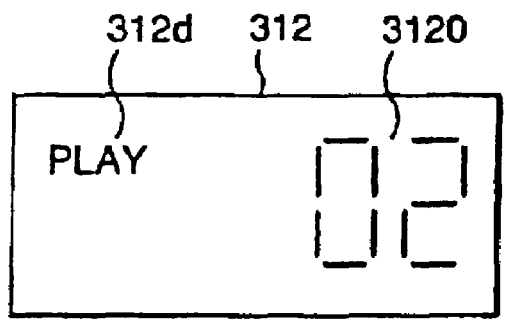
Figure 134C:
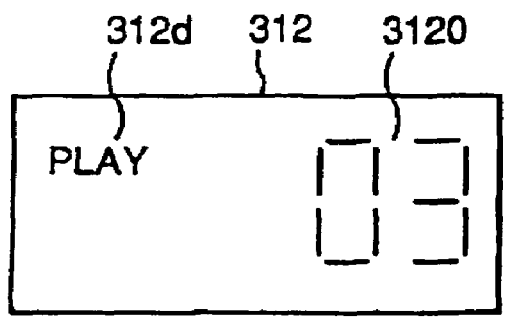
Figure 134D:
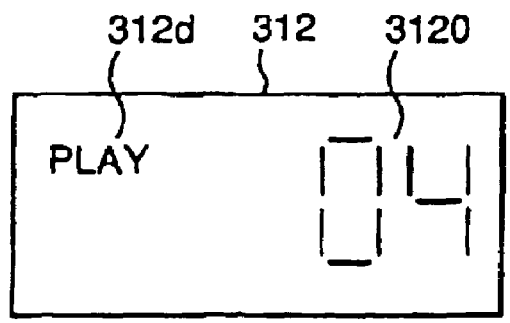
Figure 135A:
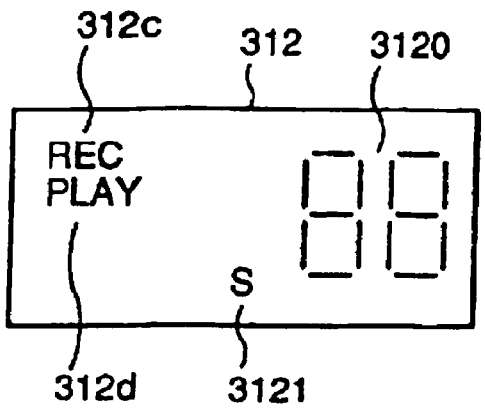
Figure 135D:
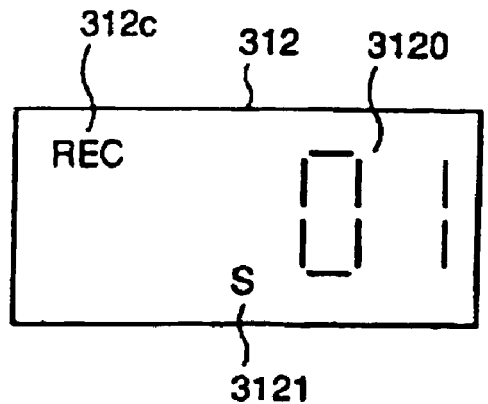
Figure 135B:
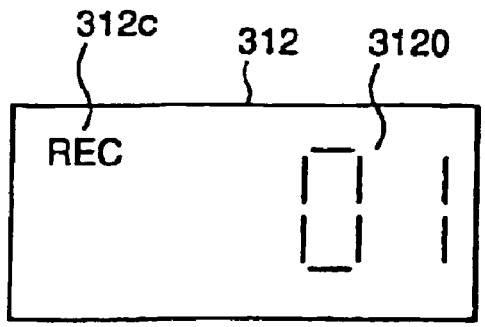
Figure 135E:
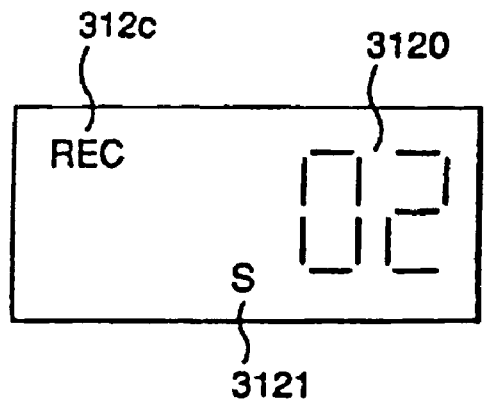
Figure 135C:
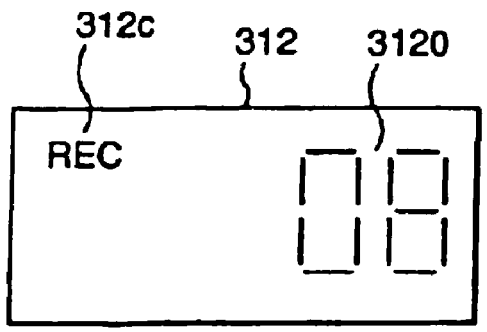

FIGS. 134(A)-134(D) show states of display on the display section 312 in the above embodiment of the DSC described in connection with FIGS. 133(A)-133(C) in the play-back operation. In the display shown in FIG. 134(A), "01" is displayed on the directory display section 3120. This indicates that the image file which is to be played-back is the first file in the root directory. Likewise, in the display shown in FIG. 134(B), "02" is displayed on the directory display section 3120. This indicates that the prevailing subject of access is the second file in the root directory. In the display shown in FIG. 134(C), a flicker display of "03" is provided on the directory display section 3120. This means a warning display that although the subject of access is the third file in the root directory, a sub-directory has been set in this file, and this file can not be a subject of play-back in this embodiment of the DSC. In the display shown in FIG. 134(D), "04" is displayed on the directory display section 3120. This indicates that the subject of access is the fourth file in the root directory. The display as shown in FIG. 134(C) is made for the following reason. Although the simplified and low cost DSC as the above embodiment does not have any function of setting or accessing sub-directories, it is possible that a memory card, in which a sub-directory has been set through a process by a high level version DSC or by a personal computer, is applied to this simplified DSC. In such a case, the user may be brought to a confusion such as taking the application of such memory card as a trouble in the camera. To avoid such confusion, some measure is necessary. The display as shown in FIG. 134(C) is such a measure. In this embodiment, like the case described before in connection with FIG. 122, the "PLAY" display 312d indicates that the camera is in the play-back mode.

FIGS. 135(A)-135(E) show states of display on the display section 312 in the DSC mainly in play-back. The display shown in FIG. 134(A). is given for the sake of convenience of describing the manner of display. More specifically, in this state of display 312, a "REC" display element 312c for displaying the setting of the recording mode, a "PLAY" display element 312d for displaying the setting of the play-back mode, a directory display section 3120 and a hierarchic display element 3121 are all in the "on" (display) state. In the display shown in FIG. 135(B), "01" is displayed on the directory display section 3120. This indicates that the image file to be recorded is a file of file name 1 in the root directory. Likewise, in the display shown in FIG. 135(C), "08" is displayed on the directory display section 3120. This indicates that the image file to be recorded is the eighth file in the root directory. Again in this embodiment, the file name which is displayed in this way can be corresponded by a frame number, which is a feature of the embodiment. In the display shown in FIG. 135(D), "01" is displayed on the directory display section 3120, and "S" is displayed on the hierarchic display section 3121. This indicates that the subject displayed as "01" on the directory display section 3120 is the first file in a sub-directory which is one level lower than the root directory FIGS. 135(B) and 135(C). Likewise, in the display shown in FIG. 135(E), "02" is displayed on the directory display section 3120, and "S" is displayed on the Hierarchic display section 3121. This indicates that the subject displayed as "02" on the directory display section 3120 is the second file in the sub-directory.

The switching of the files as the subject of access, as described in the above embodiment, is effected by operating the frame UP and frame DOWN switches 311b and 311c among the operation switches 311.

As has been described in the foregoing, with the electronic image pick-up apparatus according to the invention, the image file management is made by using a method, in which directories are set to be convenient for the file access. Besides, the directories are displayed with display sections of few digits and few operation switches that are permissible to be provided on the image pick-up apparatus in view of the portability. Thus, without spoiling the portability of the camera, it is possible to deftly classify a large number of image files. Further, it is possible to quickly select image data to be played-back.

What is claimed is:

1. An electronic image pick-up apparatus for capturing an image information representing an object image and storing the image information on a storage medium by using a directory structure, comprising:

a storage controller adapted to control storing of image information on the storage medium, by registering the image information in a directory of the directory structure until reaching an upper limit of registered image information of the directory and changing from the directory to another directory for registering the image information after reaching the upper limit.

2. The electronic image pick-up apparatus of claim 1, wherein the storage medium is a detachable storage medium.

3. The electronic image pick-up apparatus of claim 1, wherein the directory structure is a hierarchical directory structure.

4. An electronic image pick-up apparatus for storing an image information on a storage medium by using a directory structure comprising:

an image pick-up device adapted to generate an electrical signal representing an object image;

an A/D converter adapted to convert the electrical signal to a digital image data;

a compression circuit adapted to compress the digital image data to obtain the image information; and a storage controller adapted to control storing of the image information on the storage medium, by registering the image information in a directory of the directory structure until reaching a file registration limit of the directory and changing from the directory to another directory for registering the image information after reaching the file registration limit.

5. The electronic image pick-up apparatus of claim 4, wherein the electronic image pick-up apparatus reproduces a stored image information stored on the storage medium by using the directory structure for play-back, the electronic image pick-up apparatus further comprising:

a display unit adapted to display, for play-back, a first indication representing a directory in which a stored image information is registered and a second indication representing a stored image information.

6. The electronic image pick-up apparatus of claim 5, wherein the display unit is adapted to display a connection symbol disposed between the first indication and the second indication.

7. An electronic image pick-up apparatus for storing an image information on a storage medium by using a directory structure and reproducing a stored image information stored on the storage medium by using the directory structure for play-back, comprising:

a storage controller adapted to control storing of the image information on the storage medium, by registering the image information in a directory of the directory structure until reaching an upper limit of registered image information of the directory and changing from the directory to another directory for registering the image information after reaching the upper limit; and a display unit adapted to display, for play-back, a first indication representing a directory in which a stored image information is registered and a second indication representing a stored image information.

8. The electronic image pick-up apparatus of claim 7, wherein the display unit is adapted to display a connection symbol disposed between the first indication and the second indication.

9. An electronic image pick-up apparatus for storing an image information on a storage medium by using a directory structure and reproducing a stored image information stored on the storage medium by using the directory structure for play-back, comprising:

a storage controller adapted to control storing of the image information on the storage medium, by registering the image information in a directory of the directory structure up to a maximum file registration number of the directory, and not registering the image information in the directory beyond the maximum file registration number; and a display unit adapted to display, for play-back, a first indication representing a directory in which a stored image information is registered and a second indication representing a stored image information.

10. The electronic image pick-up apparatus of claim 9, wherein the storage controller changes from the directory to another directory for registering the image information after reaching the maximum file registration number.

11. An electronic image pick-up apparatus for capturing an image information representing an object image and storing the image information on a storage medium by using a directory structure, comprising:

a storage controller adapted to control storing of the image information on the storage medium, by registering the image information in a directory of the directory structure until reaching an upper limit of registered image information of the directory and changing from the directory to another directory after reaching the upper limit; and an operation member for manually changing from the directory to another directory for registering the image information before reaching the upper limit.

12. An electronic image pick-up apparatus for capturing an image information representing an object image and storing the image information on a storage medium by using a directory structure, comprising:

a storage controller adapted to control storing of the image information on the storage medium, by registering the image information in a directory of the directory structure up to a maximum file registration number of the directory and not registering the image information in the directory beyond the maximum file registration number; and an operation member for manually changing from the directory to another directory for registering the image information before reaching the maximum file registration number.

13. The electronic image pick-up apparatus of claim 12, wherein the storage controller changes from the directory to another directory for registering the image information after reaching the maximum file registration number.

14. A method for storing an image information on a storage medium of an image pick-up apparatus by using a directory structure, comprising:

capturing an image representing an object;

storing the image information by registering the image information in a directory of the directory structure until reaching an upper limited of registered image information of the directory and changing from the directory to another directory for registering the image information after reaching the upper limit; and changing from the directory to another directory for registering the image information before reaching the upper limit by manual operation.

15. A method for storing an image information on a storage medium of an image pick-up apparatus by using a directory structure, comprising:

capturing an image representing an object;

checking whether an upper limit of registered image information of a current directory is reached;

registering the image information in the current directory until reaching the upper limit according to the checking result; and changing the current directory from the directory to another directory after reaching the upper limit.

16. The method of claim 15, wherein the another directory is in a higher-order layer in the directory structure.

17. A method for storing an image information on a storage medium by using a directory structure and playing back a stored image information stored on the storage medium by using the directory structure, comprising:

checking whether an upper limit of registered image information of a current directory is reached;

registering the image information in the current directory until reaching the upper limit according to the checking result;

changing the current directory from the directory to another directory after reaching the upper limit; and in playing-back the stored image information, displaying a first indication representing a directory in which a stored image information is registered and a second indication representing a stored image information.

18. A method for storing an image information on a storage medium of an image pick-up apparatus by using a directory structure, comprising:

capturing an image representing an object;

registering the image information in a directory of the directory structure up to an upper limit of registered image information of the directory; and beyond the upper limit, not registering the image information in the directory, but changing to another directory before registering the image information.

19. A method for storing image information on a storage medium of an electronic image pick-up apparatus, comprising:

checking whether a registration limit of a directory is reached;

designating, if further registration within the directory is possible, a directory entry within the directory for registering an image information; and changing, if no further registration within the directory is possible, to another directory for registering image information.

20. A method for storing image information on a storage medium by using a directory structure and reproducing stored image information stored on the storage medium by using the directory structure for play-back, the method comprising:
- registering image information in a directory of the directory structure up to a maximum file registration number of the directory, but not registering image information in the directory beyond the maximum file registration number; and
- displaying, for play-back, a first indication representing a directory in which a storage image information is registered and a second indication representing the stored image information.

21. The method of claim 20, further comprising:
generating a warning if no further registration of image information is possible within a directory.

22. A method for storing an image information on a storage medium of an image pick-up apparatus by using a directory structure, comprising:
- capturing an image representing an object; and
- storing the image information by registering the image information in a directory of the directory structure until reaching an upper limit of registered image information of the directory and changing from the directory to another directory for registering the image information after reaching the upper limit;

wherein the directory for registering the image information is changeable before reaching the upper limit by manual operation.

23. An electronic image pick-up apparatus, comprising:
an image pick-up device for capturing an image information representing an object image;
a storage medium for storing the image information by using a directory structure; and
a storage controller adapted to control storing of image information or the storage medium, by registering the image information in a directory of the directory structure until reaching an upper limit of registered image information of the directory and changing from the directory to another directory for registering the image information after reaching the upper limit.

* * * * *